(12) United States Patent
Yoden

(10) Patent No.: US 10,969,930 B2
(45) Date of Patent: Apr. 6, 2021

(54) USER INTERFACE FOR USE IN COMPUTING DEVICE WITH SENSITIVE DISPLAY

(71) Applicant: Koji Yoden, Tamba (JP)

(72) Inventor: Koji Yoden, Tamba (JP)

( * ) Notice: Subject to any disclaimer, the term of this patent is extended or adjusted under 35 U.S.C. 154(b) by 0 days.

(21) Appl. No.: 16/824,607

(22) Filed: Mar. 19, 2020

(65) Prior Publication Data
US 2020/0285381 A1 Sep. 10, 2020

Related U.S. Application Data

(63) Continuation of application No. 14/833,140, filed on Aug. 23, 2015, now abandoned, which is a continuation of application No. 13/732,407, filed on Jan. 1, 2013, now Pat. No. 9,116,598.

(60) Provisional application No. 61/584,850, filed on Jan. 10, 2012.

(51) Int. Cl.
| | |
|---|---|
| *G06F 3/0488* | (2013.01) |
| *G06F 3/0481* | (2013.01) |
| *G06F 3/0482* | (2013.01) |
| *G06F 3/0484* | (2013.01) |

(52) U.S. Cl.
CPC ........ *G06F 3/04817* (2013.01); *G06F 3/0482* (2013.01); *G06F 3/0484* (2013.01); *G06F 3/0488* (2013.01); *G06F 3/04812* (2013.01); *G06F 3/04842* (2013.01); *G06F 3/04883* (2013.01)

(58) Field of Classification Search
CPC ... G06F 3/0482; G06F 3/0484; G06F 3/04883
See application file for complete search history.

(56) References Cited

U.S. PATENT DOCUMENTS

| | | | | |
|---|---|---|---|---|
| 2004/0049541 | A1* | 3/2004 | Swahn ............. | G06F 16/9577 709/203 |
| 2007/0201863 | A1* | 8/2007 | Wilson ............. | G03B 29/00 396/429 |
| 2008/0229197 | A1* | 9/2008 | Branson ........... | G06F 9/453 715/705 |
| 2012/0154255 | A1* | 6/2012 | Hinckley .......... | G06F 3/0488 345/1.3 |
| 2012/0254808 | A1* | 10/2012 | Gildfind .......... | G06F 3/04883 715/863 |
| 2013/0083074 | A1* | 4/2013 | Nurmi ............. | G06F 3/0488 345/650 |

* cited by examiner

*Primary Examiner* — Seth A Silverman

(57) ABSTRACT

A user interface at a computing device with a sensitive display is disclosed. A dialog is popped up, on the sensitive display, at a position that is predetermined pixels away from the position of hover or a tap of an object detected by the sensitive display. A menu for operation of a computer program is displayed responsive to such hover being detected above a predetermined location within a screen of the computer program on the sensitive display. An assistance object for assisting a tappable object to be tapped is displayed responsive to such hover being detected above the tappable object on the sensitive display. A tappable object is emphasized responsive to such hover being detected above the tappable object on the sensitive display.

20 Claims, 93 Drawing Sheets

USER INTERFACE FOR USE IN COMPUTING DEVICE WITH SENSITIVE DISPLAY

CROSS REFERENCE TO RELATED APPLICATIONS

This application claims priority from and is a continuation of U.S. patent application Ser. No. 14/833,140 filed on Aug. 23, 2015, which is a continuation of U.S. patent application Ser. No. 13/732,407 filed on Jan. 1, 2013 (now issued as U.S. Pat. No. 9,116,598), which claims priority from U.S. Provisional Patent Application Ser. No. 61/584,850 filed on Jan. 10, 2012, the contents of each of which are expressly incorporated herein by reference in their entirety.

the benefit of U.S. provisional patent application 61/584,850 filed on Jan. 10, 2012 and entitled "Display Control for use in Handheld Computing Device through Sensitive Display", the content of which is incorporated herein by reference in its entirety.

TECHNICAL FIELD

The present disclosure relates to a user interface for use in a computing device with a sensitive display.

BACKGROUND

There have been marketed computing devices such as PCs (Personal Computers), laptops, mobile phones, and tablets. Such computing device nowadays has one or more great memories and one or more great processors, thereby becoming multi-functional with various computer programs executable on the device. Such computer programs may include, for example, a text editor, a WWW (World Wide Web) browser, and video games.

The multi-functional computing device should be welcomed, but, at the same time, may require complicated operations for users thereby making usability worse. Improvement in a user interface in such computing device is great concern for making usability better. For example, the user interface is improved by use of a sensitive display. The sensitive display typically detects a contact or a tap of an object like a user's finger onto the surface of the sensitive display as well as displays graphics. The sensitive display may be advantageous in that it may enable intuitive and easy operations for the users. More improvement in a user interface through the sensitive display has been sought.

Usability may be made worse when the multi-functional computing device is a handheld device that is small for mobility and is provided with a tiny display and a tiny loudspeaker. For example, in playing video with such computing device, the video displayed on its local display is so small that the user may feel he/she would like to enjoy the video with a larger remote or external display device. In another example, in playing music with such computing device, the sound outputted through its local loudspeaker is so unsatisfactory that the user may feel he/she would like to enjoy the music with a larger remote or external loudspeaker. To do so, it is advantageous if the multi-functional device can communicate with a remote media-playing device such as a remote display device and a remote loudspeaker. Thus, improvement in a user interface for use in a computing device in connection with a remote media-playing device is also great concern.

SUMMARY

A first aspect of the present invention is a method of a user interface for use in a computing device with a sensitive display. According to the first aspect, a tap of an object such as a user's finger onto the sensitive display and hover of the object in proximity over the sensitive display are detected. Within a screen of a computer program executed in the computing device, a popup dialog is displayed at a location determined based on the detected tap or hover.

A second aspect of the present invention is a method of a user interface for use in a computing device with a sensitive display. According to the second aspect, hover of an object such as a user's finger in proximity over the sensitive display is detected. Responsive to hover detected above a predetermined area within a screen of a computer program displayed on the sensitive display, a menu is displayed.

A third aspect of the present invention is a method of a user interface for use in a computing device with a sensitive display. According to the third aspect, hover of an object such as a user's finger in proximity over the sensitive display is detected. Responsive to hover detected above a tappable object within a screen of a computer program displayed on the sensitive display, an assistant object is displayed for assisting the tappable object to be tapped.

A fourth aspect of the present invention is a method of a user interface for use in a computing device that is provided with a sensitive display and is operable in connection with a remote display device. According to the fourth aspect, hover of an object such as a user's finger in proximity over the sensitive display is detected. Video signals representing a screen of a computer program executed in the computing device can be sent to the remote display device. Also, video signals representing an indicator indicative of the detected hover can be sent to the remote display device.

A fifth aspect of the present invention is a method of a user interface for use in a computing device that is provided with a sensitive display and is operable in connection with a remote display device. According to the fifth aspect, a screen of a computer program executed in the computing device can be changed according to whether or not communication is active between the computing device and the remote display device.

The word "tappable" used in this application means possibility or ability of being tapped. For example, a tappable object means an object which is to be tapped, or which a user can tap on.

DRAWINGS

FIGS. 5, 6, 7, and 8 illustrate how the location for a notification dialog is determined based on hover according to the first aspect of the first embodiment.

FIGS. 9, 10, 11, and 12 illustrate how a notification dialog is displayed according to the first aspect of the first embodiment.

FIGS. 13, 14, 15, and 16 illustrate how a notification dialog is displayed according to the first aspect of the first embodiment.

Figure 17:
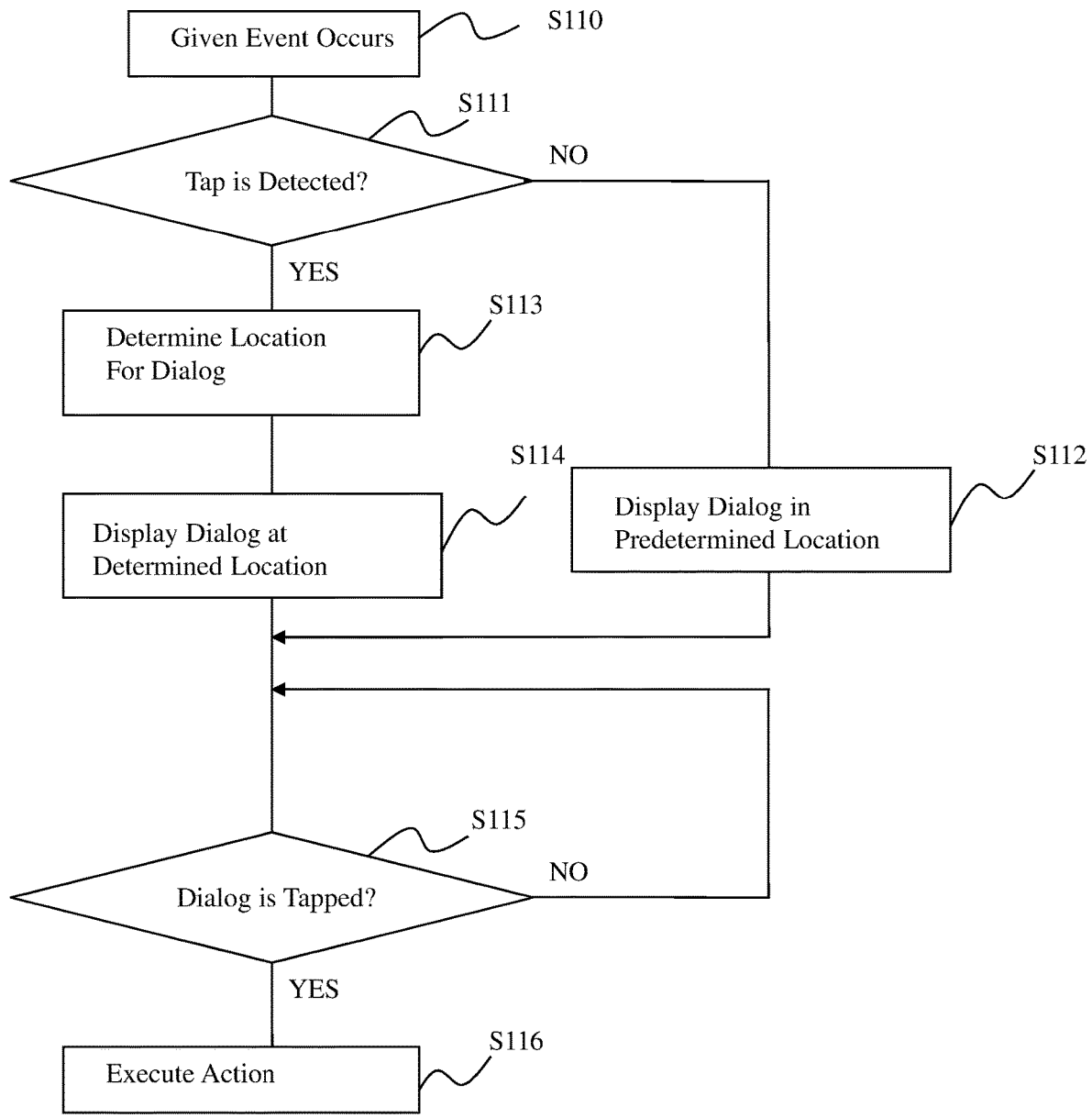

FIG. 17 is a flowchart illustrating operations performed by a computing device according to a second aspect of the first embodiment.

Figure 18:
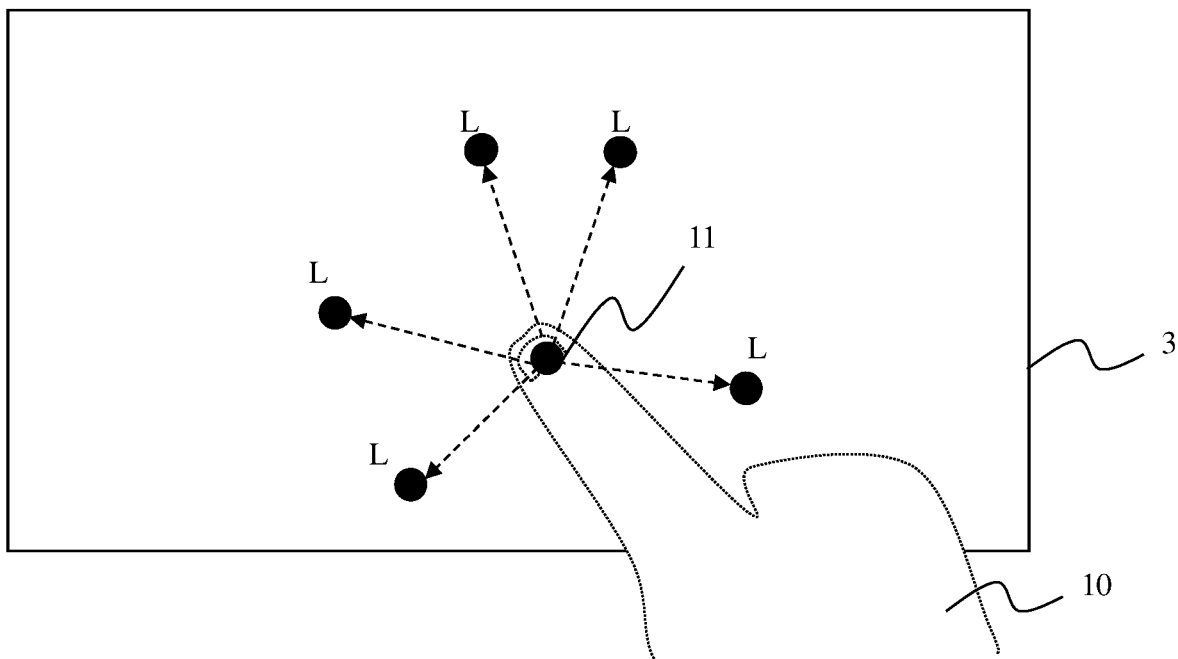

FIG. 18 illustrates how the location for a notification dialog is determined based on tap according to the second aspect of the first embodiment.

FIGS. 19, 20, 21, and 22 illustrate how the location for a notification dialog is determined based on tap according to the second aspect of the first embodiment.

FIGS. 23, 24, 25, and 26 illustrate how a notification dialog is displayed according to the second aspect of the first embodiment.

FIGS. 27, 28, 29, and 30 illustrate how a notification dialog is displayed according to the second aspect of the first embodiment.

Figure 31:
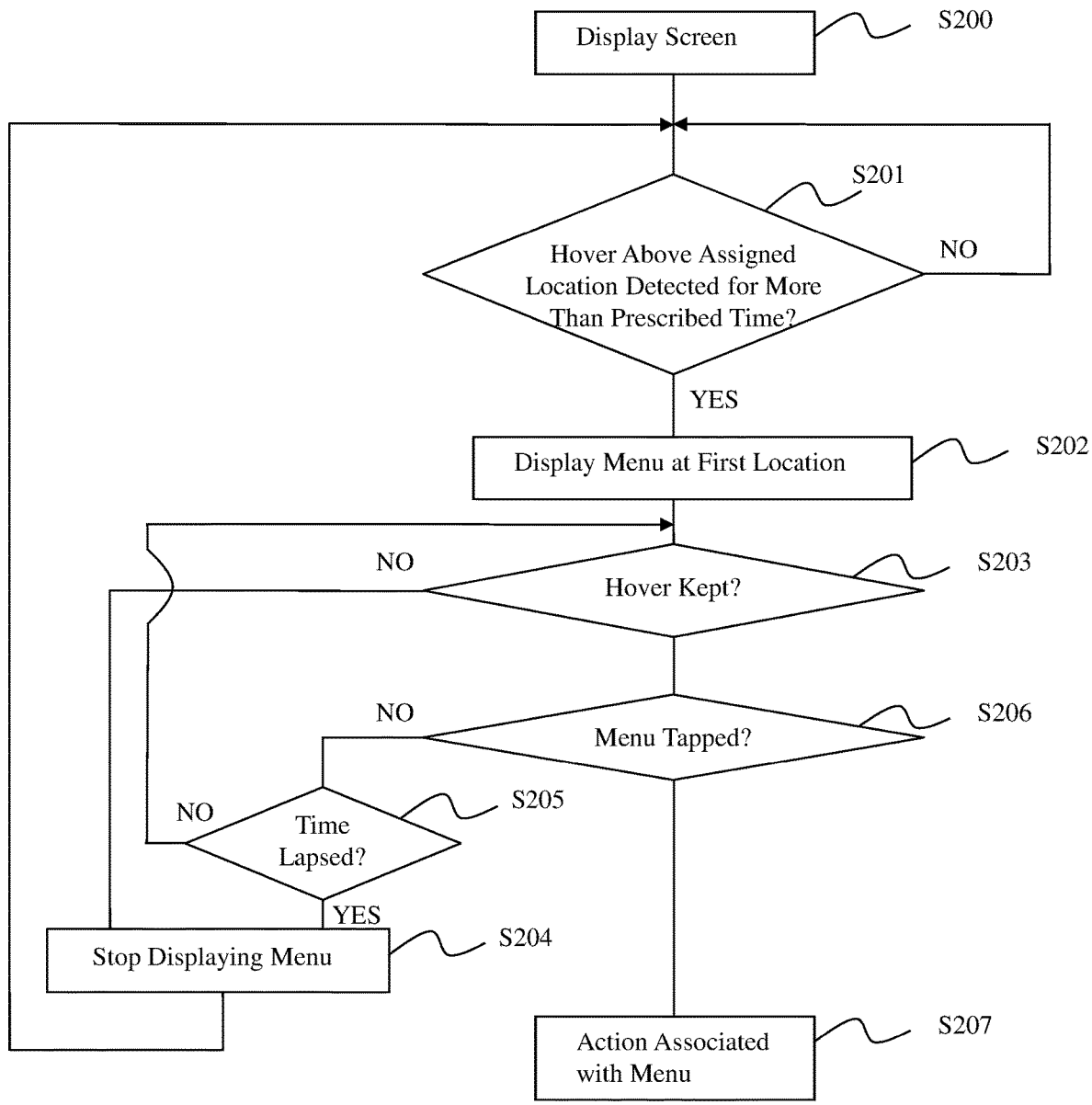

FIG. 31 is a flowchart illustrating operations performed by a computing device according to a third aspect of the first embodiment.

FIGS. 32, 33, 34, and 35 illustrate how a menu is displayed according to the third aspect of the first embodiment.

Figure 36:
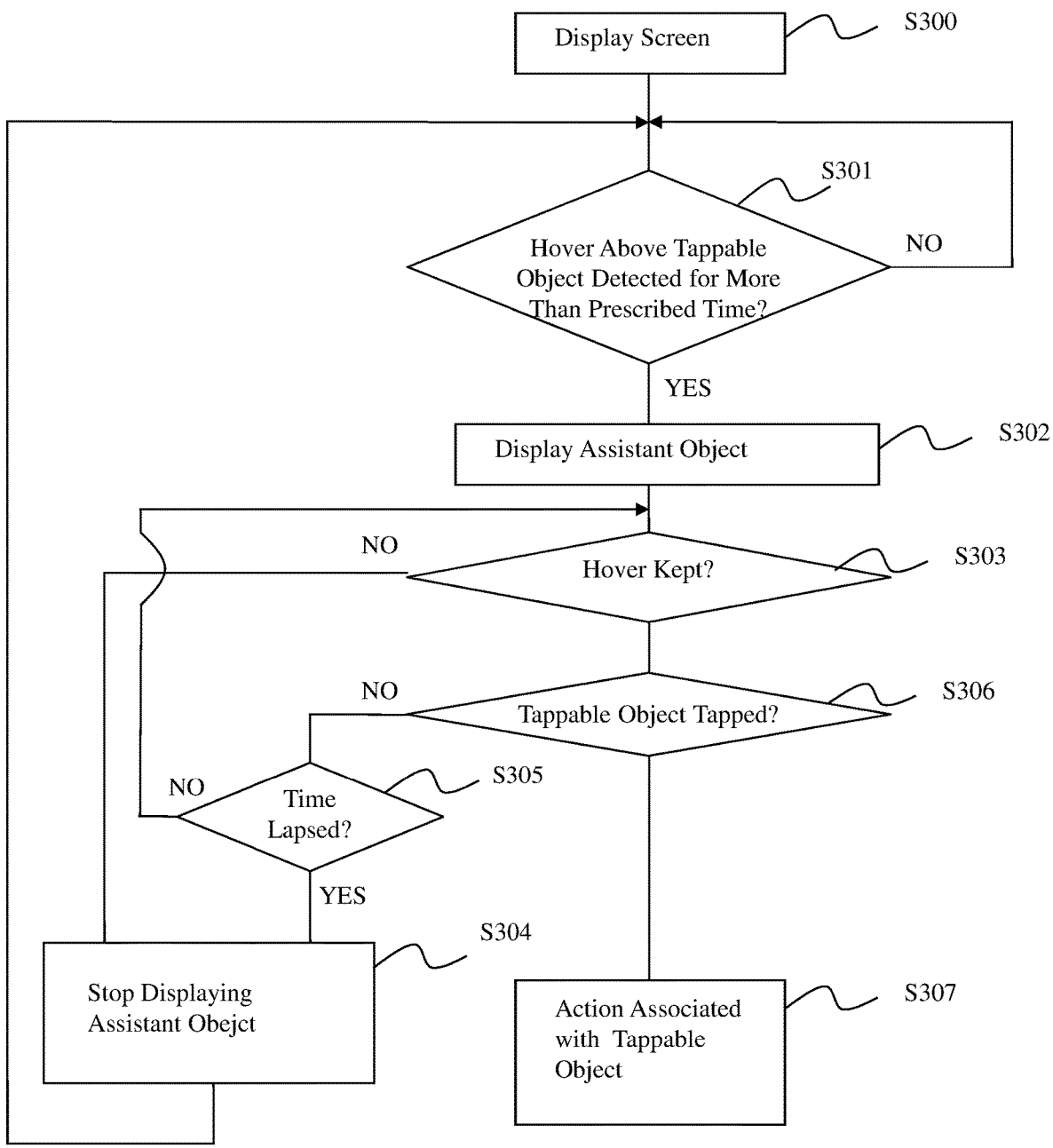

FIG. 36 is a flowchart illustrating operations performed by a computing device according to a fourth aspect of the first embodiment.

FIGS. 37, 38, 39, and 40 illustrate how an assistant object is displayed according to the fourth aspect of the first embodiment.

Figure 41:
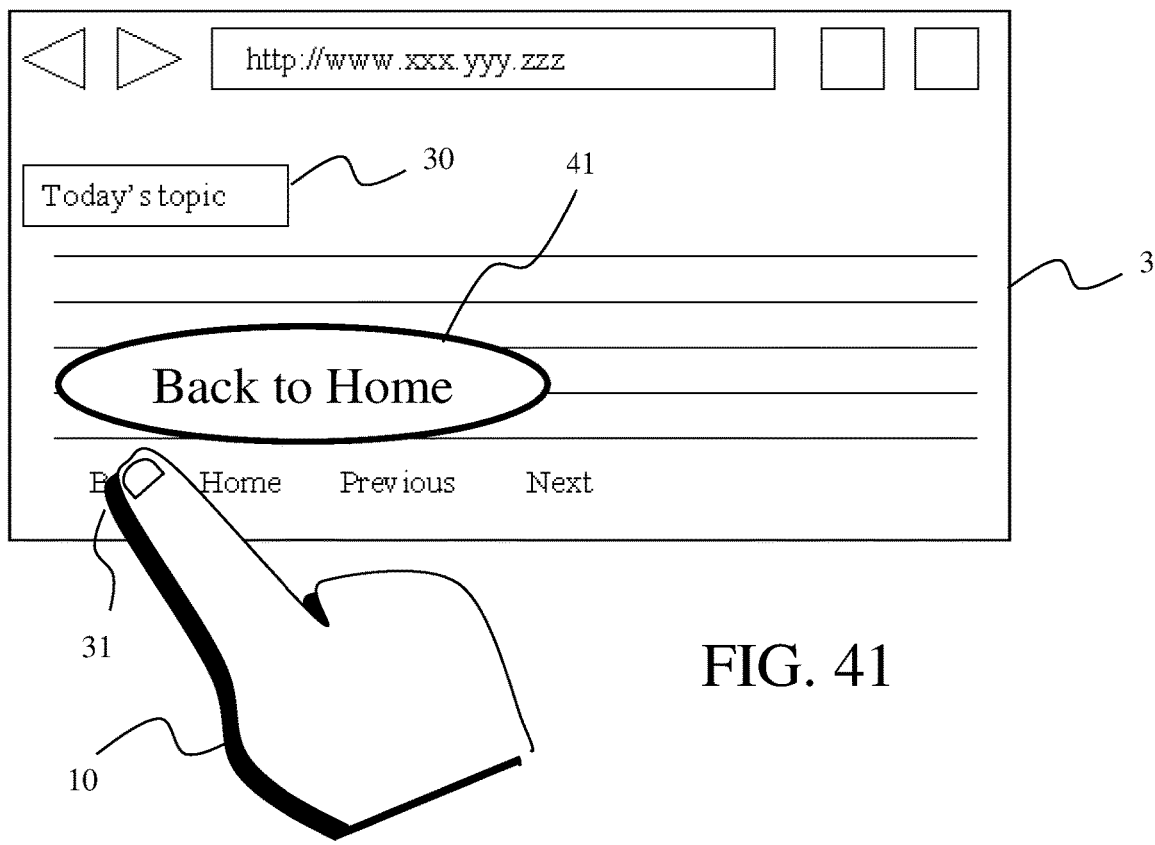
Figure 42:
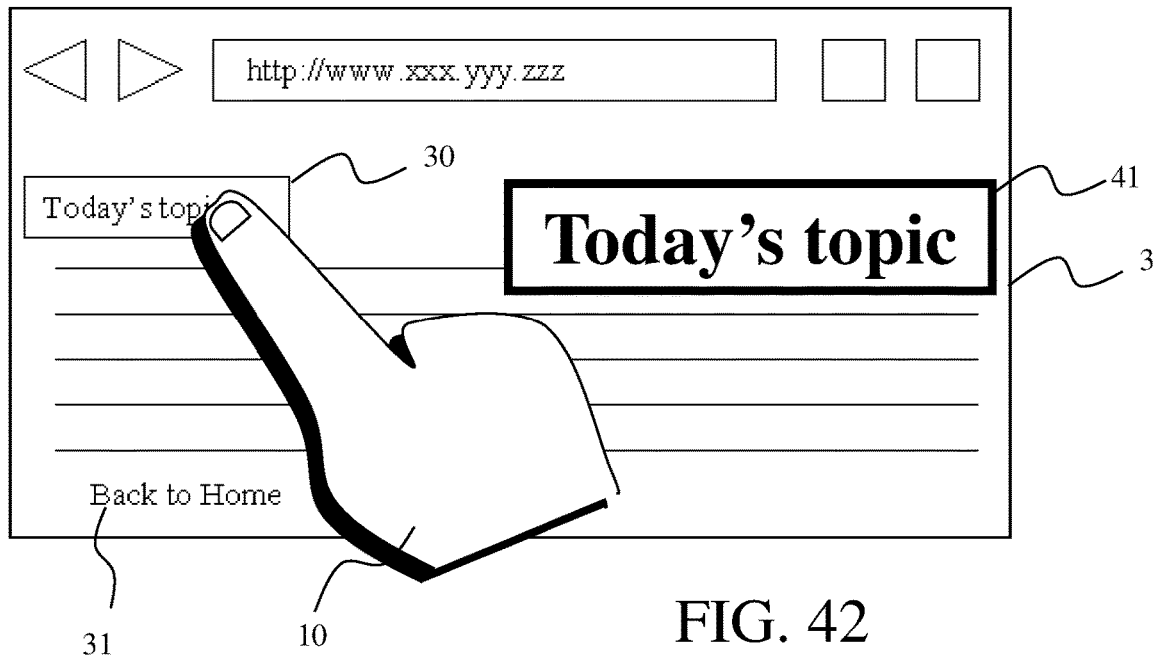
Figure 43:
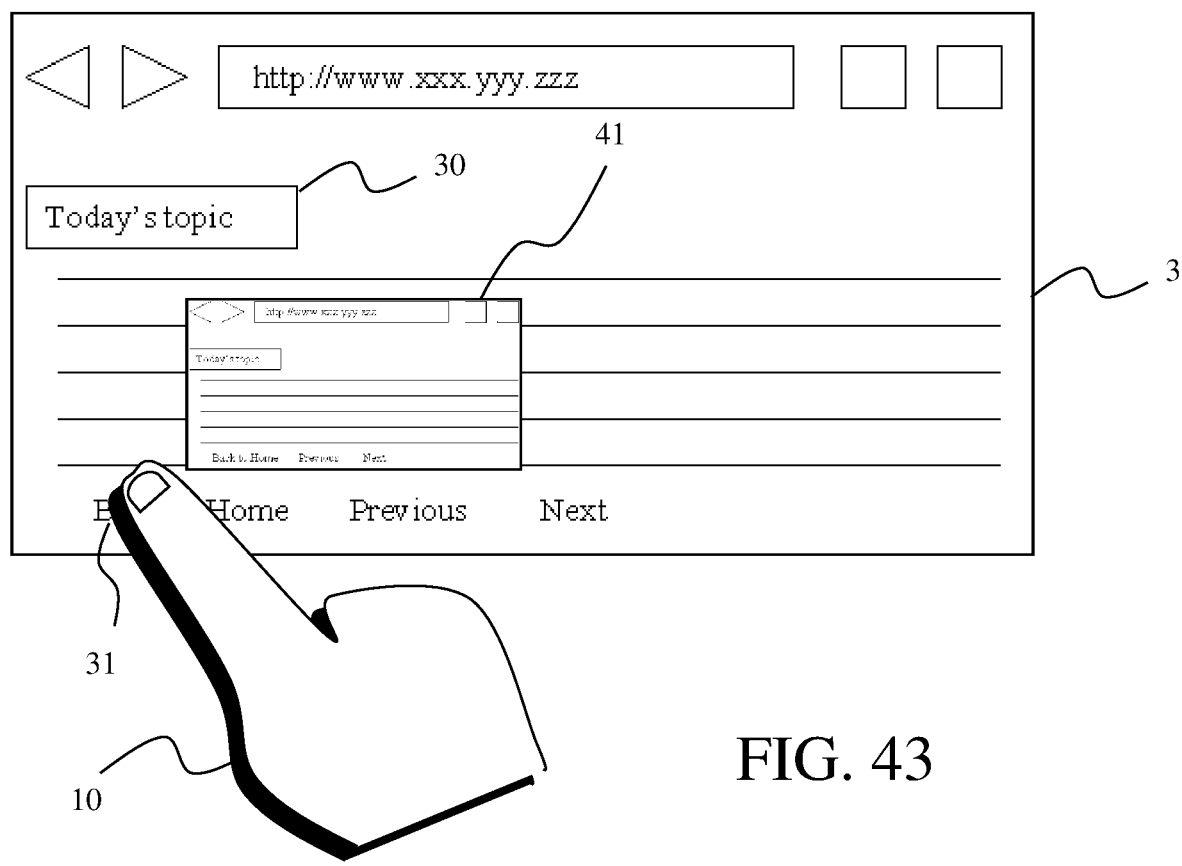

FIGS. 41, 42, and 43 illustrate how an assistant object is displayed according to the fourth aspect of the first embodiment.

Figure 44:
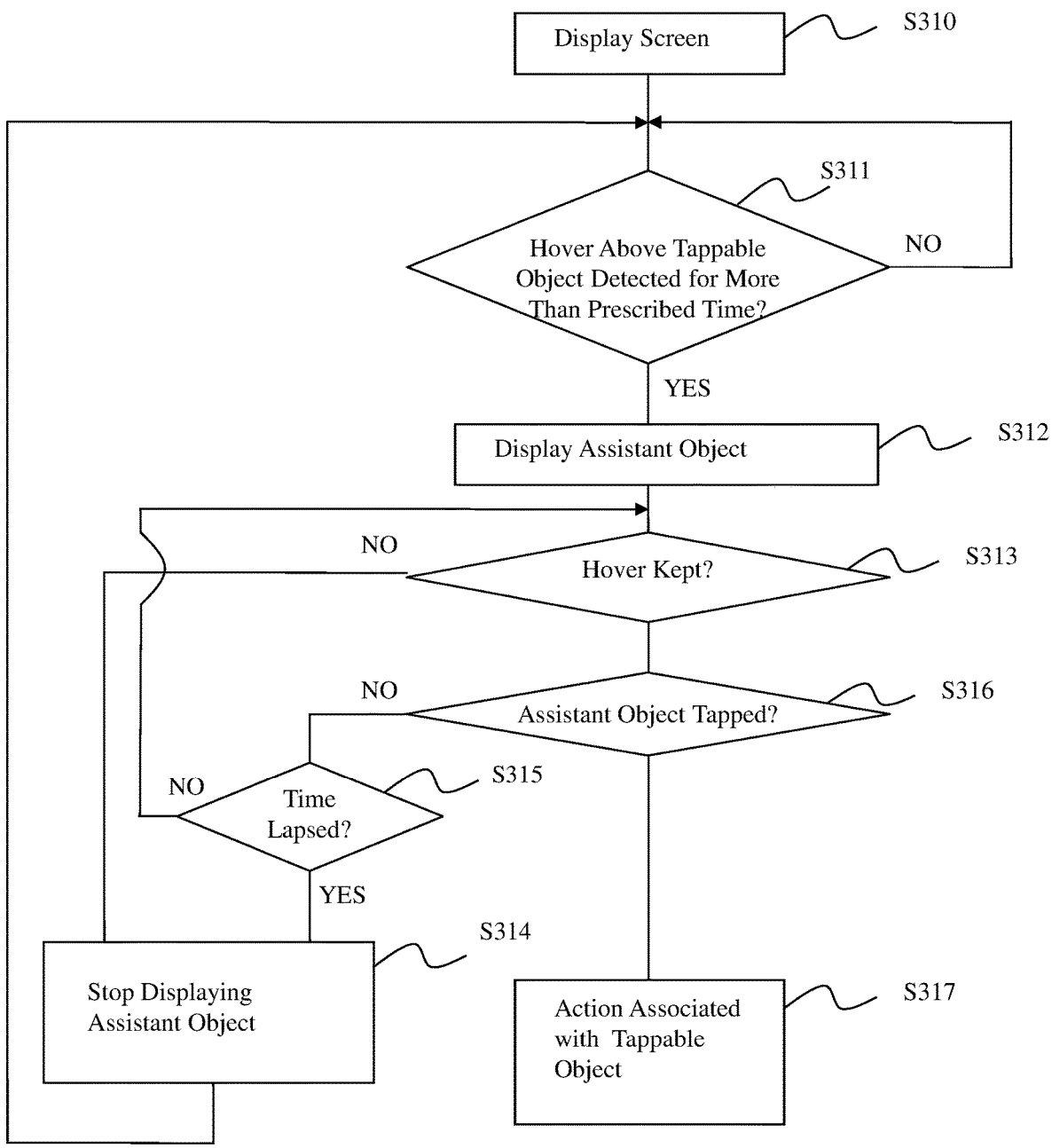

FIG. 44 is a flowchart illustrating operations performed by a computing device according to a fifth aspect of the first embodiment.

FIGS. 45, 46, 47, and 48 illustrate how an assistant object is displayed according to the fifth aspect of the first embodiment.

Figure 49:
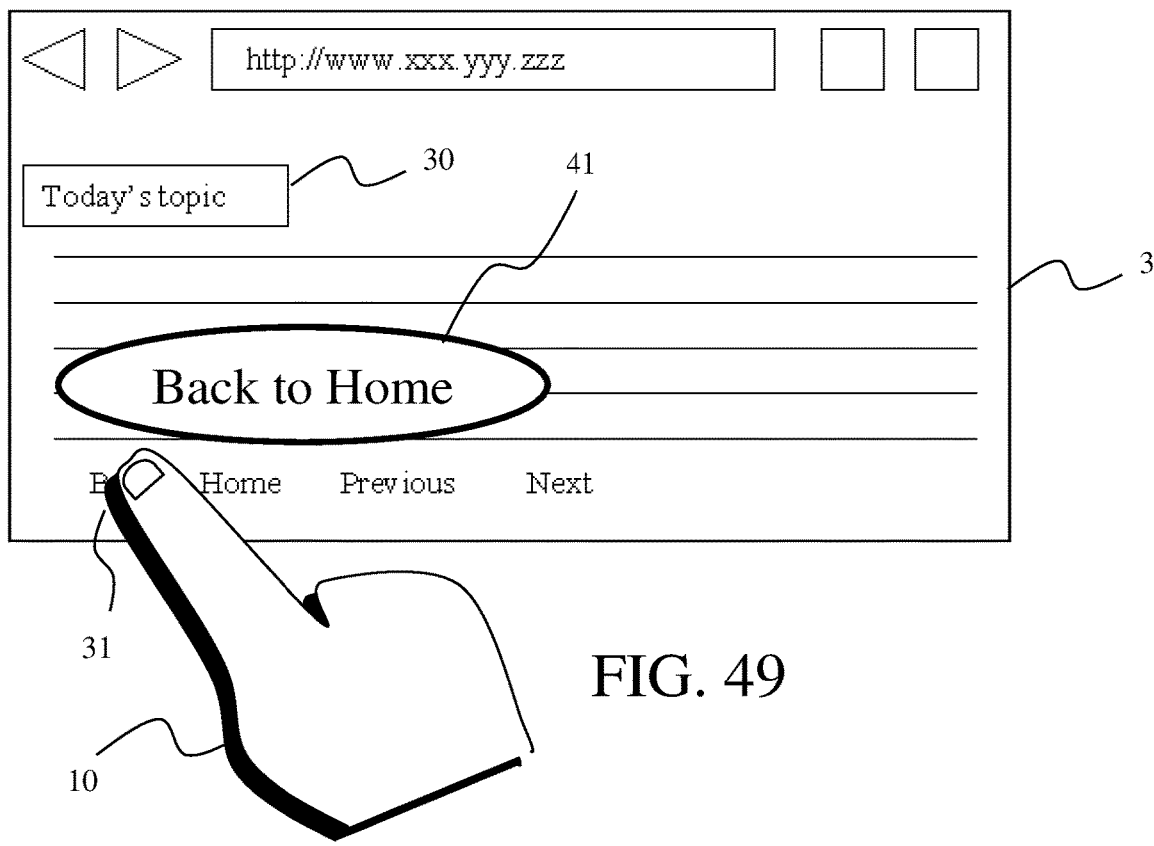
Figure 50:
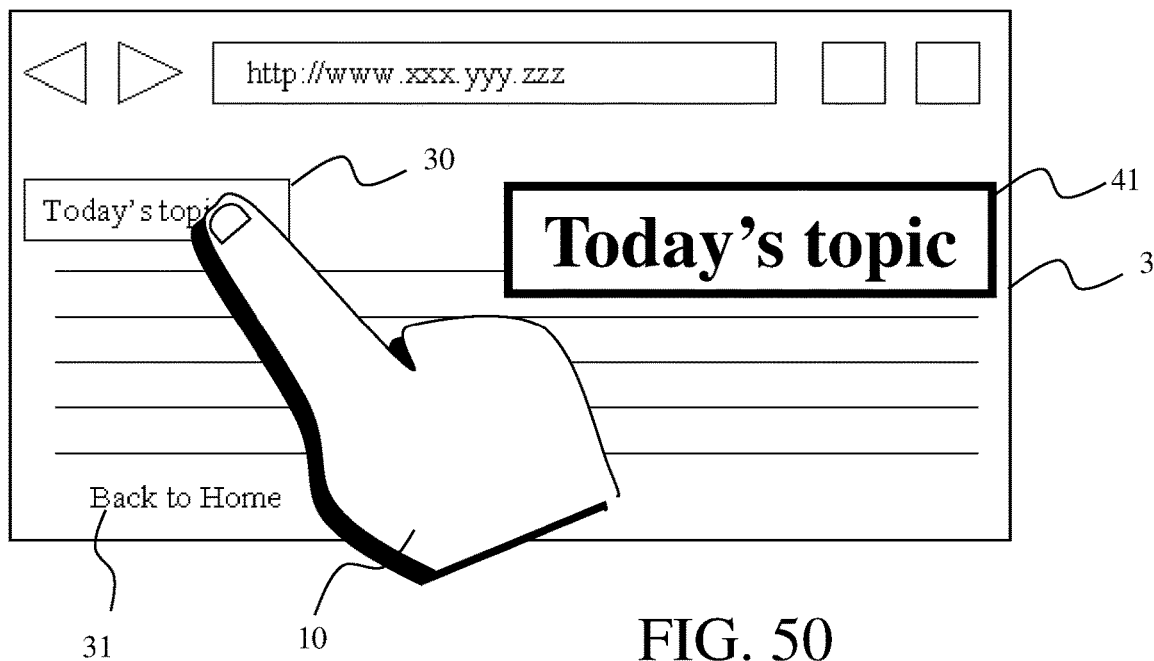
Figure 51:
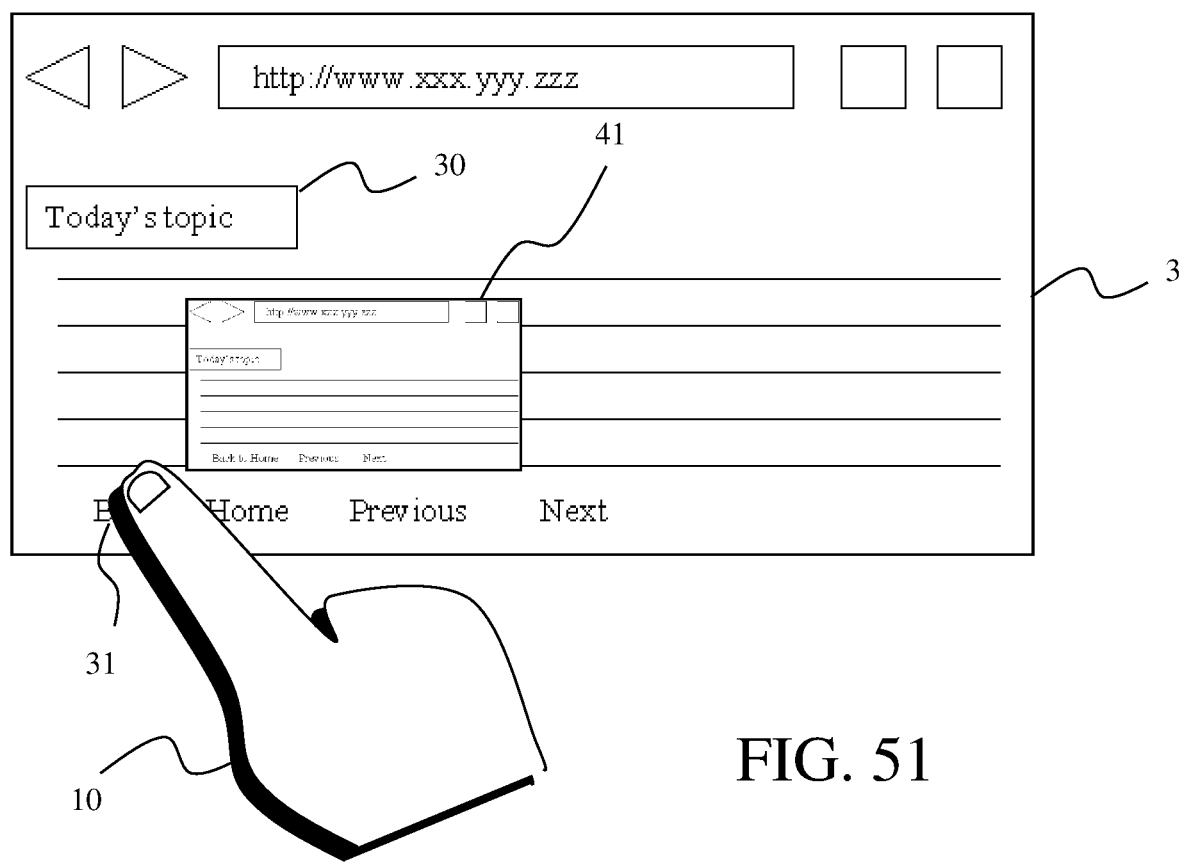

FIGS. 49, 50, and 51 illustrate how an assistant object is displayed according to the fifth aspect of the first embodiment.

Figure 52:
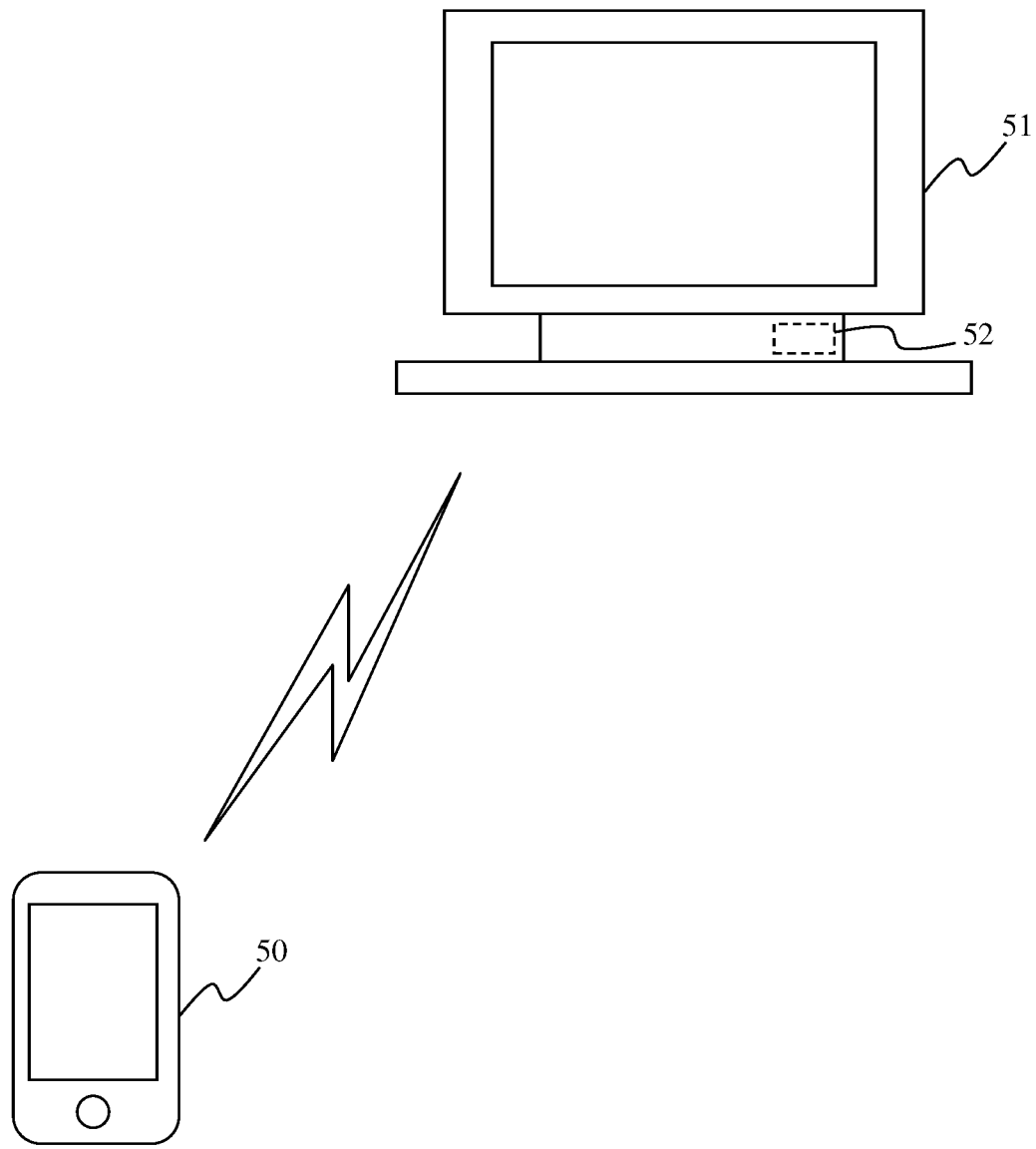

FIG. 52 illustrates a system including a computing device and a remote display device according to a second embodiment.

Figure 53:
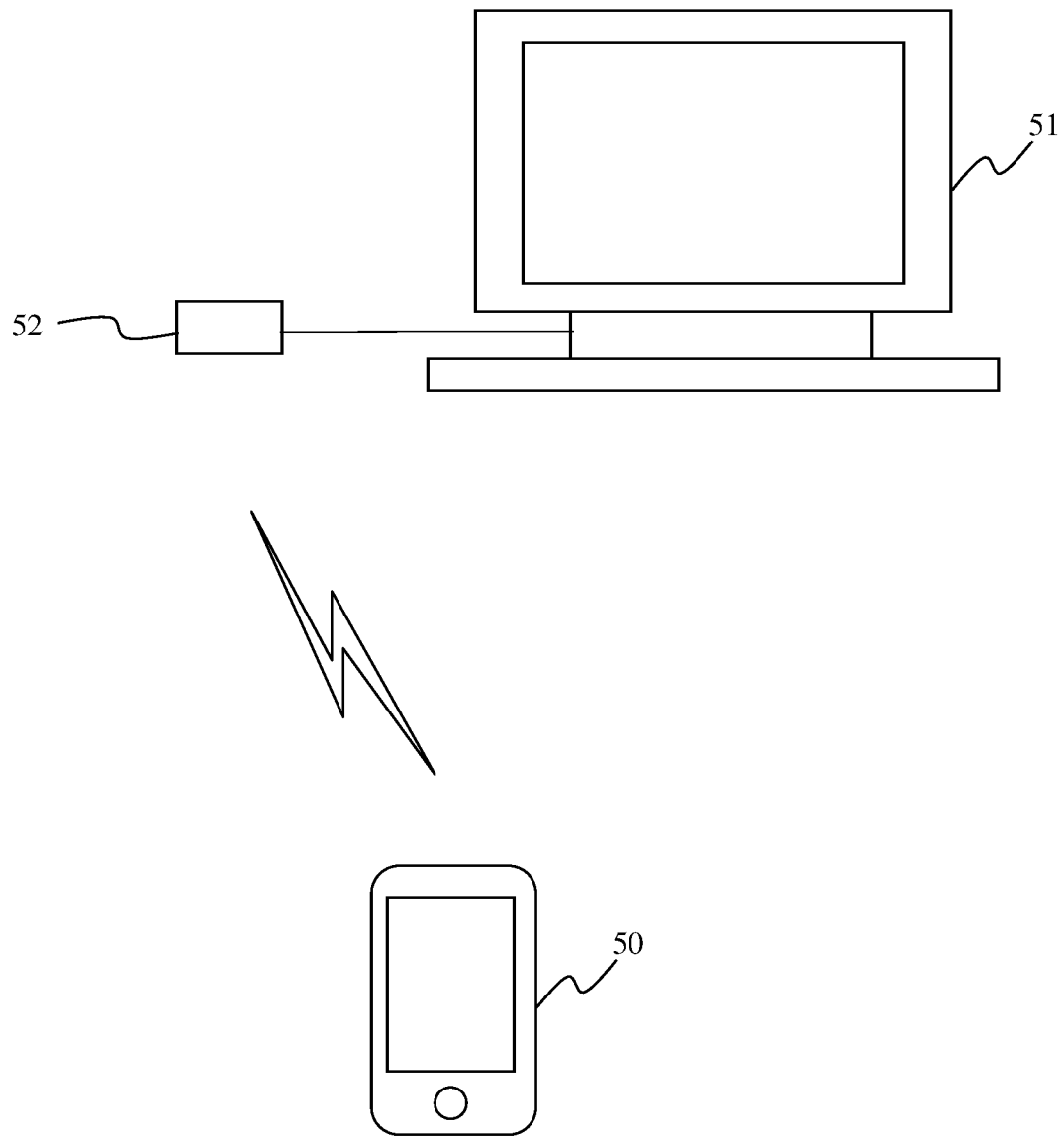

FIG. 53 illustrates a system including a computing device and a remote display device according to the second embodiment.

Figure 54:
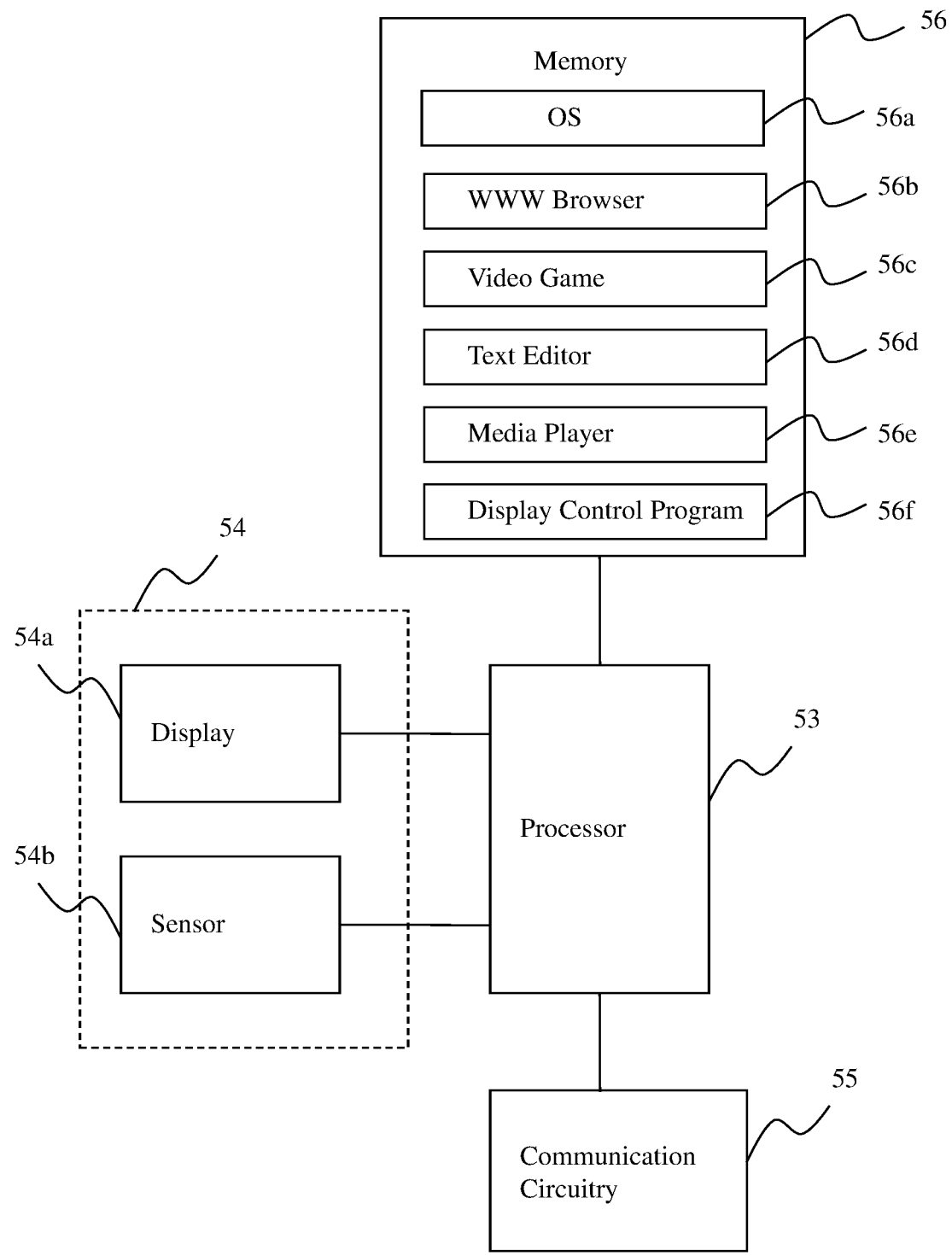

FIG. 54 is a block diagram illustrating means and/or circuitry provided in a computing device according to the second embodiment.

Figure 55:
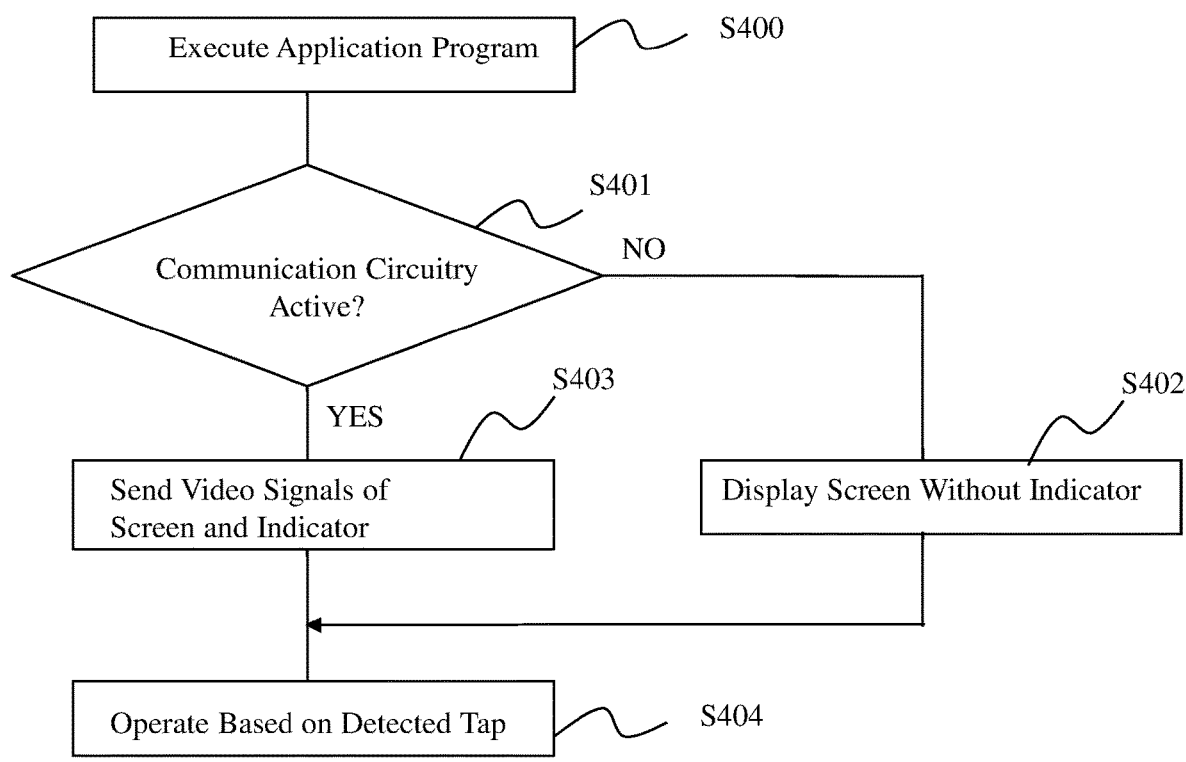

FIG. 55 is a flowchart illustrating operations performed by a computing device according to a first aspect of the second embodiment.

Figure 56:
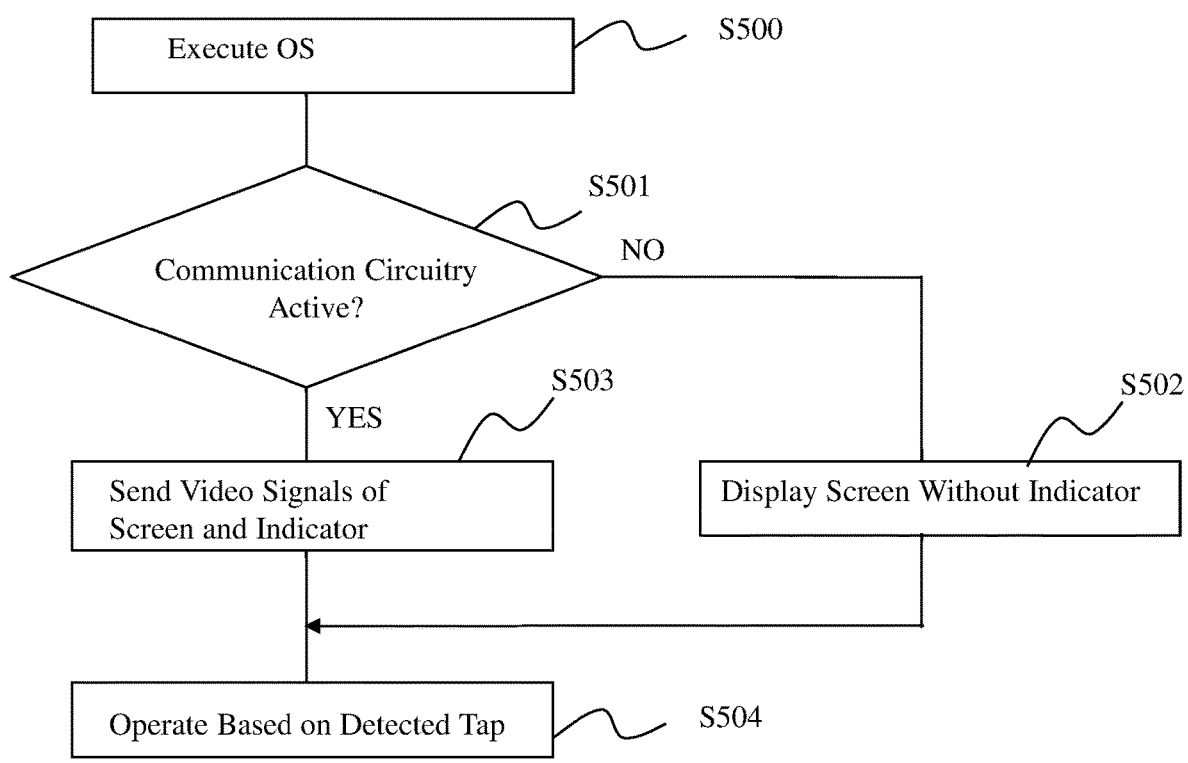

FIG. 56 is a flowchart illustrating operations performed by a computing device according to a second aspect of the second embodiment.

Figure 57:
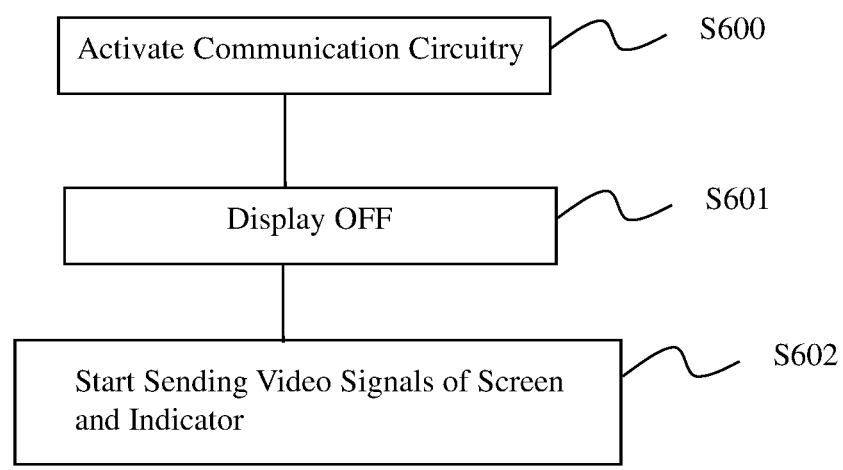

FIG. 57 is a flowchart illustrating operations performed by a computing device according to a third aspect of the second embodiment.

Figure 58:
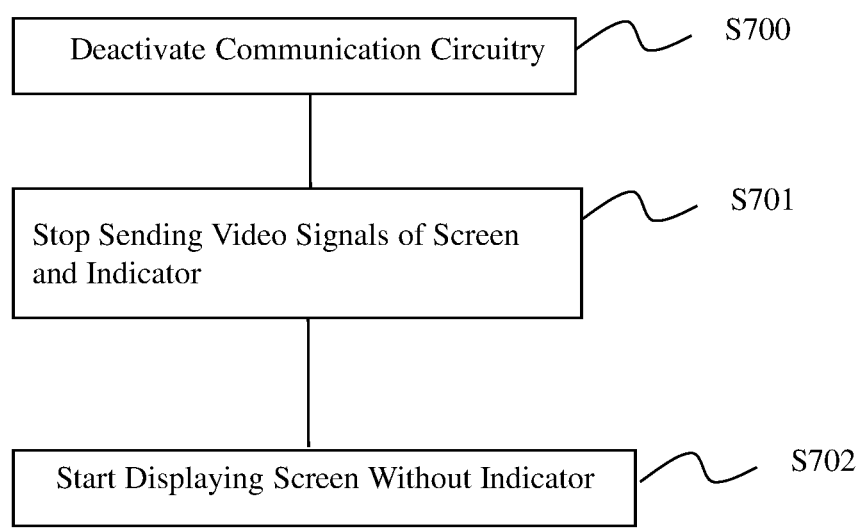

FIG. 58 is a flowchart illustrating operations performed by a computing device according to a fourth aspect of the second embodiment.

Figure 59:
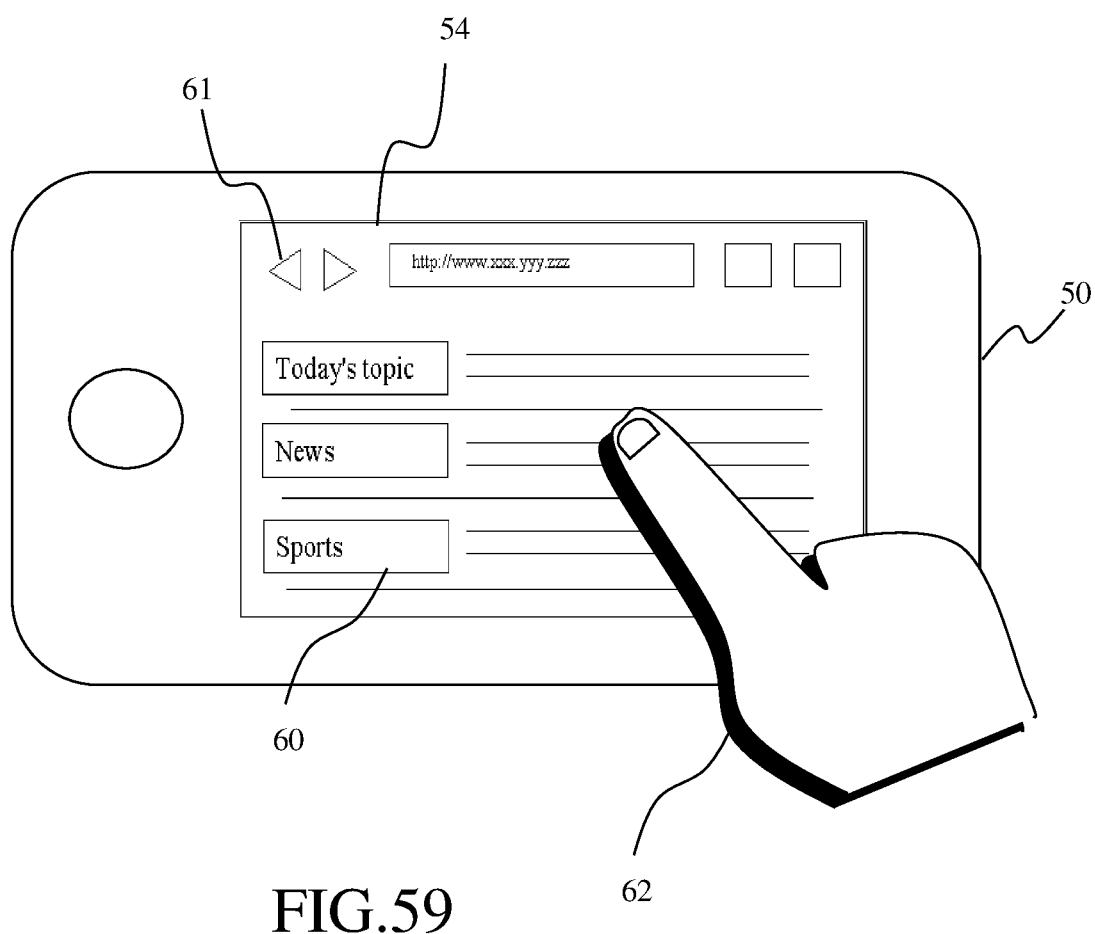
Figure 60:
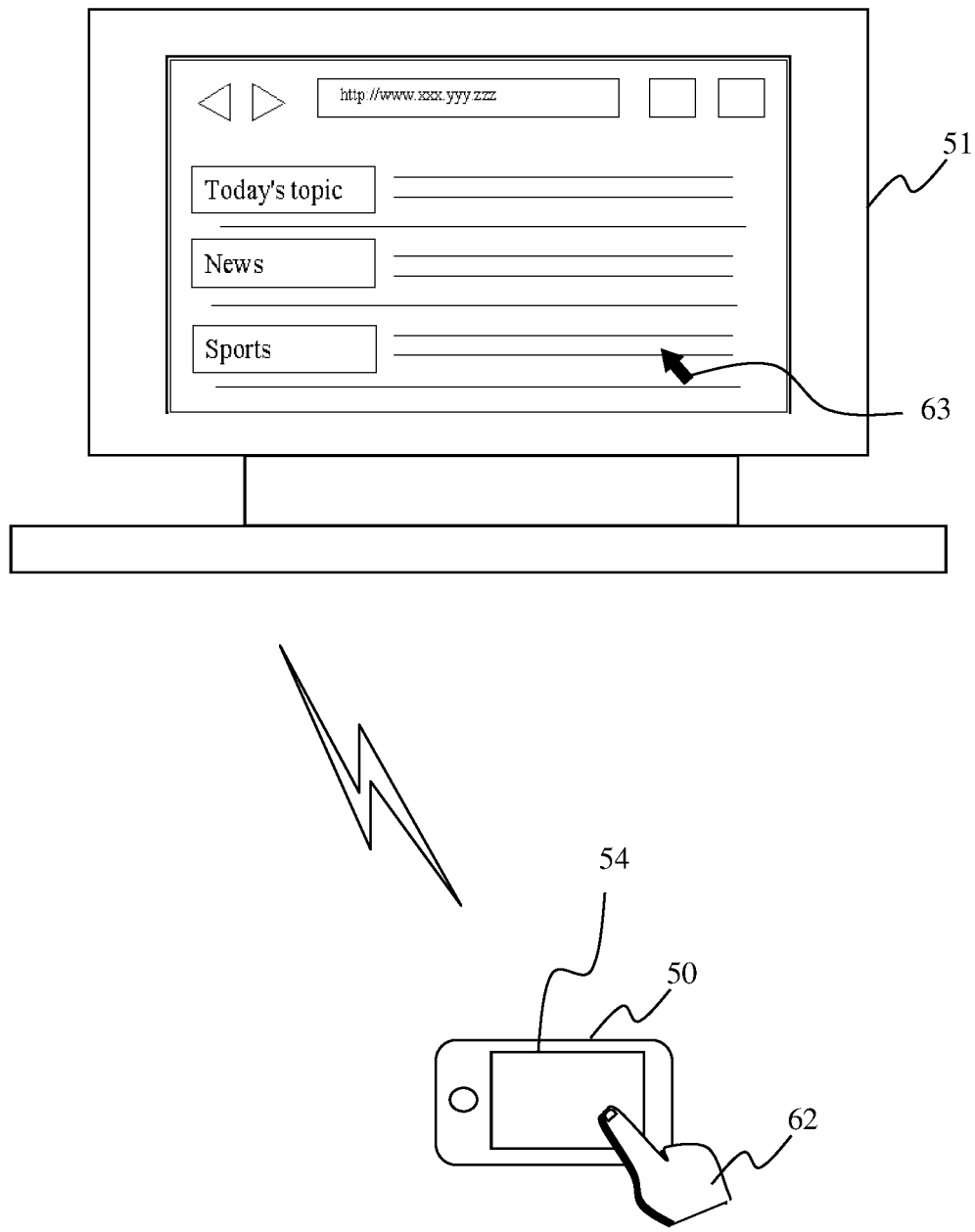

FIGS. 59 and 60 illustrate how an indicator is displayed according to the first to fourth aspects of the second embodiment.

Figure 61:
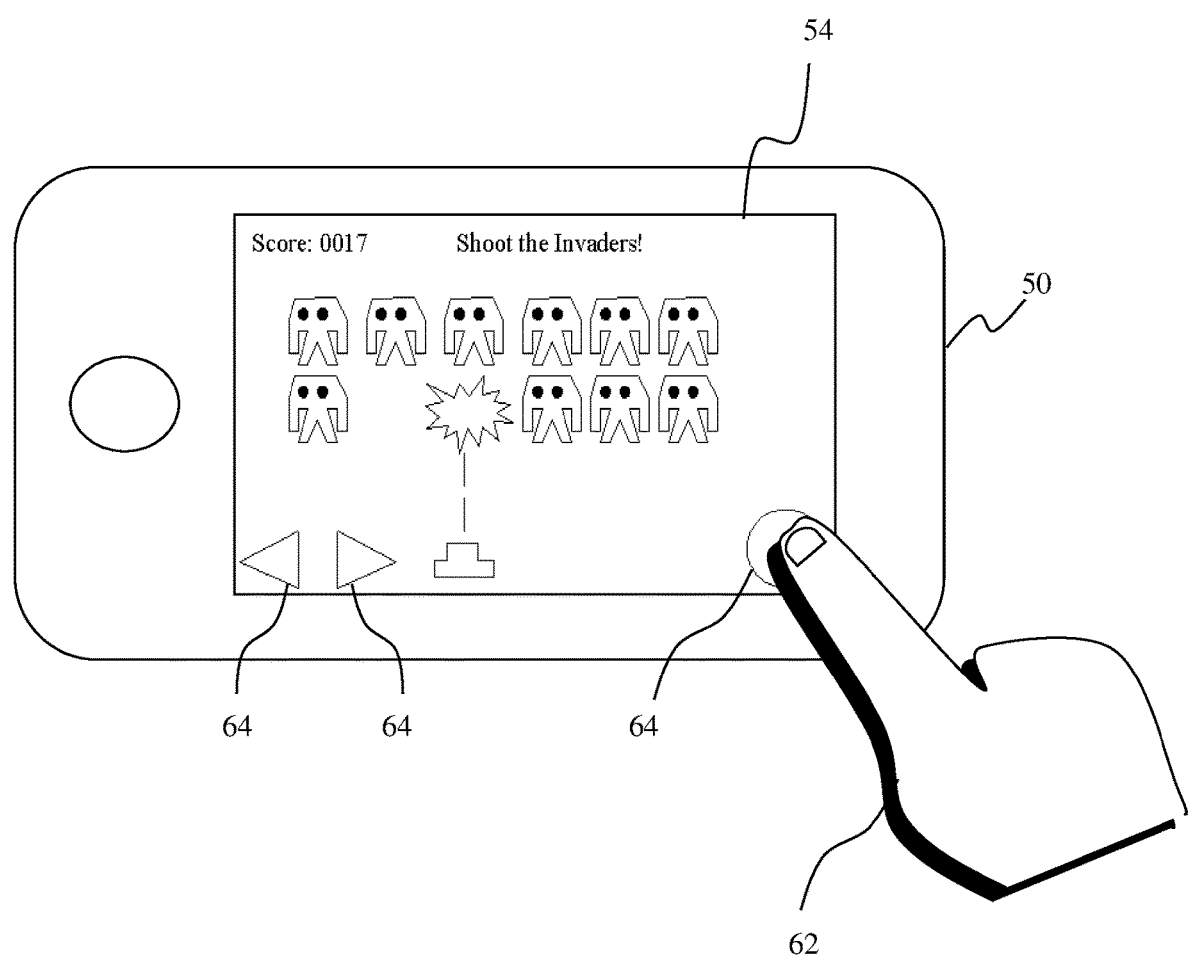
Figure 62:
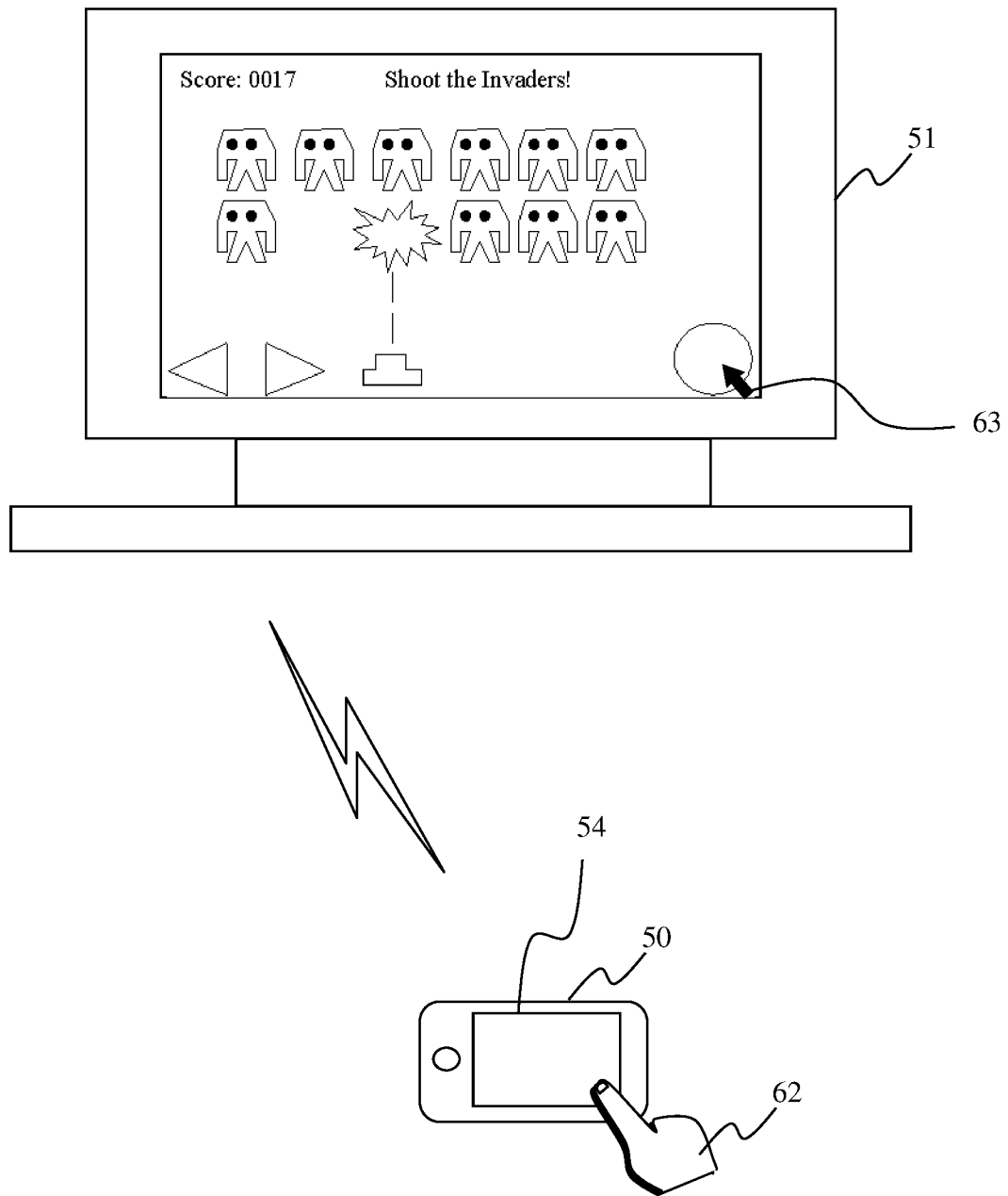

FIGS. 61 and 62 illustrate how an indicator is displayed according to the first to fourth aspects of the second embodiment.

Figure 63:
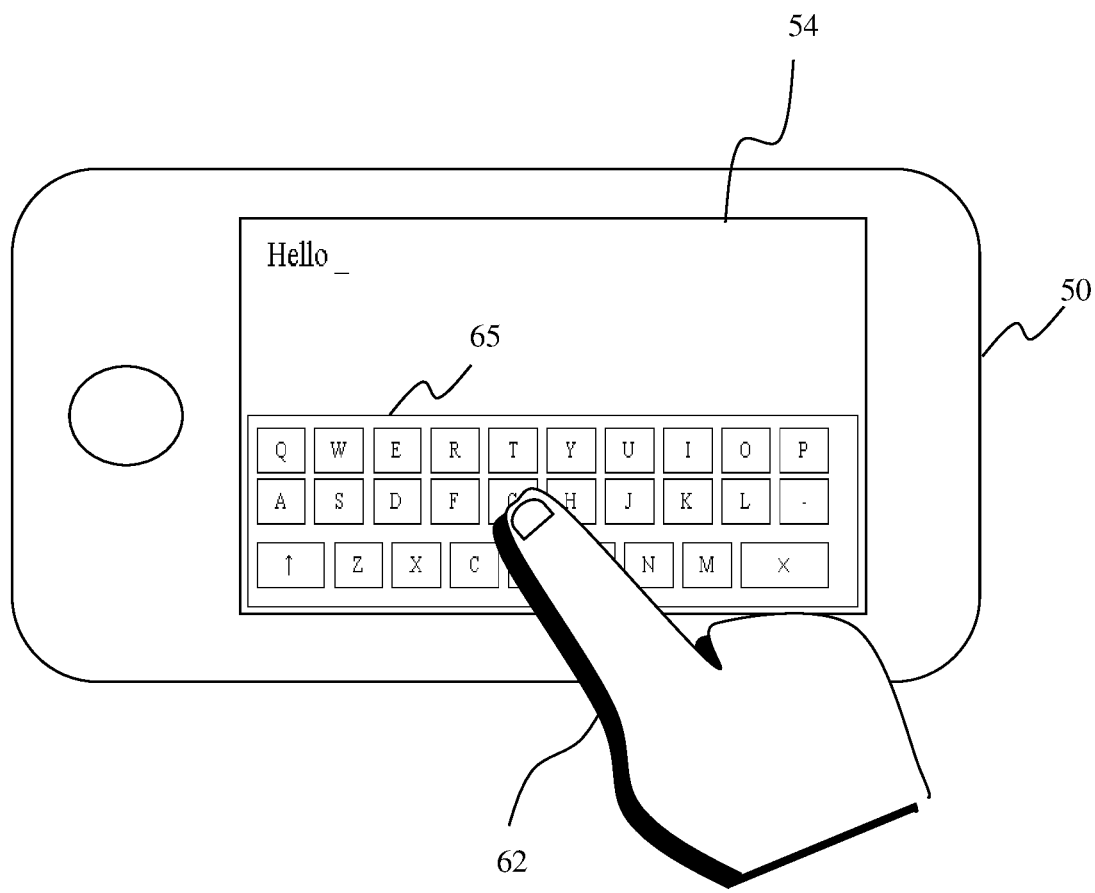
Figure 64:
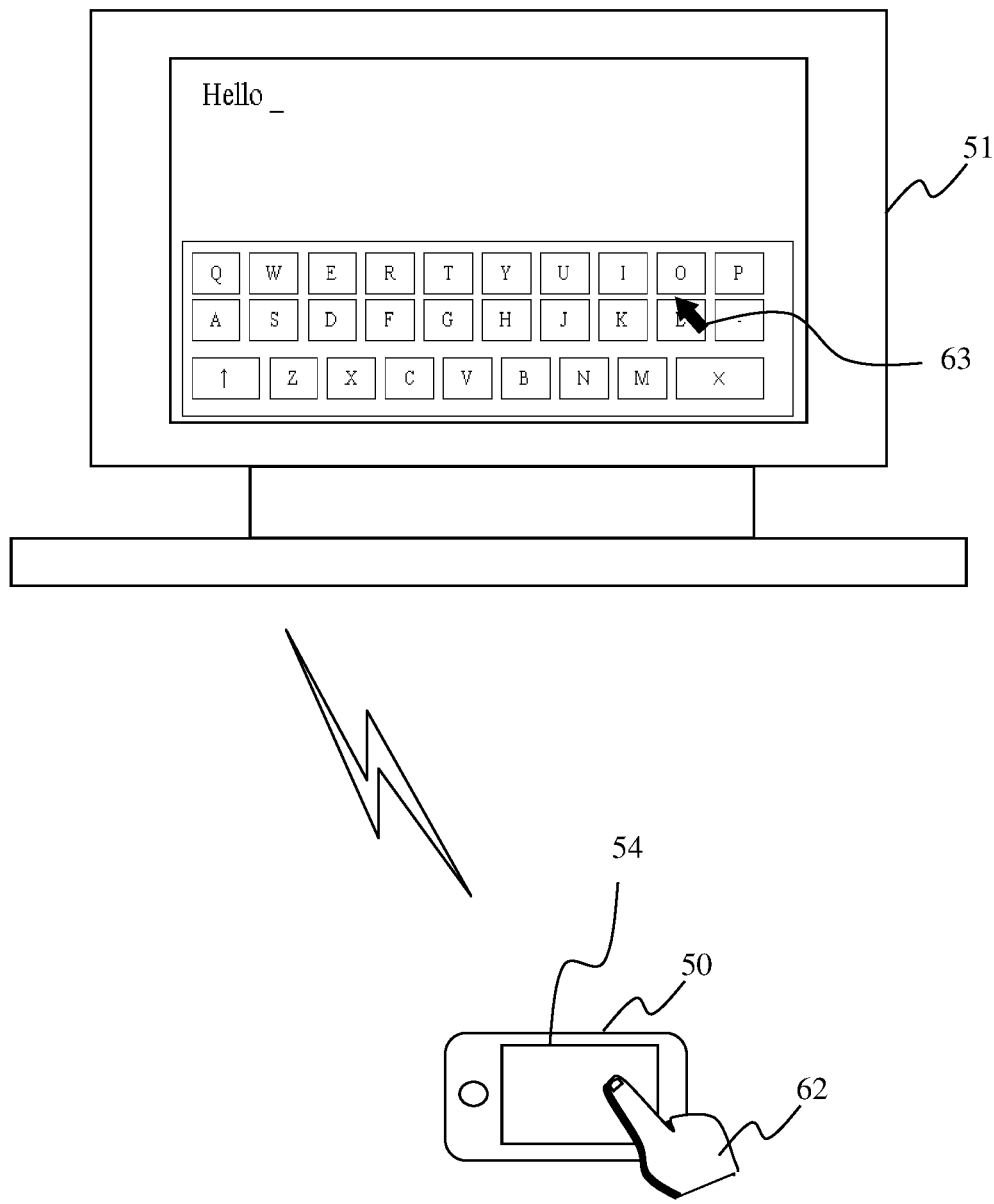

FIGS. 63 and 64 illustrate how an indicator is displayed according to the first to fourth aspects of the second embodiment.

Figure 65:
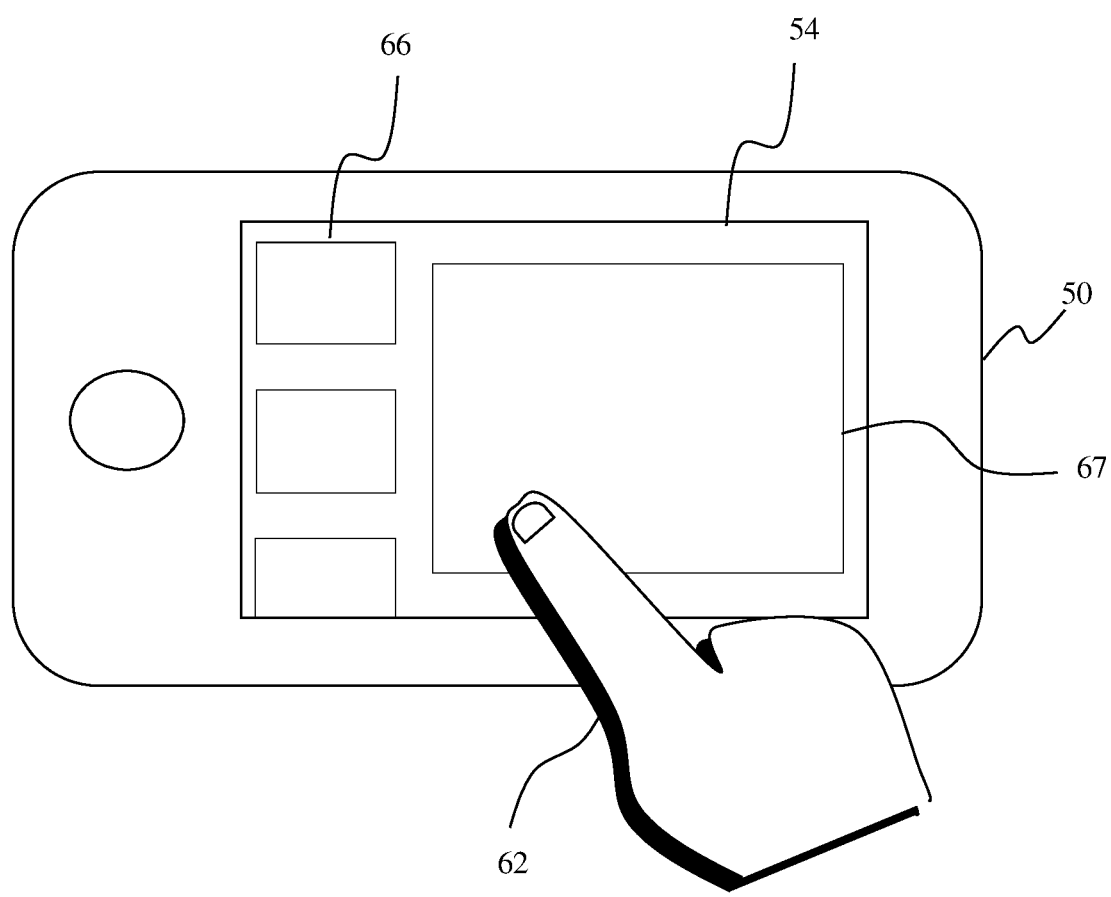
Figure 66:
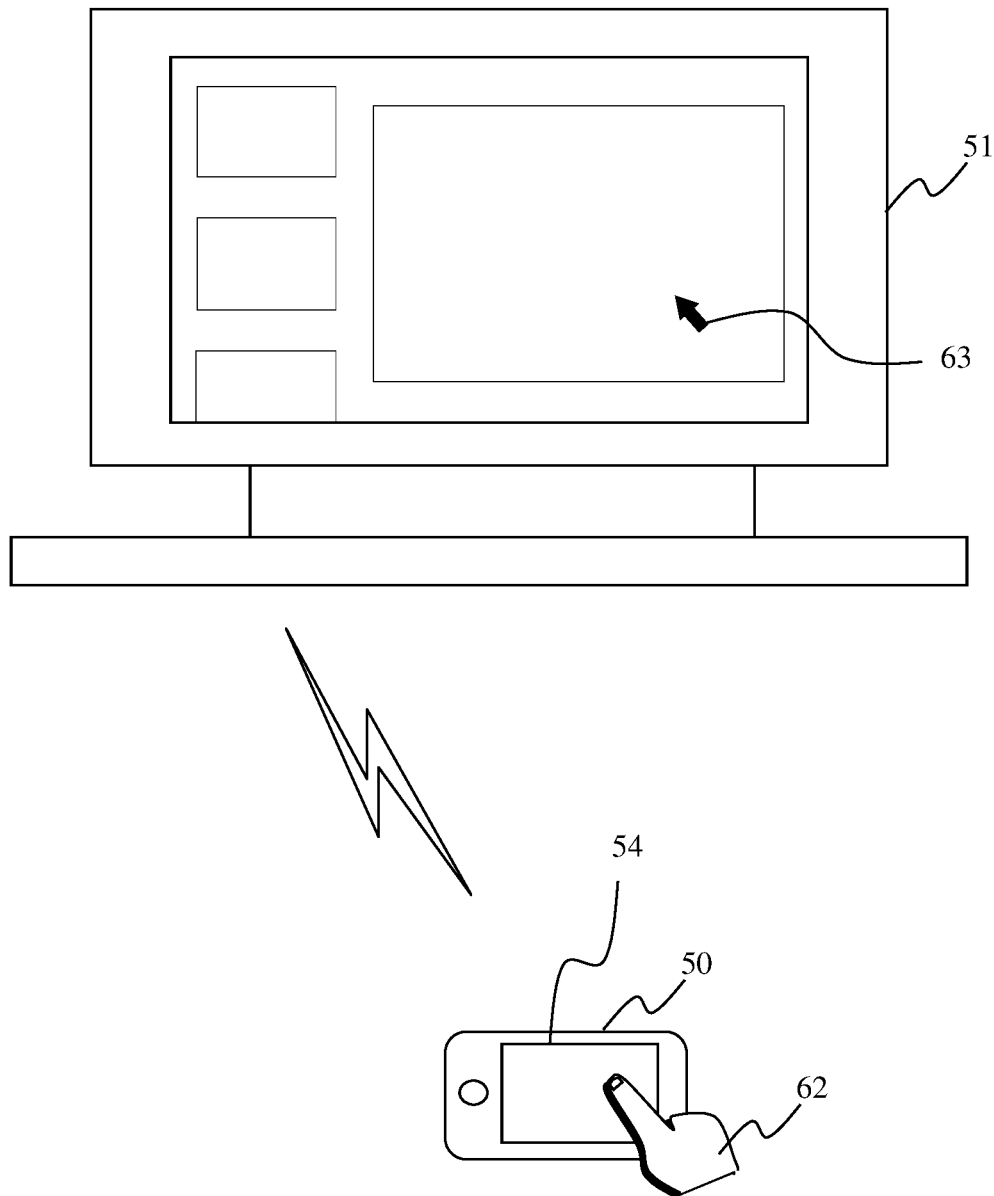

FIGS. 65 and 66 illustrate how an indicator is displayed according to the first to fourth aspects of the second embodiment.

Figure 67:
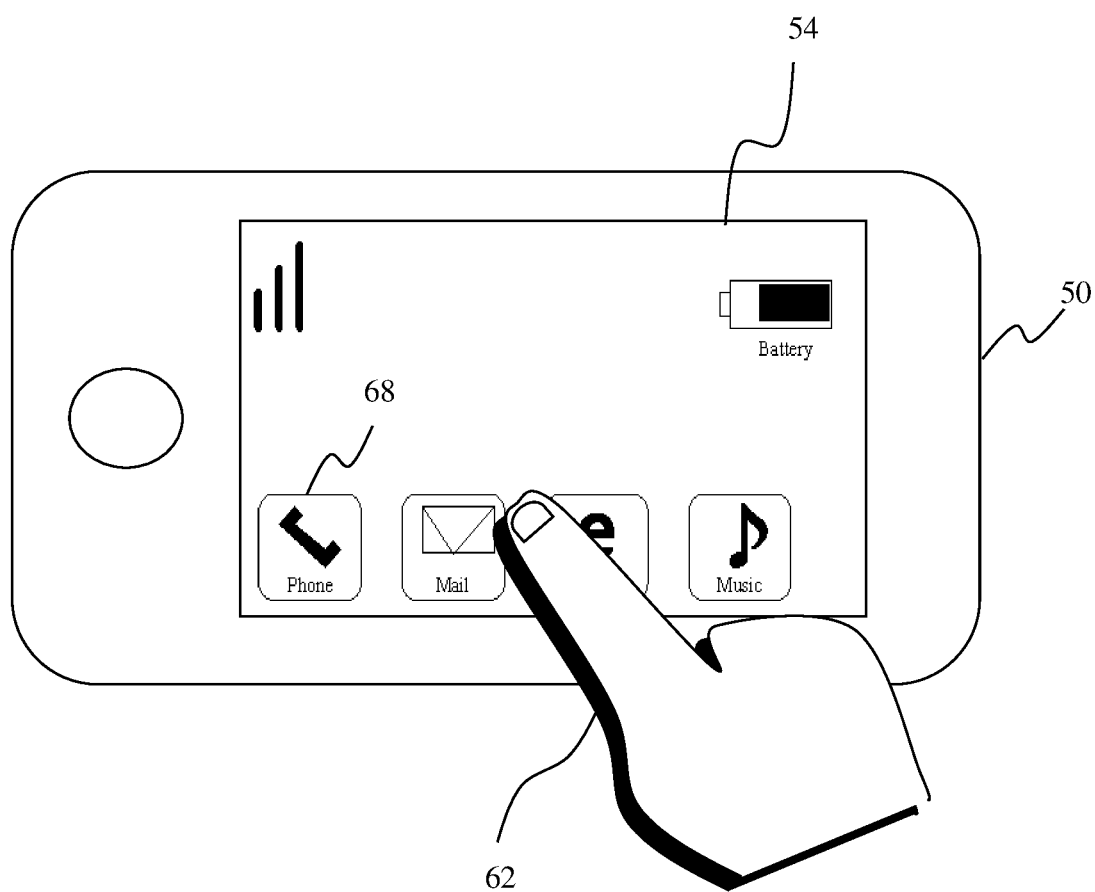
Figure 68:
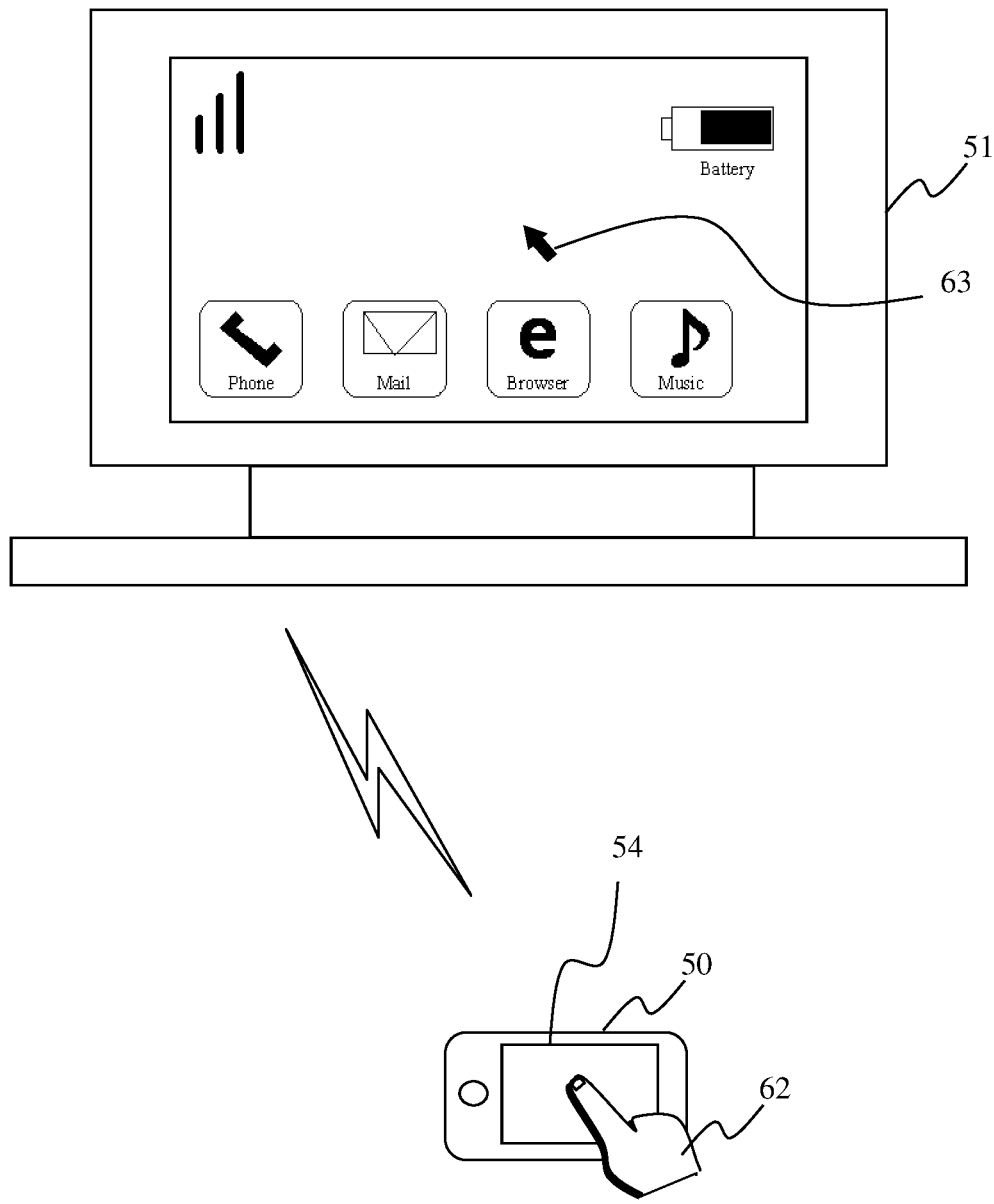

FIGS. 67 and 68 illustrate how an indicator is displayed according to the first to fourth aspects of the second embodiment.

Figure 69:
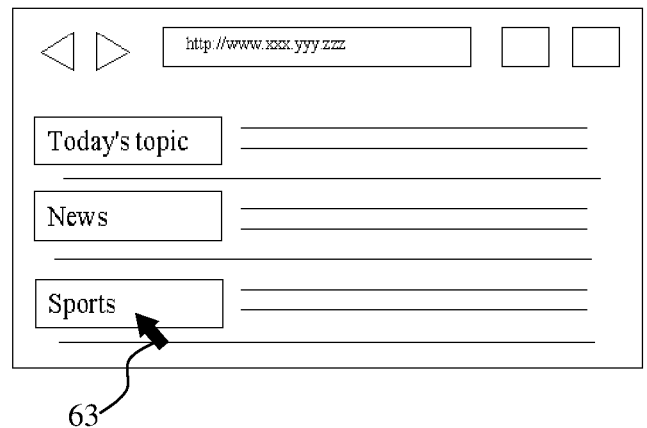
Figure 70:
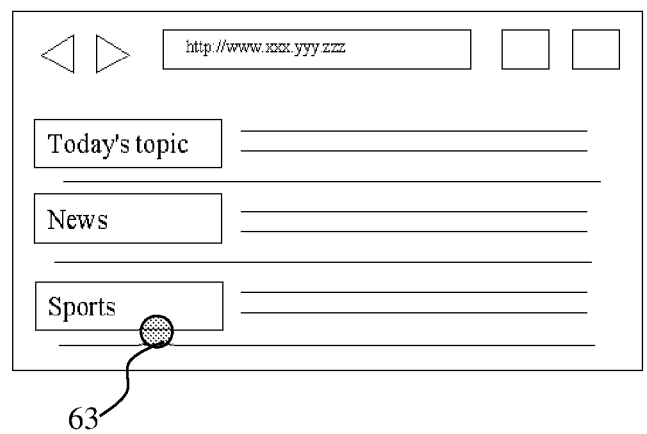

FIGS. 69 and 70 illustrate how an indicator is displayed according to the first to fourth aspects of the second embodiment.

Figure 71:
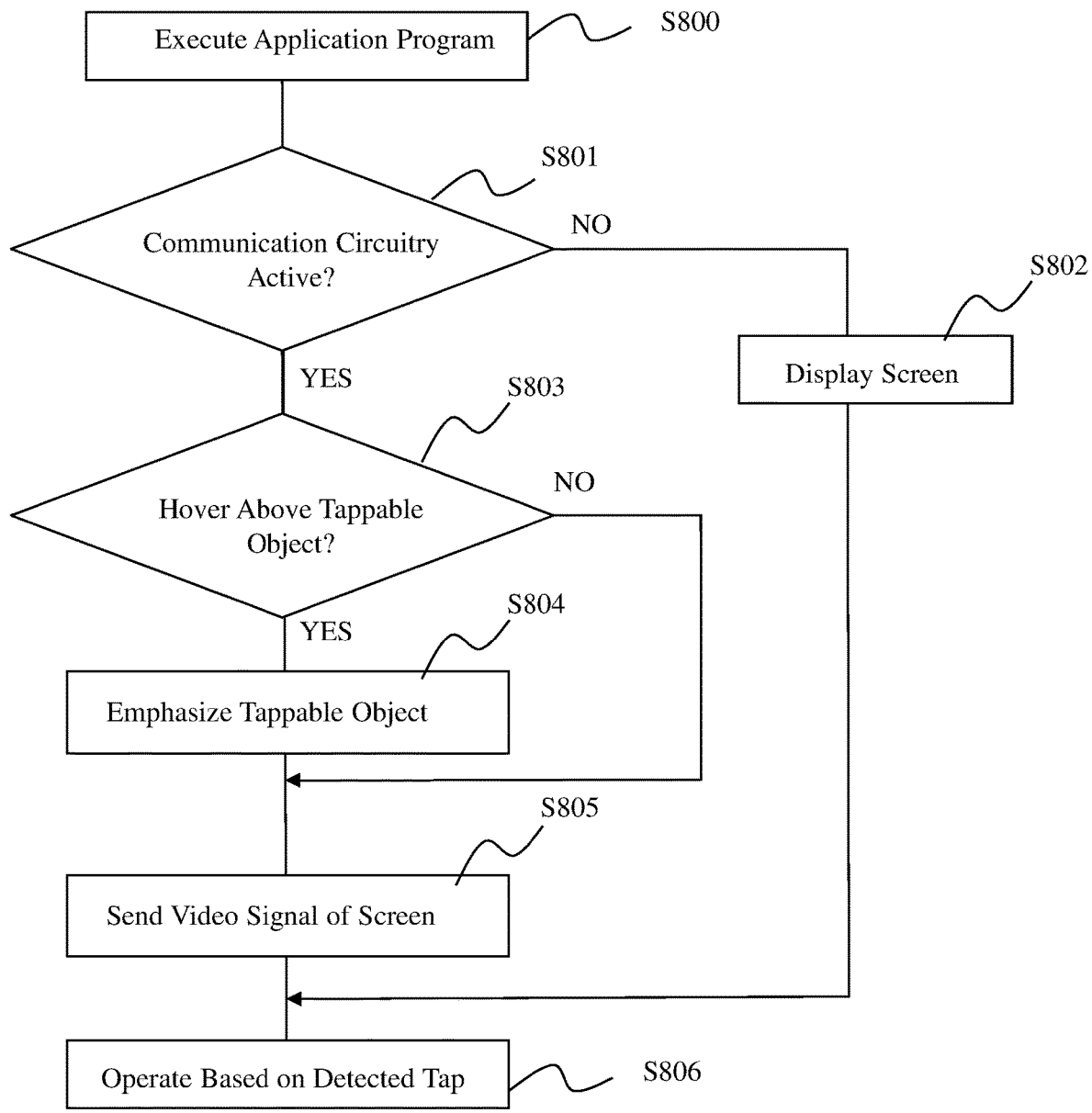

FIG. 71 is a flowchart illustrating operations performed by a computing device according to a fifth aspect of the second embodiment.

Figure 72:
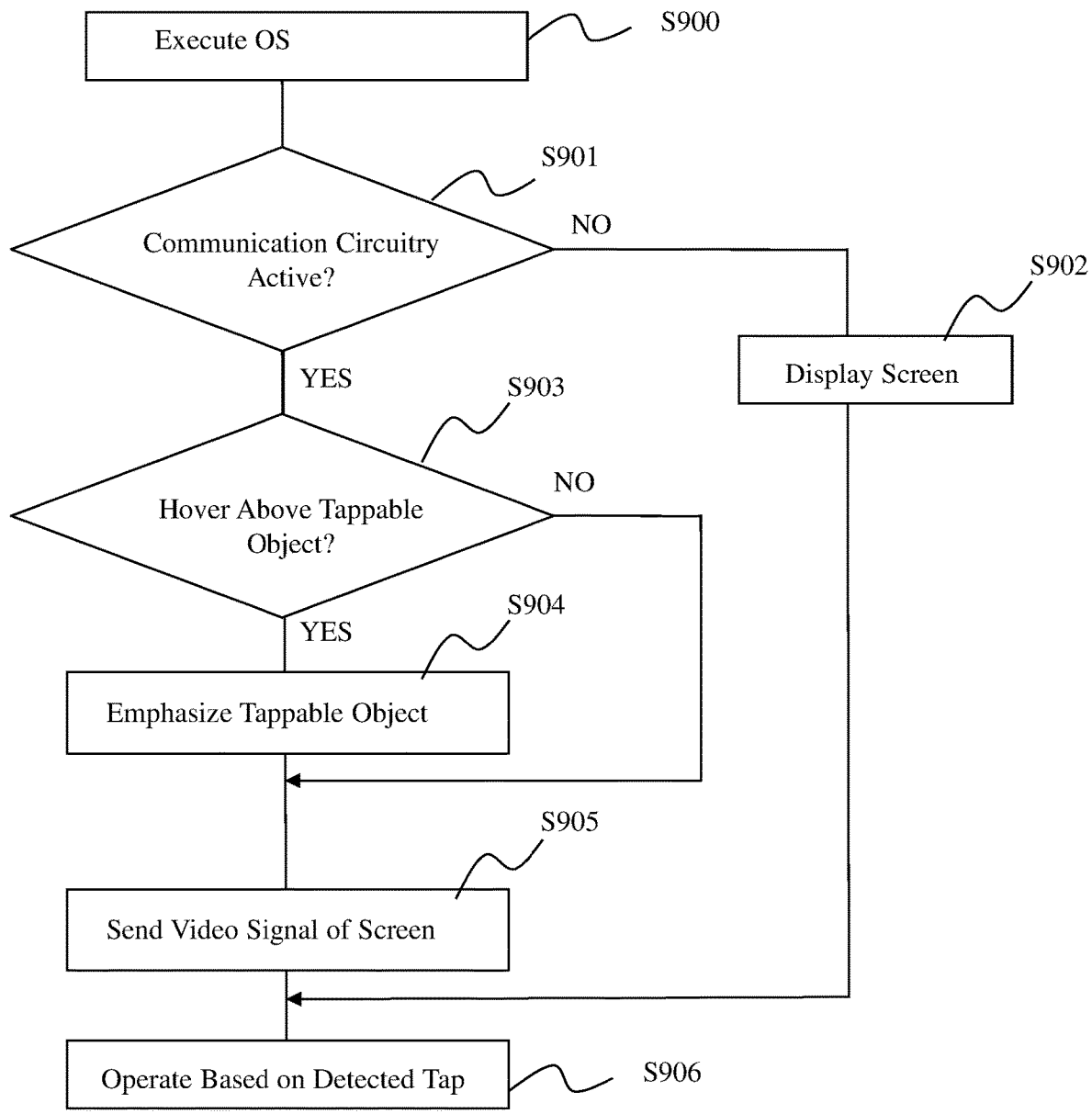

FIG. 72 is a flowchart illustrating operations performed by a computing device according to a sixth aspect of the second embodiment.

Figure 73:
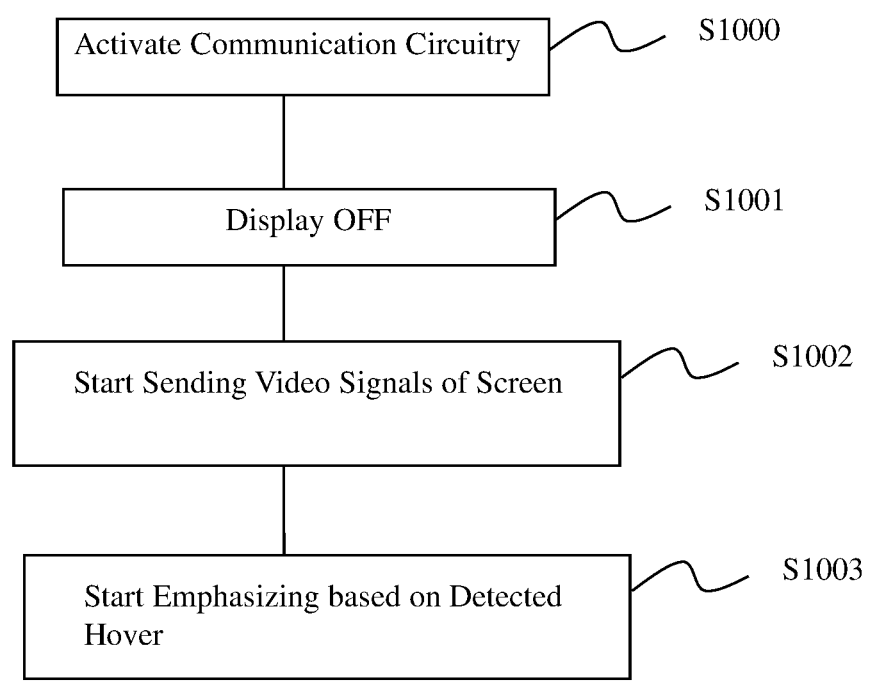

FIG. 73 is a flowchart illustrating operations performed by a computing device according to a seventh aspect of the second embodiment.

Figure 74:
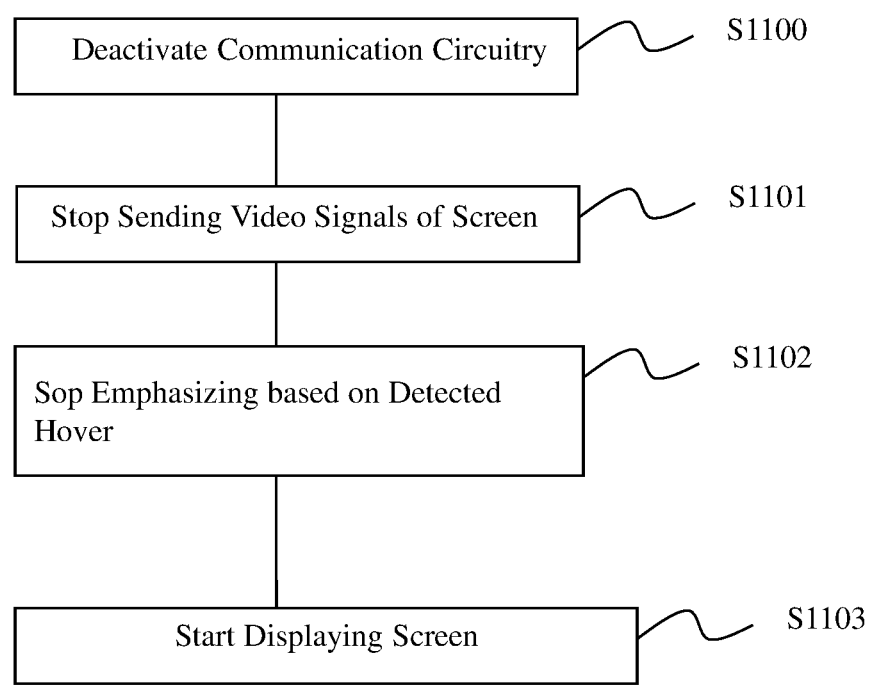

FIG. 74 is a flowchart illustrating operations performed by a computing device according to an eighth aspect of the second embodiment.

Figure 75:
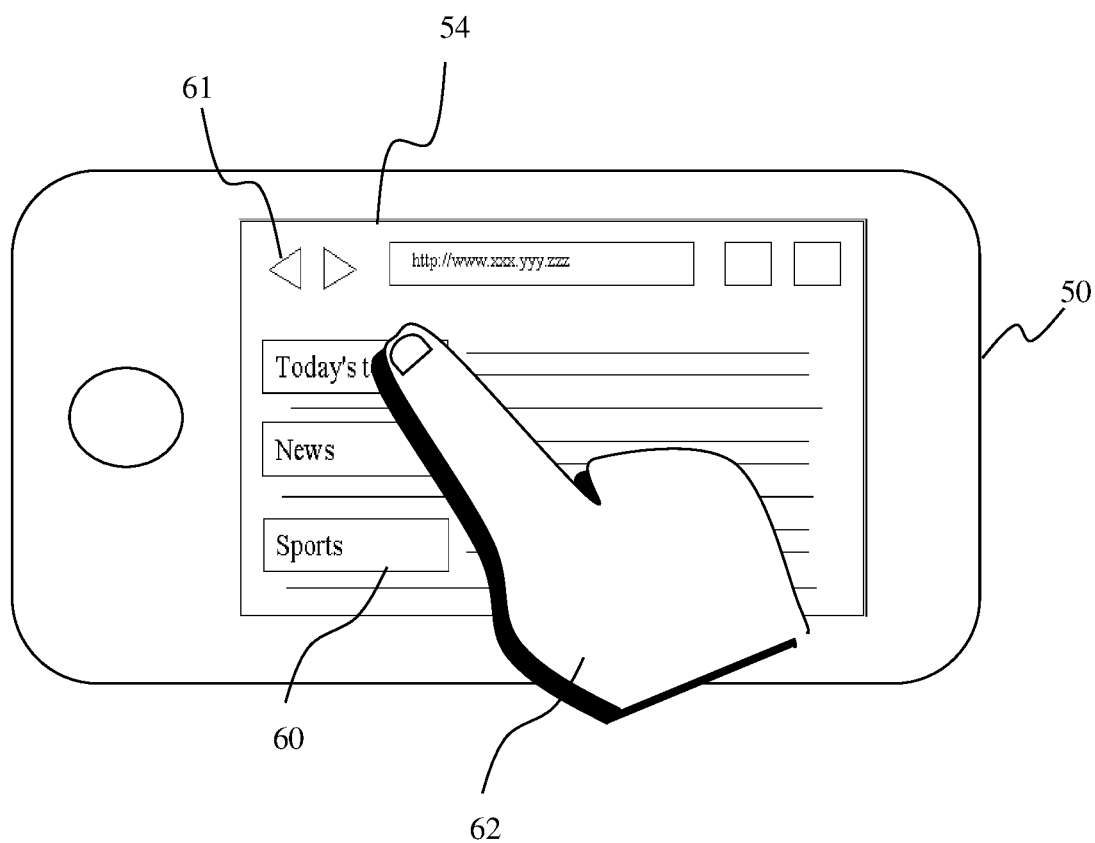
Figure 76:
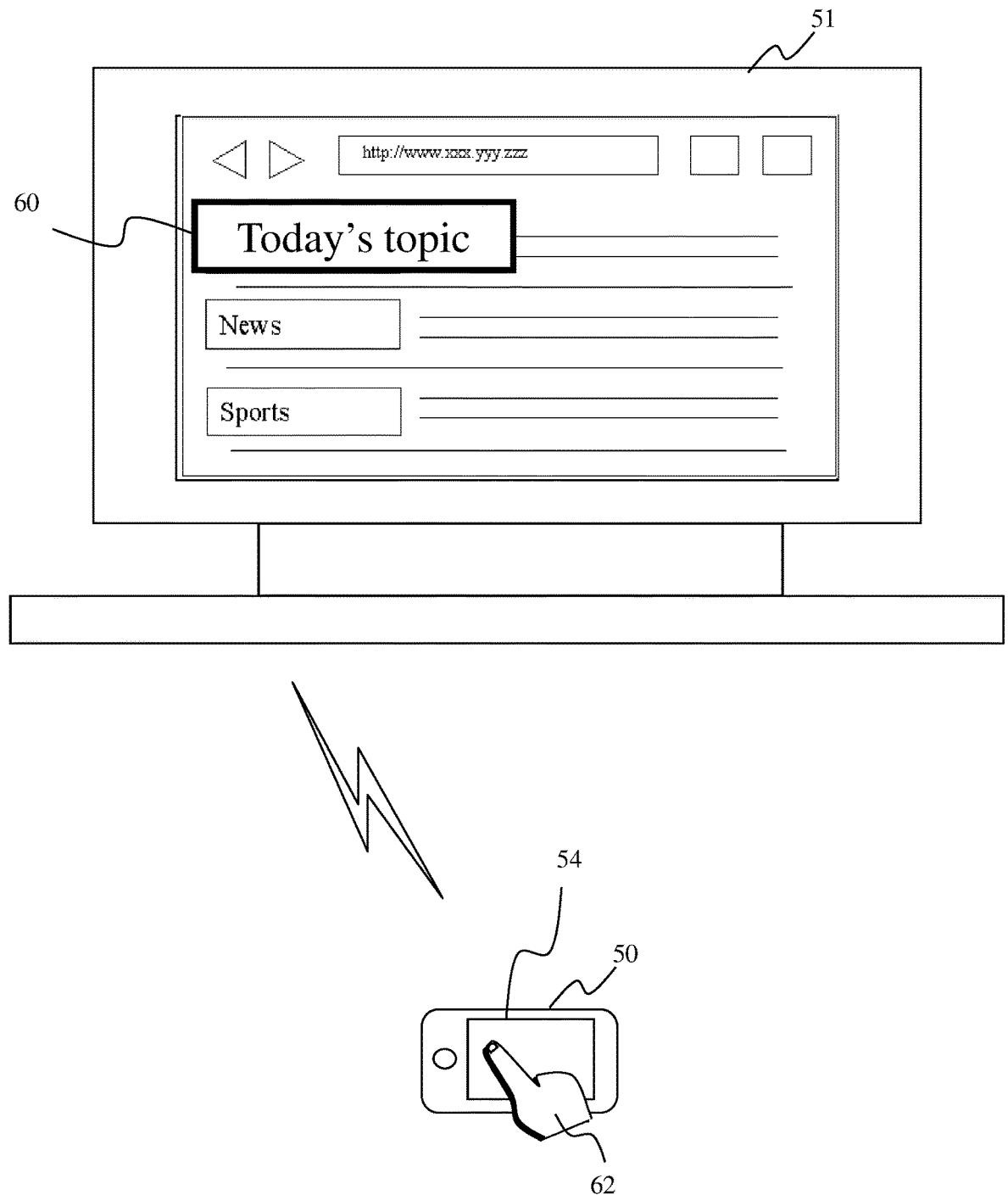

FIGS. 75 and 76 illustrate how a tappable object is emphasized according to the fifth to eighth aspects of the second embodiment.

Figure 77:
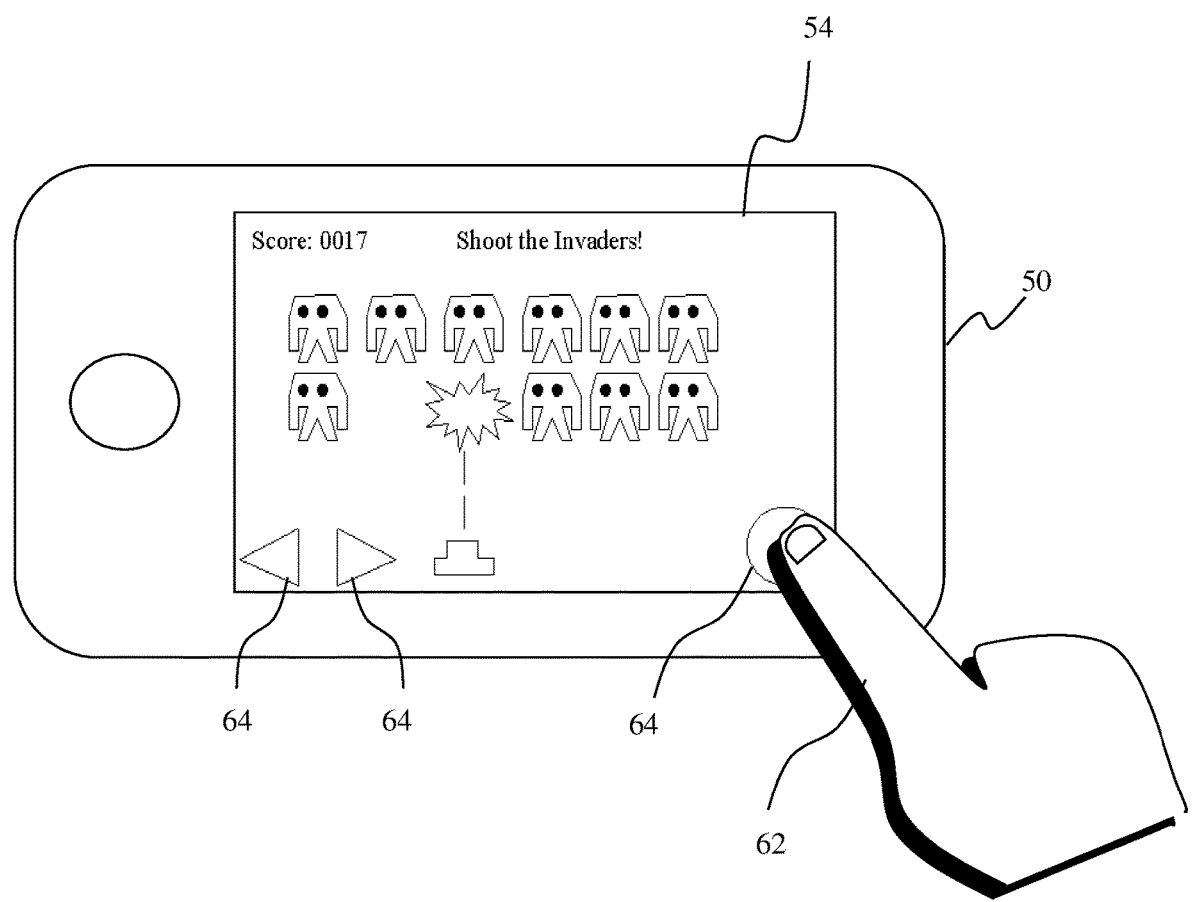
Figure 78:
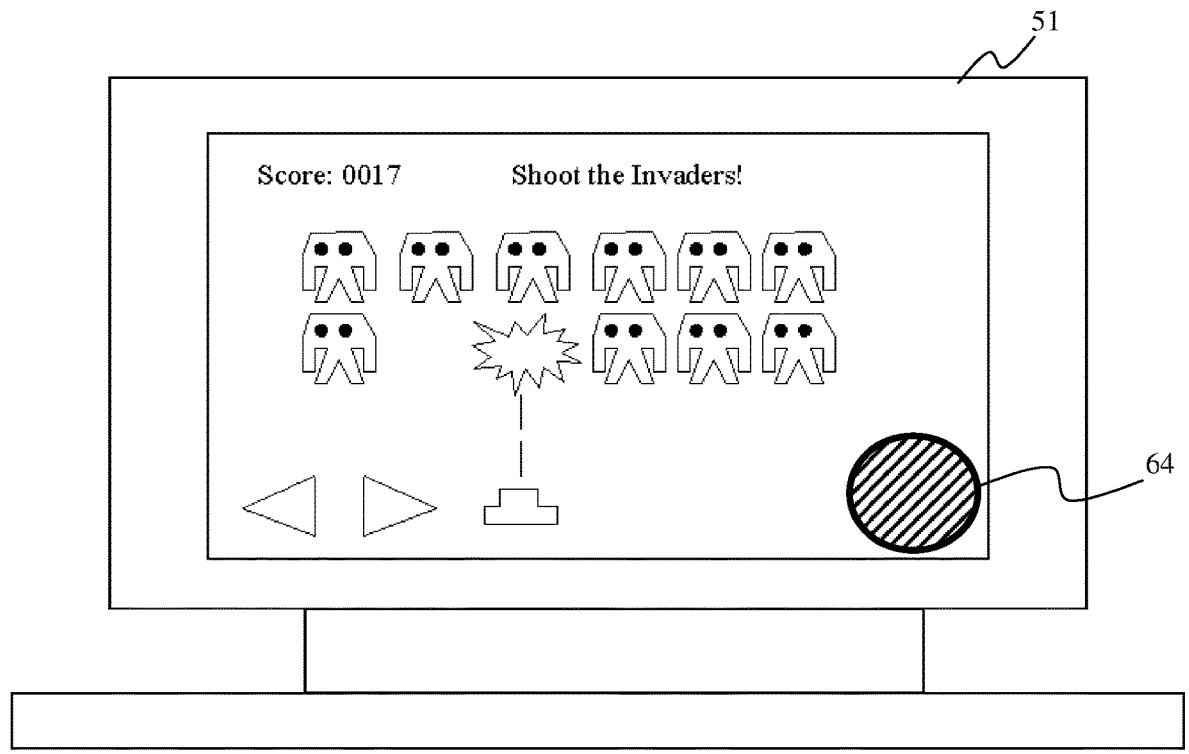

FIGS. 77 and 78 illustrate how a tappable object is emphasized according to the fifth to eighth aspects of the second embodiment.

Figure 79:
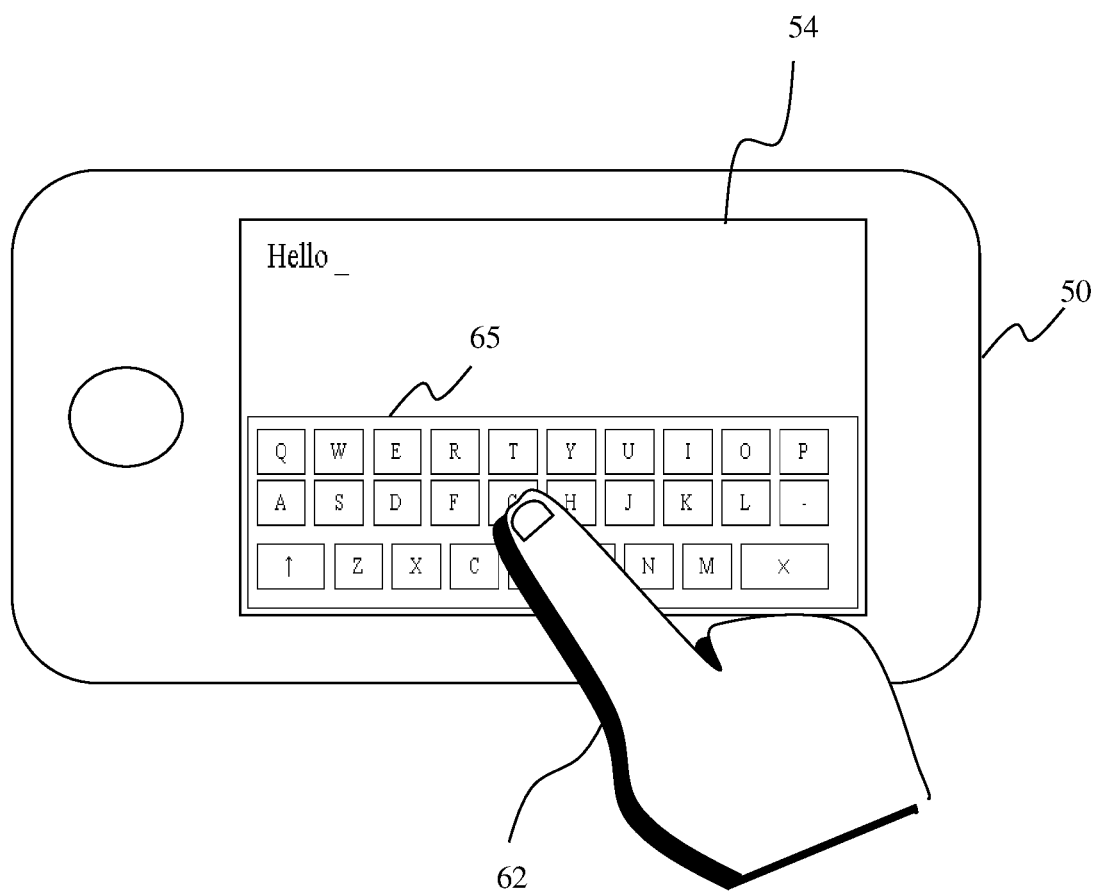
Figure 80:
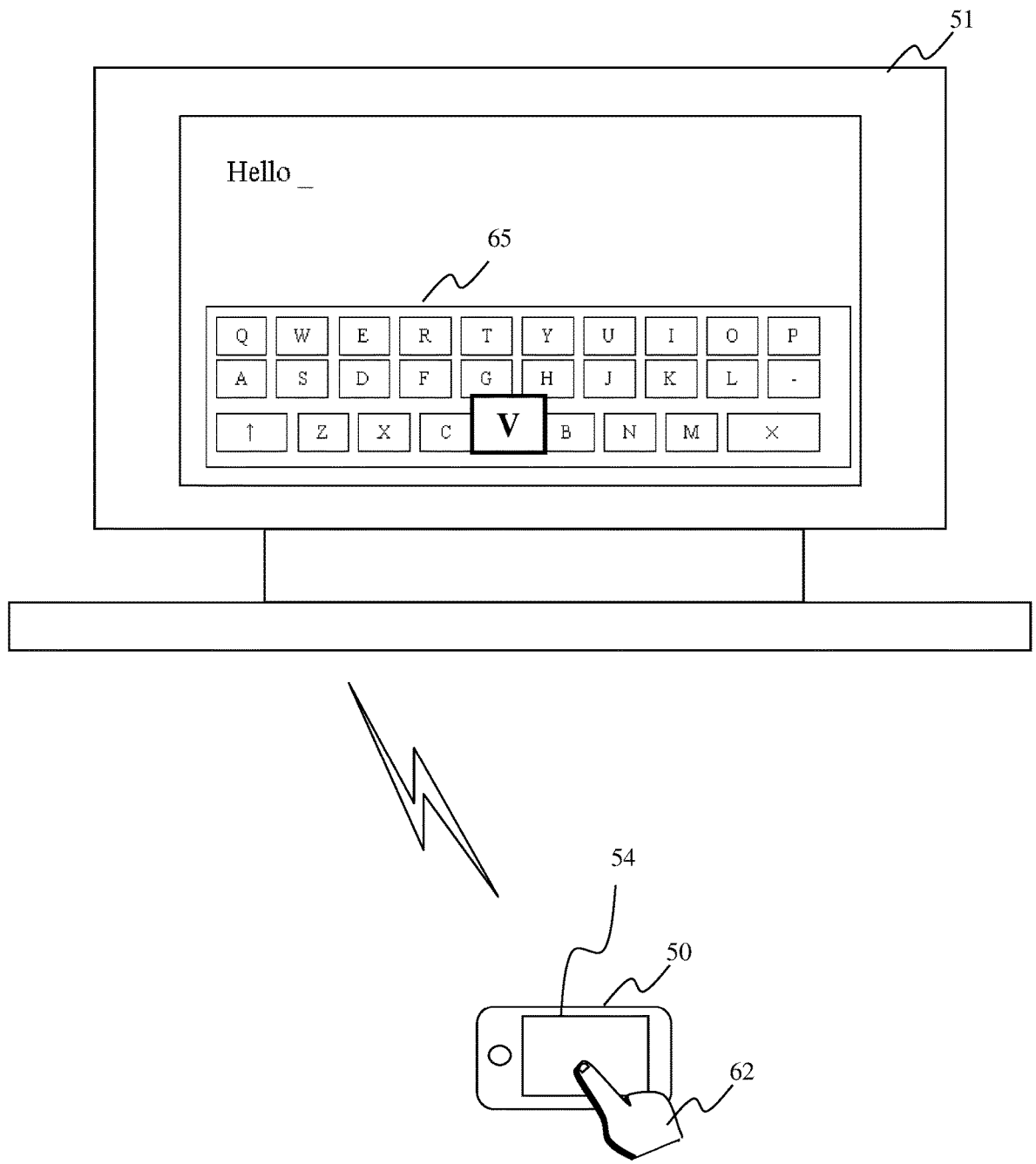

FIGS. 79 and 80 illustrate how a tappable object is emphasized according to the fifth to eighth aspects of the second embodiment.

Figure 81:
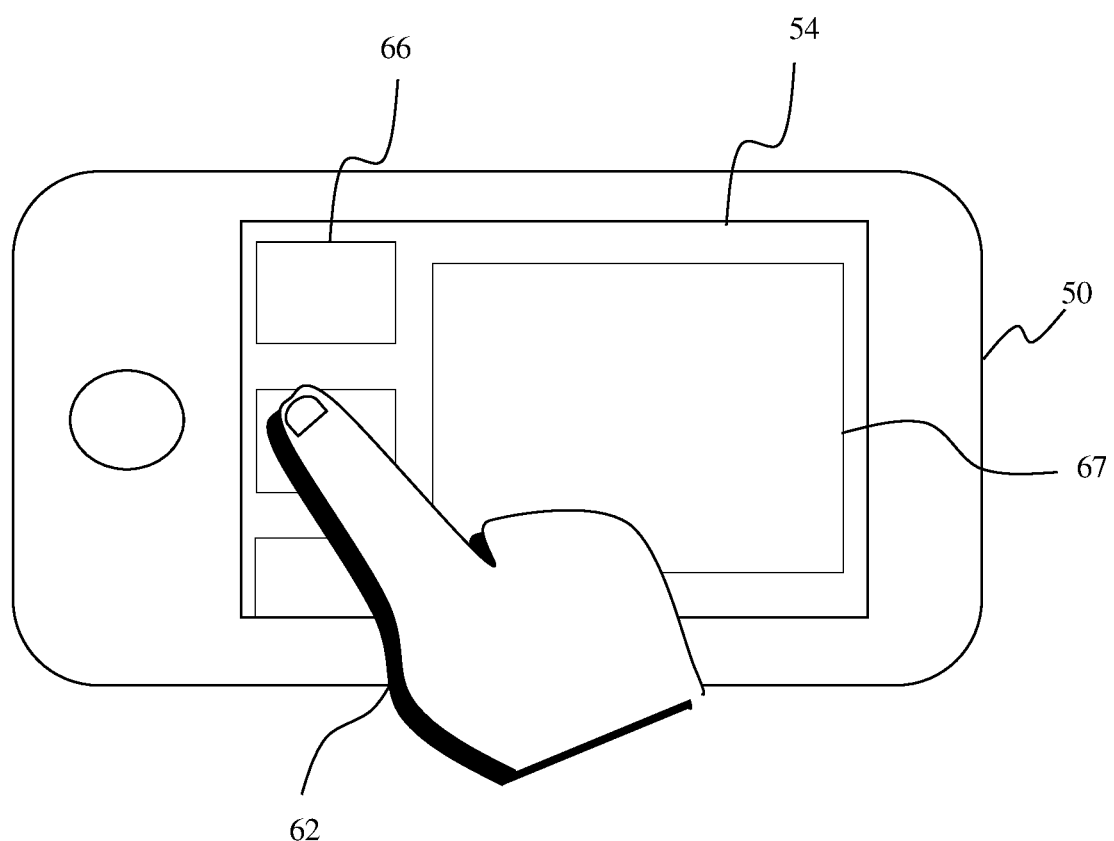
Figure 82:
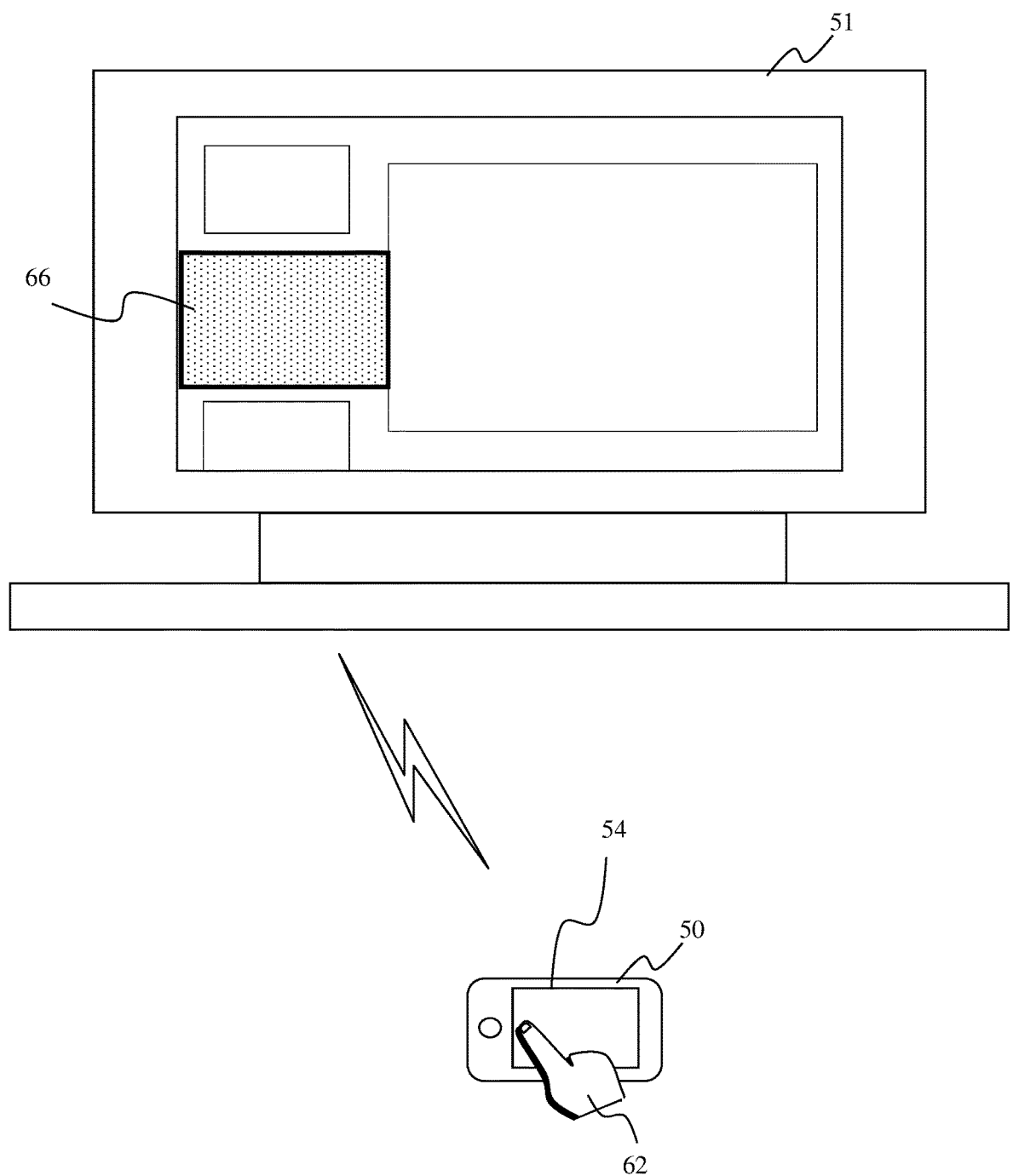

FIGS. 81 and 82 illustrate how a tappable object is emphasized according to the fifth to eighth aspects of the second embodiment.

Figure 83:
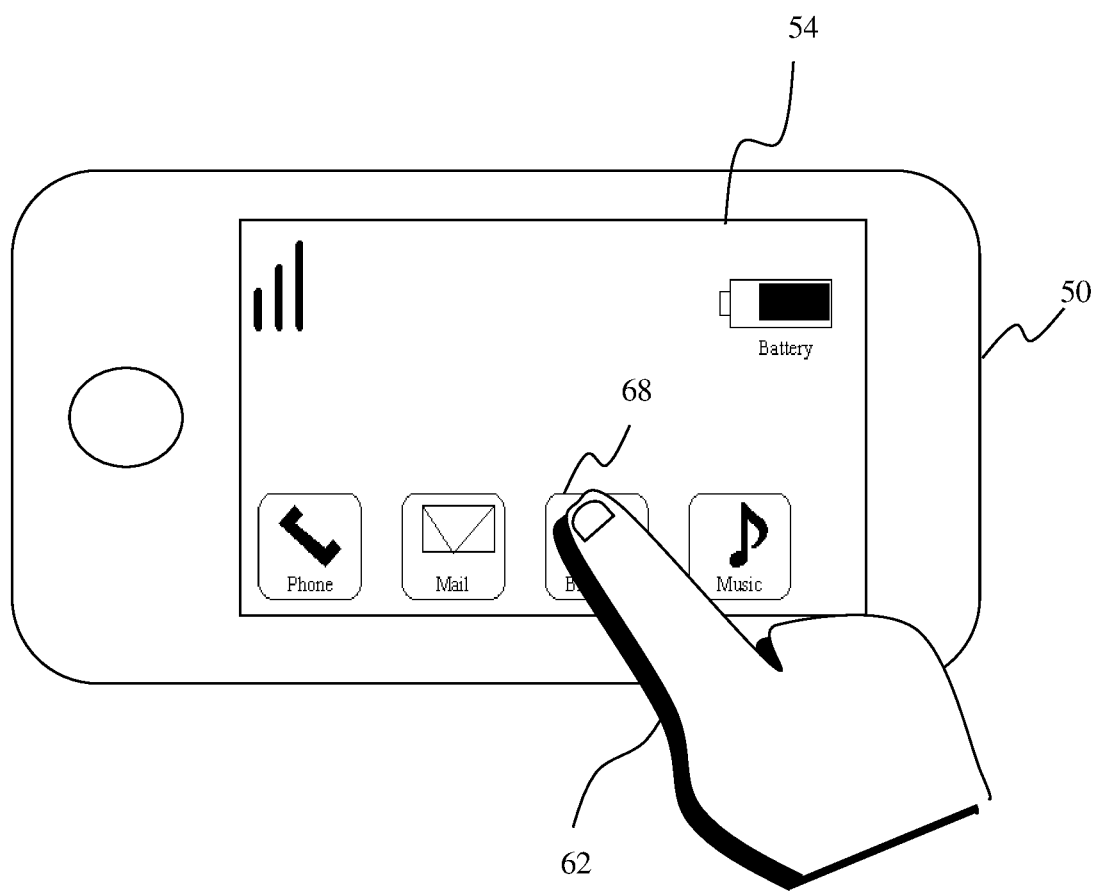
Figure 84:
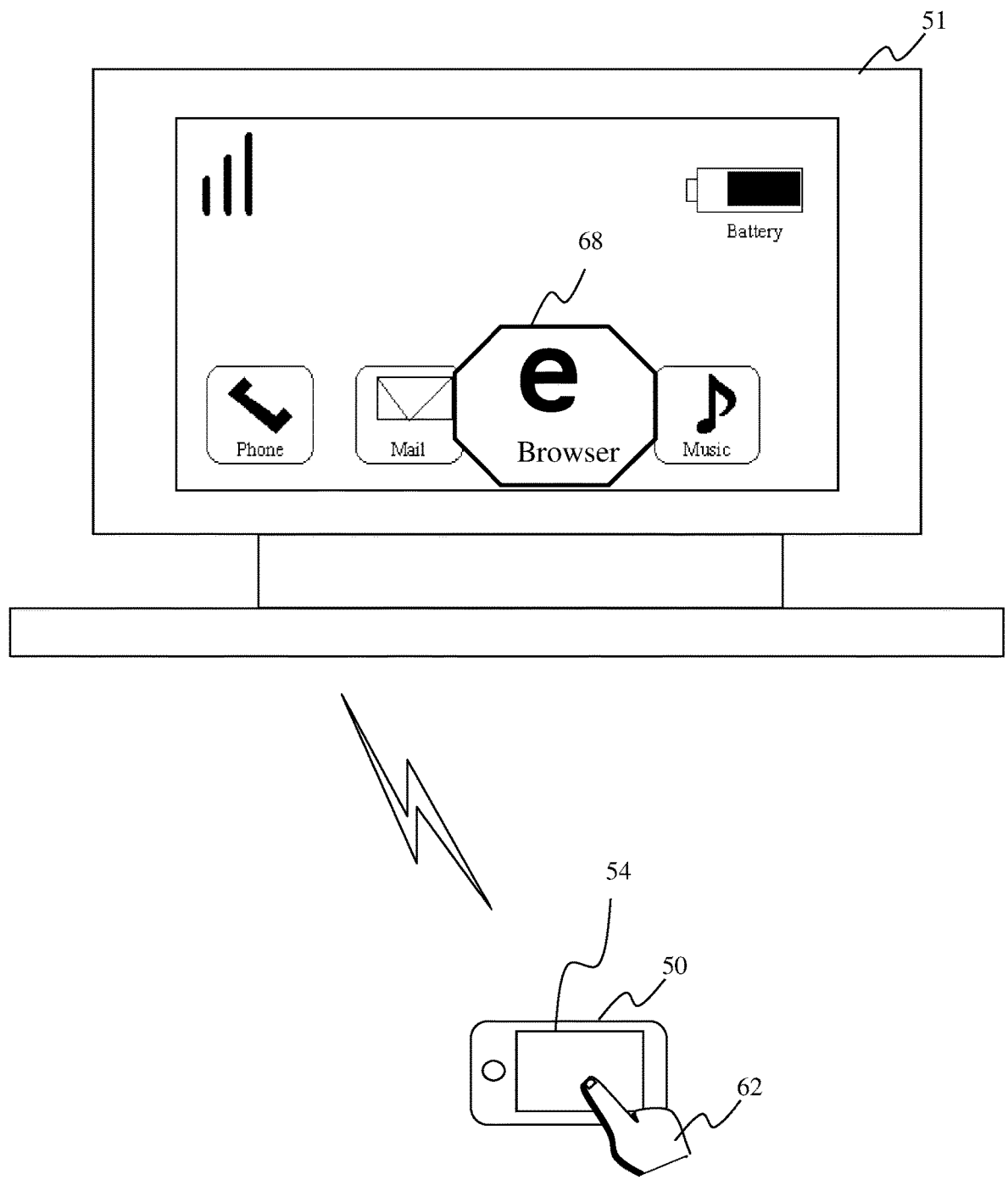

FIGS. 83 and 84 illustrate how a tappable object is emphasized according to the fifth to eighth aspects of the second embodiment.

Figure 85:
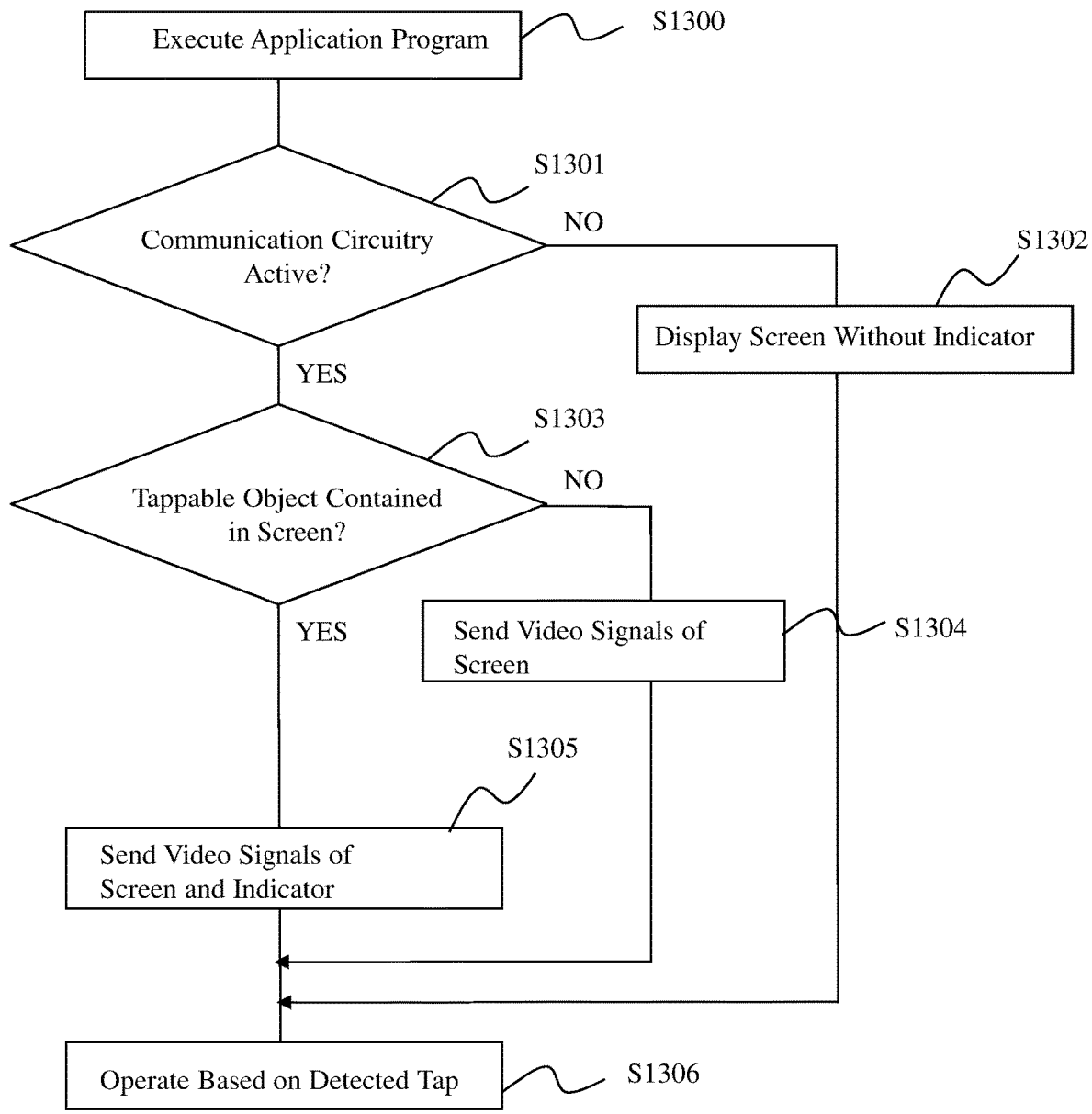

FIG. 85 is a flowchart illustrating operations performed by a computing device according to a ninth aspect of the second embodiment.

Figure 86:
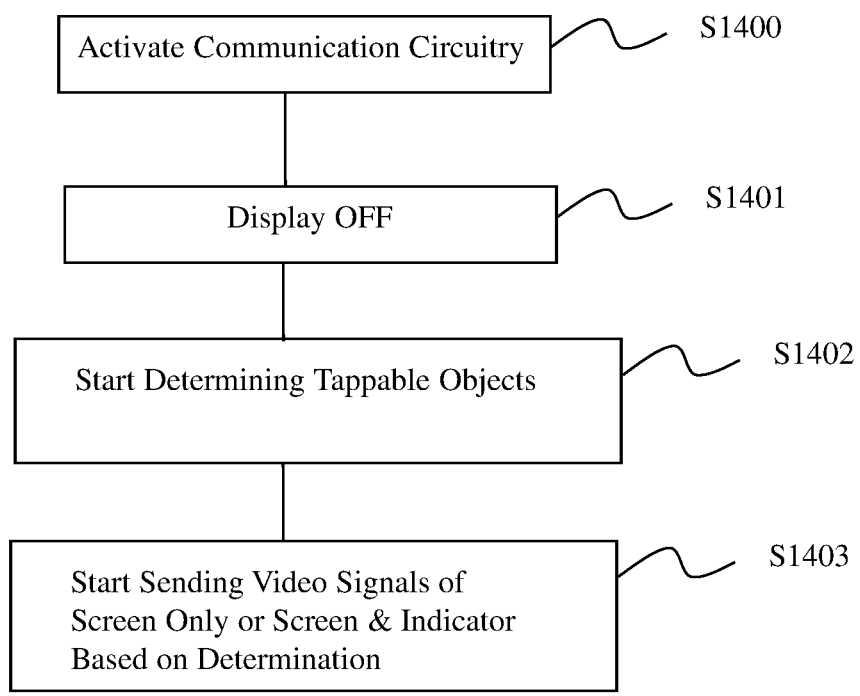

FIG. 86 is a flowchart illustrating operations performed by a computing device according to a tenth aspect of the second embodiment.

Figure 87:
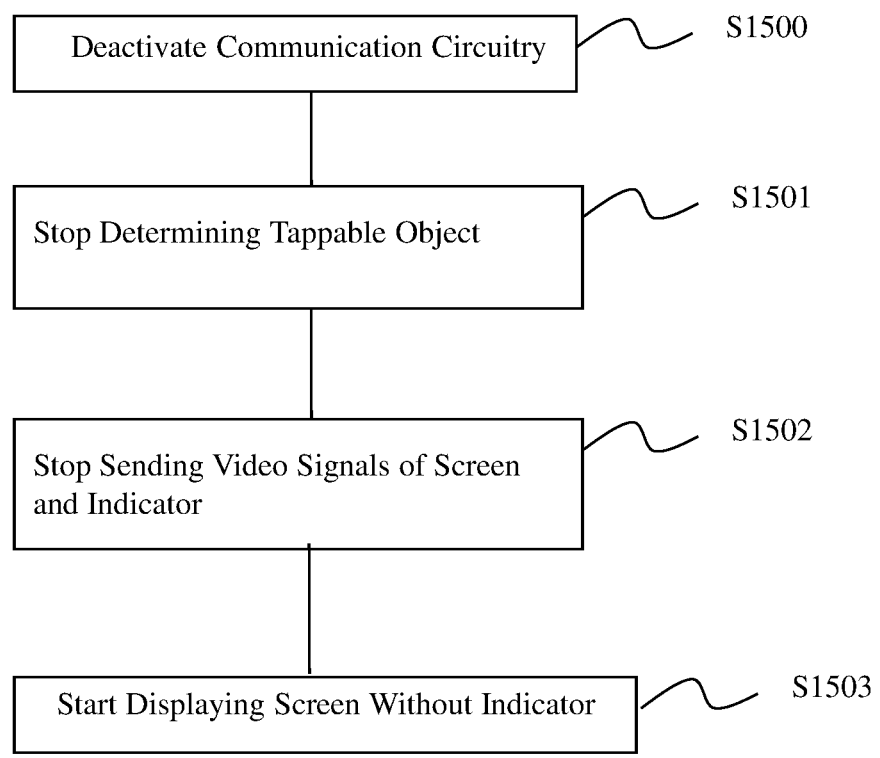

FIG. 87 is a flowchart illustrating operations performed by a computing device according to an eleventh aspect of the second embodiment.

Figure 88:
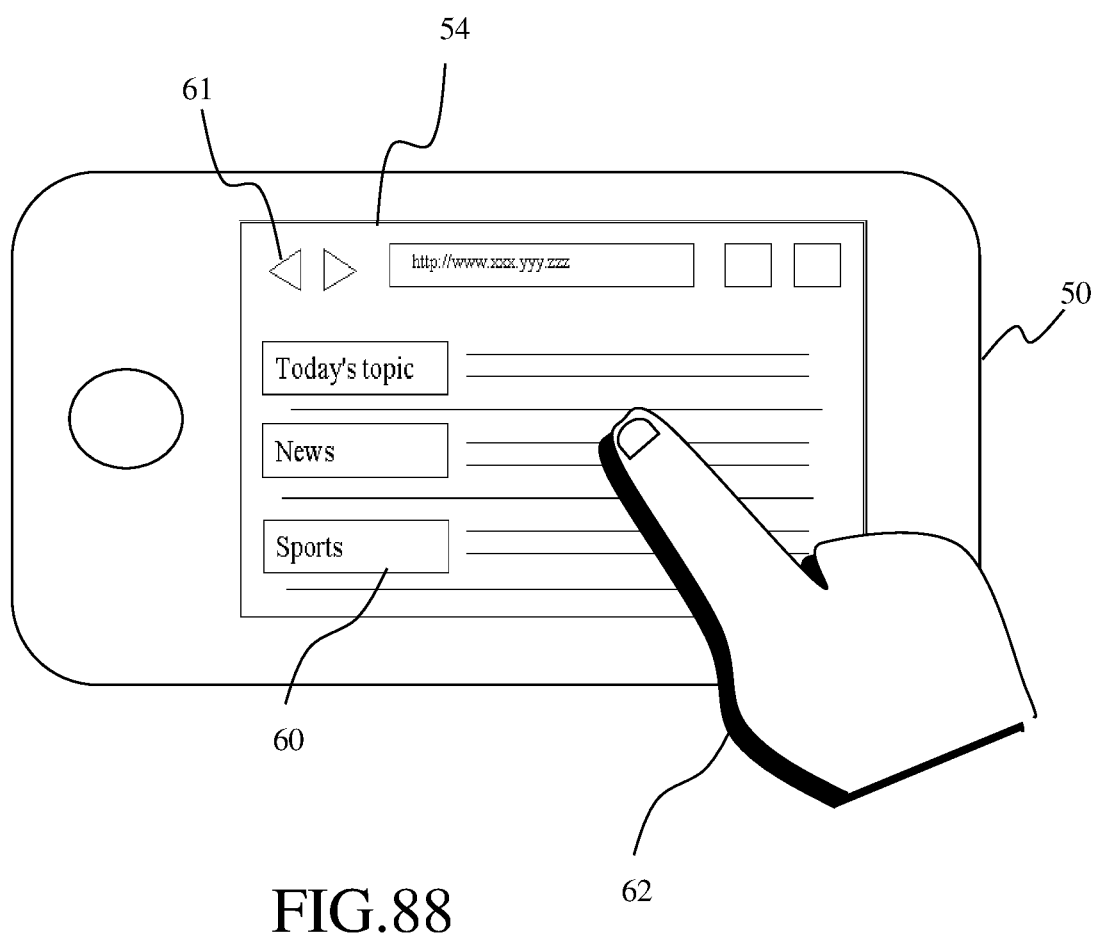
Figure 89:
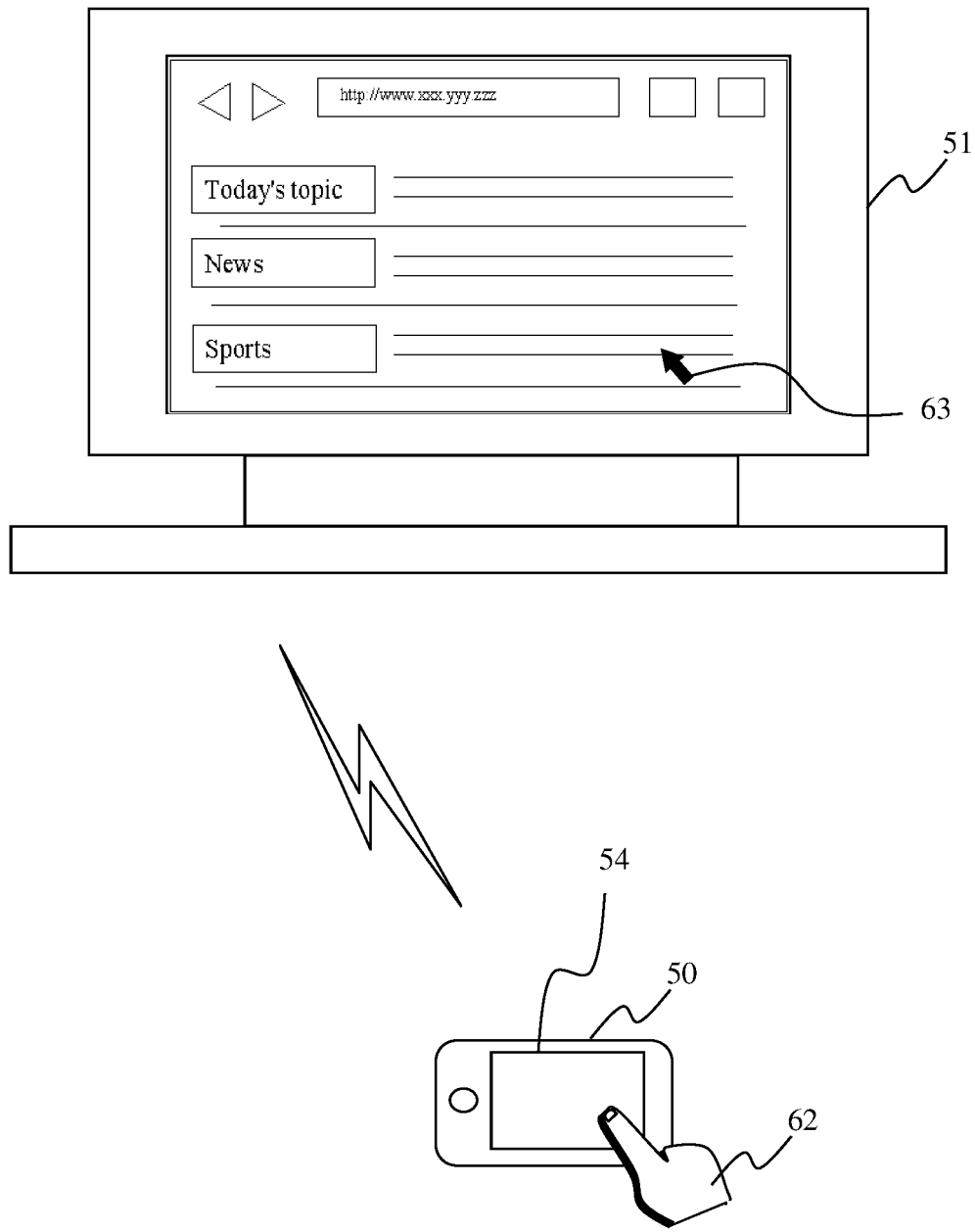
Figure 90:
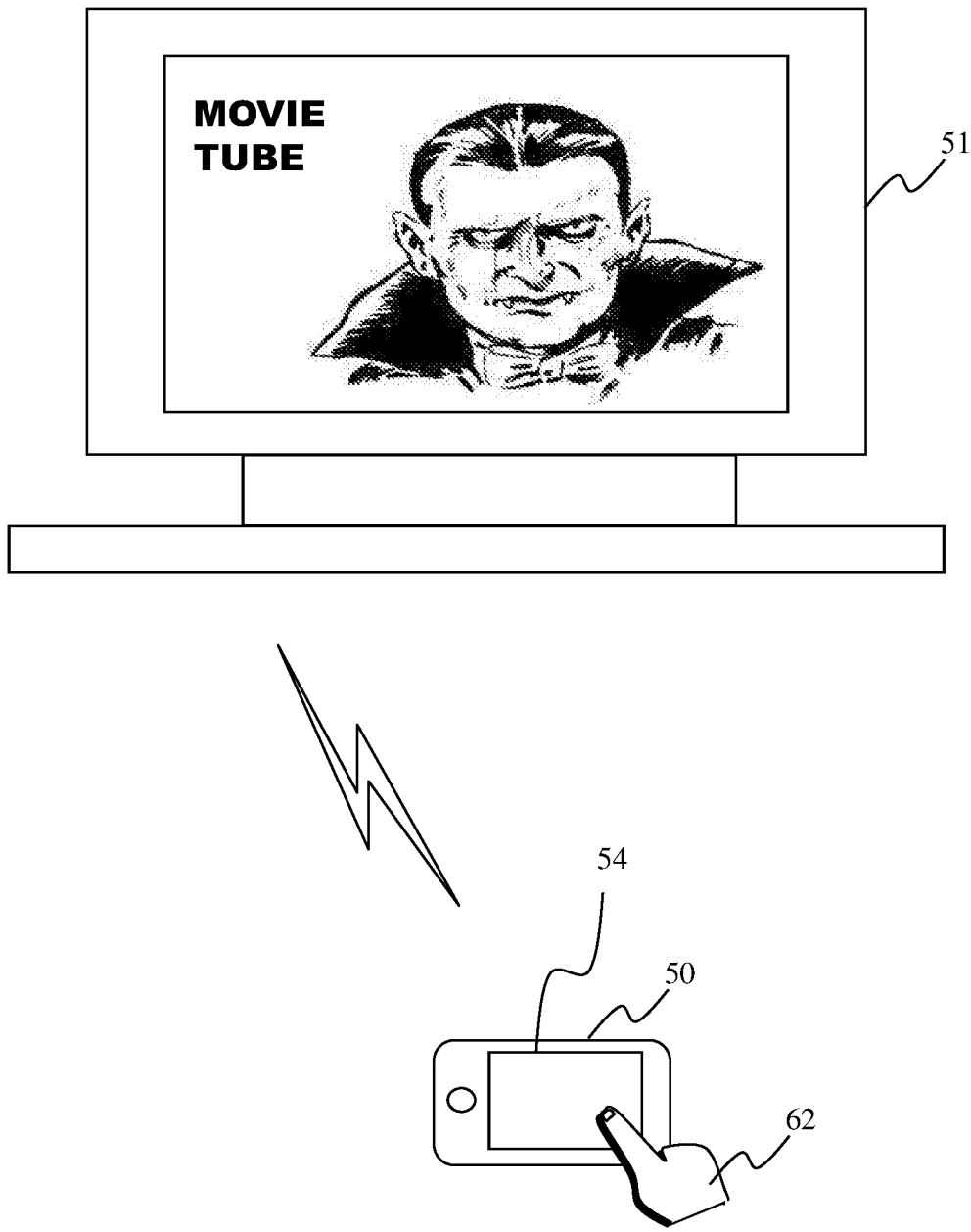

FIGS. 88 through 90 illustrate how an indicator is displayed according to the ninth to eleventh aspects of the second embodiment.

Figure 91:
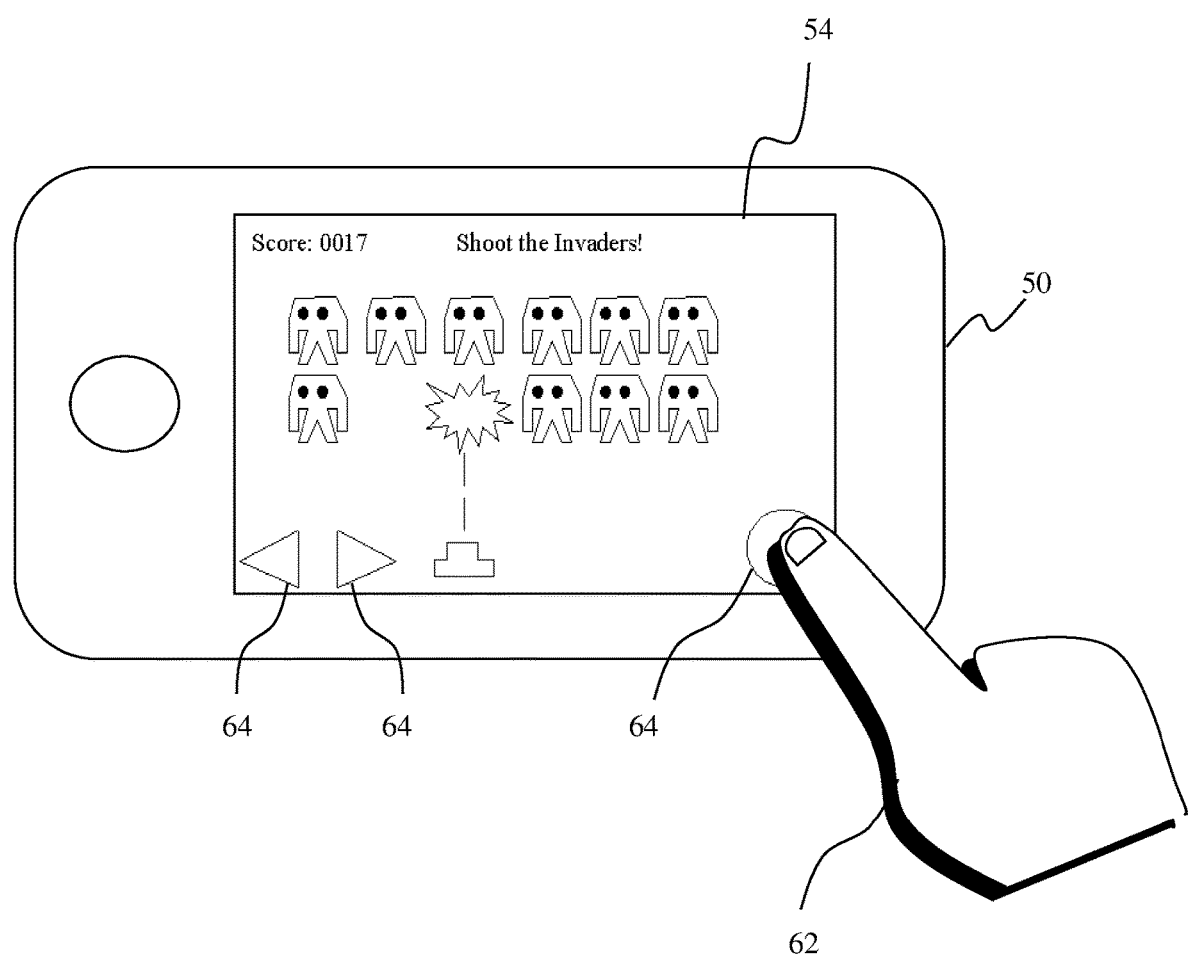
Figure 92:
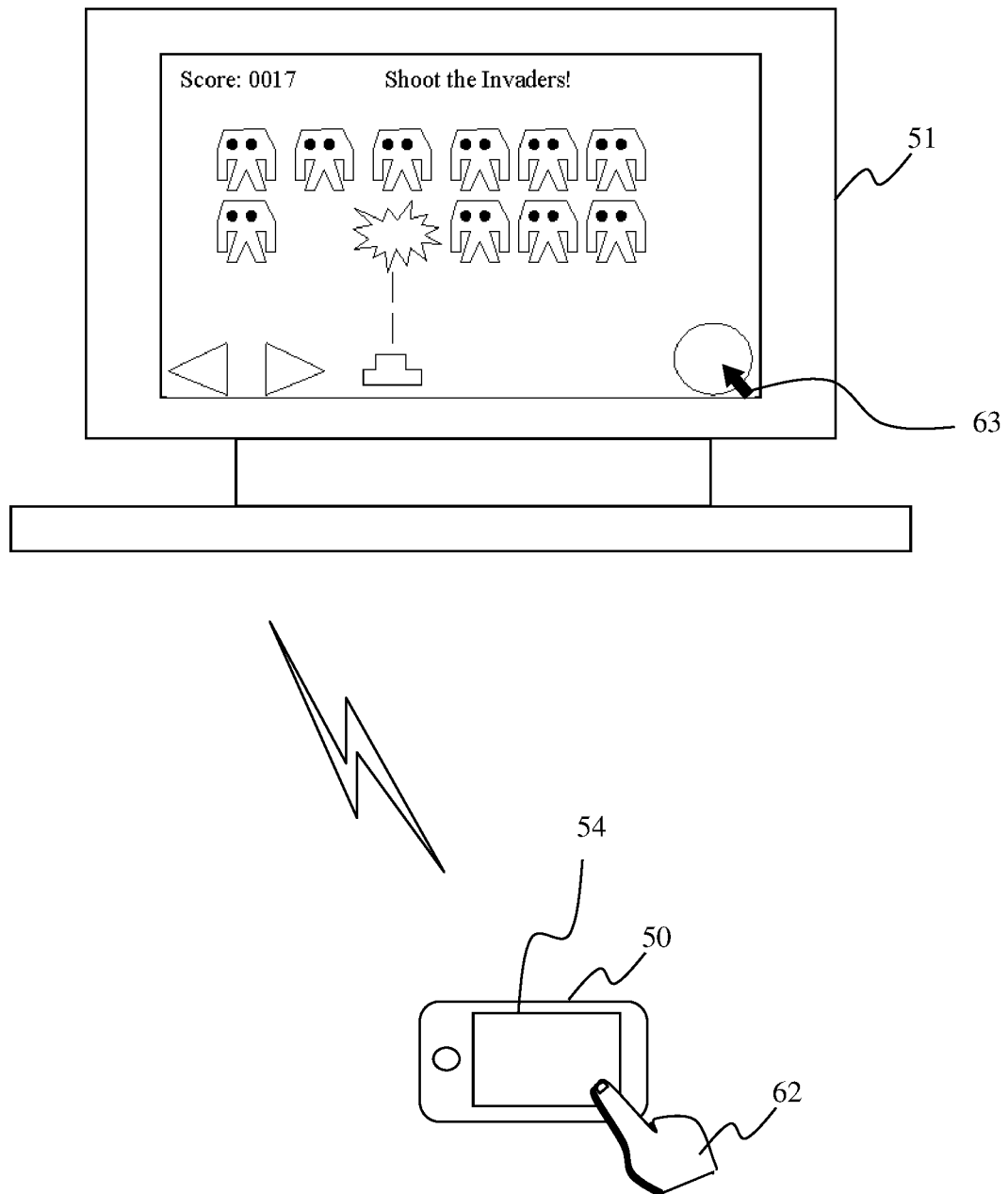
Figure 93:
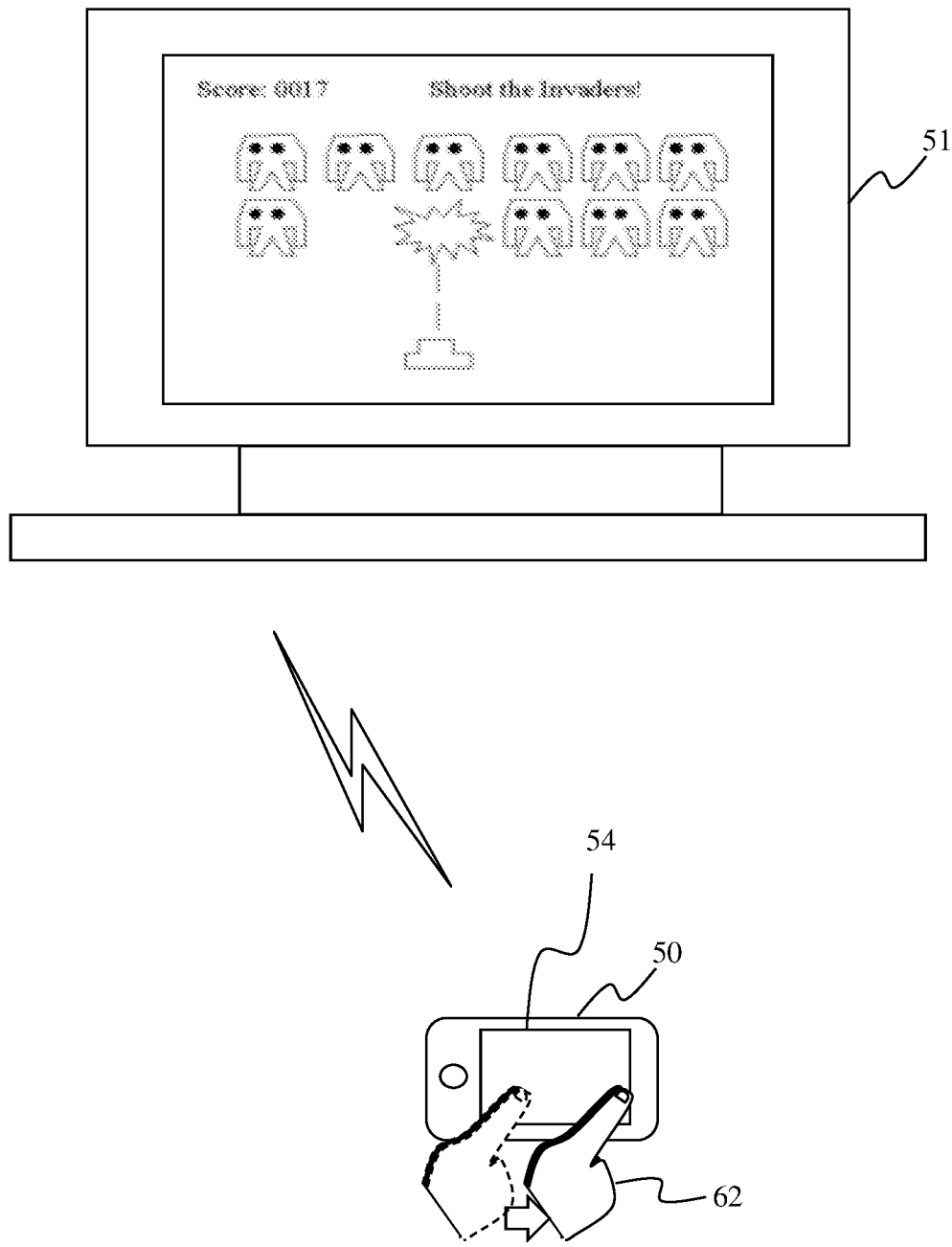

FIGS. 91 through 93 illustrate how an indicator is displayed according to the ninth to eleventh aspects of the second embodiment.

Figure 94:
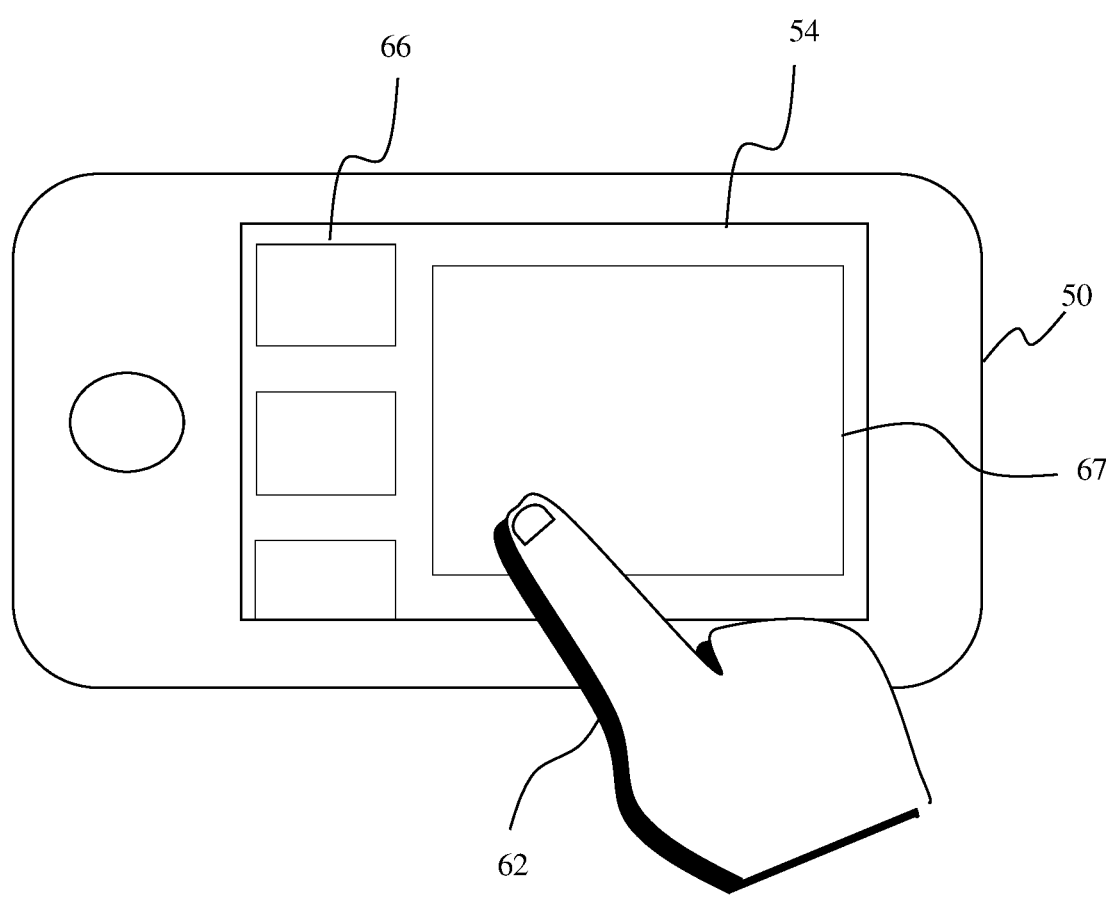
Figure 95:
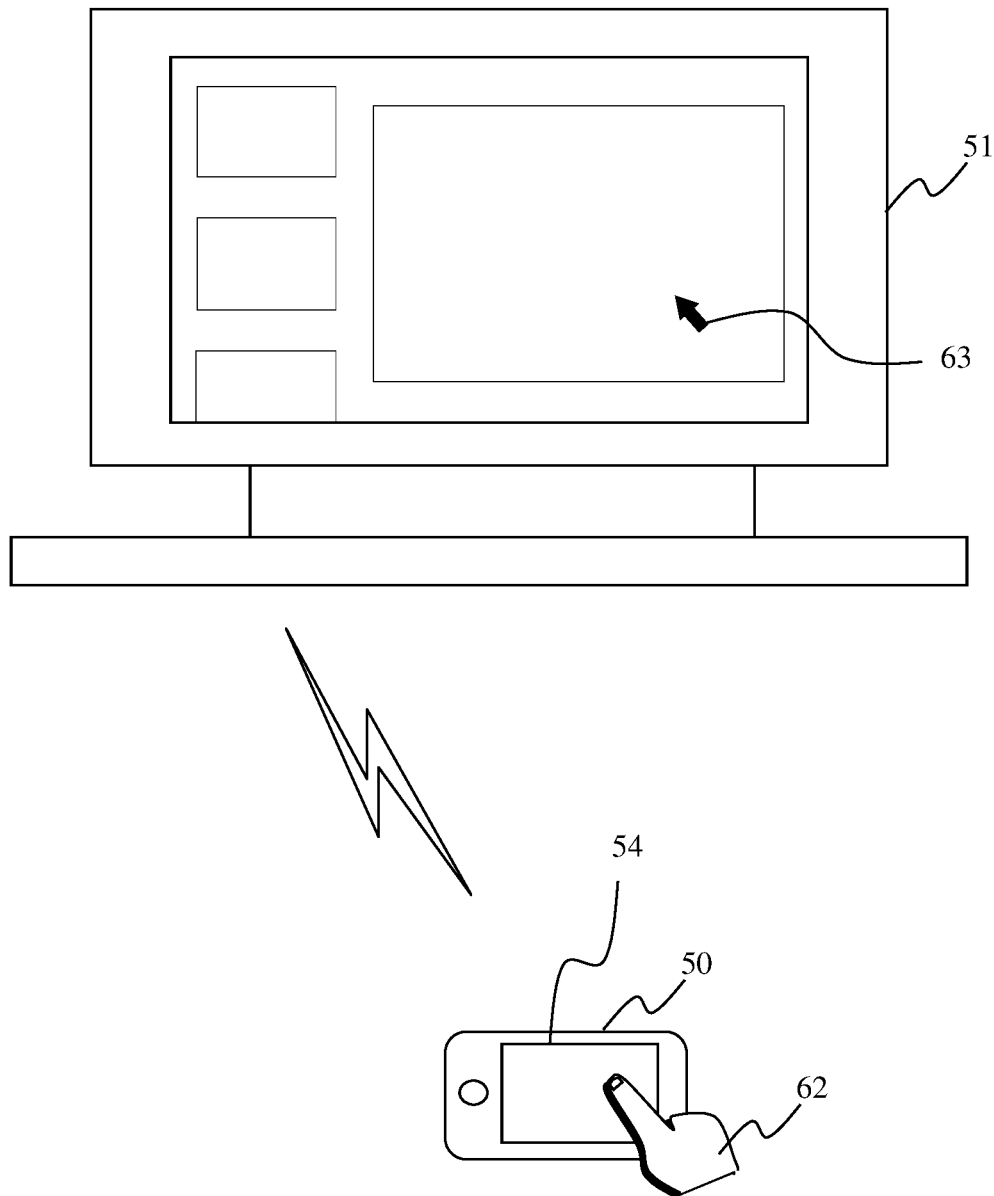
Figure 96:
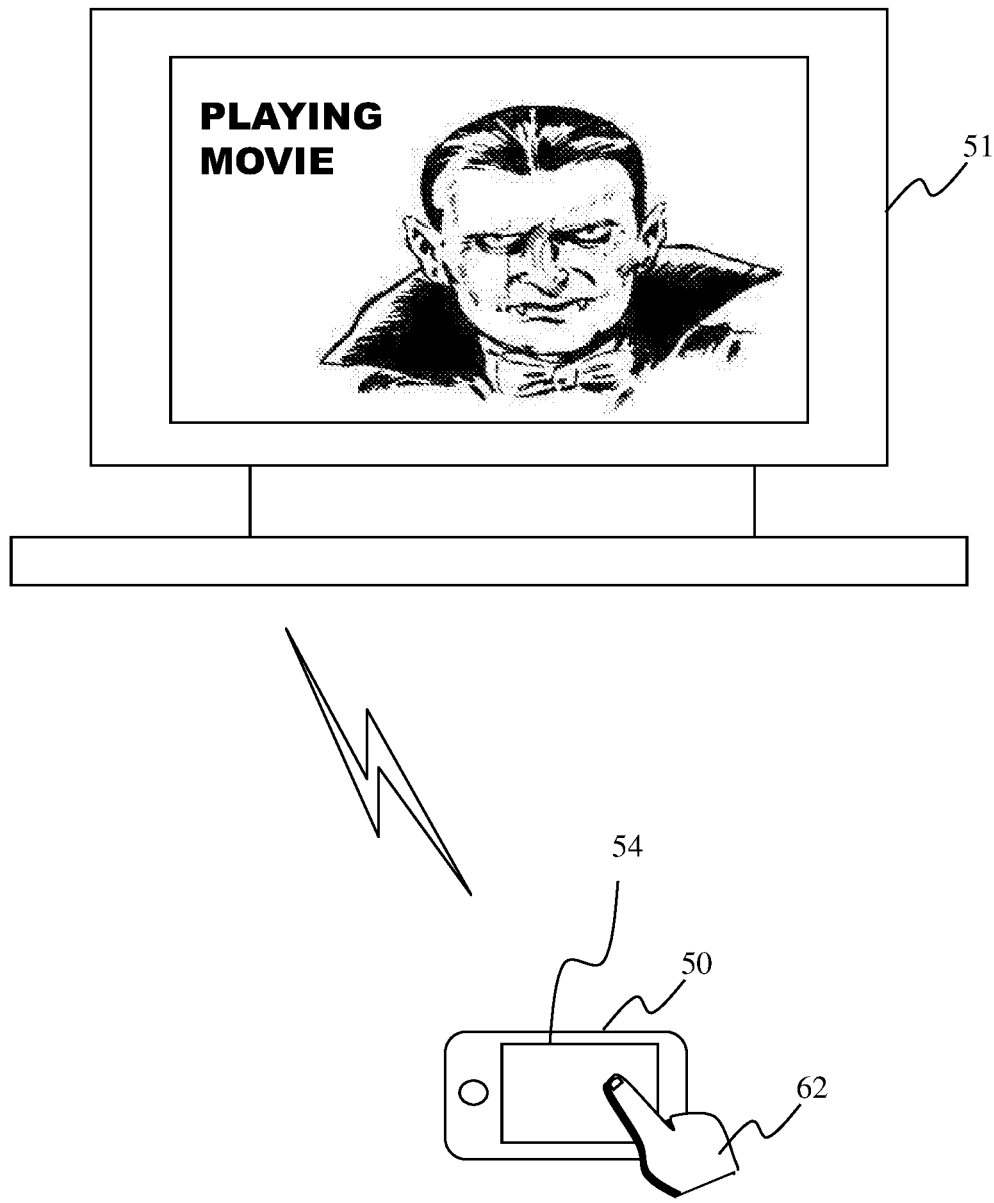

FIGS. 94 through 96 illustrate how an indicator is displayed according to the ninth to eleventh aspects of the second embodiment.

Figure 97:
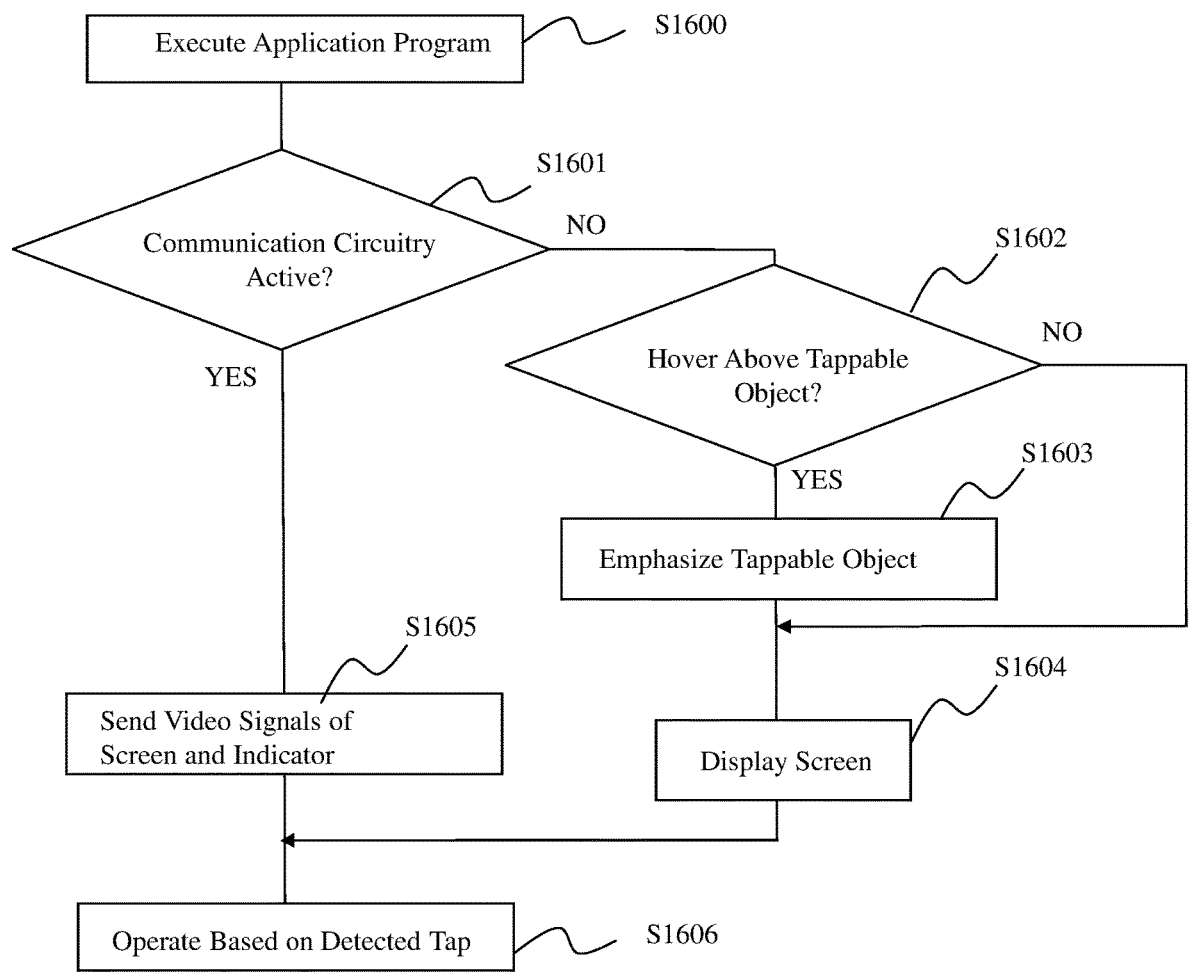

FIG. 97 is a flowchart illustrating operations performed by a computing device according to a twelfth aspect of the second embodiment.

Figure 98:
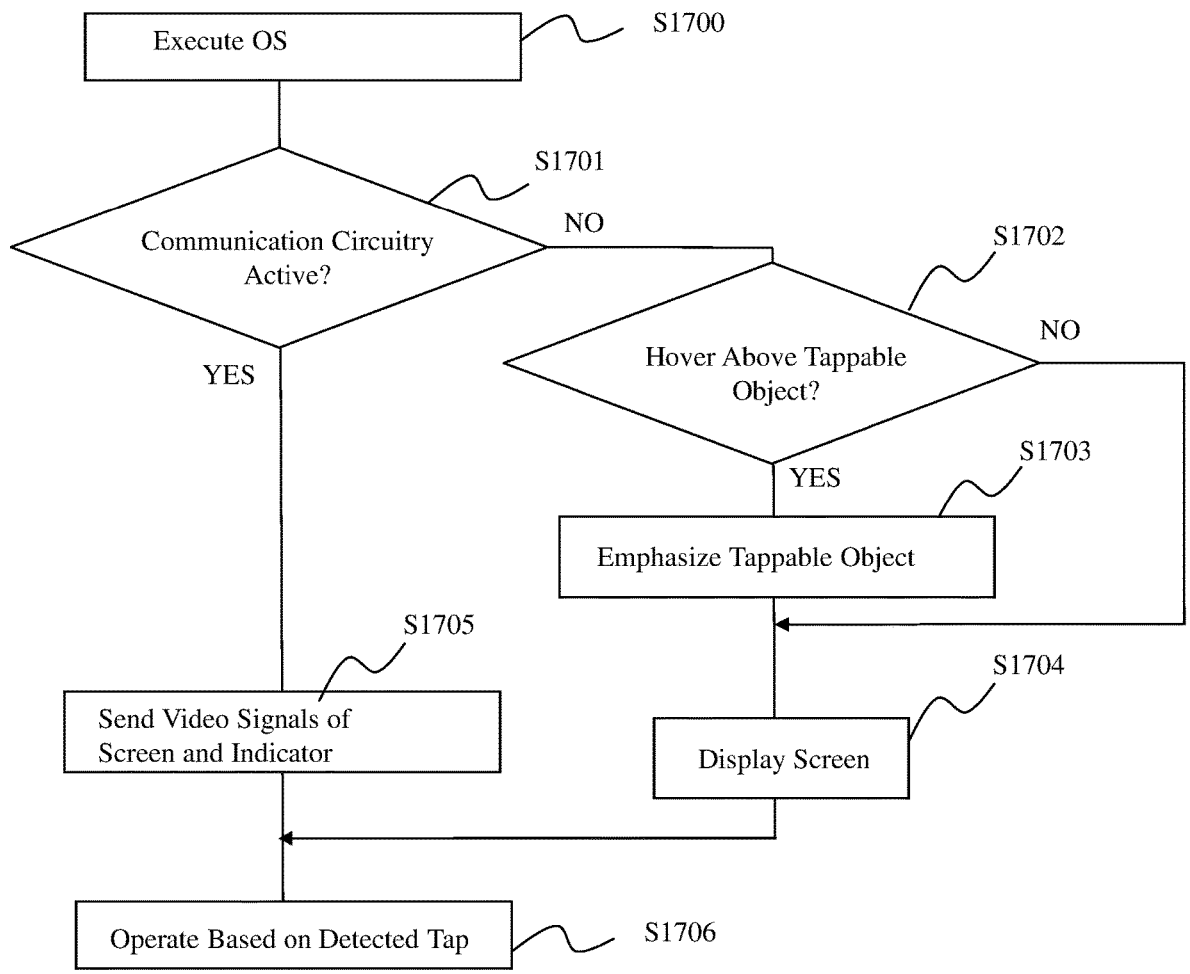

FIG. 98 is a flowchart illustrating operations performed by a computing device according to a thirteenth aspect of the second embodiment.

Figure 99:
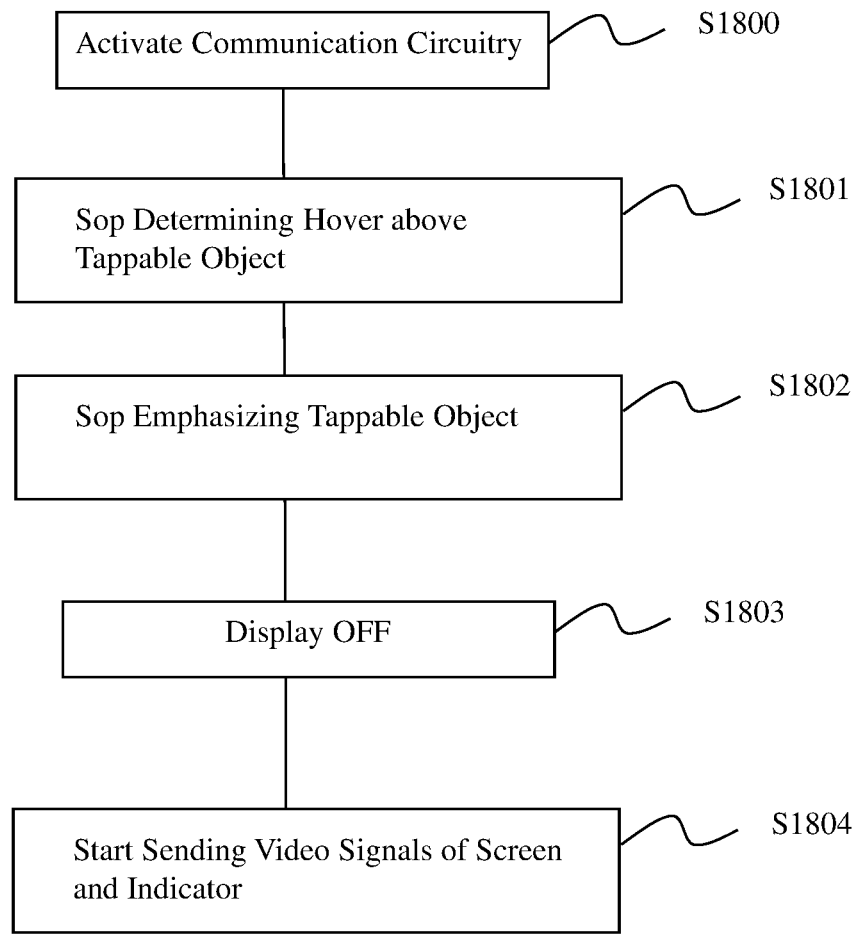

FIG. 99 is a flowchart illustrating operations performed by a computing device according to a fourteenth aspect of the second embodiment.

Figure 100:
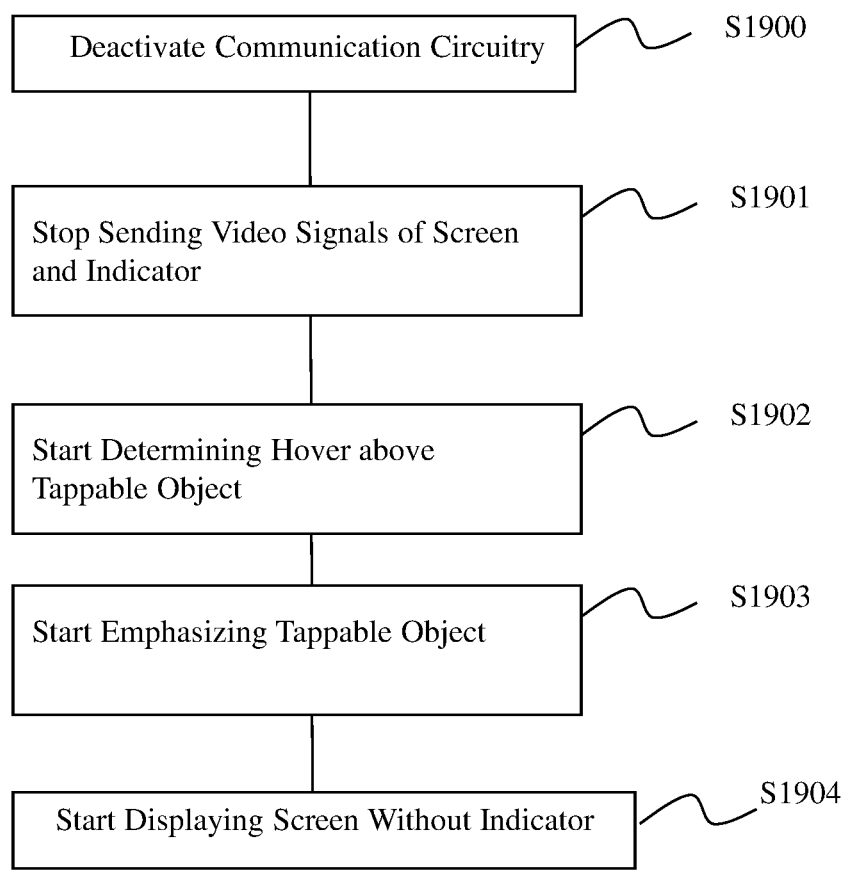

FIG. 100 is a flowchart illustrating operations performed by a computing device according to a fifteenth aspect of the second embodiment.

Figure 101:
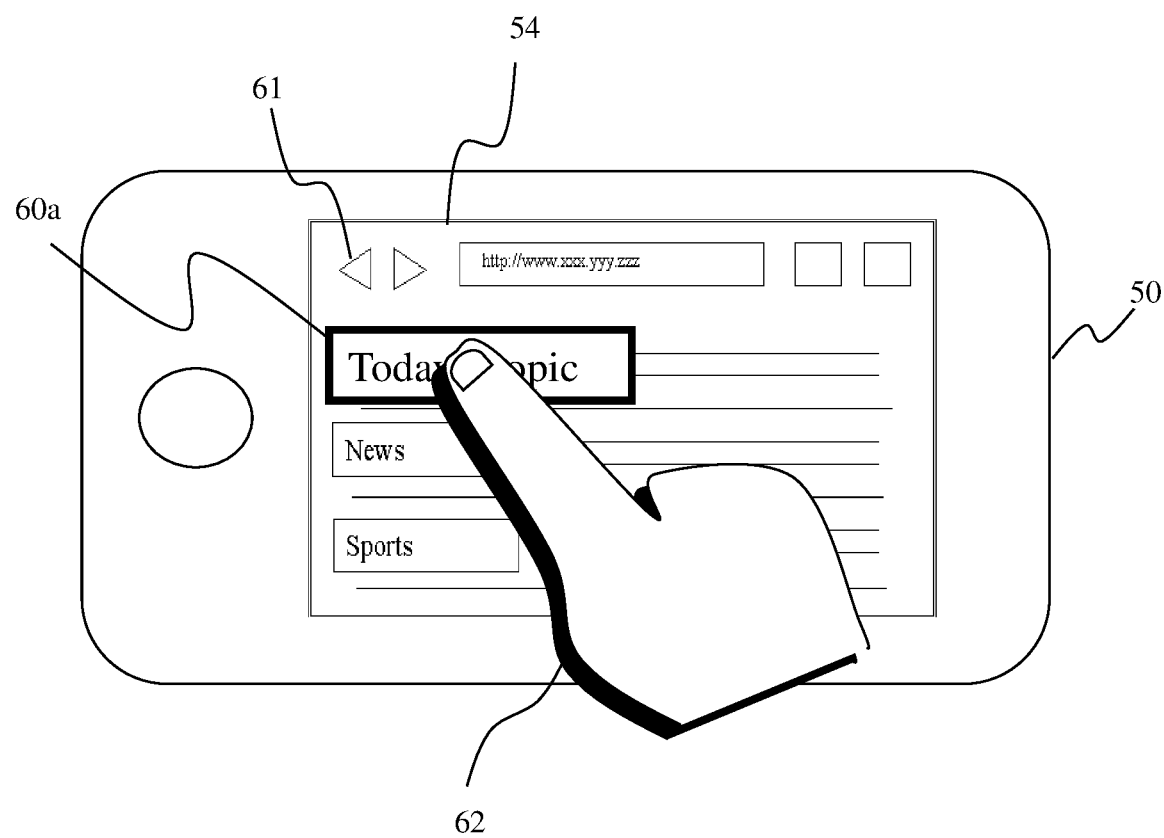
Figure 102:
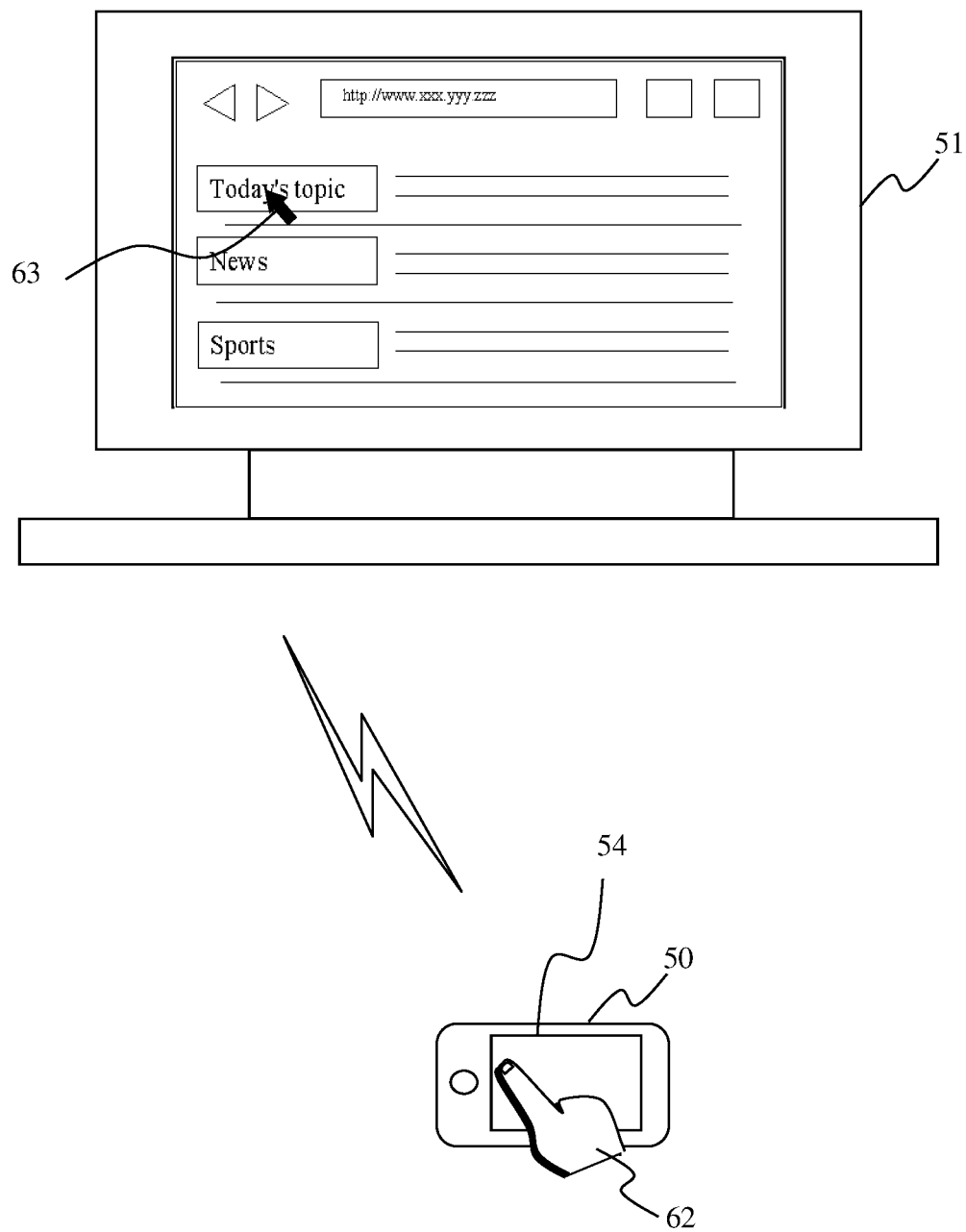

FIGS. 101 and 102 illustrate how an indicator is displayed and how a tappable object is emphasized according to the twelfth to fifteenth aspects of the second embodiment.

Figure 103:
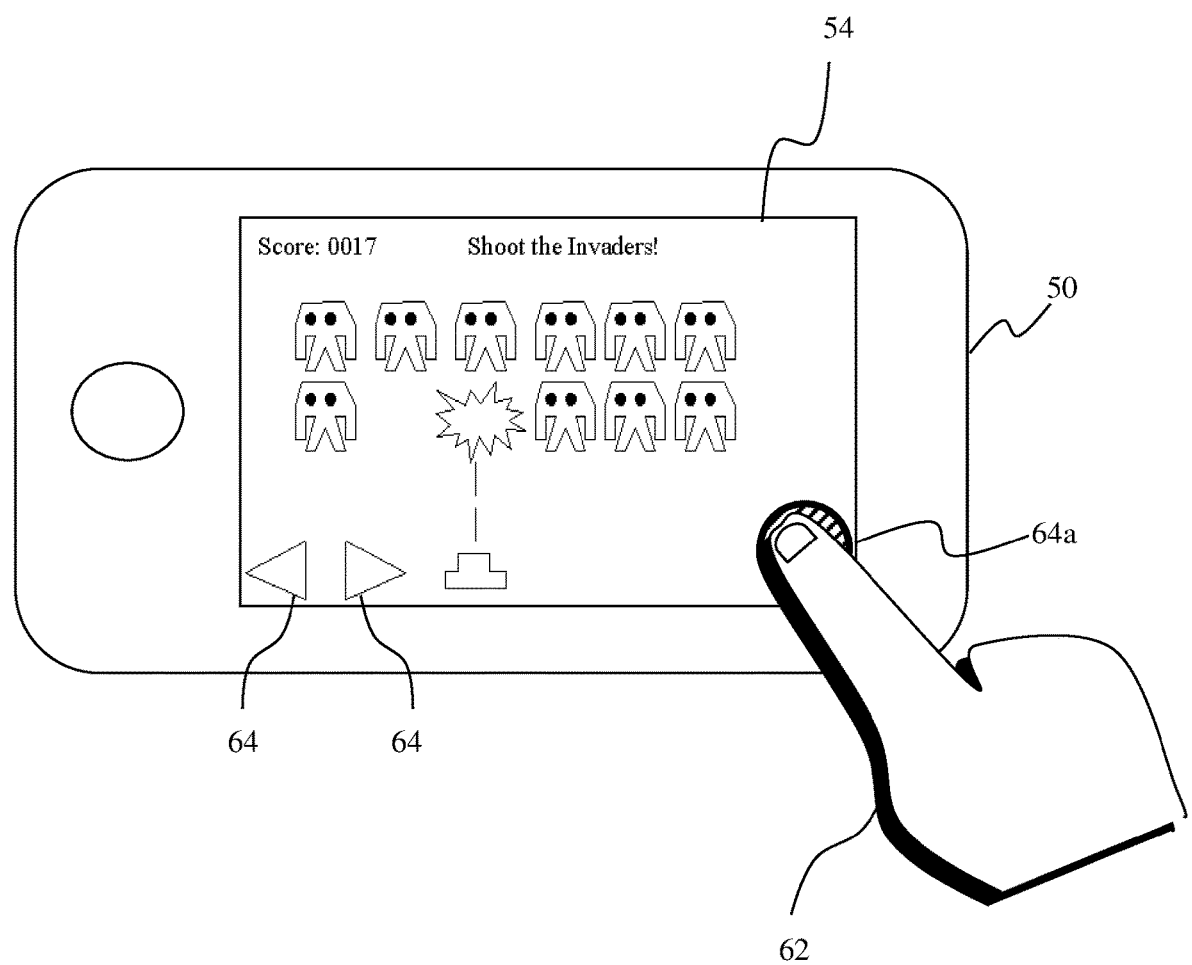
Figure 104:
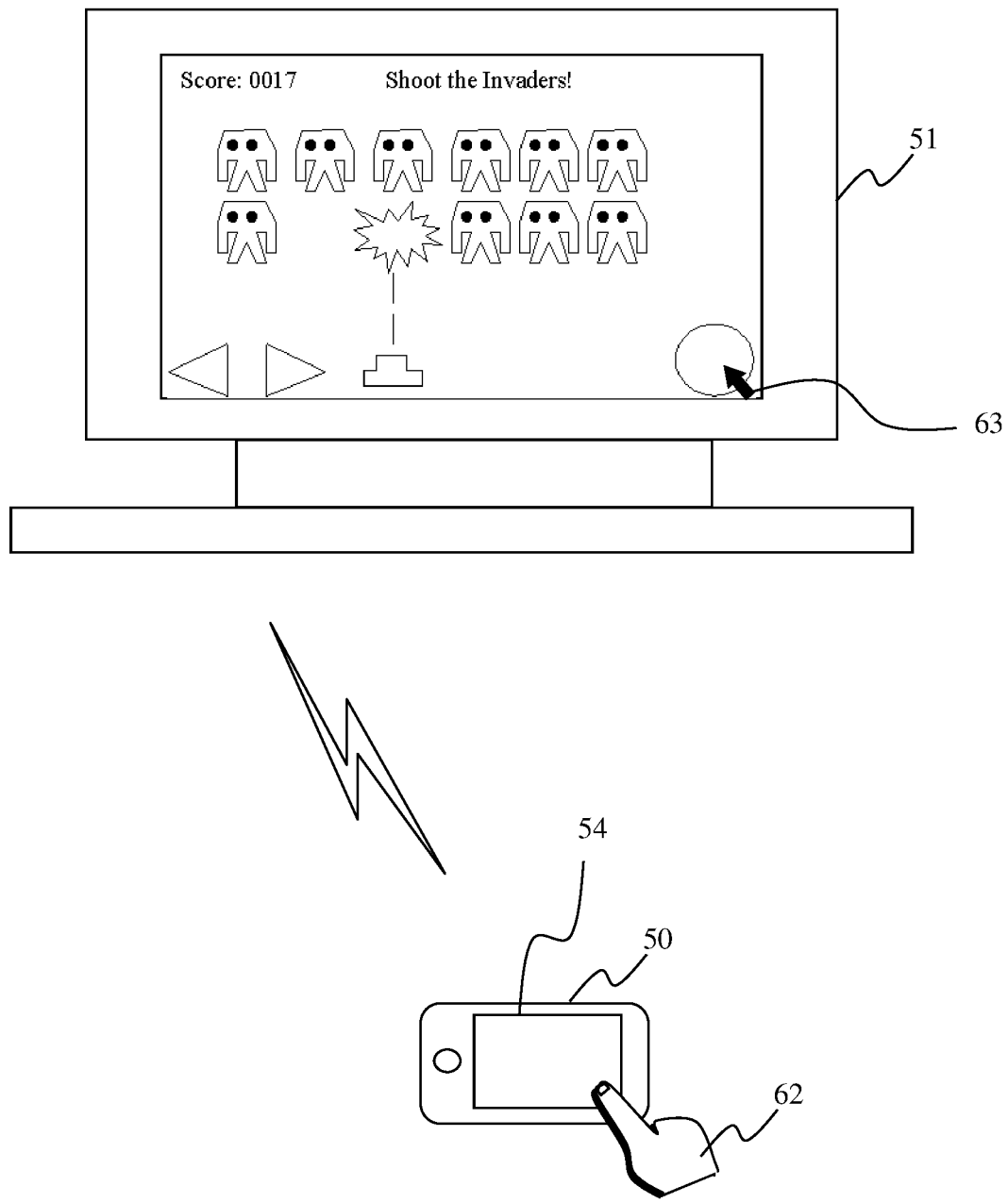

FIGS. 103 and 104 illustrate how an indicator is displayed and how a tappable object is emphasized according to the twelfth to fifteenth aspects of the second embodiment.

Figure 105:
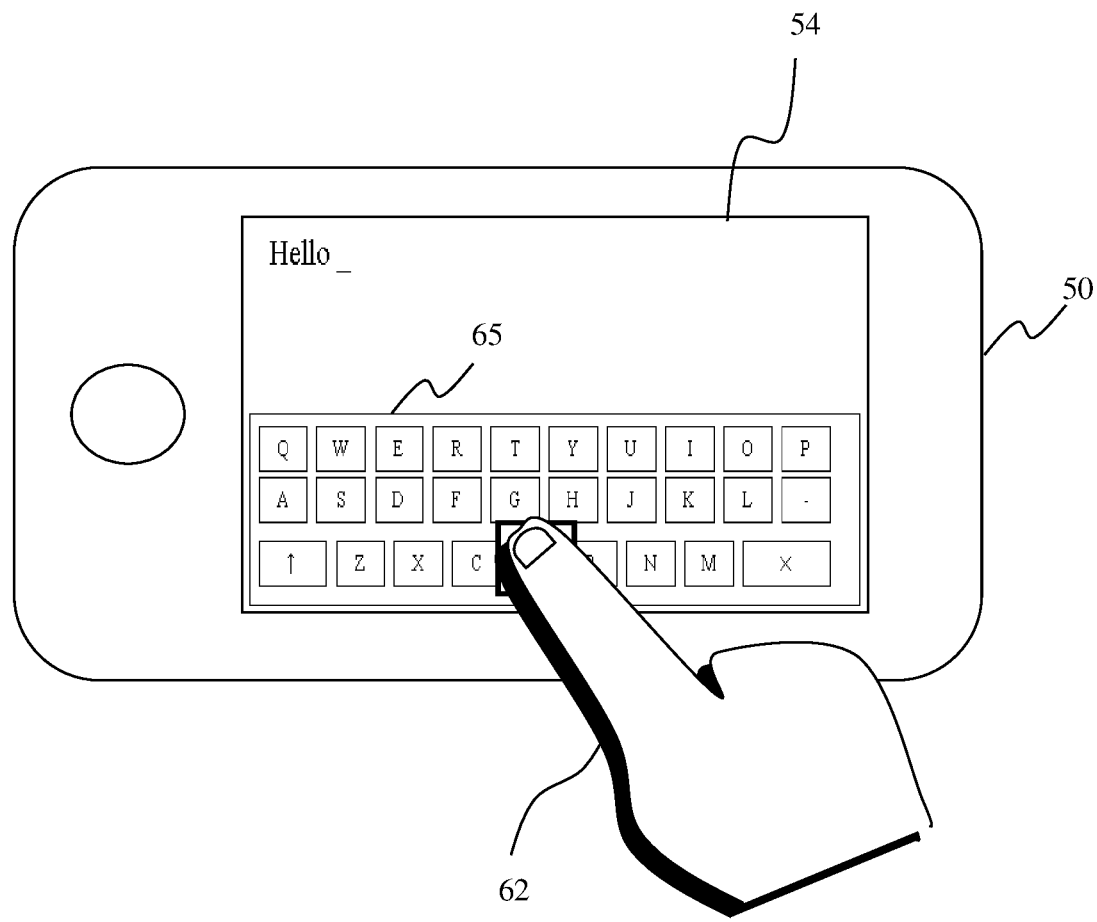
Figure 106:
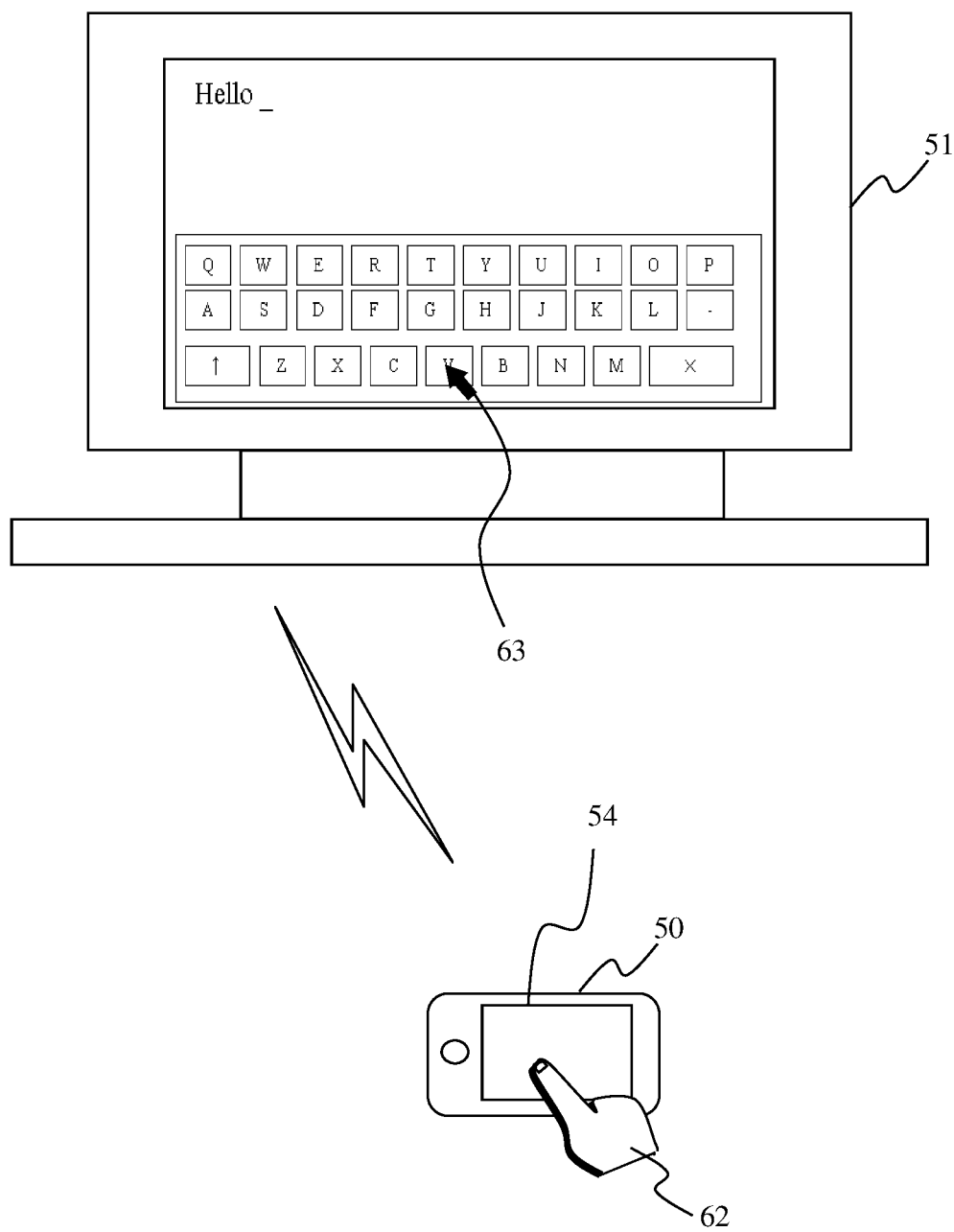

FIGS. 105 and 106 illustrate how an indicator is displayed and how a tappable object is emphasized according to the twelfth to fifteenth aspects of the second embodiment.

Figure 107:
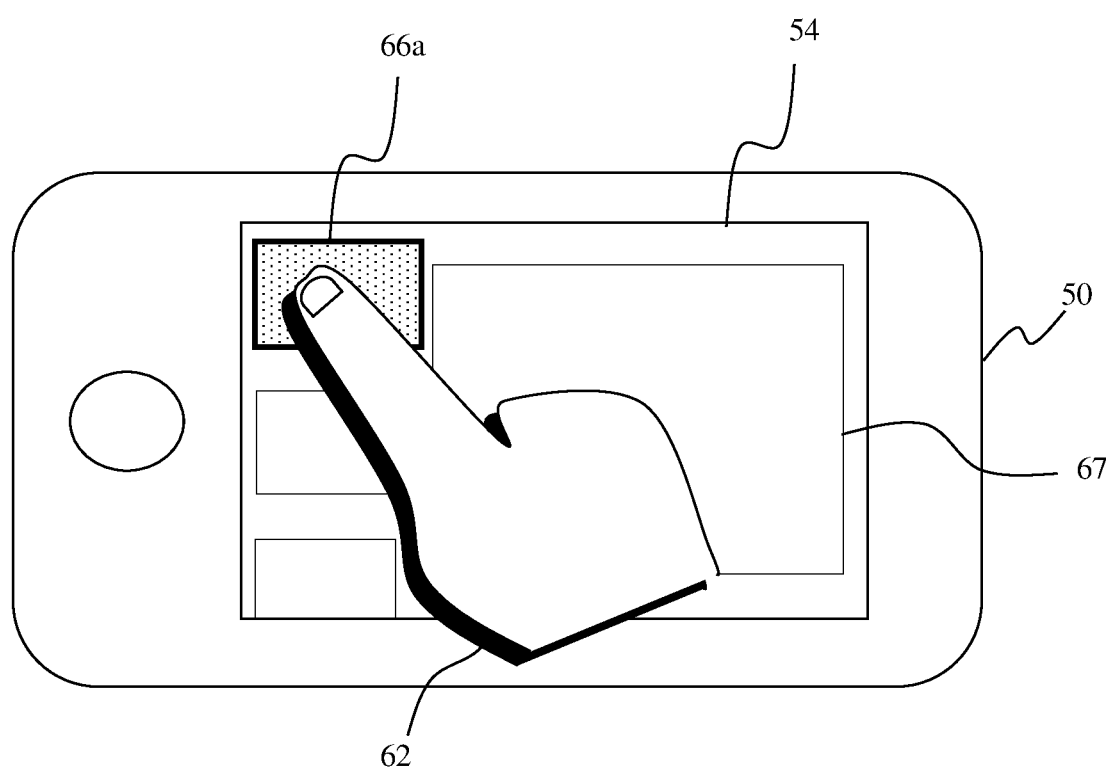
Figure 108:
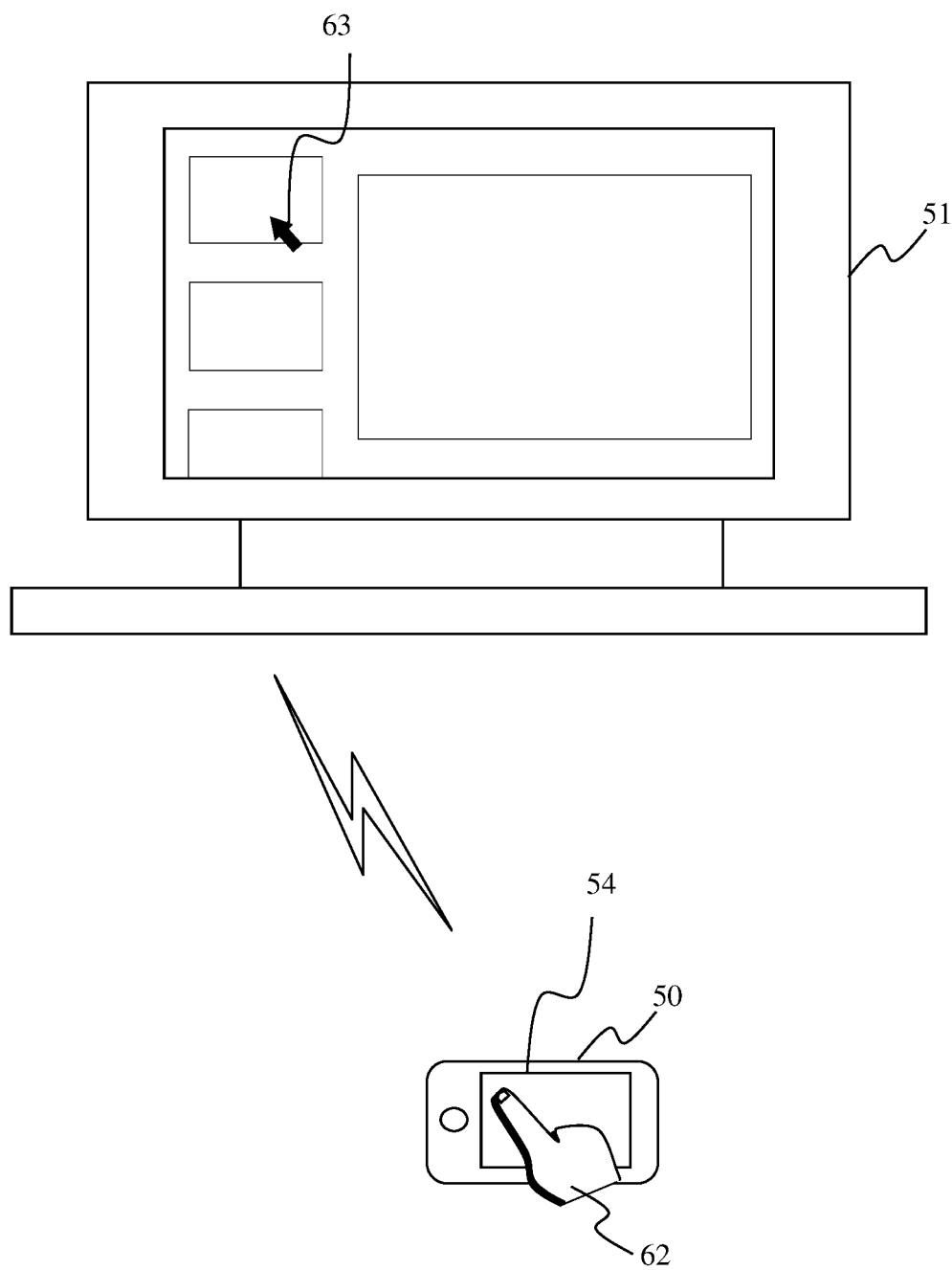

FIGS. 107 and 108 illustrate how an indicator is displayed and how a tappable object is emphasized according to the twelfth to fifteenth aspects of the second embodiment.

Figure 109:
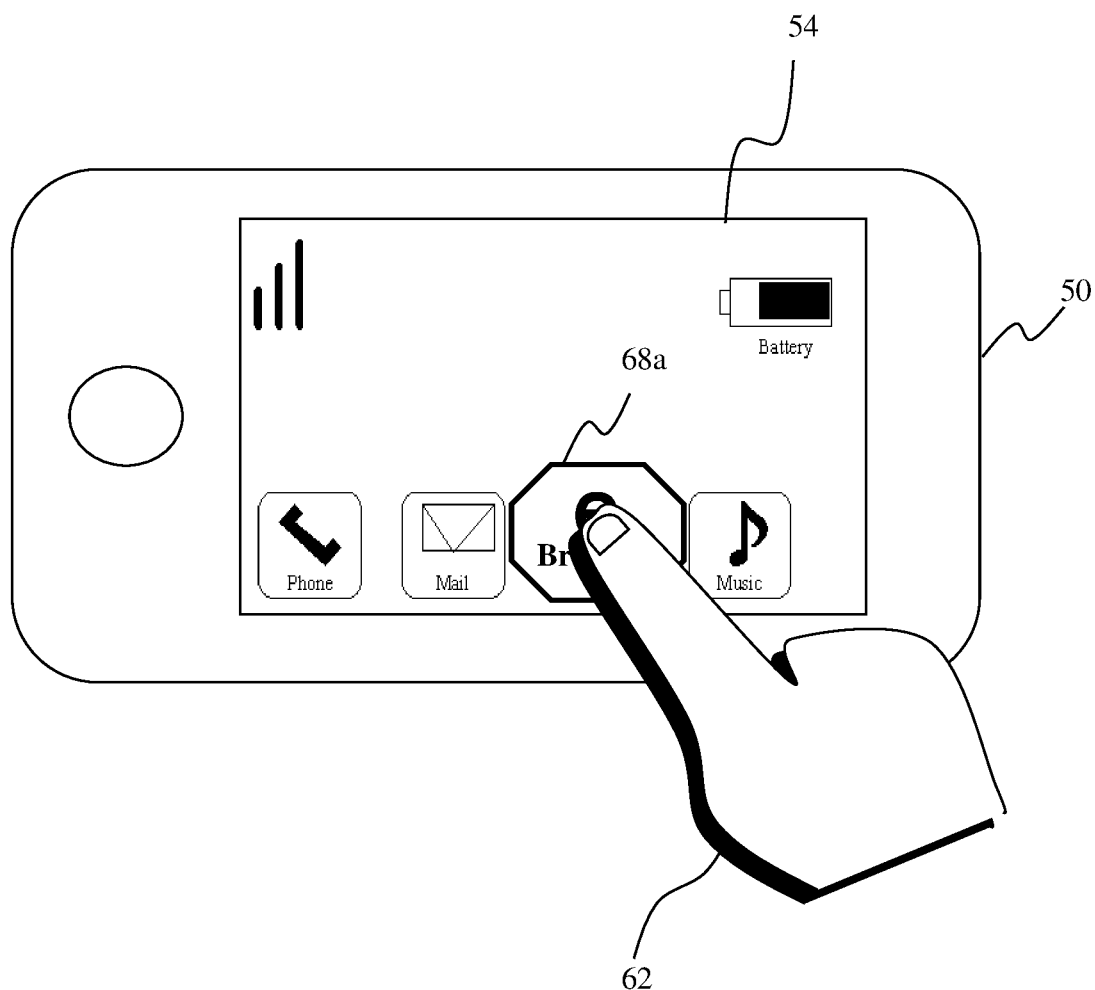
Figure 110:
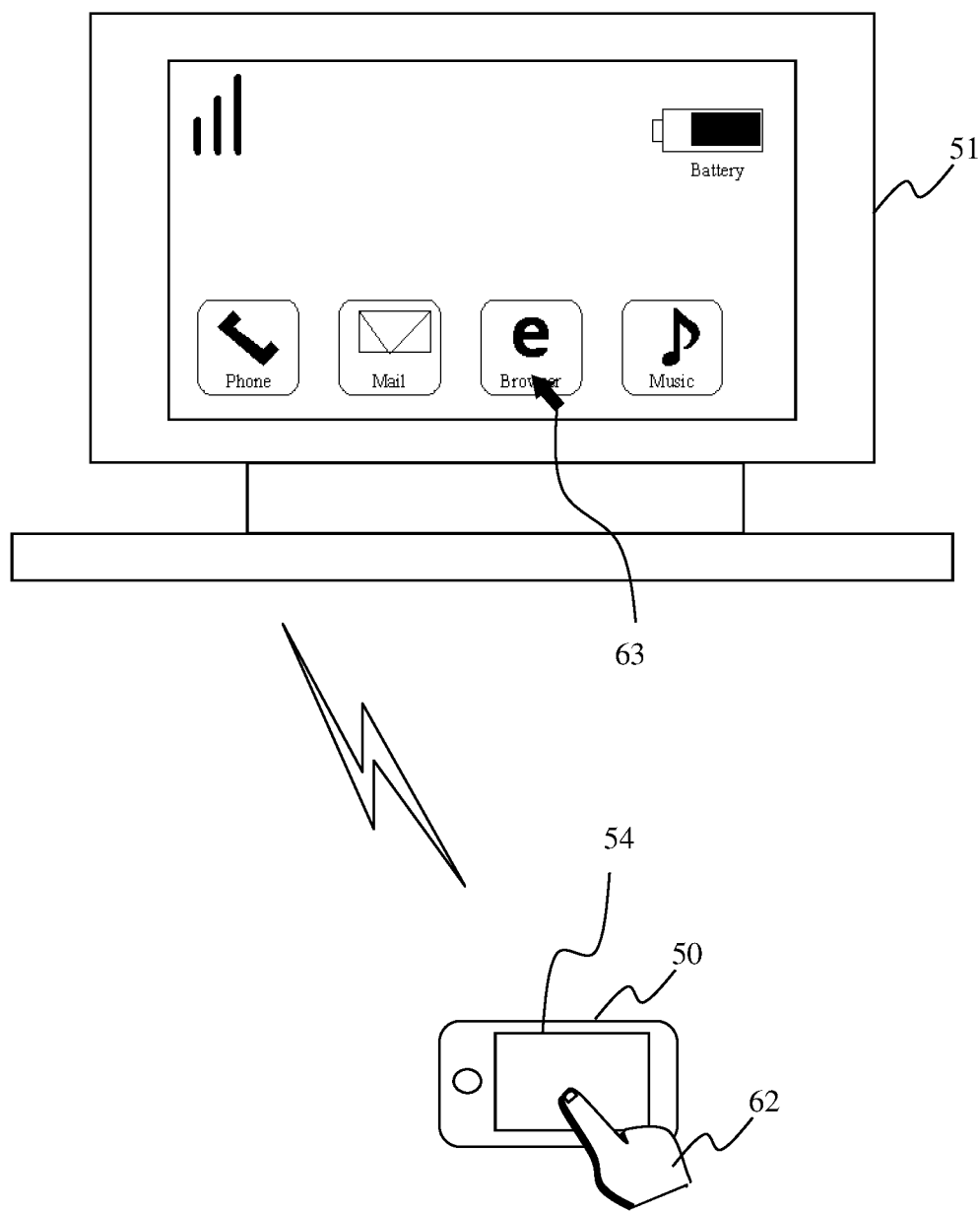

FIGS. 109 and 110 illustrate how an indicator is displayed and how a tappable object is emphasized according to the twelfth to fifteenth aspects of the second embodiment.

Figure 111:
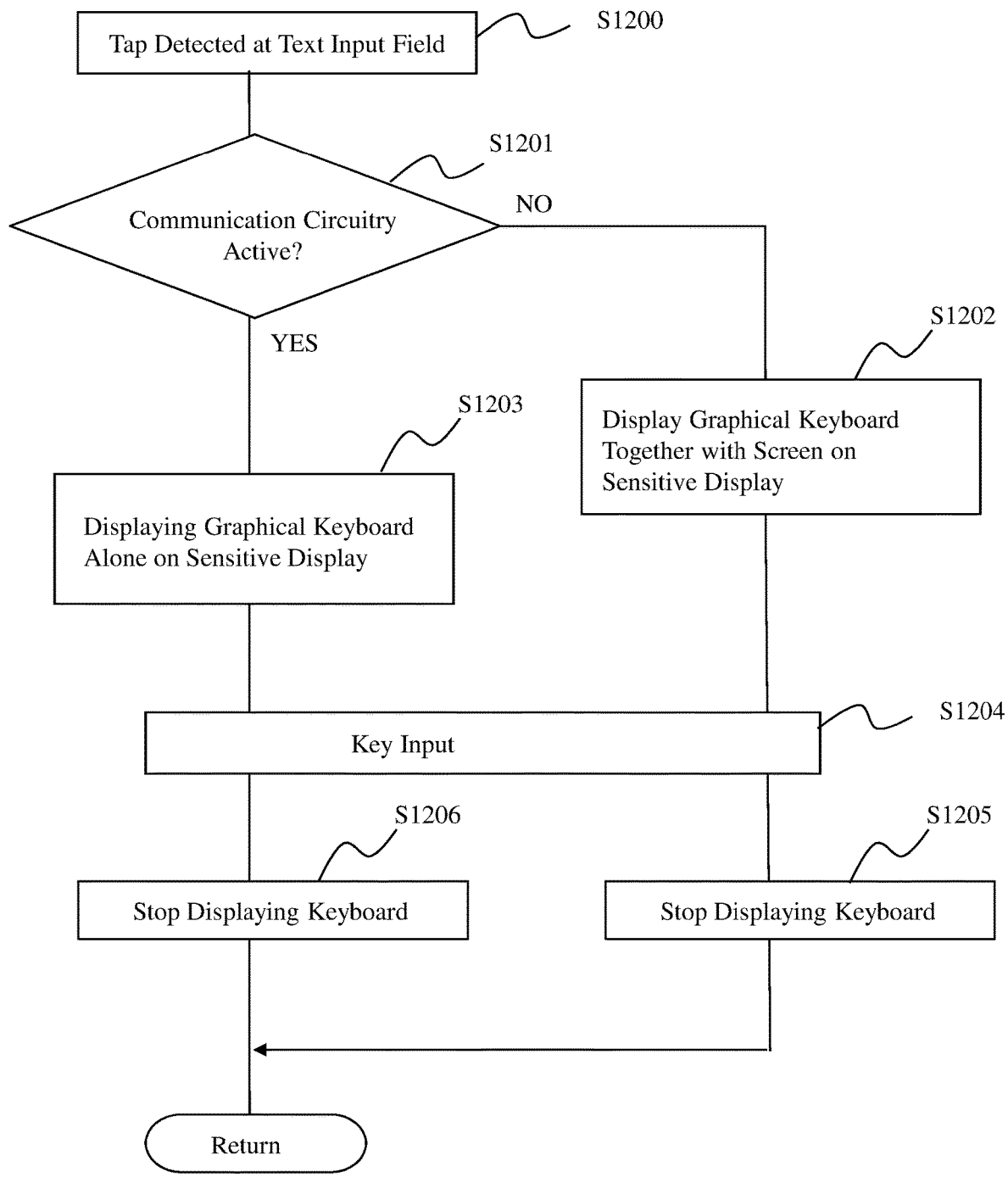

FIG. 111 is a flowchart illustrating operations performed by a computing device according to a sixteenth aspect of the second embodiment.

FIGS. 112, 113, 114, and 115 illustrate how a software keyboard is displayed according to the sixteenth aspect of the second embodiment.

DETAILED DESCRIPTION

First Embodiment

Summary

A first embodiment is disclosed with reference to FIGS. 1 to 51 In the first embodiment, a computing device 1 can detect taps of an object such as a user's finger onto its local sensitive display 3 and hover of the object in proximity over such sensitive display 3. The computing device 1 controls display of various graphical objects responsive to the detected tap and/or hover.

In first and second aspects of the first embodiment, the computing device 1 controls display of a dialog on the sensitive display 3 when an event to pop up the dialog occurs while a computer program is being executed and a screen of the computer program is being displayed on the sensitive display 3.

In a third aspect of the first embodiment, the computing device 1 controls display of a menu associated with a computer program in a screen of the computer program while the computer program is being executed.

In fourth and fifth aspects of the first embodiment, the computing device 1 controls display of an assistant object for assisting a tappable object, which appears in a screen of a computer program, to be tapped while the computer program is being executed.

In the above aspects, the computing device 1 performs the display controls based on a location of a tap and/or hover of an object such as a user's finger on and/or over the sensitive display 3.

Configuration

Figure 1:
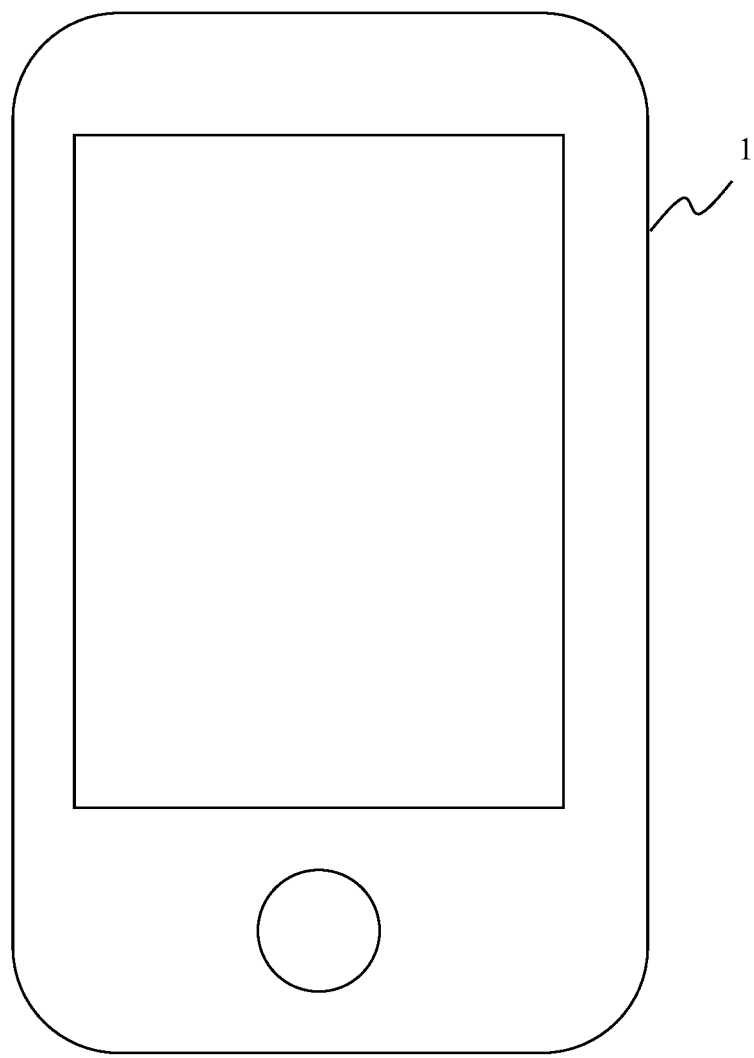
FIG. 1 illustrates a front view of a computing device according to a first embodiment.

FIG. 1 depicts the computing device 1. FIG. 1 is a front view of the computing device 1.

The computing device 1 is a multi-functional computing device suitable in size for mobility. The computing device 1 can be a cell phone, a tablet computer, a laptop computer, and other similar computing device.

Figure 2:
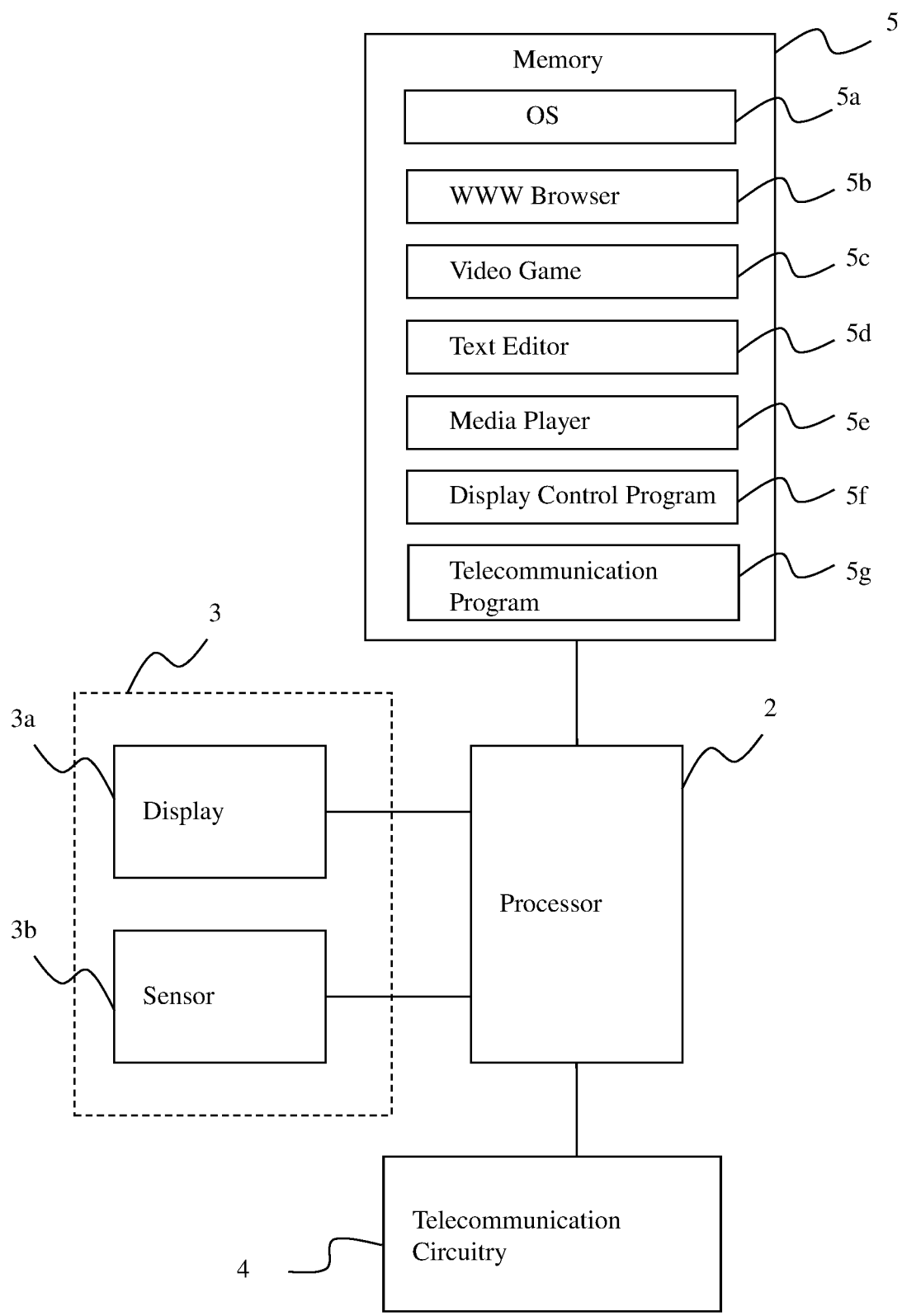
FIG. 2 is a block diagram illustrating means and/or circuitry provided in a computing device according to a first embodiment.

FIG. 2 is a block diagram of the computing device 1 for illustrating the configuration of the computing device 1 in more detail.

The computing device 1 mainly has a processor 2, the sensitive display 3, telecommunication circuitry 4, and a memory 5.

The processor 2 generally processes instructions of computer programs stored in the memory 5 to execute the computer programs, so as to realize a variety of functions of the computing device 1. The processor 2 can be a CPU (Central Processing Unit), a MPU (Micro Processing Unit), a DSP (Digital Processing Unit), or one or combination of other general or dedicated processors.

The sensitive display 3 is a display device composed essentially of a display 3a and a sensor 3b. The display 3a can be a LCD (Liquid Crystal Display), an EL (Electro-Luminance) display, or one of other similar types of display devices. The display 3a displays graphics and video in accordance with video signals sent from the processor 2. The sensor 3b is a sensor to distinctively detect (i) taps of one or more objects, such as a user's finger and a stylus, made onto the sensor 3b and (ii) hover of such object made in proximity over the sensor 3b. The sensor 3b sends to the processor 2 signals representing (i) the location of detected tap as long as such tap is detected and (ii) the location of detected hover as long as such hover is detected. A tap may be a touch or a contact in other words. Further, the sensor unit 3b detects gestures by (i) continuously detecting hover continuously made in proximity above the sensor unit 3b or (ii) continuously detecting a movement of the object while a tap is maintained on the sensor unit 3b. The technologies of sensing of taps, hover, and/or gestures are disclosed, for example, in the U.S. patent publications Nos. 2009/194344 invented by Harley et al, 2008/297487 invented by Hotelling et al, 2009/289914 invented by CHO, 2006/26521 invented by Hotelling et al, 2006/244733 invented by Geaghan et al, 2010/45633 invented by Gettemy et al, 2011/169780 invented by Goertz et al, 2008/158172 invented by Hotelling et al, and the issued U.S. Pat. No. 7,653,883 invented by Hotelling et al, U.S. Pat. No. 8,232,990 invented by King et al, U.S. Pat. No. 7,880,732 invented by Goertz, U.S. Pat. No. 7,663,607 invented by Hotelling et al, U.S. Pat. No. 7,855,718 invented by Westerman, U.S. Pat. No. 7,777,732 invented by HERZ et al, U.S. Pat. No. 7,924,271 invented by Christie et al, U.S. Pat. No. 8,219,936 invented by Kim et al, U.S. Pat. No. 8,284,173 invented by Morrison, U.S. Pat. No. 6,803,906 invented by Morrison, U.S. Pat. No. 6,954,197 invented by Morrison et al, U.S. Pat. No. 7,692,627 invented by Wilson, the contents of which are incorporated herein by reference in their entirety. The display 3a and the sensor 3b may be mechanically integrated together. As a result, the sensitive display 3 displays graphics and video as well as detects taps, hover, and gestures of an object like the user's finger or a stylus on or above the sensitive display 3.

The telecommunication circuitry 4 is circuitry for telecommunication over a telecommunication network. For example, the telecommunication circuitry 4 can be circuitry for telecommunication pursuant to CDMA (Code Divided Multiple Access) or other similar telecommunication standards or protocols.

The memory 5 is a memory device, for example, such as a flash memory, an EEPROM, a HDD (Hard Disk Drive), combination thereof, and one or combination of other similar memory devices. The memory 5 stores computer programs to be executed by the processor 2. In particular, the memory 5 stores an OS (Operating System) 5a, a WWW (World Wide Web) browser 5b, a video game 5c, a text editor 5*d*, a media player 5*e*, a display control program 5*f*, and a telecommunication program 5*g*. The WWW browser 5*b*, the video game 5*c*, the text editor 5*d*, and the media player 5*e* are typically application programs that run on the OS 5*a*. The programs 5*b* to 5*e* are often collectively referred to as application programs. The display control program 5*f* and the telecommunication program 5*g* can also run on the OS 5*a*, or can be incorporated in the OS 5*a* running as part of the OS 5*a*. The display control program 5*f* and the telecommunication program 5*g* run in the background as long as the OS 5*a* is running.

One or more of the application programs 5*b* to 5*e* are executed on the OS 5*a* in response to user's selection. The display control program 5*f* and the telecommunication program 5*g* are executed while the OS 5*a* is executed.

Display Operation

The processor 2 sends video signals to the sensitive display 3 in accordance with instructions of the OS 5*a*, the application programs 5*b* to 5*e*, the display control program 5*f*, and/or the telecommunication program 5*g*. The sensitive display 3 displays graphics and video in accordance with the video signals.

For example, the graphics and the video to be displayed include screens, icons, dialogs, menus and other graphical objects or contents. The screen may contain one or more tappable objects or contents within the screen, such as a HTML (Hyper Text Markup Language) link, a text-input field, a software button, and a software keyboard. The dialog is a graphical object, with a message and one or more tappable objects, which pops up in response to occurrence of one or more given events associated with the OS 5*a*, the application programs 5*b* to 5*e*, the display control program 5*f*, and/or the telecommunication program 5*g*. The menu is associated with the OS 5*a*, the application programs 5*b* to 5*e*, the display control program 5*f*, and/or the telecommunication program 5*g*, and is a tappable object for operation of the OS 5*a*, the application programs 5*b* to 5*e*, the display control program 5*f*, and/or the telecommunication program 5*g*.

In this manner, for example, one or more icons representing one or more of the application programs 5*b* to 5*e* are displayed on the sensitive display 3 in accordance with the instruction of the OS 5*a*. For example, a screen of one of the application programs 5*b* to 5*e* is displayed on the sensitive display 3 in accordance with the instructions of the one of the application programs 5*b* to 5*e*. For example, a dialog for notifying a user of an incoming call over the telecommunication network is popped up in accordance with the instructions of the telecommunication program 5*g*.

Sensitive Operation

When an object such as the user's finger hovers over the sensitive display 3, the sensitive display 3 detects the hover and determines the location above which the hover exists over the sensitive display 3. The sensitive display 3 continuously sends to the processor 2 signals each representing the determined hover location during the hover detection. The location may be a position or an X-Y coordinates in other words.

When a tap of an object such as the user's finger is made onto the sensitive display 3, the sensitive display 3 detects the tap and determines the location at which the tap is made on the sensitive display 3. The sensitive display 3 then sends to the processor 2 a signal representing the determined tap location. The location may be a position or an X-Y coordinates in other words.

The processor 2 receives the signals from the sensitive display 3. Based on the received signals, the processor 2 determines the location of the hover and tap within a screen displayed on the sensitive display 3. The processor 2 then operates in response to the hover and tap in accordance with the instructions of the OS 5*a*, the application programs 5*b* to 5*e*, the display control program 5*f*, and/or the telecommunication program 5*g*.

For example, in accordance with the instructions of the OS 5*a*, if the processor 2 determines that a tap is made on an icon representing the WWW browser 5*b*, the processor 2 launches the WWW browser 5*b*.

For example, in accordance with the instructions of the WWW browser 5*b*, if the processor 2 determines that a tap is made on a text-input field, the processor 2 launches a software keyboard.

Display Screen and Dialog Popup

Upon executing the programs 5*a* to 5*g*, the processor 2 generates and sends video signals representing a screen of one of the programs 5*a* to 5*g* to the sensitive display 3, so as for the sensitive display 3 to display the screen. Also, the processor 2 receives operations of the program whose screen is displayed by way of, for example, the user's tapping software buttons or other tappable graphical objects that appear in the screen.

For example, when executing the OS 5*a* without executing any of the application programs 5*b* to 5*e*, the processor 2 displays the screen of the OS 5*a* on the sensitive display 3. The screen may contain icons representing the application programs 5*b* to 5*e*. And, the processor 2 receives operations for launching one of the application programs 5*b* to 5*e* through the user's tapping on the one of the icons.

For example, when executing the WWW browser 5*b* on the OS 5*a*, the processor 2 displays the screen of the WWW browser 5*b* on the sensitive display 3. The screen may contain software buttons. And, the processor 2 receives operations for connecting to WWW pages through the user's tapping on the software buttons.

The processor 2 usually does not display screen of the display control program 5*f* and the telecommunication program 5*g* because the programs 5*f* and 5*g* run in the background while the OS 5*a* is running.

One or more events are associated with one or more of the programs 5*a* to 5*g*. If an event occurs in one of the programs 5*a* to 5*g*, the processor 2 generates and sends video signals representing a dialog associated with the event to the sensitive display 3 so as for the sensitive display 3 to pop up the dialog over the screen already displayed. The dialog may contain one or more tappable graphical objects. In response to the user's tapping on the graphical object, the processor 2 executes a predetermined action associated with the tapped graphical objects.

For example, an incoming call event is associated with the telecommunication program 5*g*. While the telecommunication program 5*g* is running in the background, the processor 2 continuously monitors an incoming call over the telecommunication network through the telecommunication circuitry 4 from some distant caller. Responsive to arrival of an incoming call, the sensitive display 3 pops up a dialog for notifying the user of the incoming call over the already-displayed screen. The dialog may contain a software button for answering the incoming call. Responsive to the user's tapping the software button, the processor 2 establishes telecommunication between the user, namely, the computing device 1 and the caller.

For example, a virus detection event is associated with the WWW browser 5b. When the WWW browser 5b is running, the processor 2 continuously monitors computer virus maliciously hidden in WWW pages. Responsive to some hidden computer virus detected, the sensitive display 3 pops up a dialog for notifying the user of the detected computer virus over the already-displayed screen. The dialog may contain a software button for responding to the notice and selecting countermeasures against the computer virus. Responsive to the user's tapping the software button, the processor 2 quarantines or eliminates the virus.

Display Control

The detail of the display control performed by the processor 2 in accordance with the display control program 5f is described below.

First Aspect of Display Control

Figure 3:
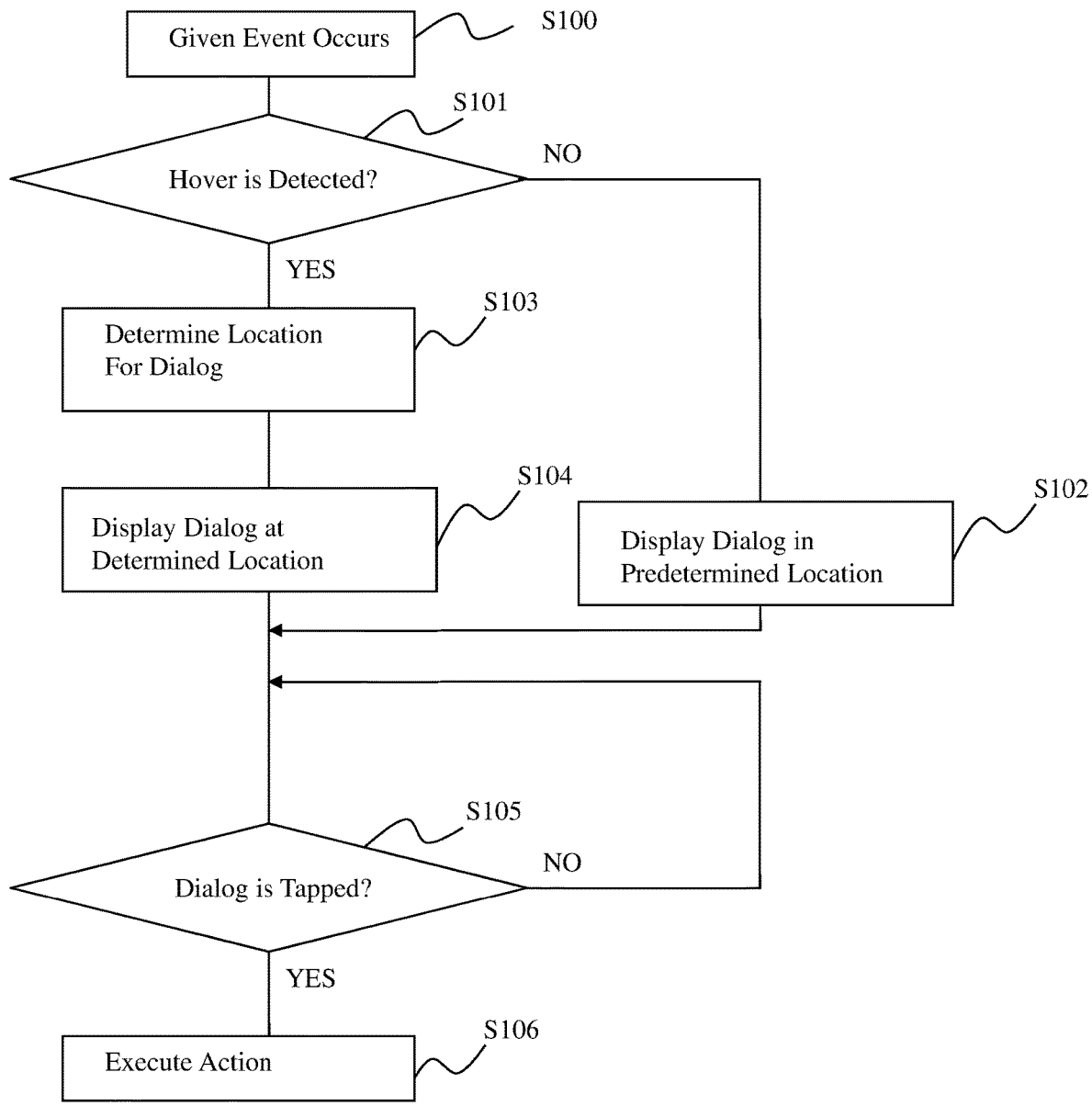
FIG. 3 is a flowchart illustrating operations performed by a computing device according to a first aspect of the first embodiment.

FIG. 3 is a flowchart illustrating a first aspect of the display control in accordance with the display control program 5f. According to the first aspect of the present embodiment, the display control is executed responsive to occurrence of one of the above-mentioned given events triggering a popup of a dialog.

If a given event occurs (S100), the processor 2 determines whether or not hover of an object such as the user's finger in proximity over the sensitive display 3 is being detected (S101). Namely, the processor 2 determines whether or not signals representing the location of hover are being sent from the sensitive display 3 (S101).

If no hover is being detected (S101: NO), the processor 2 pops up a dialog associated with the event at a predetermined location over the screen on the sensitive display 3 (S102). The predetermined location may be the center of the screen, the bottom area of the screen, or the likes.

Figure 4:
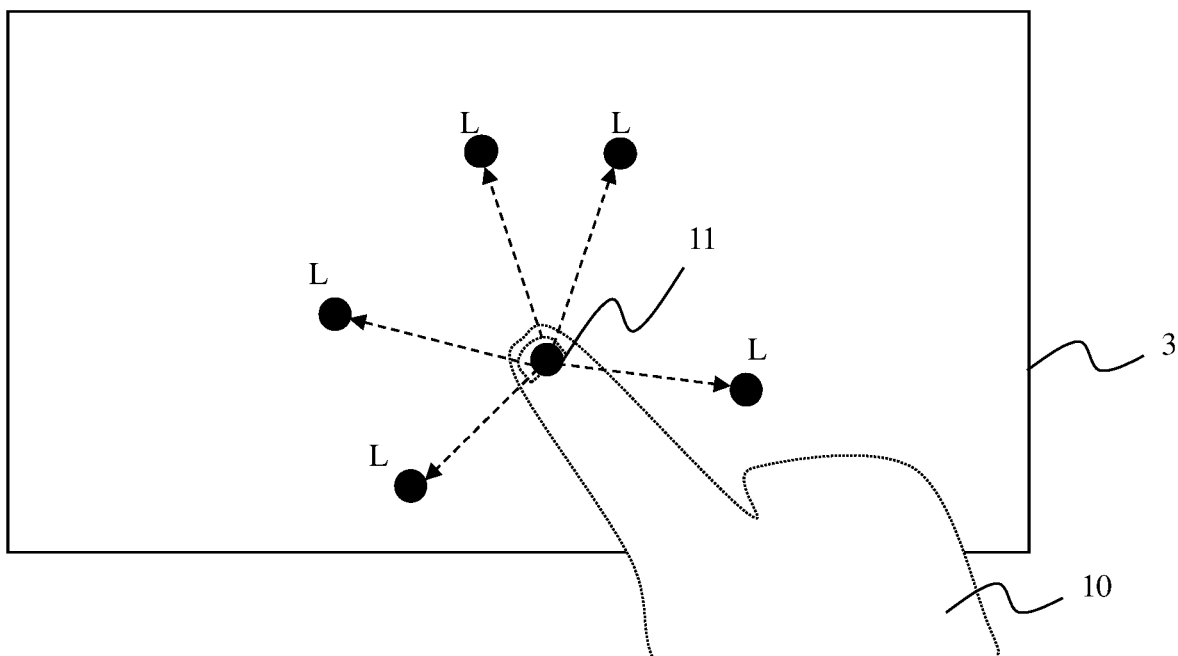
FIG. 4 illustrates how the location for a notification dialog is determined based on hover according to the first aspect of the first embodiment.

If hover is being detected and the location of the hover is determined (S101: YES), the processor 2 determines a location that is predetermined pixels away from the determined hover location (S103). A dialog is to be displayed at the determined location. As illustrated in FIG. 4, the determination in S103 can be done by simply selecting one of the locations L each of which is predetermined pixels away from the determined hover location 11.

Figure 5:
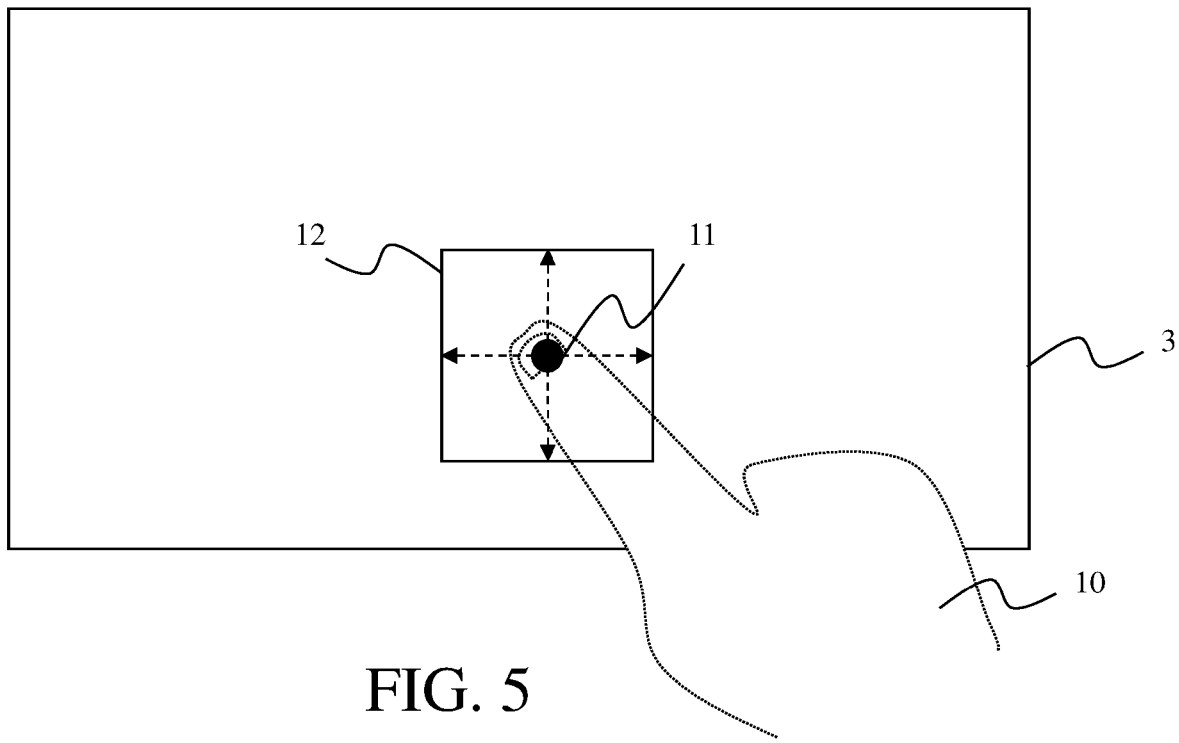
Figure 6:
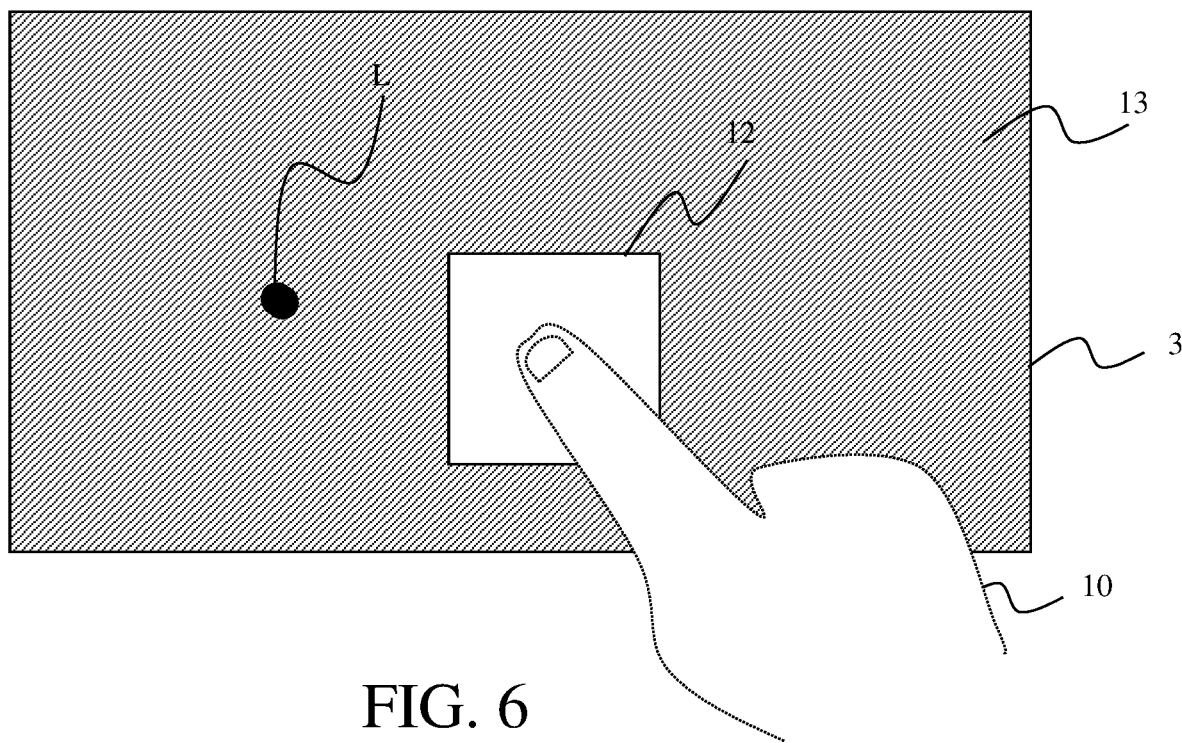
Figure 7:
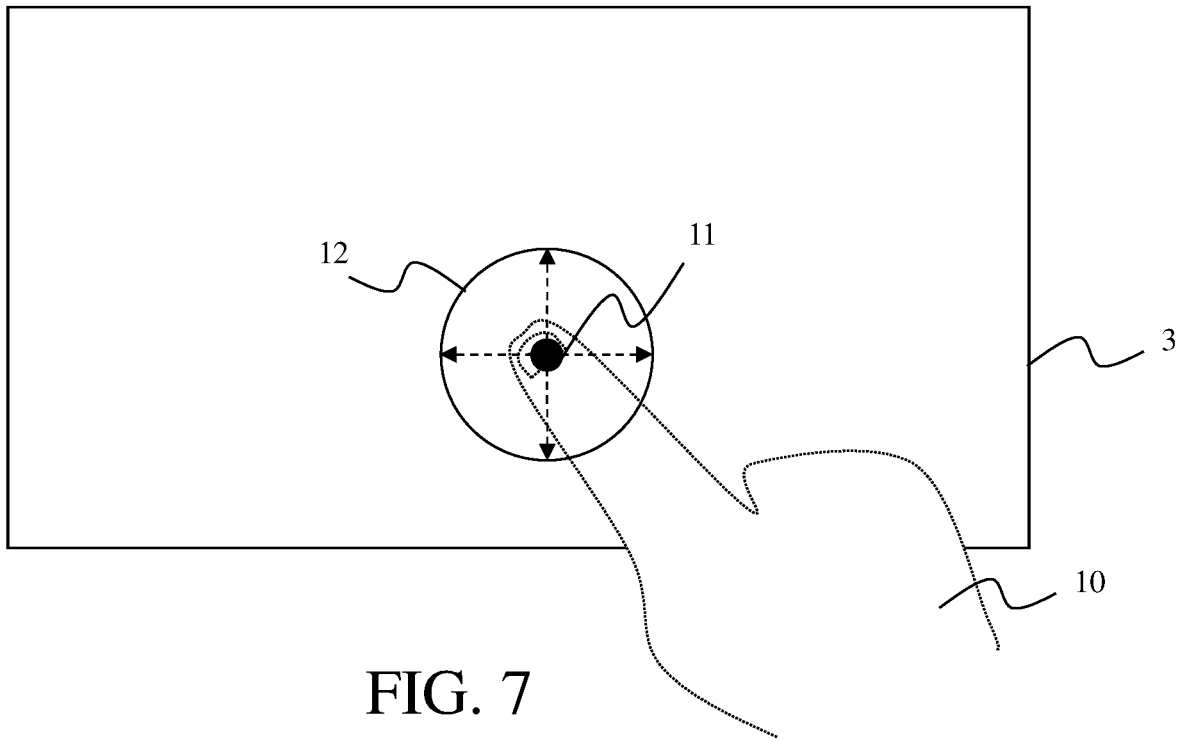
Figure 8:
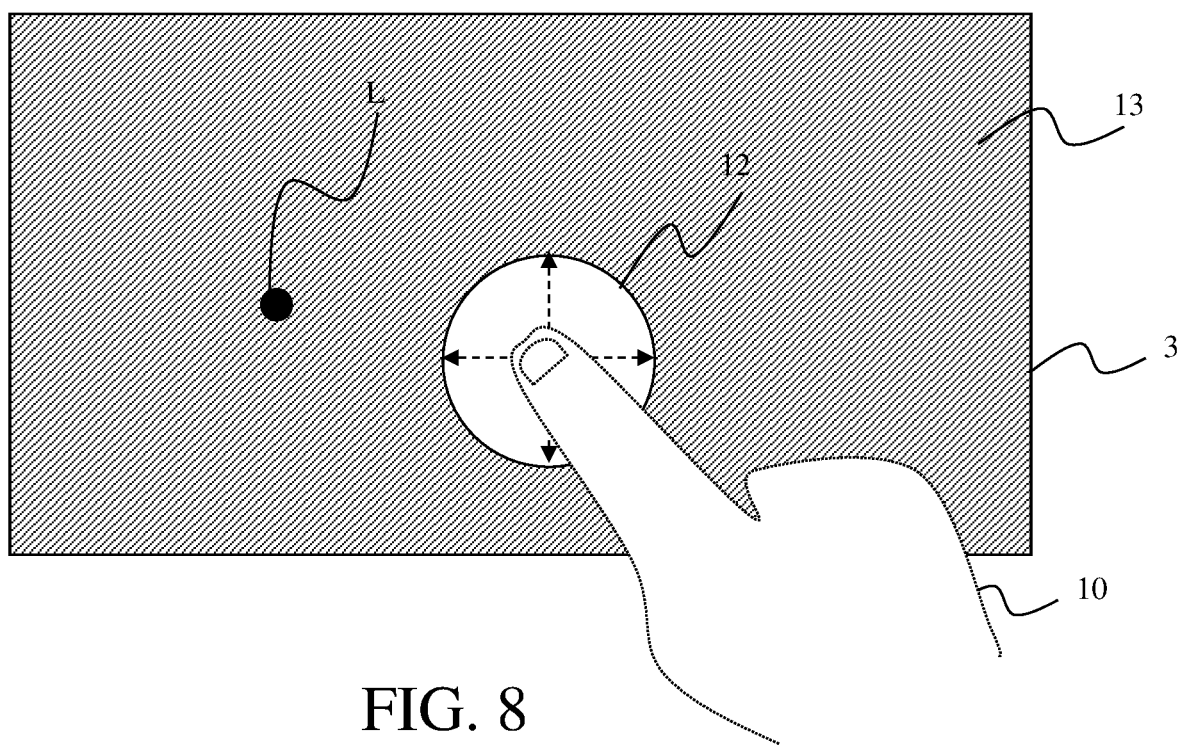

More specifically, without limitation, the determination in S103 can be done by determining first and second areas based on the determined hover location and then determining a given location within the second area, as described as follows with reference to 5 to 8. As illustrated in FIG. 5 or 7, first, the first area 12 is determined based on the determined hover location 11. The first area 12 can be defined from vertexes each of which is predetermined pixels away from the determined hover location 11 as illustrated in FIG. 5. Note that the predetermined pixels may be identical among all of the vertexes to form the first area 12 to be a regular square, or may be different among the vertexes to form an irregular square. Also note that the first area 12 may be formed from four vertexes to be a square, or may be formed from more than or less than four vertexes to be a polygon other than the square. Instead, as illustrated in FIG. 7, the first area 12 can be defined as a circle having a radius of predetermined pixels from the detected hover location 11. Next, the second area 13 is determined based on the first area 12. The second area 13, shaded in FIGS. 6 and 8, is defined to be an area other than the first area in the screen as illustrated in FIGS. 6 and 8. Finally, a given location L is determined within the second area.

Now back in FIG. 3, After determination of the location for a dialog, the processor 2 pops up a dialog associated with the given event at the determined location over the screen on the sensitive display 3 (S104). As a result, the dialog is popped up to be displayed some pixels away from the user's finger hovering in proximity over the screen.

After popup of the dialog in accordance with S102 or S104, the processor 2 determines whether or not one or more tappable graphical objects contained in the dialog are tapped (S105).

If a tappable graphical object is tapped (S105: YES), the processor 2 executes a given action associated with the tapped graphical object (S106).

Example of Dialog Popup

FIGS. 9, 10, 11, 12, 13, 14, 15, and 16 illustrate examples describing how a dialog is popped up in accordance with the above-mentioned display control.

FIGS. 9 to 12 illustrate an example of popping up a dialog responsive to occurrence of an incoming call event associated with the telecommunication program 5g while the OS 5a is being executed.

Figure 9:
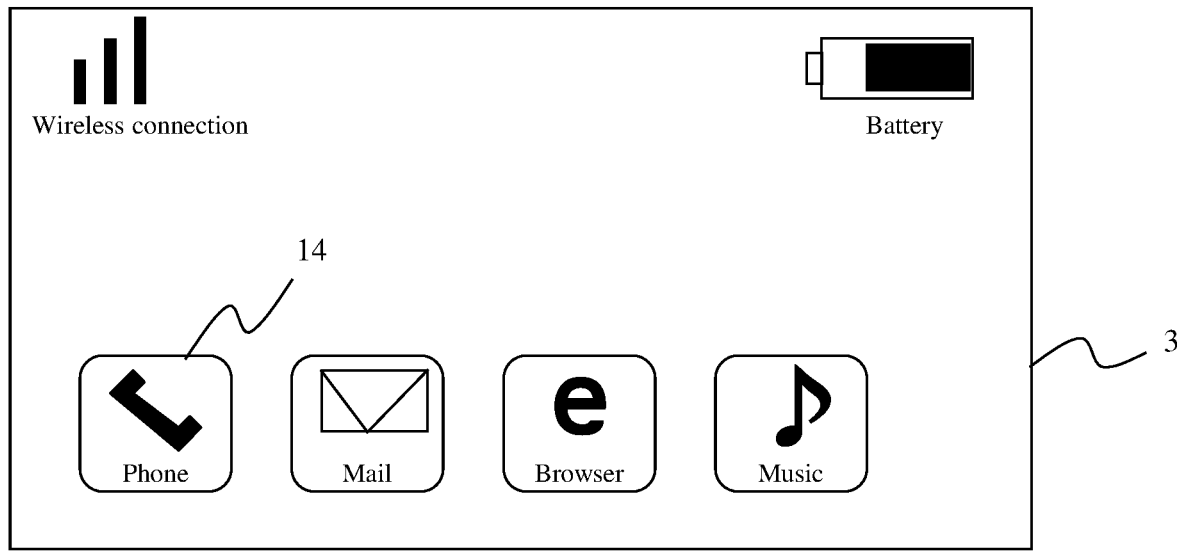

While the OS 5a is executed, the screen of the OS 5a is displayed on the sensitive display 3 as illustrated in FIG. 9. The screen contains icons 14 representing one or more of the application programs 5b to 5e. The processor 2 receives operation for selecting and launching one of the application programs 5b to 5e by way of the user's tapping on an icon 14.

Figure 10:
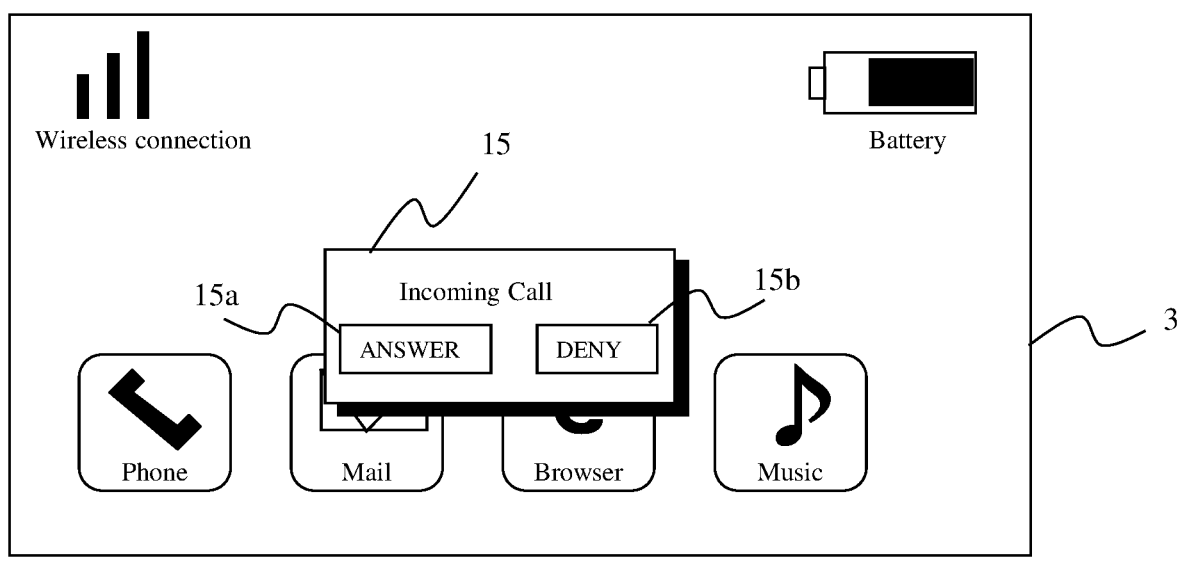

The telecommunication program 5g is running in the background, whose screen is not displayed. If an incoming call event occurs, the processor 2 determines whether or not hover is being detected. If there is no hover detected, the processor 2 then displays a dialog 15 for notifying the user of the incoming call over the screen of the active OS 5a at a predetermined location, such as the substantially center of the screen, as depicted in FIG. 10.

Figure 11:
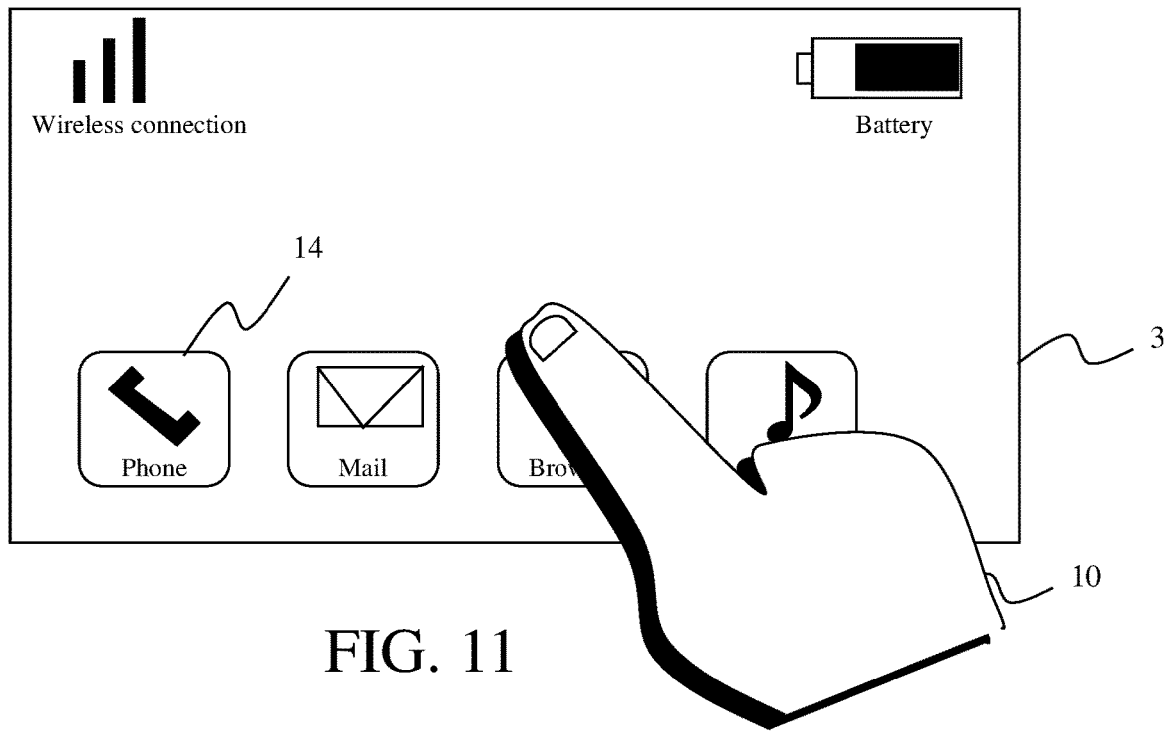
Figure 12:
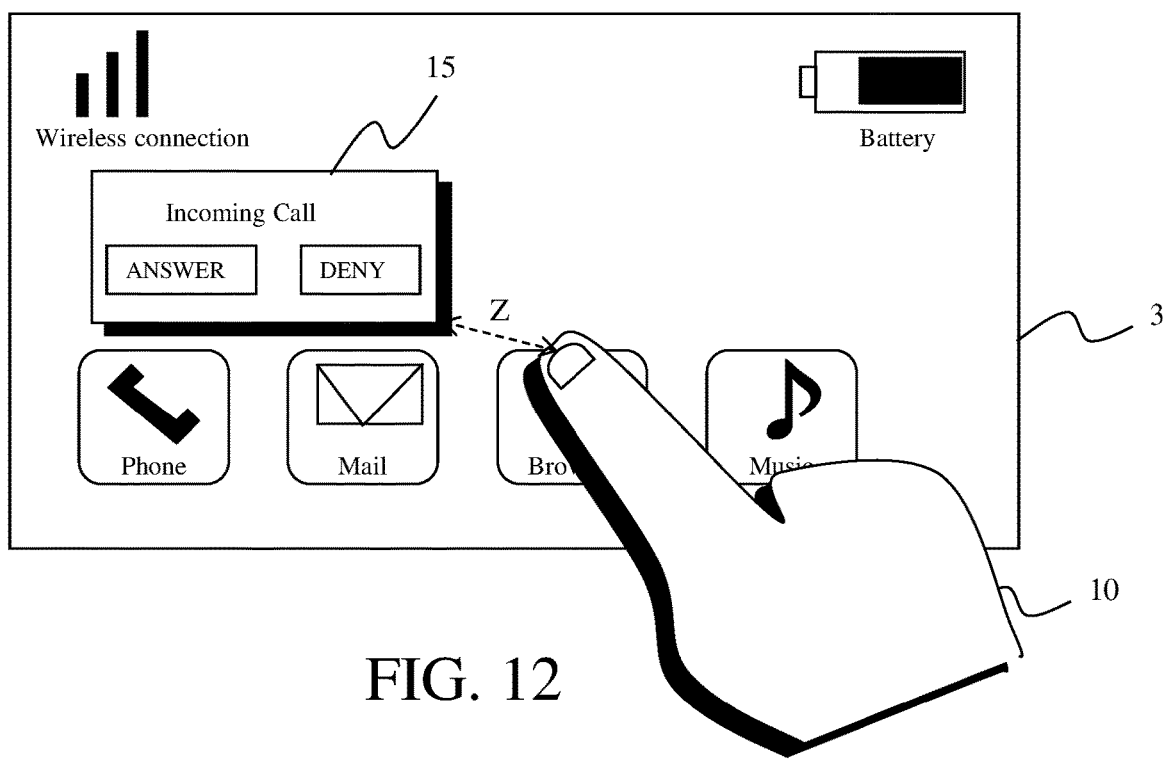

On the other hand, if there is hover of the user's finger 10 detected, the processor 2 determines a location which is predetermined pixels (for example, Z pixels in FIG. 12) away from the location of the detected hover, and then displays the dialog 15 at the determined location as depicted in FIGS. 11 and 12.

The dialog 15 contains a tappable object 15a for answering the incoming call as well as a tappable object 15b for denying the incoming call. Responsive to the user's tapping the graphical object 15a, the processor 2 establishes telecommunication between the user, namely, the computing device 1 and the caller through the telecommunication circuitry 4, in accordance with the instructions of the telecommunication program 5g.

Advantageously, the above-mentioned display control can avoid user's erroneous tapping on the suddenly displayed dialog 15. Specifically speaking, if the dialog 15 popped up near the finger 10 just when the user is about or ready to tap any of the icons 14 with hovering the finger 10 over the screen of the OS 5a, the user might erroneously tap the tappable object 15a or 15b against his/her intention. The user might feel bad if he/she erroneously answered the incoming call by tapping the tappable object 15a against his/her intention. Thanks to the above-mentioned display control, the dialog 15 is always popped up distantly from the user's hovering finger 10, and so the erroneous operation can be avoided.

FIGS. 13 to 16 illustrate an example of popping up a dialog responsive to occurrence of a virus detection event associated with the WWW browser 5b while the WWW browser 5b is running.

Figure 13:
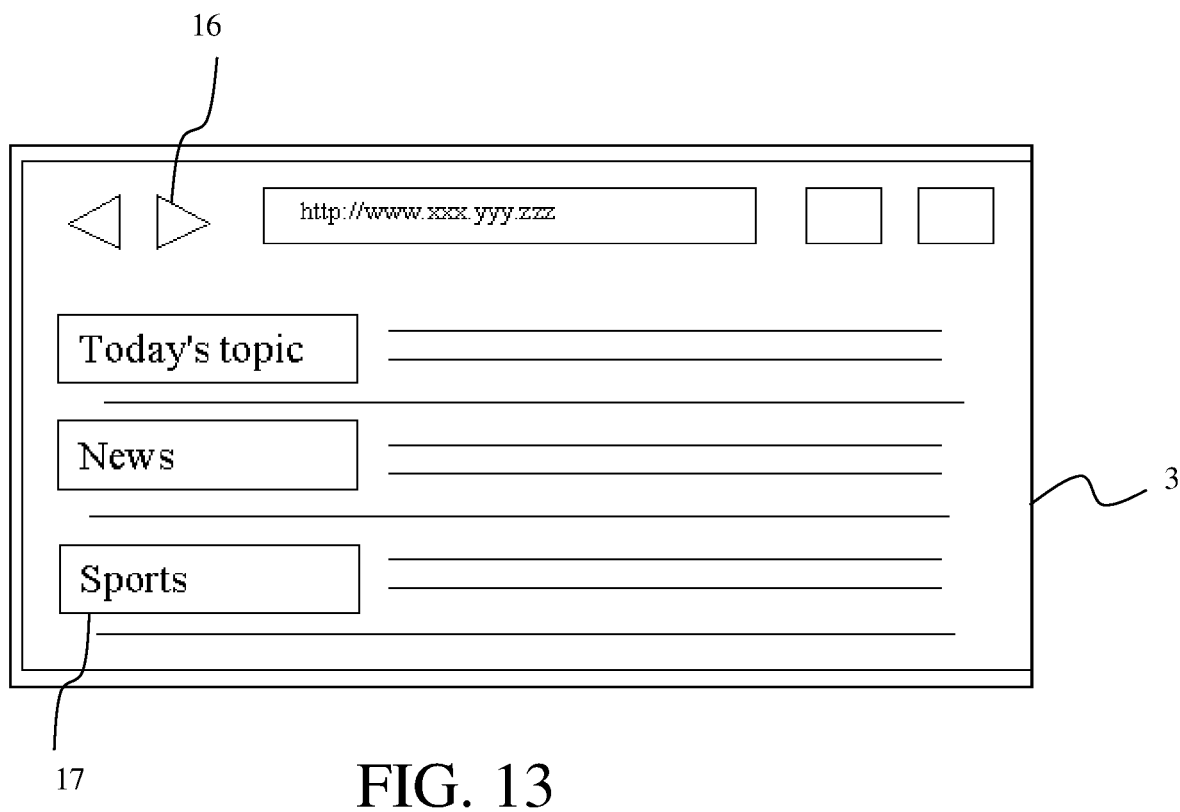

While the WWW browser 5b is executed on the OS 5a, the screen of the WWW browser 5b is displayed on the sensitive display 3 as illustrated in FIG. 13. The screen contains software buttons 16 and hyperlink buttons 17. The processor 2 receives operation of scrolling forward or back WWW pages by way of the user's tapping the software buttons 16, and operations of connecting to other WWW pages by way of the user's tapping the hyperlink buttons 17. Also, the WWW browser 5b continuously monitors computer viruses hidden in the WWW pages in the background.

Figure 14:
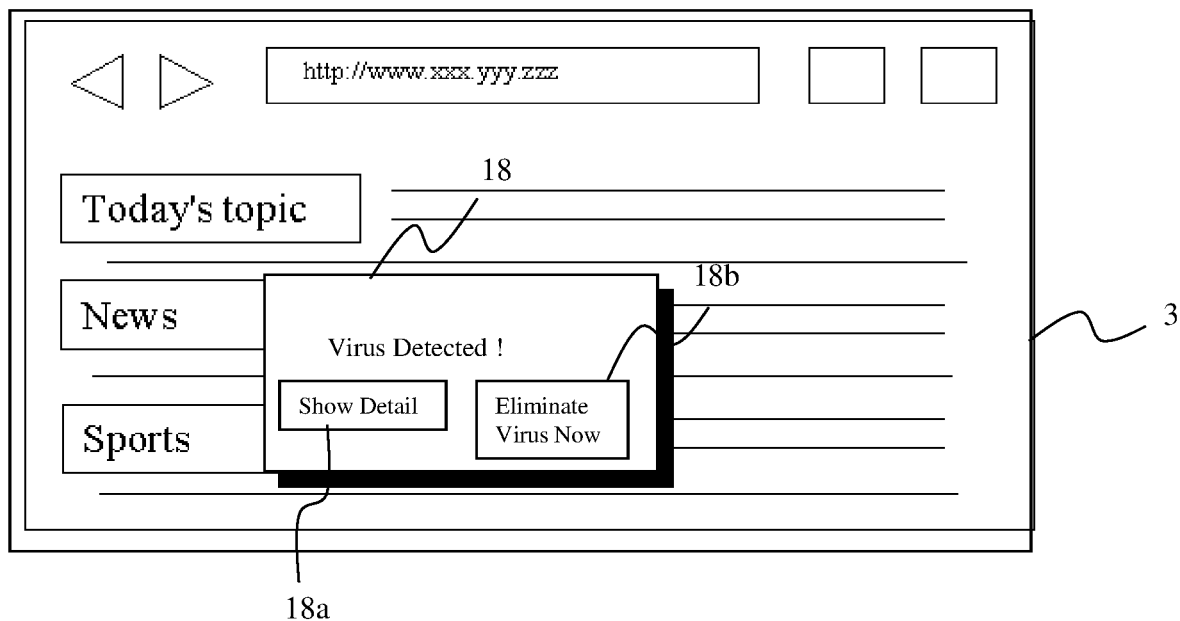

If a virus detection event occurs, the processor 2 determines whether or not hover of the user's finger is being detected. If there is no hover detected, the processor 2 then displays a dialog 18 for notifying the user of the detected virus over the screen at a predetermined location, such as the substantially center of the screen, as depicted in FIG. 14.

Figure 15:
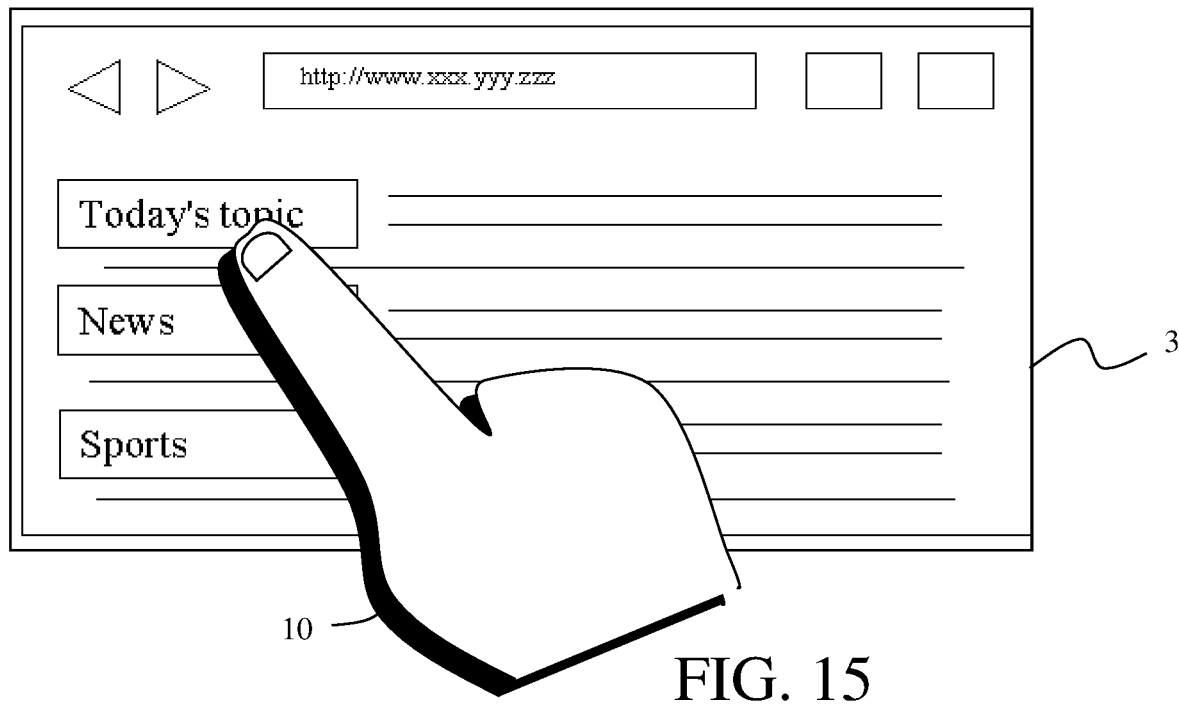
Figure 16:
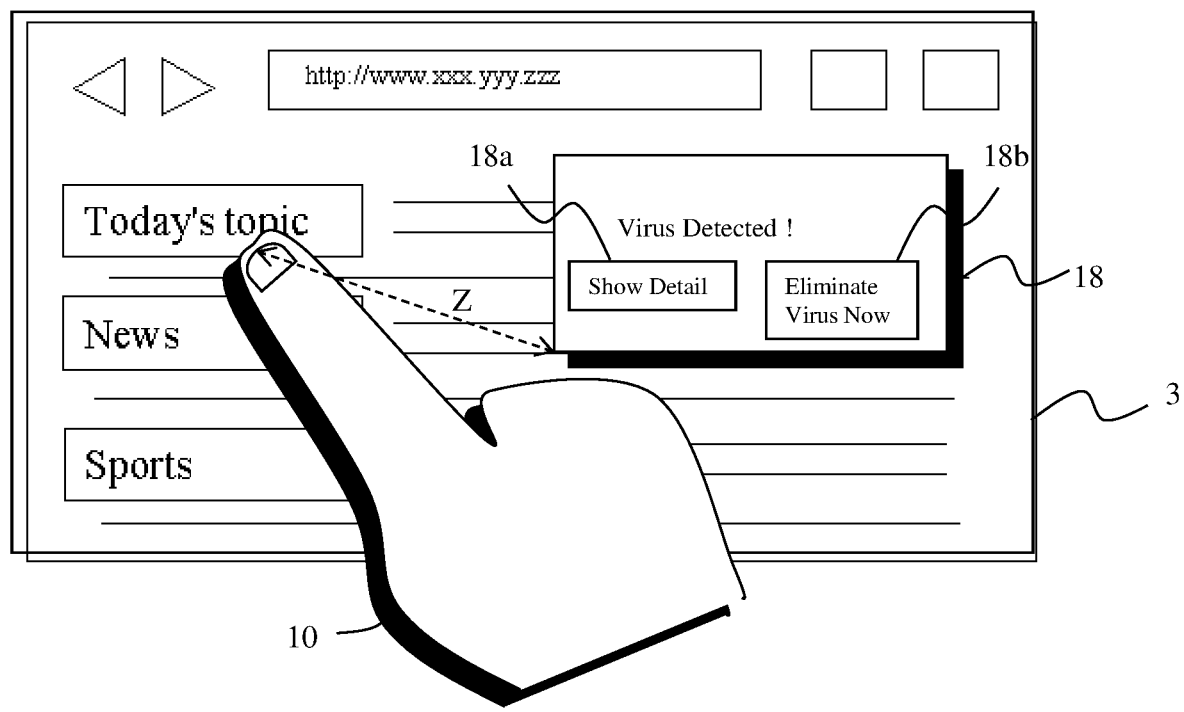

On the other hand, if there is hover of the user's finger 10 detected, the processor 2 determines a location which is predetermined pixels (for example, Z pixels in FIG. 16) away from the location of the detected hover, and then displays the dialog 18 at the determined location as depicted in FIGS. 15 and 16.

The dialog 18 contains a tappable object 18a for checking the details of the virus as well as a tappable object 18b for eliminating the virus. Responsive to the user's tapping the graphical objects 18a, the processor 2 displays detail information about the virus. Responsive to the user's tapping the graphical objects 18b, the processor 2 executes the instructions of WWW browser 5b to exterminate the virus.

Advantageously, the above-mentioned display control can avoid the user's erroneous tapping on the suddenly displayed dialog 18. Specifically speaking, if the dialog 18 popped up near the finger 10 just when the user is about or ready to tap the software buttons 16 or the hyperlink buttons 17 with hovering the finger 10 above the screen, the user might erroneously tap the tappable object 18a or 18b against his/her intention. The user might feel bad if he/she erroneously eliminated the virus by tapping the object 18b against his/her intention to analyze the virus carefully. Thanks to the above-mentioned display control, the dialog 18 is popped up distantly from the user's hovering finger 10, and so the erroneous operation can be avoided.

Second Aspect of Display Control

FIG. 17 is a flowchart illustrating a second aspect of the display control in accordance with the display control program 5f. According to the second aspect of the present embodiment, the display control is executed upon occurrence of one of the above-mentioned given events triggering a popup of a dialog.

If a given event occurs (S110), the processor 2 determines whether or a tap of an object such as the user's finger on the sensitive display 3 is being detected (S111). Namely, the processor 2 determines whether or not signals representing the location of tap are being sent from the sensitive display 3 (S111).

If no tap is being detected (S111: NO), the processor 2 pops up a dialog associated with the event at a predetermined location over the screen on the sensitive display 3 (S112). The predetermined location may be the center of the screen, the bottom area of the screen, or the likes.

If a tap is being detected and the location of the tap is determined (S111: YES), the processor 2 determines a location that is predetermined pixels away from the determined tap location (S113). A dialog is to be displayed at the predetermined location. As illustrated in FIG. 18, the determination in S113 can be done by simply selecting one of the locations L each of which is predetermined pixels away from the determined tap location 11.

Figure 19:
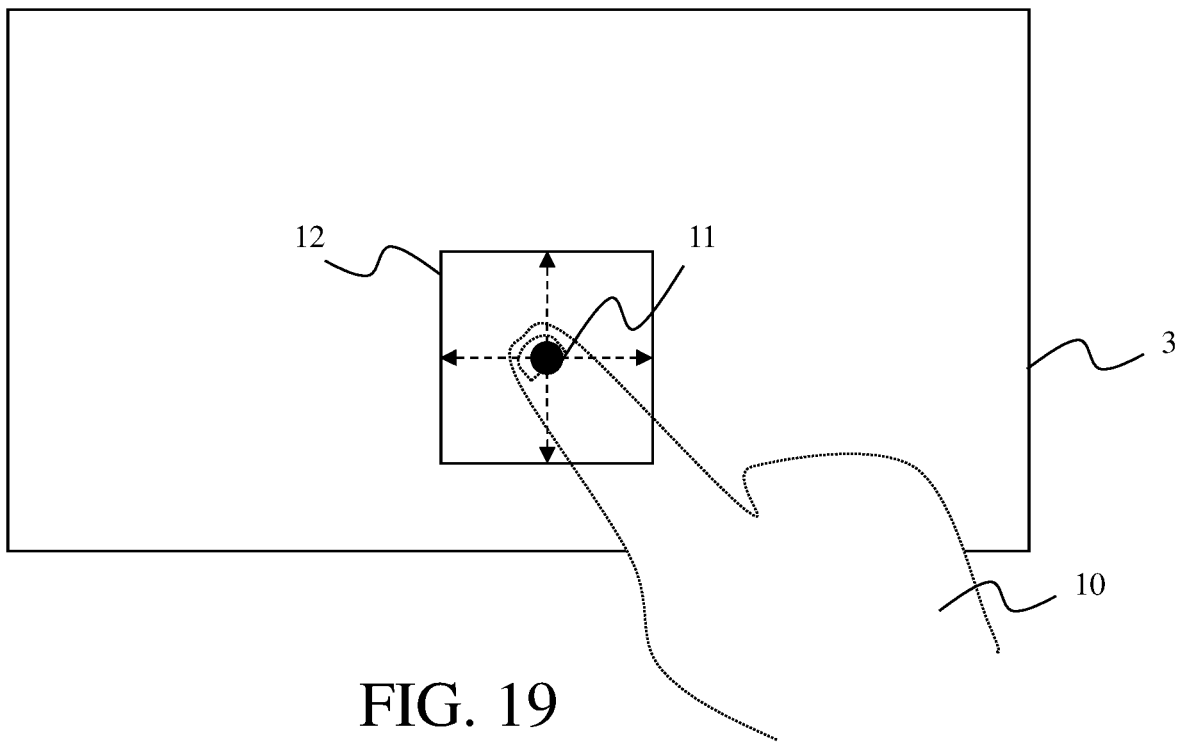
Figure 20:
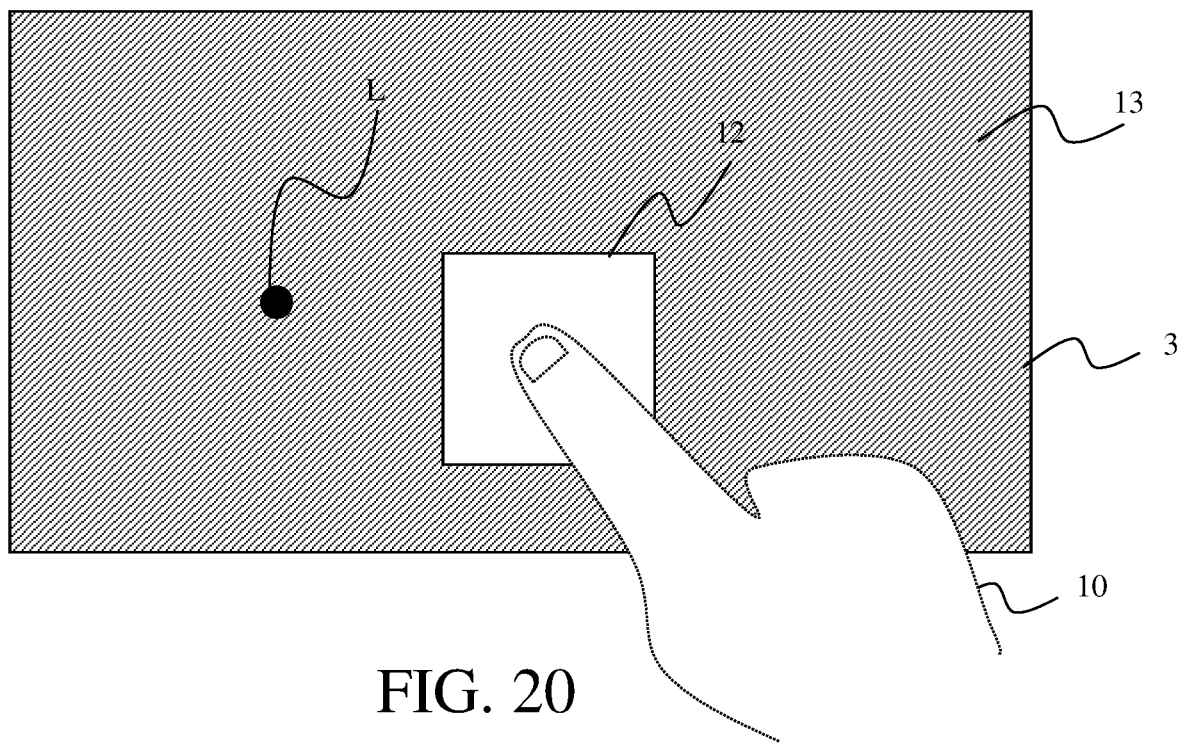
Figure 21:
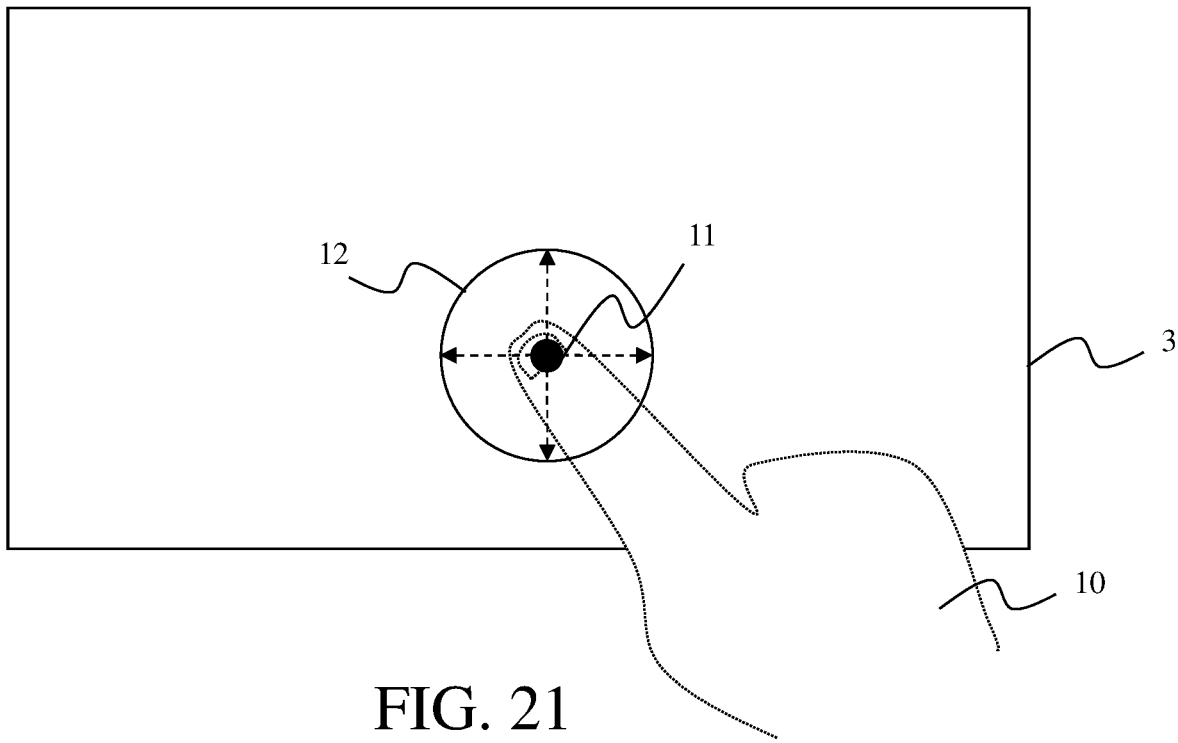
Figure 22:
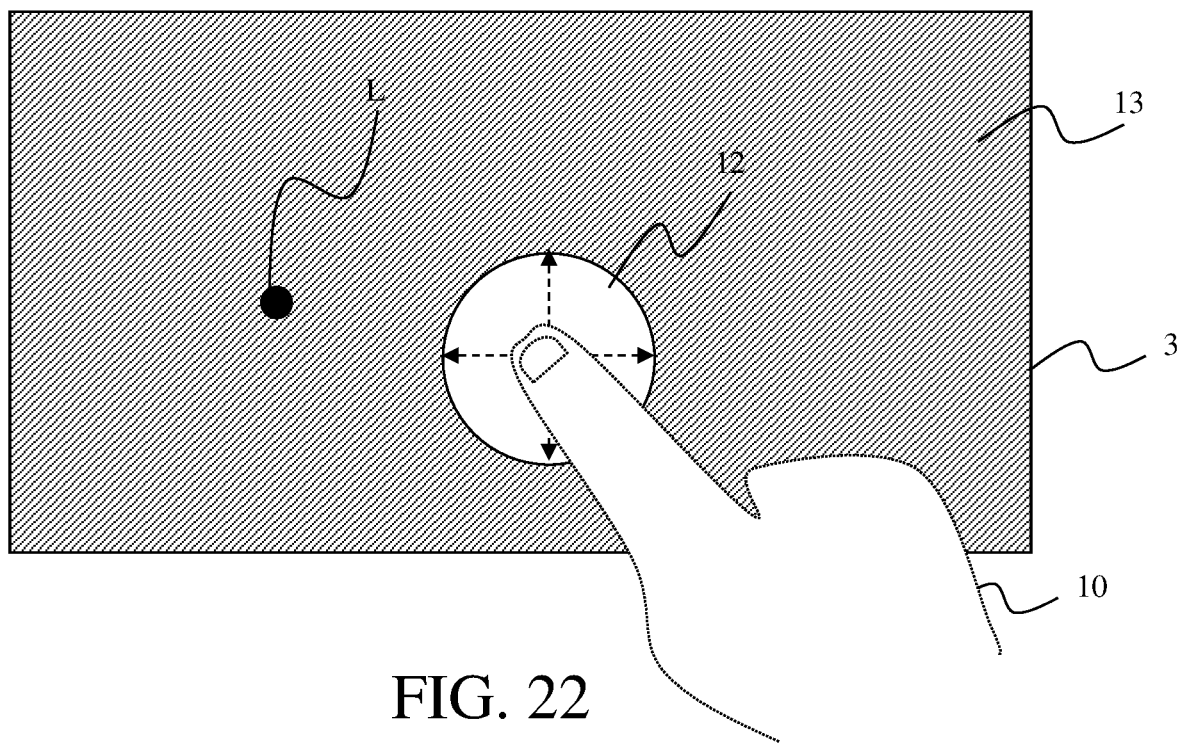

More specifically, without limitation, the determination in S113 can be done by determining first and second areas based on the determined tap location and then determining a given location within the second area, as described as follows with reference to 10A to 10D. As illustrated in FIG. 19 or 21, first, the first area 12 is determined based on the determined tap location 11. The first area 12 can be defined from vertexes each of which is predetermined pixels away from the determined tap location 11 as illustrated in FIG. 19. Note that the predetermined pixels may be identical among all of the vertexes to form the first area 12 to be a regular square, or may be different among the vertexes to form an irregular square. Also note that the first area 12 may be formed from four vertexes to be a square, or may be formed from more than or less than four vertexes to be a polygon other than the square. Instead, as illustrated in FIG. 21, the first area 12 can be defined as a circle having a radius of predetermined pixels from the detected tap location 11. Next, the second area 13 is determined based on the first area 12. The second area 13, shaded in FIGS. 20 and 22, is defined to be an area other than the first area in the screen as illustrated in FIGS. 20 and 22. Finally, a given location L is determined within the second area.

Now back in FIG. 17, After determination of the location for a dialog, the processor 2 pops up a dialog associated with the given event at the determined location over the screen on the sensitive display 3 (S114). As a result, the dialog is popped up to be displayed some pixels away from the user's finger tapped on the screen.

After popup of the dialog in accordance with S112 or S114, the processor 2 determines whether or not one or more tappable graphical objects contained in the dialog are tapped (S115).

If a tappable graphical object is tapped (S115: YES), the processor 2 executes a given action associated with the tapped graphical object (S116).

Example of Dialog Popup

FIGS. 23, 24, 25, 26, 27, 28, 29, and 30 illustrate examples describing how a dialog is popped up in accordance with the above-mentioned display control.

FIGS. 23 to 26 illustrate an example of popping up a dialog responsive to occurrence of an incoming call event associated with the telecommunication program 5g while the OS 5a is being executed.

Figure 23:
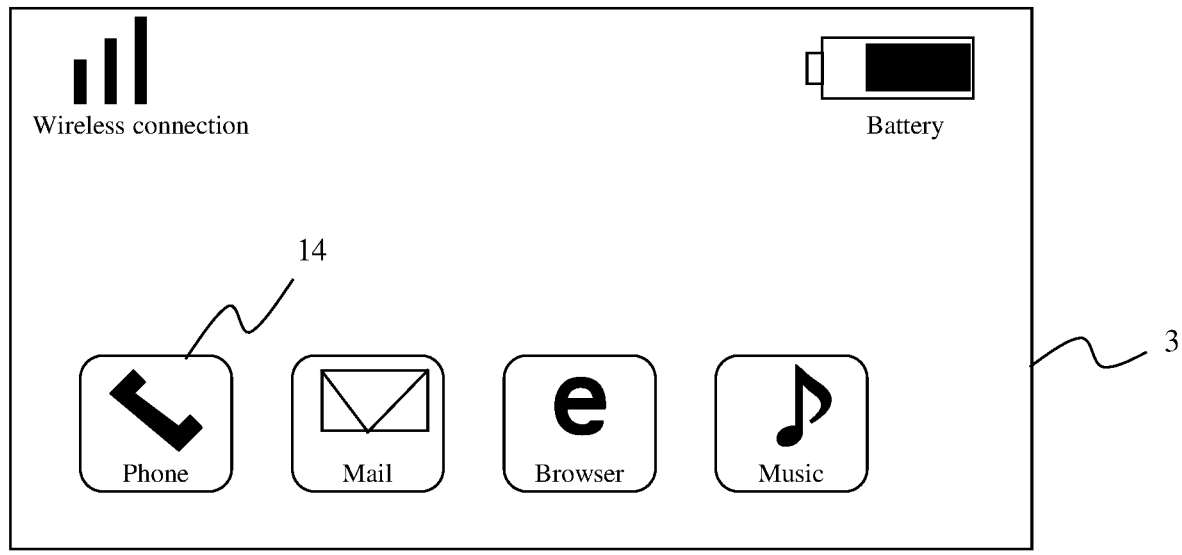

While the OS 5a is executed, the screen of the OS 5a is displayed on the sensitive display 3 as illustrated in FIG. 23. The screen contains icons 14 representing one or more of the application programs 5b to 5e. The processor 2 receives operation for selecting and launching one of the application programs 5b to 5e by way of the user's tapping on an icon 14.

Figure 24:
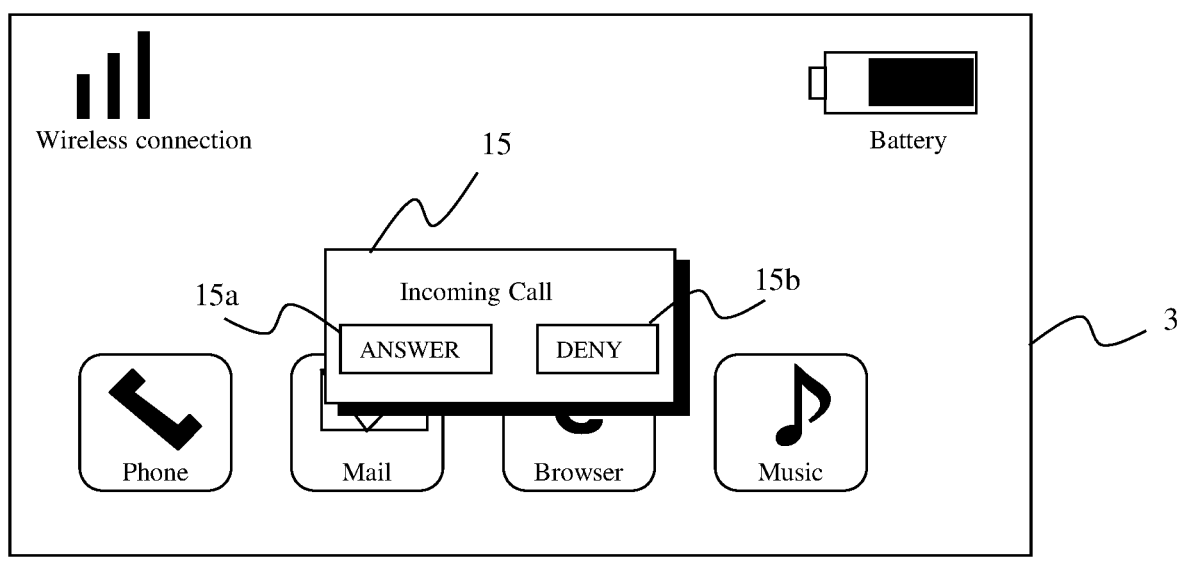

The telecommunication program 5g is running in the background, whose screen is not displayed. If an incoming call event occurs, the processor 2 determines whether or not a tap is being detected. If there is no tap detected, the processor 2 then displays a dialog 15 for notifying the user of the incoming call over the screen of the active OS 5a at a predetermined location, such as the substantially center of the screen, as depicted in FIG. 24.

Figure 25:
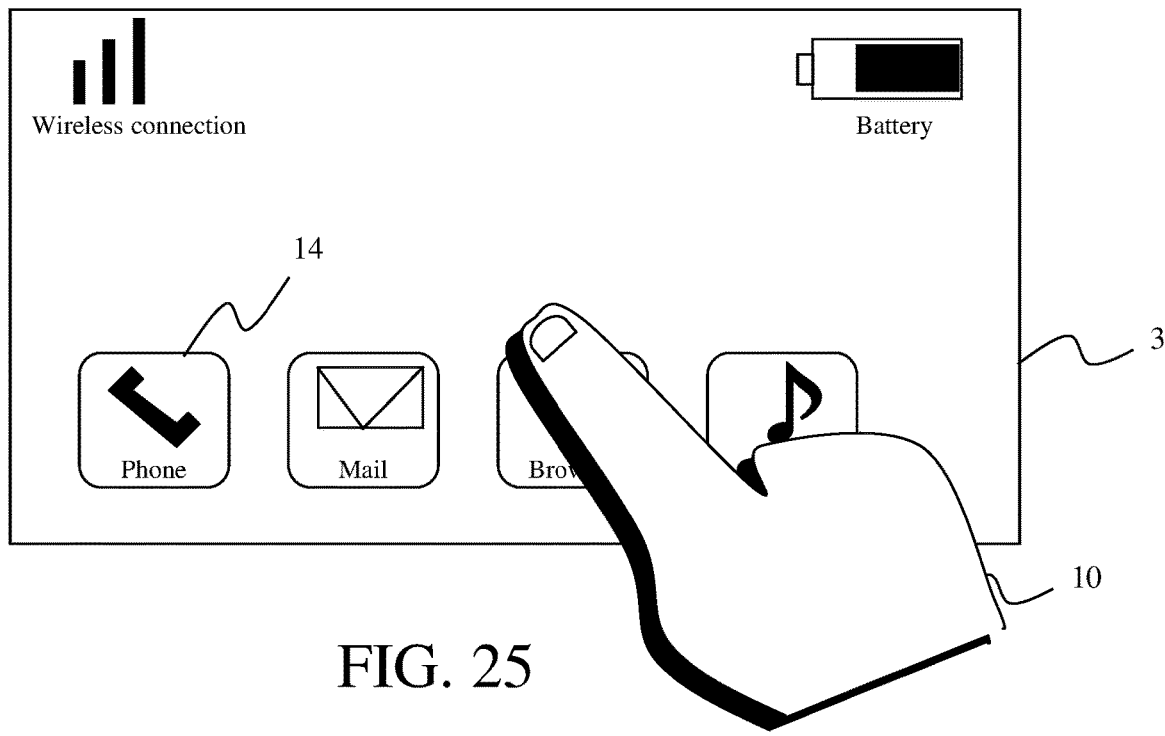
Figure 26:
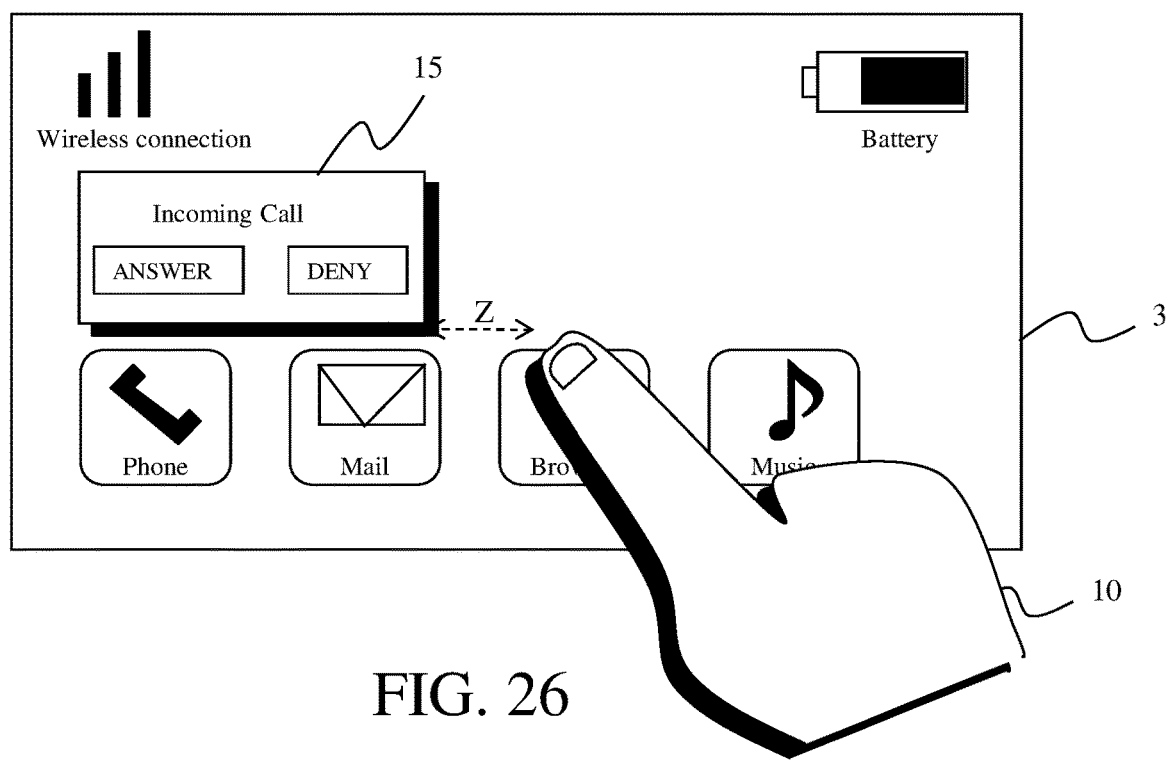

On the other hand, if there is a tap detected, the processor 2 determines a location which is predetermined pixels (for example, Z pixels in FIG. 26) away from the location of the detected tap, and then displays the dialog 15 at the determined location as depicted in FIGS. 25 and 26.

The dialog 15 contains a tappable object 15a for answering the incoming call as well as a tappable object 15b for denying the incoming call. Responsive to the user's tapping the graphical object 15a, the processor 2 establishes telecommunication between the user, namely, the computing device 1 and the caller through the telecommunication circuitry 4, in accordance with the instructions of the telecommunication program 5g.

Advantageously, the above-mentioned display control can avoid user's erroneous tapping on the suddenly displayed dialog 15. Specifically speaking, if the dialog 15 popped up near the finger 10 just when the user is tapping on the screen of the OS 5a for operation of the OS 5a, the user might erroneously tap the tappable object 15a or 15b against his/her intention. The user might feel bad if he/she erroneously answered the incoming call by tapping the tappable object 15a against his/her intention. Thanks to the above-mentioned display control, the dialog 15 is always popped up distantly from the user's tapped finger 10, and so the erroneous operation can be avoided.

FIGS. 27 to 30 illustrate an example of popping up a dialog responsive to occurrence of a virus detection event associated with the WWW browser 5b while the WWW browser 5b is running.

Figure 27:
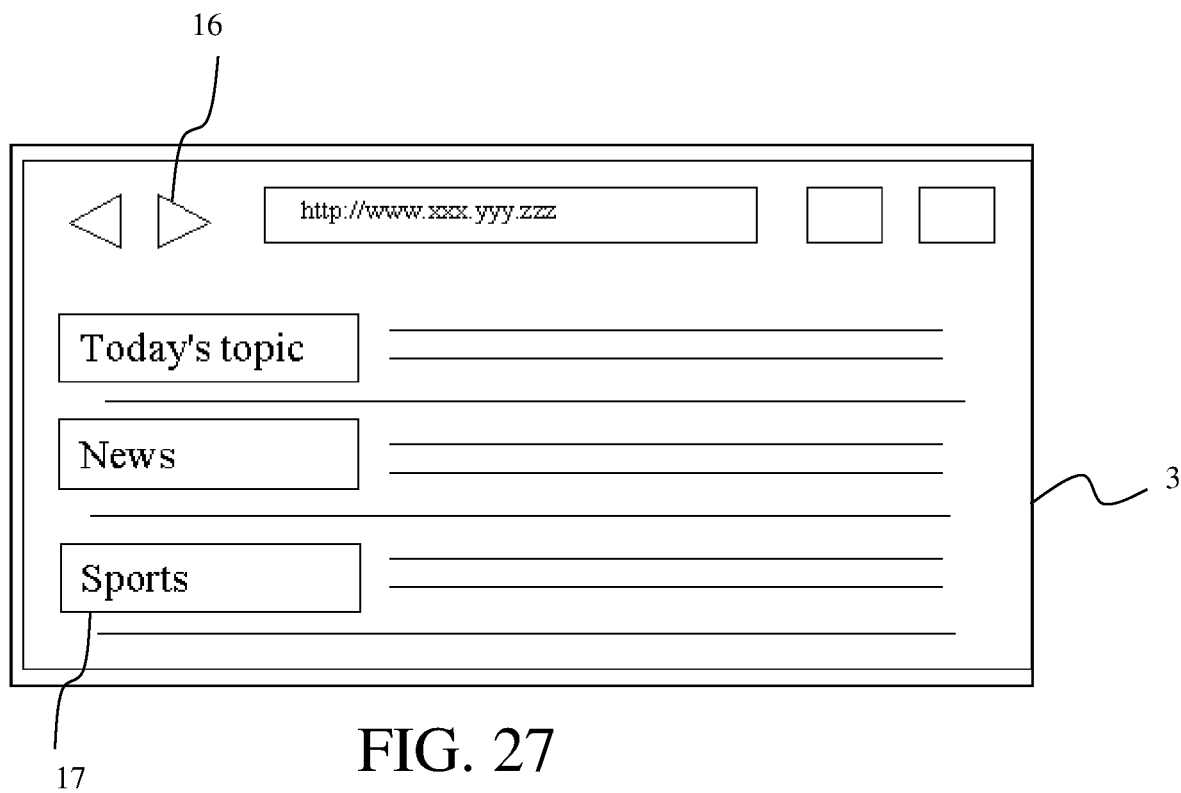

While the WWW browser 5b is executed on the OS 5a, the screen of the WWW browser 5b is displayed on the sensitive display 3 as illustrated in FIG. 27. The screen contains software buttons 16 and hyperlink buttons 17. The processor 2 receives operation of scrolling forward or back WWW pages by way of the user's tapping the software buttons 16, and operations of connecting to other WWW pages by way of the user's tapping the hyperlink buttons 17. Also, the WWW browser 5b continuously monitors computer viruses hidden in the WWW pages in the background.

Figure 28:
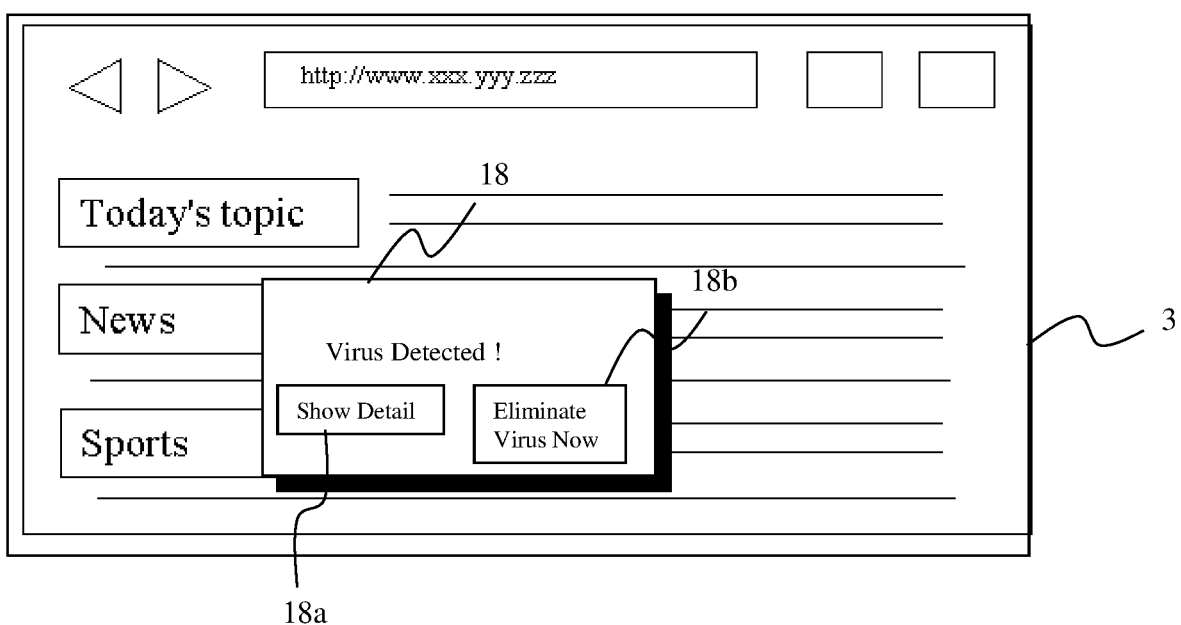

If a virus detection event occurs, the processor 2 determines whether or not a tap of the user's finger is being detected. If there is no tap detected, the processor 2 then displays a dialog 18 for notifying the user of the detected virus over the screen at a predetermined location, such as the substantially center of the screen, as depicted in FIG. 28.

Figure 29:
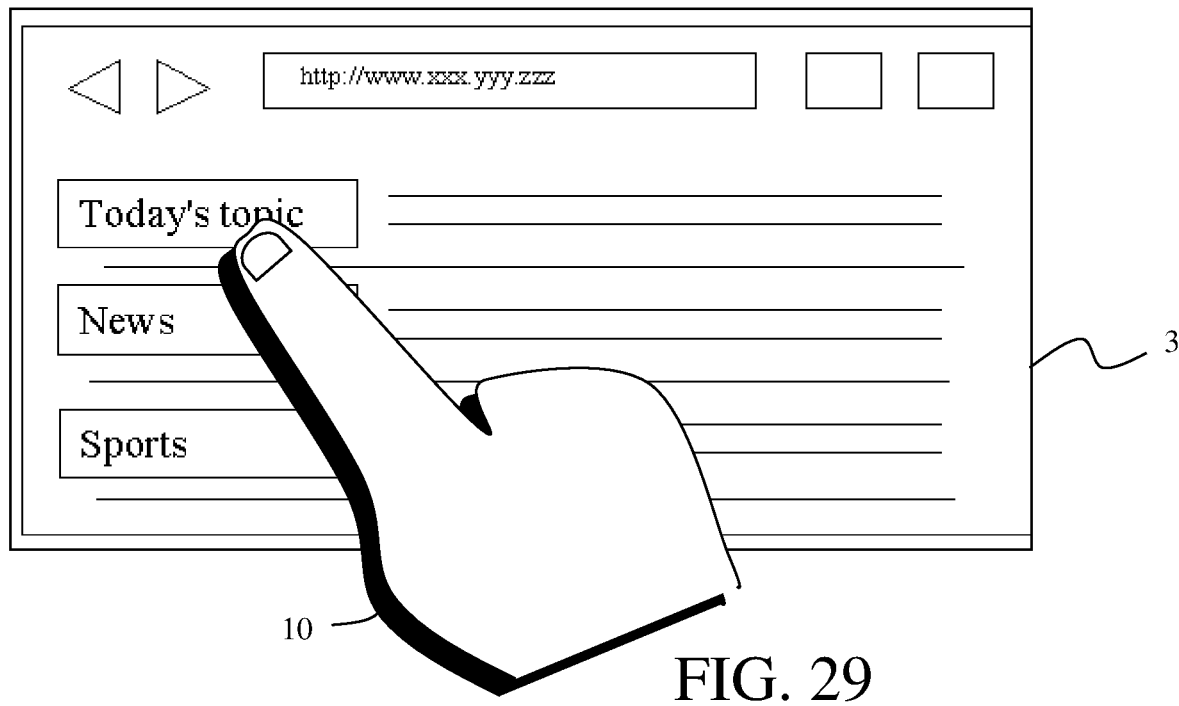
Figure 30:
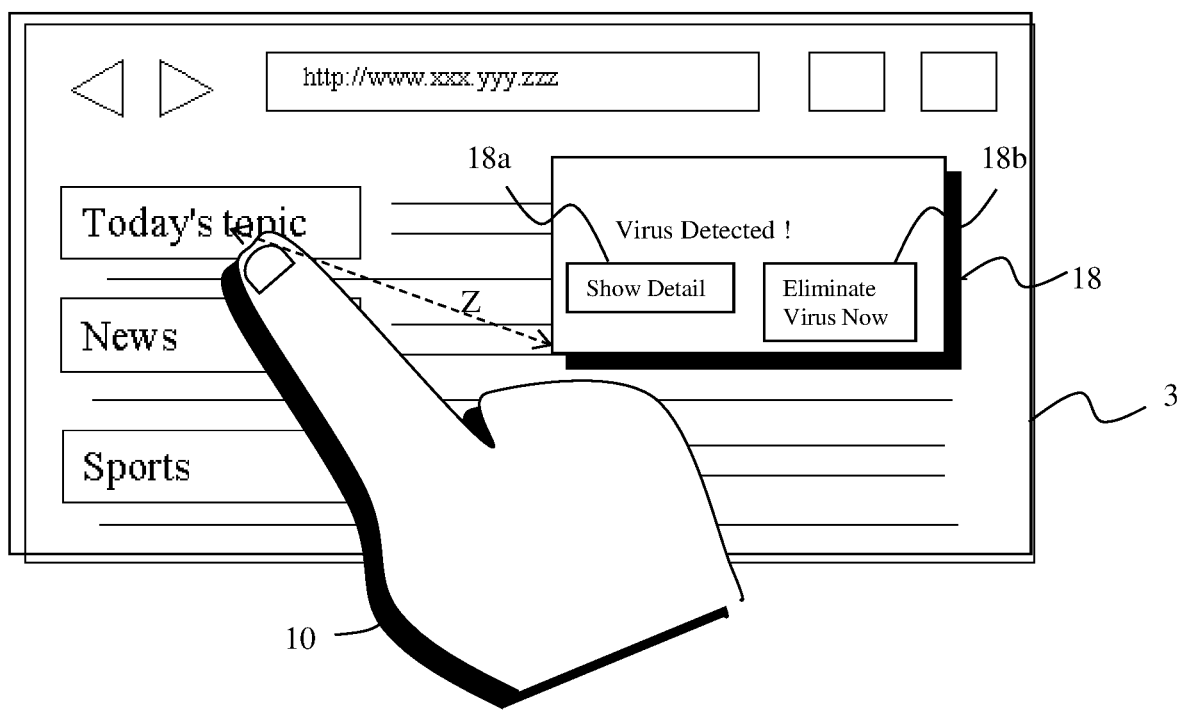

On the other hand, if there is a tap detected, the processor 2 determines a location which is predetermined pixels (for example, Z pixels in FIG. 30) away from the location of the detected tap, and then displays the dialog 18 at the determined location as depicted in FIGS. 29 and 30.

The dialog 18 contains a tappable object 18a for checking the details of the virus as well as a tappable object 18b for eliminating the virus. Responsive to the user's tapping the objects 18a, the processor 2 displays detail information about the virus. Responsive to the user's tapping the graphical objects 18b, the processor 2 executes the instructions of WWW browser 5b to exterminate the virus.

Advantageously, the above-mentioned display control can avoid the user's erroneous tapping on the suddenly displayed dialog 18. Specifically speaking, if the dialog 18 popped up near the finger 10 just when the user is tapping on the screen, the user might erroneously tap the object 18a or 18b against his/her intention. The user might feel bad if he/she erroneously eliminated the virus by tapping the tappable object 18b against his/her intention to analyze the virus carefully. Thanks to the above-mentioned display control, the dialog 18 is popped up distantly from the user's tapped finger 10, and so the erroneous operation can be avoided.

Third Aspect of Display Control

FIG. 31 is a flowchart illustrating a third aspect of the display control in accordance with the display control program 5f. According to the third aspect of the present embodiment, the display control is executed while a screen of one of the programs 5a to 5g is displayed on the sensitive display 3. One or more given location or area within the screen are assigned for popup of a menu for operation of the one of the programs. For example, the upper right part of the screen can be assigned.

While the screen of the program is displayed on the sensitive display 3 (S200), the processor 2 continuously determines whether or not hover of an object such as the user's finger is being detected at the assigned location above the screen for more than a predetermined period based on the signals from the sensitive display 3 (S201). If the processor 2 has continuously received the signals representing hover above the assigned location for more than the predetermined period, the processor 2 determines affirmatively.

If hover is detected (S201: YES), the processor 2 displays a menu at a first location over the screen (S202). The first location is defined to be predetermined pixels away from the assigned location. The menu is a tappable graphical object for operation of the executed program.

Once the processor 2 displays the menu, the processor 2 continuously determines whether or not hover anywhere in the screen is kept continuously detected based on the signals from the sensitive display 3 (S203). The processor 2 determines dismissively if the sensitive display 3 stops detecting hover because, for example, the user has moved his/her finger away from the sensitive display 3. The processor 2 determines affirmatively if the sensitive display 3 keeps detecting hover because, for example, the user has kept his/her finger in proximity the sensitive display 3.

If detection of hover stops (S203: NO), the processor 2 stops displaying the menu (S204). On the other hand, as long as detection of hover is kept (S203: YES), the processor 2 keeps displaying the menu until a predetermined time has lapsed (S205).

While the menu is displayed, the processor 2 receives the user's tap on the menu through the sensitive display 3 (S206).

If the menu is tapped (S206: YES), the processor 2 executes a given action associated with the menu in accordance with the instructions of the executed program (S207).

Examples of Menu

FIGS. 32 to 35 illustrate examples describing how a menu is popped up in accordance with the above-mentioned display control while the text editor 5c is being executed.

Figure 32:
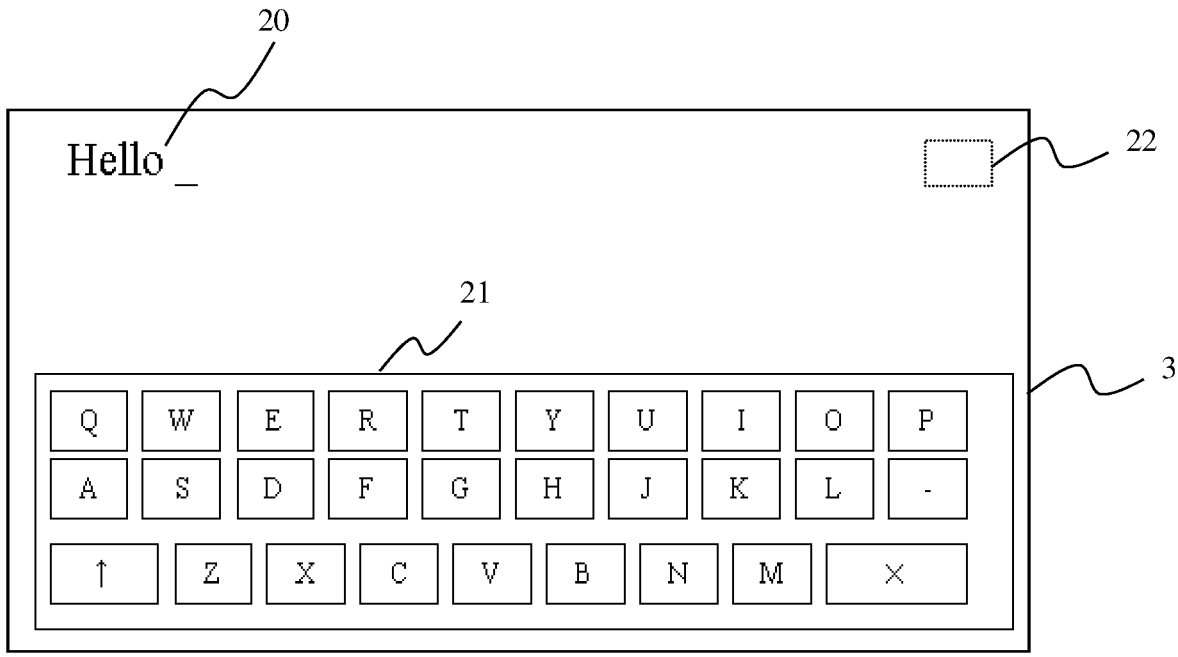
Figure 33:
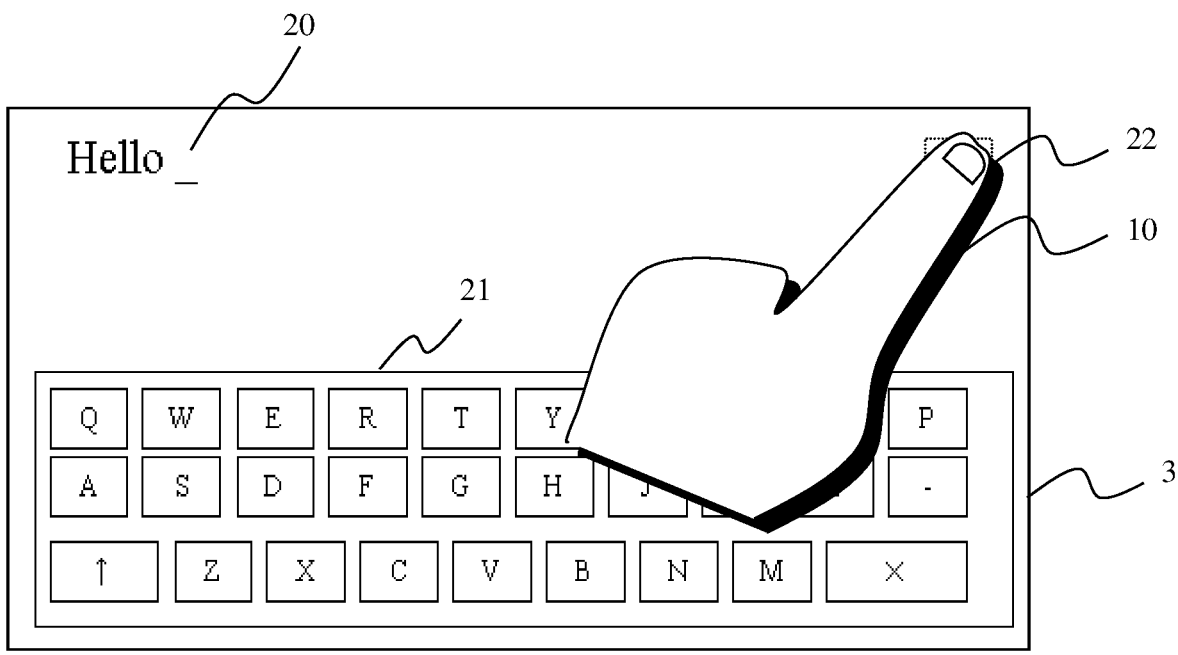

As illustrated in FIG. 32, the screen of the text editor 5c contains a text input field 20 and a software keyboard 21. The processor 2 receives taps on tappable alphabetical keys within the software keyboard 21 through the sensitive display 3 to input texts in the text input field 21. In addition, a given part 22 in the upper right of the screen is assigned for menu popup.

Figure 34:
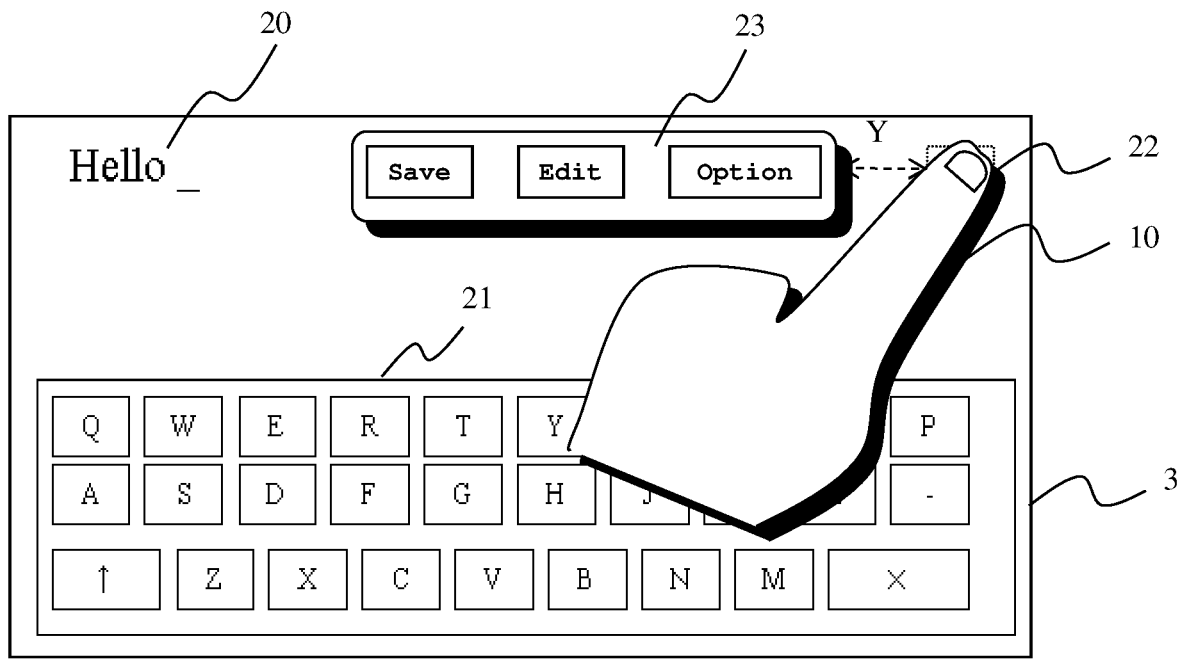
Figure 35:
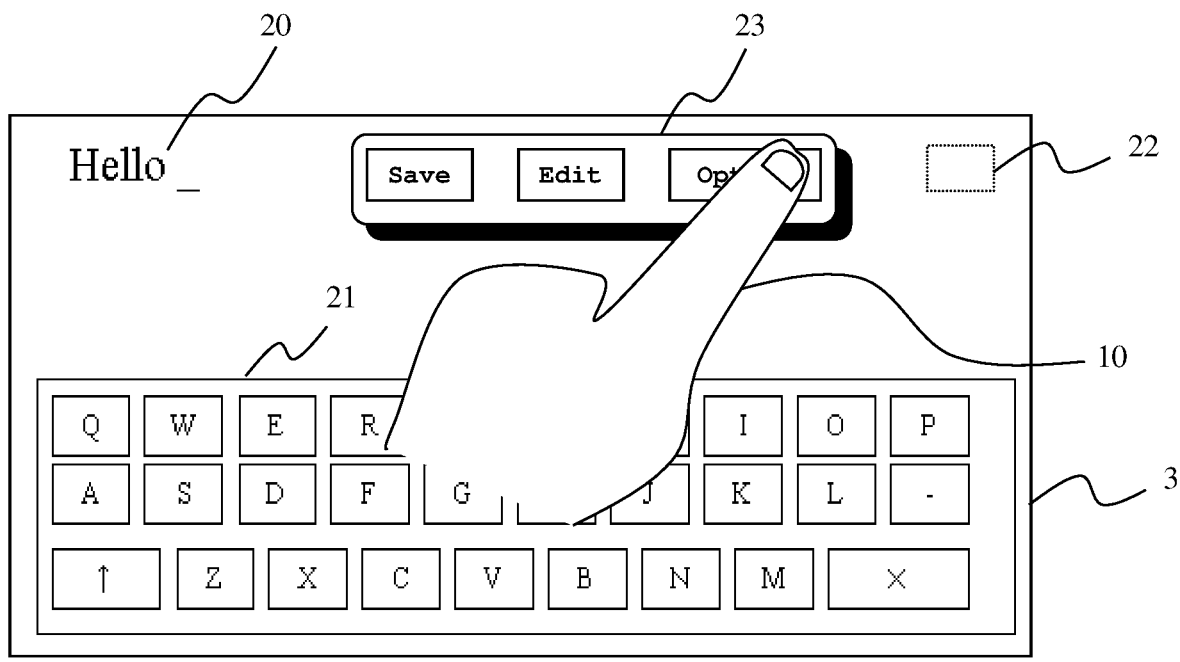

If the processor 2 detects hover of the user's finger 10 above the part 22 for more than a predetermined period, the processor 2 displays a menu 23 at a first location that is predetermined pixels (for example, Y pixels in FIG. 34) away from the part 22, as depicted in FIG. 34. The menu 23 is a graphical object containing tappable software buttons entitled "save", "edit", and "option" by way of example.

The processor 2 keeps displaying the menu 23 as long as hover of the finger 10 is kept over the screen. The processor 2 executes actions associated with any one of the software buttons within the menu 23 by receiving a tap on the one of the software buttons in accordance with the instructions of the text editor 5*c*. For example, the processor 2 can save a document created through text inputs in the memory 5 by receiving a tap on the software button entitled "save".

On the other hand, the processor 2 stops displaying the menu 23 if the predetermined time has lapsed or detection of hover has stopped before reception of tap on the menu 23.

Advantageously, the above-mentioned display control can hide the menu 23 to avoid the screen from being occupied by the menu 23 unless or until the user hopes or needs to operate by use of the menu 23, so as to enhance screen visibility.

Further, the menu 23 is displayed some pixels away from the hovering finger 10, so as to avoid the finger 10 itself from interrupting the menu 23.

In addition, display of the menu 23 can be kept or ceased through easy operation of the user's keeping the finger 10 in proximity over the screen or moving the finger 10 away from the screen. Accordingly, usability in operating the programs can be improved.

Fourth Aspect of Display Control

FIG. 36 is a flowchart illustrating a fourth aspect of the display control in accordance with the display control program 5*f*. According to the fourth aspect of the present embodiment, the display control is executed while a screen of one of the programs 5*a* to 5*g* is displayed on the sensitive display 3. The screen may contain one or more tappable objects, such as texts and images, associated with a given action defined by instructions of one of the programs 5*a* to 5*g*. For example, a screen of the WWW browser 5*b* displays a WWW page and may contain a tappable object linked to another WWW page. Tapping on the object may initiate a given action, namely, connection to and display of the linked WWW page.

While the screen of one of the programs 5*a* to 5*g* is displayed on the sensitive display 3 (S300), the processor 2 continuously determines whether or not hover of an object such as the user's finger 10 is being detected above a tappable object over the screen for more than a predetermined period (S301). If the processor 2 has continuously received the signals representing hover above the location of the tappable object for more than the predetermined period, the processor 2 determines affirmatively.

If hover is detected (S301: YES), the processor 2 generates and displays an assistant object at a location which is predetermined pixels away from the tappable object over the screen (S302). The assistant object is an object for assisting the tappable object to be tapped. The assistant object can be, for example, generated by enlarging the tappable object.

Once the processor 2 displays the assistant object, the processor 2 continuously determines whether or not hover above the tappable object is kept continuously detected based on the signals from the sensitive display 3 (S303). The processor 2 determines dismissively if the sensitive display 3 stops detecting hover because, for example, the user has moved his/her finger away from the sensitive display 3. The processor 2 determines affirmatively if the sensitive display 3 keeps detecting hover because, for example, the user has kept his/her finger in proximity above the tappable object.

If detection of hover stops (S303: NO), the processor 2 stops displaying the assistant object (S304). On the other hand, as long as detection of hover is kept (S303: YES), the processor 2 keeps displaying the assistant object until a predetermined time has lapsed (S305).

While the assistant object is displayed, the processor 2 receives the user's tap on the tappable object through the sensitive display 3 (S306).

If the tappable object is tapped (S306: YES), the processor 2 executes a given action associated with the tappable object in accordance with the instructions of the program (S307).

Example of Assistant Object

FIGS. 37 to 40 illustrate an example describing how the assistant object is displayed in accordance with the above-mentioned display control while the WWW browser 5*b* is being executed.

Figure 37:
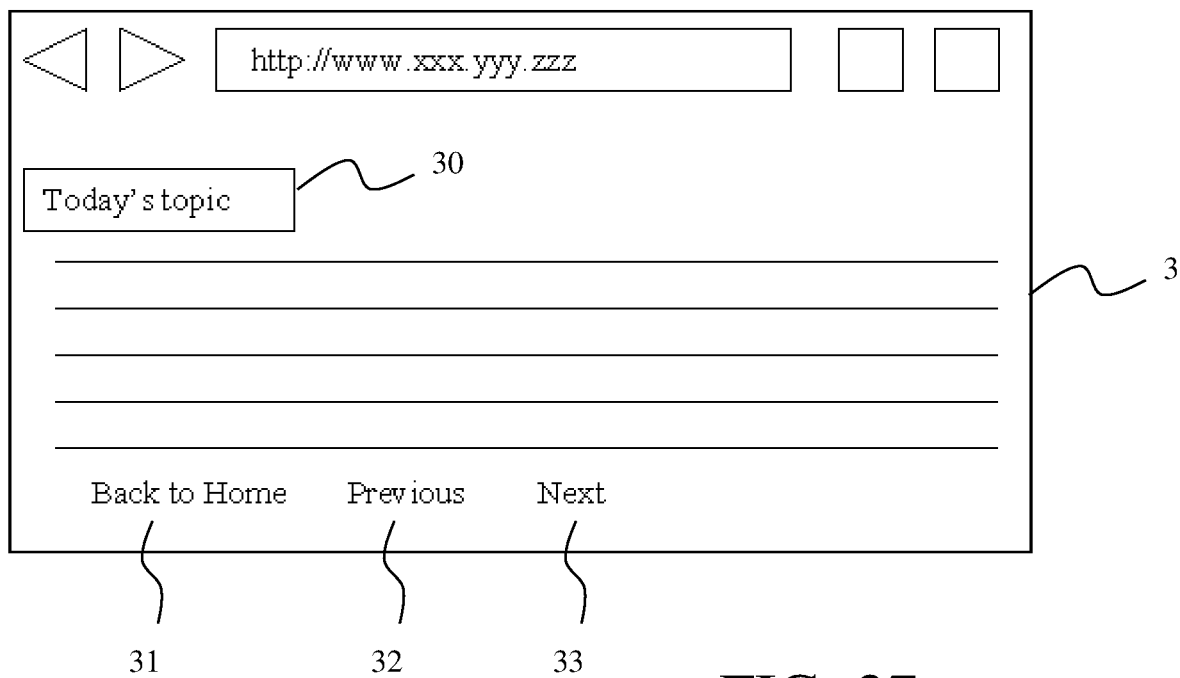

As illustrated in FIG. 37, as the screen of the WWW browser 5*b*, a WWW page is displayed. The WWW page contains tappable text objects 31 to 33 and a tappable image object 30. Each of the tappable text objects 31 to 33 consists of texts, whereas the tappable image object 30 consists of an image. Each of the tappable objects 30 to 33 is linked to another WWW page. The processor 2 receives taps on the tappable objects 30 to 33 through the sensitive display 3 to connect to the linked WWW page and display a screen of the linked WWW page.

Figure 38:
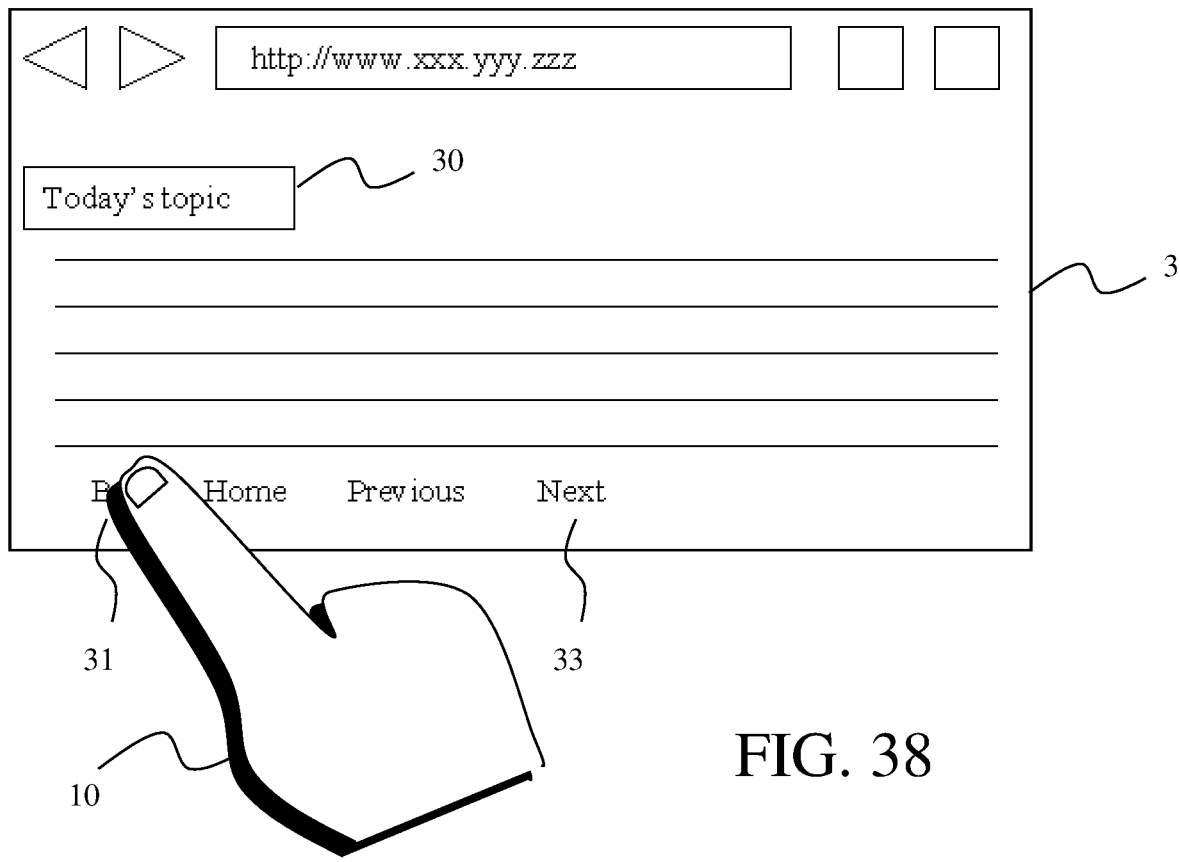
Figure 39:
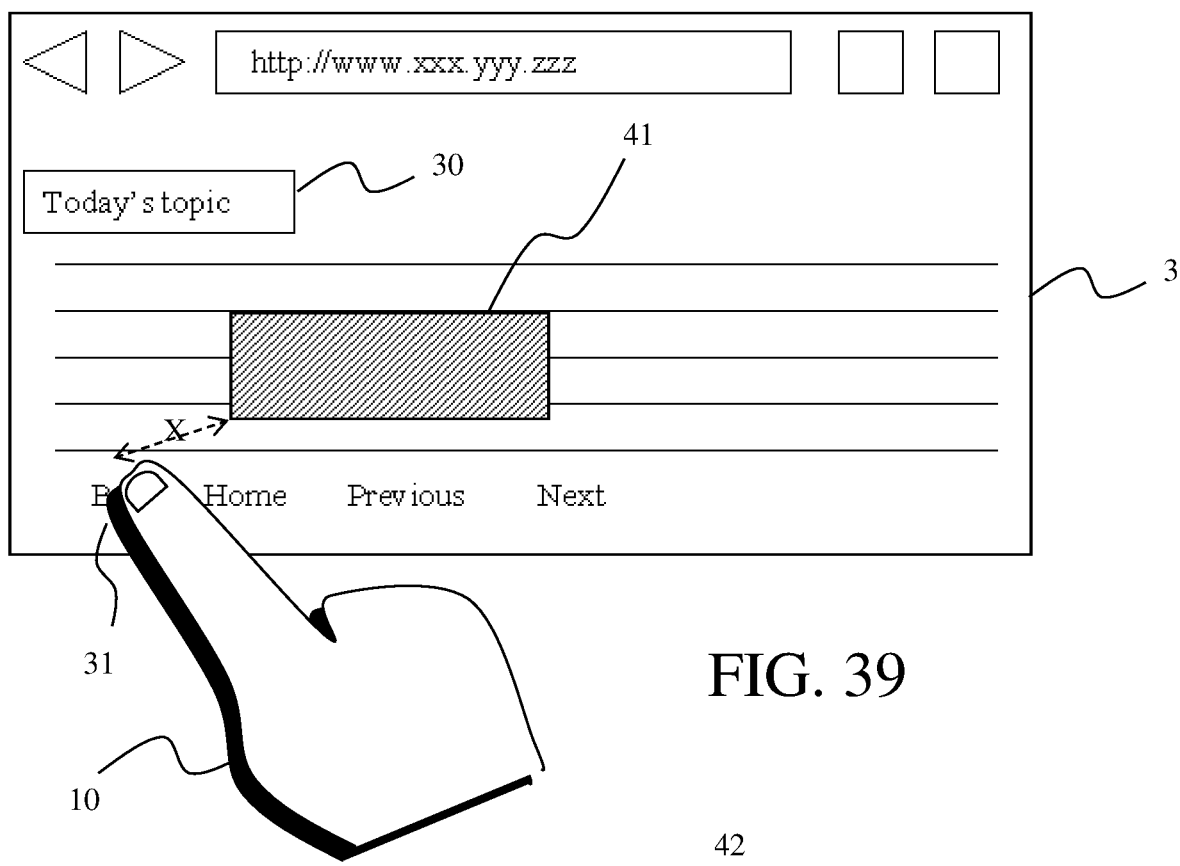

If the processor 2 detects hover of an object such as the user's finger 10 above one of the tappable objects 30 to 33, for example the tappable text object 31, for more than a predetermined period as depicted in FIG. 38, the processor 2 generates an assistant object 41 for assisting the tappable text object 31 to be tapped. The processor 2 then displays the assistant object 41 near but predetermined pixels (for example, X pixels in FIG. 39) away from the original tappable text object 31, as depicted in FIG. 39.

The processor 2 keeps displaying the assistant object 41 as long as hover of the finger 10 is kept detected above the tappable text object 31. The processor 2 executes an action associated with the tappable text object 31 by receiving tap on the tappable text object 31 in accordance with the instructions of the WWW browser 5*b*. For example, the processor 2 can connect to another WWW page linked to the tappable text object 31 and display a screen of the linked WWW page.

Figure 40:
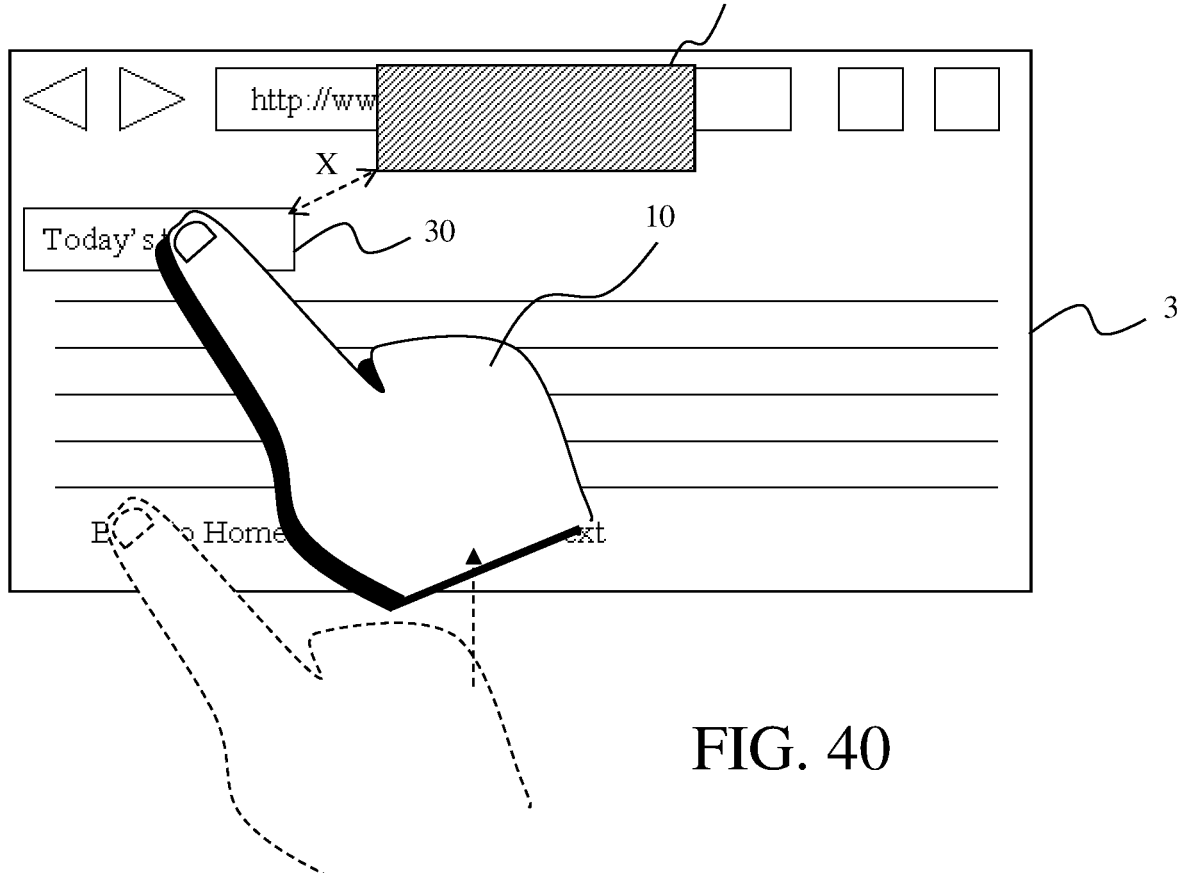

On the other hand, the processor 2 stops displaying the assistant object 41 if the predetermined time has lapsed or detection of hover has stopped because, for example, the user has moved the finger 10 away from the tappable text object 31 before reception of tap on the tappable text object 31. After stopping display of the assistant object 41, if the processor 2 again detects hover above one of the tappable objects 30 to 33, for example the tappable image object 30 because the user has moved the finger 10 from above the tappable text object 31 to above the tappable image object 30, the processor 2 then generates and displays an assistant object 42 for assisting the tappable image object 30 to be tapped, near but predetermined pixels (for example, X pixels in FIG. 40) away from the original tappable image object 30, as depicted in FIG. 40.

Example of Assistant Object

The assistant object generated in accordance with the above display control may be embodied in various manners within the scope of its purpose of assisting the a original tappable object to be tapped.

For example, the assistant object can be generated by copying the original tappable object, and enlarging the copied object, as depicted in FIGS. 41 and 42.

For example, the assistant object can be a thumbnail or screenshot of a WWW page linked to the original tappable object as depicted in FIG. 43.

Advantageously, the above-mentioned display control can enhance usability in the user tapping on tappable objects that appear in the screen, and can avoid the user from erroneously tapping on the tappable objects. More specifically, even in case the tappable objects are displayed too small for the user to easily read or recognize what is written in the tappable object or what will occur upon tapping on the tappable object because the sensitive display 3 is tiny, the user can read or recognize what is written in the tappable object or what will occur upon tapping on the tappable object by taking a look at the assistant object. Accordingly, the user's erroneous tapping on the tappable objects against his/her intention can be avoided. Therefore, usability in operating the programs can be improved.

Fifth Aspect of Display Control

FIG. 44 is a flowchart illustrating a fifth aspect of the display control in accordance with the display control program 5f. According to the fifth aspect of the present embodiment, the display control is executed while the screen of one of the programs 5a to 5g is displayed on the sensitive display 3. The screen may contain one or more tappable objects, such as texts and images, associated with a given action for operation of the one of the programs 5a to 5g. For example, a screen of the WWW browser 5b, which is a WWW page, may contain a tappable object linked to another WWW page. Tapping on the graphical object may execute a given action, namely, connection to and display of the linked WWW page.

While the screen of one of the programs 5a to 5g is displayed on the sensitive display 3 (S310), the processor 2 continuously determines whether or not hover of an object such as the user's finger is being detected above a tappable object over the screen for more than a predetermined period (S311). If the processor 2 has continuously received the signals representing hover at the location of the tappable object for more than the predetermined period, the processor 2 determines affirmatively.

If hover is detected (S311: YES), the processor 2 generates and displays an assistant object at a location which is predetermined pixels away from the tappable object over the screen (S312). The assistant object is an object for assisting the tappable object to be tapped. Specifically, the assistant object is generated in a tappable form, and is associated with the same given action as the action originally associated with the tappable object. In other words, the same instructions as the instructions originally assigned to the tappable object for executing the given action, is also assigned to the assistant object.

Once the processor 2 displays the assistant object, the processor 2 determines whether or not hover anywhere over the screen is kept continuously detected based on the signals from the sensitive display 3 (S313). The processor 2 determines dismissively if the sensitive display 3 stops detecting hover because, for example, the user has moved his/her finger away from the sensitive display 3. The processor 2 determines affirmatively if the sensitive display 3 keeps detecting hover because, for example, the user has kept his/her finger in proximity anywhere over the screen.

If detection of hover stops (S313: NO), the processor 2 stops displaying the assistant object (S314). On the other hand, as long as detection of hover is kept (S313: YES), the processor 2 keeps displaying the assistant object until a predetermined time has lapsed (S315).

While the assistant object is displayed, the processor 2 receives the user's tap on the assistant object through the sensitive display 3 (S316).

If the assistant object is tapped (S316: YES), the processor 2 executes a given action associated with the assistant object, which corresponds to the action originally associated with the tappable object, in accordance with the instructions of the program (S317).

Example of Assistant Object

FIGS. 45 to 48 illustrate an example describing how the assistant object is displayed in accordance with the above-mentioned display control while the WWW browser 5b is being executed.

Figure 45:
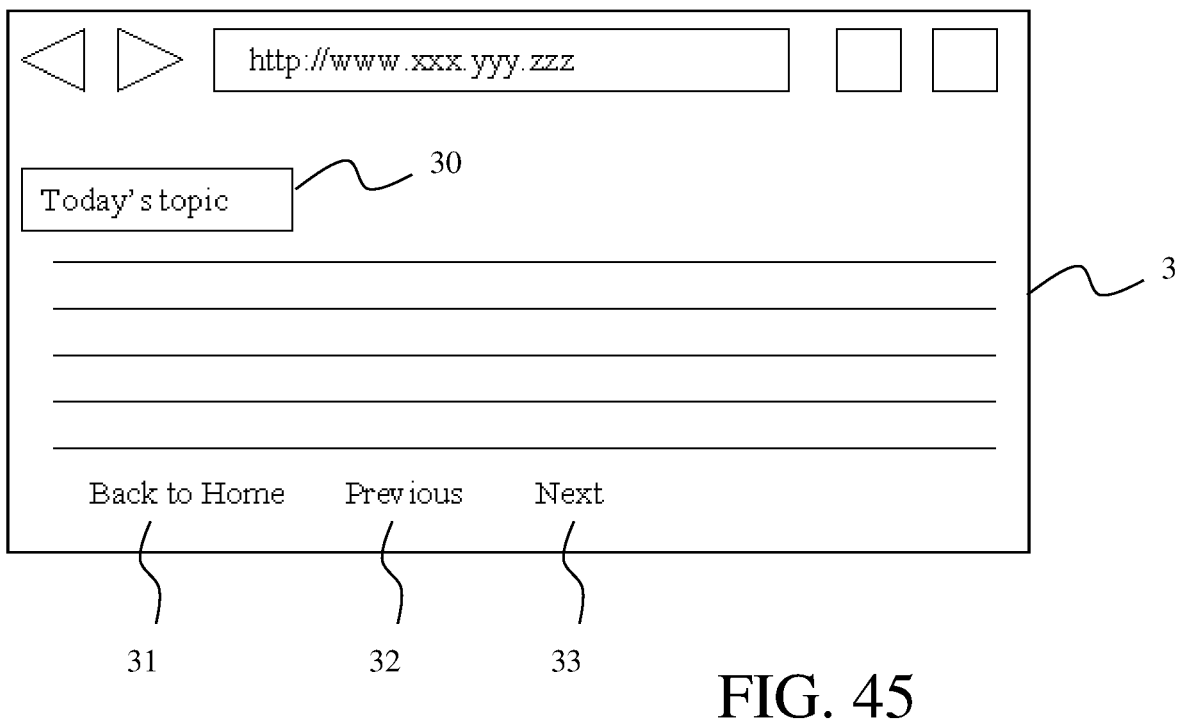

As illustrated in FIG. 45, the screen of the WWW browser 5b, which is a WWW page, contains tappable text objects 31 to 33 and a tappable image object 30. Each of the tappable objects 30 to 33 is linked to another WWW page. The processor 2 receives taps on the tappable objects 30 to 33 through the sensitive display 3 to connect to the linked WWW page and display a screen of the linked WWW page.

Figure 46:
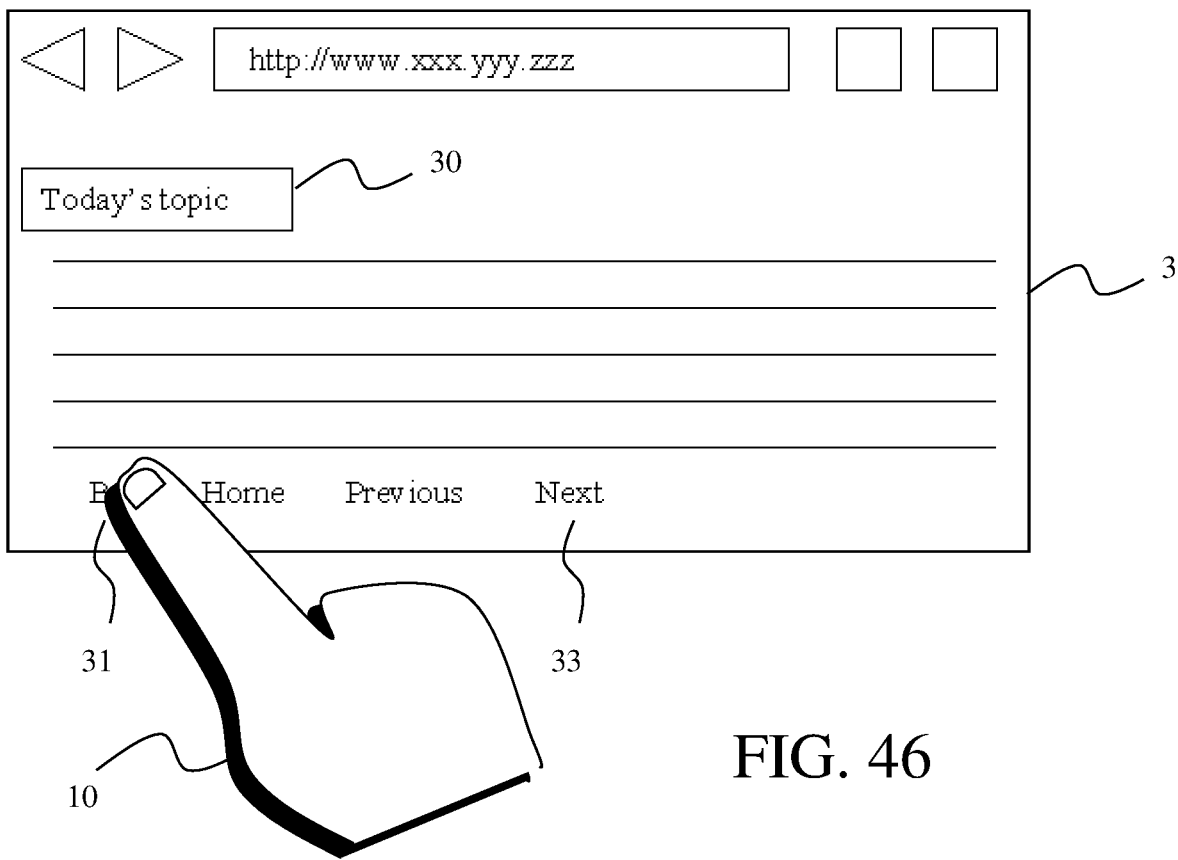
Figure 47:
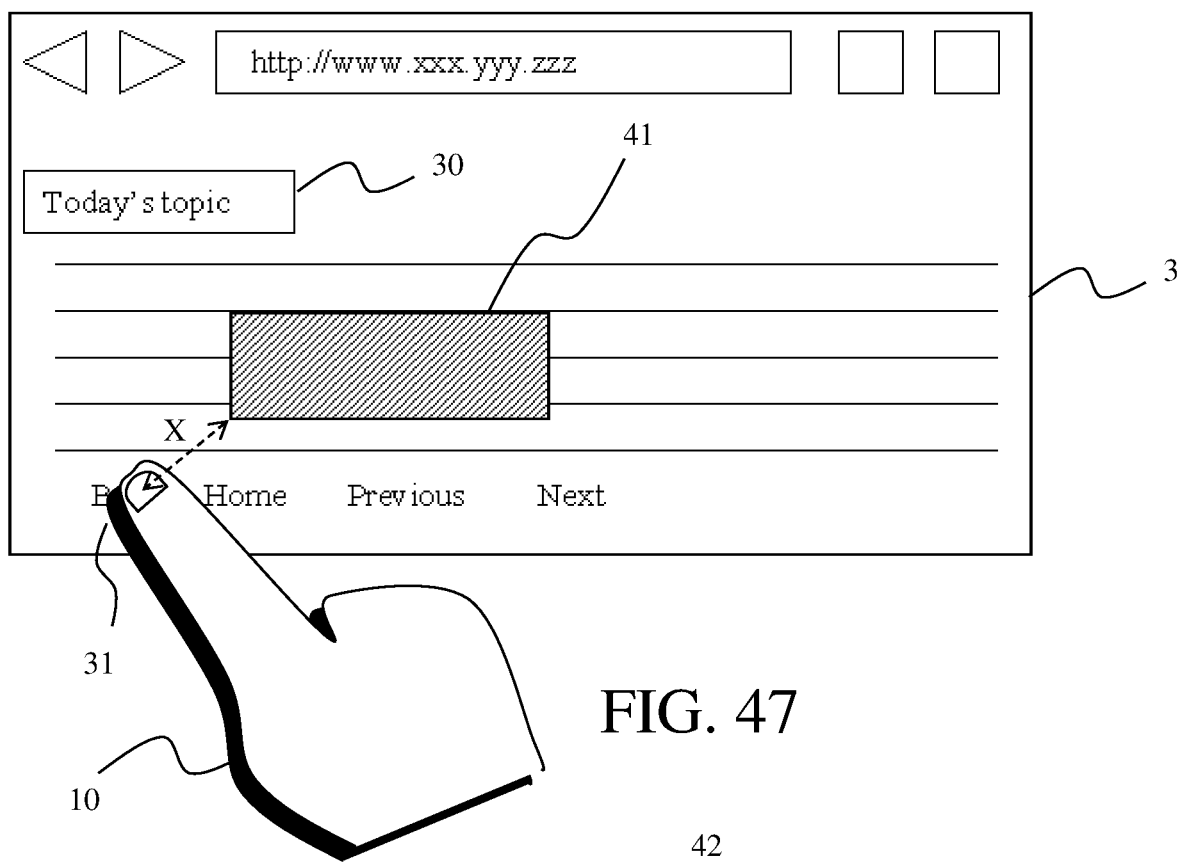

If the processor 2 detects hover of an object such as the user's finger 10 above one of the tappable objects 30 to 33, for example the tappable text object 31, for more than a predetermined period as depicted in FIG. 46, the processor 2 generates an assistant object 41 for the tappable text object 31. This assistant object 41 is associated with the action originally associated with the tappable text object 31, namely, has a link to the WWW page to which the tappable text object 31 is originally linked. The processor 2 then displays the assistant object 41 near but predetermined pixels (for example, X pixels in FIG. 47) away from the original tappable text object 31, as depicted in FIG. 47.

The processor 2 keeps displaying the assistant object 41 as long as hover of the finger 10 is kept anywhere over the screen. The processor 2 executes an action associated with the assistant object 41, which corresponds to the action originally associated with the tappable text object 31, by receiving tap on the assistant object 41 in accordance with the instructions of the WWW browser 5b. For example, the processor 2 can connect to another WWW page linked to the assistant object 41, which corresponds to the WWW page originally linked to the tappable text object 31, and display a screen of the linked WWW page.

Figure 48:
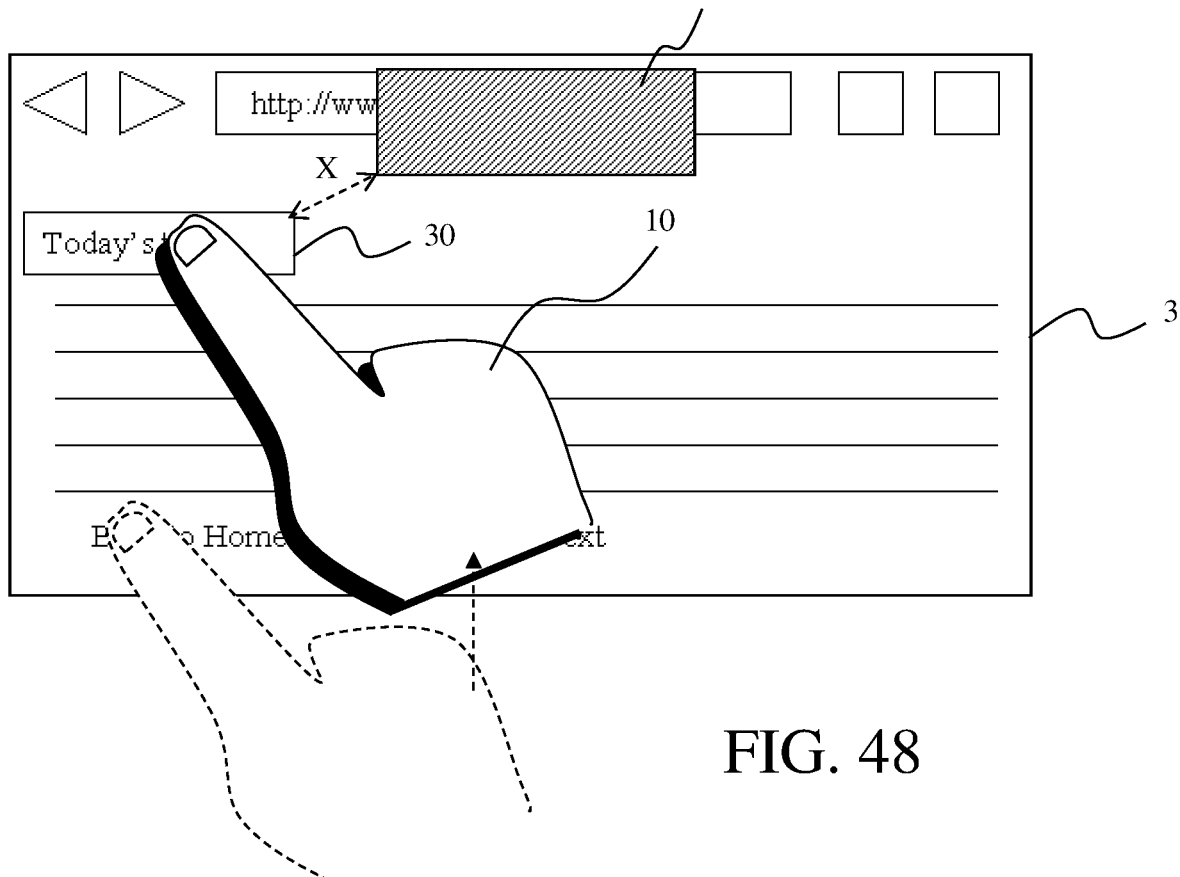

On the other hand, the processor 2 stops displaying the assistant object 41 if the predetermined time has lapsed or detection of hover has stopped because, for example, the user has moved the finger 10 away from the screen before reception of tap on the assistant object 41. After stopping display of the assistant object 41, if the processor 2 again detects hover above one of the tappable objects 30 to 33, for example the tappable image object 30 because the user has moved the finger 10 to approach to the tappable image object 30, the processor 2 then generates and displays an assistant object 42 for the tappable image object 30 near but predetermined pixels (for example, X pixels in FIG. 48) away from the original tappable object 30, as depicted in FIG. 48.

Example of Assistant Object

The assistant object generated in accordance with the above display control may be embodied in various manners within the scope of its purpose of assisting the tappable object to be tapped.

For example, the assistant object can be generated by copying the original tappable object, and enlarging the copied object, as depicted in FIGS. 49 and 50.

For example, the assistant object can be a thumbnail or screenshot of a WWW page linked to the assistant object, which corresponds to the WWW page originally linked to the original tappable object, like the tappable object 31 in FIG. 51, as depicted in FIG. 51.

Advantageously, the above-mentioned display control can enhance usability in the user executing a given action associated with tappable objects that appear in the screen. More specifically, even in case the tappable objects are displayed too small for the user to easily tap on the tappable object for executing the given action because the sensitive display 3 is tiny, the user can execute the given action easily by tapping on an assistant object instead of the original tappable object. Therefore, usability in operating the programs can be improved.

Second Embodiment

Summary

A second embodiment is disclosed with reference to FIGS. 52 to 110. In the second embodiment, a computing device 50 is operable in connection with a remote display device 51 that is physically separated from the computing device 50. The computing device 1 can detect taps of an object such as a user's finger onto its local sensitive display 54 and hover of such object in proximity over the sensitive display 54. The computing device 50 controls display of a screen of a computer program executed in the computing device 50 based on communication between the computing device 50 and the remote display device 51.

Configuration

Each of FIGS. 52 and 53 depicts the computing device 50 and the remote display device 51.

The computing device 50 is a multi-functional computing device suitable in size for mobility. The computing device 50 can be a cell phone, a tablet computer, a laptop computer, and other similar computing device.

The computing device 50 has communication circuitry 55 for wirelessly communicating with communication circuitry 52 coupled to the remote display 51.

The remote display device 51 is a typical desktop display device suitable for use, for example, on a desk, a table, or in a living room. The size of the remote display device 51 can be 20 inches, 32 inches, 40 inches, 60 inches, and so on.

The remote display device 51 is physically different from the computing device 50. In other words, the computing device 50 and the remote display device 51 have their components and circuitry housed in housings different from each other.

The remote display device 51 is coupled to the communication circuitry 52 for wirelessly communicating with the communication circuitry 55. The communication circuitry 52 can be provided inside the remote display device 51 as depicted in FIG. 52, or can be an external device attachable to the remote display device 51 by way of, for example, USB (Universal Serial Bus) or another interface as depicted in FIG. 53.

The communication circuitry 55 and 52 can communicate with each other in accordance with, for example, the Bluetooth (registered trademark of Bluetooth SIG, INC.) protocol, the FireWire (registered trademark of Apple Inc.) protocol, the WiMAX (registered trademark of WiMAX Forum Corporation) protocol, the wireless LAN (Local Area Network) protocol, or another wireless communication protocol.

The communication circuitry 52 can receive video signals streamed through the communication circuitry 55, and can output the received video signals to the remote display device 51.

Thanks to the above configuration of the computing device 50 and the remote display device 51, the computing device 50 can send video signals to the remote display device 51, thereby making the remote display device 51 display graphics or video represented by the video signals.

FIG. 54 is a block diagram of the computing device 50 for illustrating the configuration of the computing device 50 in more detail.

The computing device 50 mainly has a processor 53, the sensitive display 54, the communication circuitry 55, and a memory 56.

The processor 53 generally processes instructions of computer programs stored in the memory 56 to execute the computer programs, so as to realize a variety of functions of the computing device 50. The processor 53 can be a CPU (Central Processing Unit), a MPU (Micro Processing Unit), a DSP (Digital Processing Unit), or another general or dedicated processor.

The sensitive display 54 is a display device composed essentially of a display 54a and a sensor 54b. The display 54a can be a LCD (Liquid Crystal Display), an EL (Electro-Luminance) display, or one of other similar types of display devices. The display 54a displays graphics and video in accordance with video signals sent from the processor 53. The sensor 54b is a sensor to distinctively detect (i) taps of one or more objects, such as a user's finger and a stylus, made onto the sensor 54b and (ii) hover of such object made in proximity over the sensor 54b. The sensor 54b sends to the processor 53 signals representing (i) the location of detected tap as long as such tap is detected and (ii) the location of detected hover as long as such hover is detected. A tap may be a touch or a contact in other words. Further, the sensor unit 54b detects gestures by (i) continuously detecting hover continuously made in proximity above the sensor unit 54b or (ii) continuously detecting a movement of the object while a tap is maintained on the sensor unit 54b. The technologies of sensing of taps, hover, and/or gestures are disclosed, for example, in the U.S. patent publications Nos. 2009/194344 invented by Harley et al, 2008/297487 invented by Hotelling et al, 2009/289914 invented by CHO, 2006/26521 invented by Hotelling et al, 2006/244733 invented by Geaghan et al, 2010/45633 invented by Gettemy et al, 2011/169780 invented by Goertz et al, 2008/158172 invented by Hotelling et al, and the issued U.S. Pat. No. 7,653,883 invented by Hotelling et al, U.S. Pat. No. 8,232,990 invented by King et al, U.S. Pat. No. 7,880,732 invented by Goertz, U.S. Pat. No. 7,663,607 invented by Hotelling et al, U.S. Pat. No. 7,855,718 invented by Westerman, U.S. Pat. No. 7,777,732 invented by HERZ et al, U.S. Pat. No. 7,924,271 invented by Christie et al, U.S. Pat. No. 8,219,936 invented by Kim et al, U.S. Pat. No. 8,284,173 invented by Morrison, U.S. Pat. No. 6,803,906 invented by Morrison, U.S. Pat. No. 6,954,197 invented by Morrison et al, U.S. Pat. No. 7,692,627 invented by Wilson, the contents of which are incorporated herein by reference in their entirety. The display 54a and the sensor 54b may be mechanically integrated together. As a result, the sensitive display 54 displays graphics and video as well as detects taps, hover, and gestures of an object like the user's finger or a stylus on or above the sensitive display 54.

The communication circuitry 55 is circuitry for wireless communication with the communication circuitry 52. In particular, video signals are transmitted to the communication circuitry 52 through the communication circuitry 55 under control by the processor 53. The communication circuitry 55 can communicate in accordance with the Bluetooth (registered trademark of Bluetooth SIG, INC.) protocol, the FireWire (registered trademark of Apple Inc.) protocol, the WiMAX (registered trademark of WiMAX Forum Corporation) protocol, the wireless LAN (Local Area Network) protocol, or another wireless communication protocol.

The memory 56 is a memory device, for example, such as a flash memory, an EEPROM, a HDD (Hard Disk Drive), and another similar memory device. The memory 56 stores computer programs to be executed by the processor 53. In particular, the memory 56 stores an OS (Operating System) 56a, a WWW (World Wide Web) browser 56b, a video game 56c, a text editor 56d, a media player 56e, and a display control program 56f. The WWW browser 56b, the video game 56c, the text editor 56d, and the media player 56e are typically application programs that run on OS 56a. The programs 56b to 56e are often collectively referred to as application programs. The display control program 56f can also run on the OS 56a, or can be incorporated in the OS 56a running as part of the OS 56a.

One or more of the application programs 56b to 56e are executed on the OS 56a in response to the user's selection. The display control program 56f is executed while the OS 56a and/or one or more of the application programs 56b to 56e are executed.

Display Operation

The processor 53 sends video signals to the sensitive display 54 in accordance with instructions of the OS 56a, the application programs 56b to 56e, and/or the display control program 56f. The sensitive display 54 displays graphics and video in accordance with the video signals.

For example, the graphics and the video to be displayed include screens, icons, and other graphical objects or contents. The screen may contain one or more tappable graphical objects or contents within the screen, such as a HTML (Hyper Text Markup Language) link, a text-input field, a software button, and a software keyboard.

In this manner, for example, one or more icons representing one or more of the application programs 56b to 56e are displayed on the sensitive display 54 in accordance with the instruction of the OS 56a. For example, a screen of one of the application programs 56b to 56e is displayed on the sensitive display 54 in accordance with the instruction of the application programs 56b to 56e.

Sensitive Operation

When an object such as the user's finger hovers over the sensitive display 54, the sensitive display 54 detects the hover and determines the location above which the hover is made over the sensitive display 54. The sensitive display 54 continuously sends to the processor 53 signals representing the determined hover location during the hover detection. The location may be a position or an X-Y coordinates in other words.

Also, a gesture may be defined by continuous hover in a predetermined path. For example, the sensitive display 54 may detect a gesture responsive to detecting left-to-right linear continuous hover or circular continuous hover. In this case, the sensitive display 54 may then send to the processor 53 a signal representing the detected gesture.

When a tap of an object such as the user's finger is made onto the sensitive display 54, the sensitive display 54 detects the tap and determines the location at which the tap is made within the sensitive display 54. The sensitive display 54 then sends to the processor 53 a signal representing the determined tap location. The location may be a position or an X-Y coordinates in other words.

Also, a gesture may be defined by a movement of the object while a tap is once detected and maintained on the sensitive display 54. For example, the sensitive display 54 may detect a gesture responsive to detecting a left-to-right linear movement of the object or a circular movement of the object. In this case, the sensitive display 54 may then send to the processor 53 a signal representing the detected gesture.

The processor 53 receives the signals from the sensitive display 54. Based on the received signals, the processor 53 determines the location of the hover and tap within a screen displayed on the sensitive display 54. The processor 53 then operates in response to the hover and tap in accordance with the instructions of the OS 56a, the application programs 56b to 56e, and/or the display control program 56f.

For example, in accordance with the instructions of the OS 56a, if the processor 53 determines that a tap is made onto an icon representing the WWW browser 56b, the processor 53 launches the WWW browser 56b.

For example, in accordance with the instructions of the WWW browser 56b, if the processor 53 determines that a tap is made onto a text-input field, the processor 53 launches a software keyboard.

For example, in accordance with the instructions of the display control program 56f, if the processor 53 determines that hover is made anywhere above a screen displayed on the sensitive display 54, the processor 53 generates a video signal representing an indicator indicative of the determined hover location if the communication circuitry 55 is active.

Communication Circuitry Operation

The processor 53 activates or deactivates the communication circuitry 55 in response to the user's operation, for example, through the sensitive display 54.

For example, an icon for activation or deactivation of the communication circuitry 55 is displayed on the sensitive display 54. Responsive to detection of a tap or hover of the user's finger or a stylus on or above the icon, the processor 53 may activate the communication circuitry 55 if the communication circuitry 55 had not been active, and vice versa. Or, Responsive to detection of a predetermined gesture made on or above the sensitive display 54, the processor 53 may activate the communication circuitry 53 if the communication circuitry 55 had not been active, and vice versa.

First Aspect of Display Control

FIG. 55 is a flowchart illustrating a first aspect of the display control in accordance with the display control program 56f.

The processor 53 launches, namely, executes one of the application programs 56b to 56e in response to the user's selection (S400). The selection is made by way of, for example, the user's tap on an icon representing any of the application programs 56b to 56e on the sensitive display 54, and the processor 53 detects the tap on the icon.

While the one of the application programs 56b to 56e is executed, the processor 53 determines whether or not the communication circuitry 55 is active or not (S401).

As described above, the communication circuitry 55 becomes activated or deactivated by way of, for example, the user's operation such as a tap or hover of his/her finger on or above a predetermined icon displayed on the sensitive display 54 and a predetermined gesture on or above the sensitive display 54.

If the communication circuitry 55 is not active (S401: No), the processor 53 generates video signals representing a screen of the executed application program and sends the video signals to the sensitive display 54 (S402). Accordingly, the screen of the executed application program is displayed on the sensitive display 54. The screen of the executed application program may contain one or more tappable objects such as a HTML link, a text-input field, a software button, a software keyboard, and the like. The processor 53 does not generate video signals representing an indicator indicative of the location of hover even if such hover is detected by the sensitive display 54.

If the communication circuitry 55 is active (S401: Yes), the processor 53 generates video signals representing the screen of the executed application program and also generates video signals representing an indicator over the screen. The indicator indicates the hover location by being displayed at the location of hover detected by the processor 53 over the screen. The processor 53 then sends the generated video signals of the screen and the indicator to the communication circuitry 52 through the communication circuitry 55 (S403).

In this manner, the screen of the executed application program and the indicator indicative of the location of the user's finger's hover over the screen are displayed on the remote display device 51. The screen of the executed application program may contain one or more tappable object such as a HTML link, a text-input field, a software button, and a software keyboard.

While the screen of the executed application program and the indicator are displayed on the sensitive display 54 or on the remote display device 51 in accordance with S402 or S403, the processor 53 operates in response to the user's tap on the tappable objects contained in the screen in accordance with the executed application program (S404).

Second Aspect of Display Control

FIG. 56 is a flowchart illustrating a second aspect of the display control in accordance with the display control program 56f.

The processor 53 launches, namely, executes the OS 56a in response to activating or powering on the computing device 50 (S500). The activation is made, for example, by way of the user's turning on the computing device 50.

While the OS 56a is executed, the processor 53 determines whether or not the communication circuitry 55 is active or not (S501).

As described above, the communication circuitry 55 becomes activated or deactivated by way of, for example, the user's operation such as a tap or hover of his/her finger on or above a predetermined icon displayed on the sensitive display 54 and a predetermined gesture on or above the sensitive display 54.

If the communication circuitry 55 is not active (S501: No), the processor 53 generates video signals representing a screen of the OS 56a and sends the video signals to the sensitive display 54 (S502). Accordingly, the screen of the OS 56a is displayed on the sensitive display 54. The screen of the OS 56a may contain one or more tappable icons representing one or more of the application programs 56b to 56e.

If the communication circuitry 55 is active (S501: Yes), the processor 53 generates video signals representing the screen of the OS 56a and also generates video signals representing an indicator over the screen. The indicator indicates the hover location by being displayed at the location of hover detected by the processor 53 over the screen. The processor 53 then sends the generated video signals of the screen and the indicator to the communication circuitry 52 through the communication circuitry 55 (S503).

In this manner, the screen of the OS 56a and the indicator indicative of the location of the user's finger's hover over the screen are displayed on the remote display device 51. The screen of the OS 56a contains one or more tappable icons representing one or more of the application programs 56b to 56e.

While the screen of the OS 56a and the indicator are displayed on the sensitive display 54 or on the remote display device 51 in accordance with S502 or S503, the processor 53 operates in response to the user's tap on the tappable icons contained in the screen in accordance with the OS 56a (S504).

Third Aspect of Display Control

FIG. 57 is a flowchart illustrating a third aspect of the display control in accordance with the display control program 56f.

The display control of FIG. 57 is operated when the communication circuitry 55 becomes activated. While the communication circuitry 55 is not active, as mentioned above with reference to FIGS. 55 and 56, the screen of the OS 56a or one of the application programs 56b to 56e is displayed on the sensitive display 54 (S402, S502).

In this situation, if the user operates to activate the communication circuitry 55 by, for example, tapping on a predetermined icon on the sensitive display 54, the processor 53 activates the communication circuitry 55 (S600).

The processor 53 then stops displaying the screen on the sensitive display 54 (S601). More specifically, the processor 53 may stop sending the video signals of the screen to the sensitive display 54.

Instead, the processor 53 starts generating video signals representing an indicator indicative of the location of hover detected by the processor 53. The processor 53 then starts sending to the remote display device 54 via the communication circuitry 55 video signals of the screen and the indicator (602).

Fourth Aspect of Display Control

FIG. 58 is a flowchart illustrating a fourth aspect of the display control in accordance with the display control program 56f.

The display control of FIG. 58 is operated when the communication circuitry 55 becomes deactivated. While the communication circuitry 55 is active, as mentioned above with reference to FIGS. 55 and 56, video signals representing the screen of the OS 56a or one of the application programs 56b to 56e as well as an indicator indicative of the location of hover detected by the processor 53 are being sent to the remote display device 54.

In this situation, if the user operates to deactivate the communication circuitry 55 by, for example, tapping on a predetermined icon on the sensitive display 54, the processor 53 deactivates the communication circuitry 55 (S700).

The processor 53 then stops sending the video signals of the screen and the indicator (S701). In S701, the processor 53 may also stop generating the video signals representing the indicator.

Instead, the processor 53 then starts displaying the screen, without the indicator, on the sensitive display 54 (S702). More specifically, the processor 53 starts sending video signals of the screen to the sensitive display 54.

Examples of Screen

The detail of how the screen is displayed in accordance with the above-mentioned first to fourth aspects of display control is explained below.

FIGS. 59 and 60 illustrate how the screen is displayed if the executed application program is the WWW (World Wide Web) browser 56b.

As illustrated in FIG. 59, while the communication circuitry 55 is not active, the screen of the WWW browser 56b is displayed on the sensitive display 54. An indicator indicative of hover is not generated and displayed over the screen even if such hover is detected by the sensitive display 54. HTML links 60 and graphical buttons 61 contained in the screen are tappable by the user's finger 62 for operation of the WWW browser 56b.

As illustrated in FIG. 60, while the communication circuitry 55 is active, the video signals of the screen of the WWW browser 56b and the indicator 63 are sent from the computing device 50 to the remote display device 51. Accordingly, the indicator 63 indicative of the location of hover detected by the processor 53 during the display of the screen is displayed over the screen at the remote display device 51.

FIGS. 61 and 62 illustrate how the screen is displayed if the executed application program is a video game 56c.

As illustrated in FIG. 61, while the communication circuitry 55 is not active, the screen of the video game 56c is displayed on the sensitive display 54. An indicator indicative of hover is not generated and displayed over the screen even if such hover is detected by the sensitive display 54. Graphical buttons 64 contained in the screen are tappable by the user's finger 62 for operation of the video game 56c.

As illustrated in FIG. 62, while the communication circuitry 55 is active, the video signals of the screen of the video game 56c and the indicator 63 are sent from the computing device 50 to the remote display device 54. Accordingly, the indicator 63 indicative of the location of hover detected by the processor 53 during the display of the screen is displayed over the screen.

FIGS. 63 and 64 illustrate how the screen is displayed if the executed application program is the text editor 56d.

As illustrated in FIG. 63, while the communication circuitry 55 is not active, the screen of the text editor 56d is displayed on the sensitive display 54. An indicator indicative of hover is not generated and displayed over the screen even if such hover is detected by the sensitive display 54. Graphical keyboard 65 contained in the screen is tappable for operation of the text editor 56d, namely, for text inputting.

As illustrated in FIG. 64, while the communication circuitry 55 is active, the video signals of the screen of the text editor 56d and the indicator 63 are sent from the computing device 50 to the remote display device 51. Accordingly, the indicator 63 indicative of the location of hover detected by the processor 53 during the display of the screen is displayed over the screen.

FIGS. 65 and 66 illustrate how the screen is displayed if the executed application program is the media player 56e.

As illustrated in FIG. 65, while the communication circuitry 55 is not active, the screen of the media player 56e is displayed on the sensitive display 54. An indicator indicative of hover is not generated and displayed over the screen even if such hover is detected by the sensitive display 54. Thumbnails 66 of pictures or movies that appear in the screen are tappable for operation of the media player 56e, namely, for displaying an enlarged picture corresponding to the tapped thumbnail at an area 67 or for playing a movie corresponding to the tapped thumbnail at the area 67.

As illustrated in FIG. 66, while the communication circuitry 55 is active, the video signals of the screen of the media player 56e and the indicator 63 are sent from the computing device 50 to the remote display device 54. Accordingly, the indicator 63 indicative of the location of hover detected by the processor 53 during the display of the screen is displayed over the screen.

FIGS. 67 and 68 illustrate how the screen is displayed when the OS 56a is executed.

As illustrated in FIG. 67, while the communication circuitry 55 is not active, the screen of the OS 56a is displayed on the sensitive display 54. An indicator indicative of hover is not generated and displayed over the screen even if such hover is detected by the sensitive display 54. Icons 68 representing the application programs 56b to 56e that appear in the screen are tappable for operation of the OS 56a, namely, for launching one of the application programs 56b to 56e corresponding to the tapped icon.

As illustrated in FIG. 68, while the communication circuitry 55 is active, the video signals of the screen of the OS 56a and the indicator 63 are sent from the computing device 50 to the remote display device 54. Accordingly, the indicator 63 indicative of the location of hover detected by the processor 53 during the display of the screen is displayed over the screen.

Examples of Indicator

The indicator 63 can be shaped and/or colored in any manner within the scope of its intention to indicate hover location. For example, the indicator 63 can be shaped to be a form of an arrow as depicted in FIG. 69, or can be shaped to be a form of a circle and colored translucently or transparently as depicted in FIG. 70.

Advantage

According to the above-mentioned first to fourth aspects of the second embodiment, when the user enjoys the computer programs with his/her eyes on the screen displayed on the remote display device 51 with the communication circuitry 55 being active, the indicator 63 indicates, on the remote display device 51, the location of his/her finger hovering over the sensitive display 54. Therefore, the user can easily recognize where in the sensitive display 54 he/she should tap on in order to tap the tappable objects 60, 61, 64, 65, 66, or 68 within the screen while he/she is keeping watching the screen displayed on the remote display device 51.

On the other hand, when the user enjoys the computer programs with his/her eyes on the screen displayed on the sensitive display 54, the indicator 63 is not displayed over the screen because he/she can recognize where to tap without the indicator 63 because he/she can see the finger hovering in proximity over the sensitive display 54 while he/she is watching the screen displayed on the sensitive display 54.

In this way, usability can be highly improved because an indicator indicative of detected hover are displayed suitably or ideally depending on whether or not a computing device is communicatable with a remote display device. Therefore, usability in operation through the sensitive display 54 can be improved.

Fifth Aspect of Display Control

FIG. 71 is a flowchart illustrating a fifth aspect of the display control performed in accordance with the display control program 56*f*.

The processor 53 launches, namely, executes one of the application programs 56*b* to 56*e* in response to the user's selection (S800). The selection is made by way of, for example, the user's tap on an icon representing the application programs 56*b* to 56*e* on the sensitive display 54, and the processor 53 detects the tap on the icon.

While the one of the application programs 56*b* to 56*e* is executed, the processor 53 determines whether or not the communication circuitry 55 is active or not (S801).

As described above, the communication circuitry 55 becomes activated or deactivated by way of, for example, the user's operation such as a tap or hover of his/her finger on or above a predetermined icon displayed on the sensitive display 54 and a predetermined gesture on or above the sensitive display 54.

If the communication circuitry 55 is not active (S801: No), the processor 53 generates video signals representing a screen of the executed application program, and sends the video signals to the sensitive display 54 (S802). Accordingly, the screen of the executed application program is displayed on the sensitive display 54. The screen of the executed application program may contain one or more tappable objects such as a HTML link, a text-input field, a software button, a software keyboard, and the like. Each tappable object in a screen has a predefined default appearance such as, for example, size and color. In S802, each tappable object is displayed in its predefined default appearance.

If the communication circuitry 55 is active (S801: Yes), the processor 53 continuously determines whether or not hover is made above a tappable object in the displayed screen (S803). The determination can be made by, for example, comparing the location of a tappable object with the location of hover detected by the processor 53. If the processor 53 determines that hover is made above a tappable object (S803: Yes), the processor 53 emphasizes the tappable object (S804). The emphasizing can be made by, for example, changing the predefined default appearance of the tappable object. The changing includes, without limitation, enlarging or zooming up the predefined default size of the tappable object and highlighting the predefined default color of the tappable object. The processor 53 then generates video signals representing the screen of the executed application program with the emphasized tappable object, and sends the generated video signals to the communication circuitry 52 through the communication circuitry 55 (S805).

If the processor 53 determines that hover is not made above a tappable object (S803: NO), the processor 53 does not perform the emphasizing.

In this manner, the screen of the executed application program is displayed on the remote display device 51, with the tappable object emphasized while hover of the user's finger exists above the tappable object. The steps S801 to S805 may be continuously performed while an application program is executed.

While the screen of the executed application program is displayed on the sensitive display 54 or on the remote display device 51 in accordance with S802 or S805, the processor 53 operates in response to the user's tap on the tappable objects contained in the screen in accordance with the executed application program (S806).

Sixth Aspect of Display Control

FIG. 72 is a flowchart illustrating a sixth aspect of the display control performed in accordance with the display control program 56*f*.

The processor 53 launches, namely, executes the OS 56*a* in response to activating or powering on the computing device 50 (S900). The activation is made, for example, by way of the user's turning on the computing device 50.

While the OS 56*a* is executed, the processor 53 determines whether or not the communication circuitry 55 is active or not (S901).

As described above, the communication circuitry 55 becomes activated or deactivated by way of, for example, the user's operation such as a tap or hover of his/her finger on or above a predetermined icon displayed on the sensitive display 54 and a predetermined gesture on or above the sensitive display 54.

If the communication circuitry 55 is not active (S901: No), the processor 53 generates video signals representing a screen of the OS 56*a* and sends the video signals to the sensitive display 54 (S902). Accordingly, the screen of the OS 56*a* is displayed on the sensitive display 54. The screen of the OS 56*a* may contain one or more tappable icons representing one or more of the application programs 56*b* to 56*e*. Each tappable icon in a screen has a predefined default appearance such as, for example, size and color.

In S902, each tappable icon is displayed in its predefined default appearance.

If the communication circuitry 55 is active (S901: Yes), the processor 53 continuously determines whether or not hover is made above a tappable icon in the displayed screen (S903). The determination can be made by, for example, comparing the location of a tappable icon with the location of hover detected by the processor 53. If the processor 53 determines that hover is made above a tappable icon (S903: Yes), the processor 53 emphasizes the tappable icon (S904). The emphasizing can be made by, for example, changing the predefined default appearance of the tappable icon. The changing includes, without limitation, enlarging or zooming up the predefined default size of the tappable icon and highlighting the predefined default color of the tappable icon. The processor 53 then generates video signals representing the screen of the OS 56*a* with the emphasized tappable icon, and sends the generated video signals to the communication circuitry 52 through the communication circuitry 55 (S905).

If the processor 53 determines that hover is not made above a tappable icon (S903: NO), the processor 53 does not perform the emphasizing.

In this manner, the screen of the OS 56a is displayed on the remote display device 51, with the tappable icon emphasized when hover of the user's finger exists above the tappable icon. The steps S901 to S905 may be continuously performed while the OS 56a is executed.

While the screen of the OS 56a is displayed on the sensitive display 54 or on the remote display device 51 in accordance with S902 or S905, the processor 53 operates in response to the user's tap on the tappable icons contained in the screen in accordance with the OS 56a (S906).

Seventh Aspect of Display Control

FIG. 73 is a flowchart illustrating a seventh aspect of the display control in accordance with the display control program 56f.

The display control of FIG. 73 is operated when the communication circuitry 55 becomes activated. While the communication circuitry 55 is not active, as mentioned above with reference to FIGS. 71 and 72, the screen of the OS 56a or one of the application programs 56b to 56e is displayed on the sensitive display 54 (S802, S902).

In this situation, if the user operates to activate the communication circuitry 55 by, for example, tapping on a predetermined icon on the sensitive display 54, the processor 53 activates the communication circuitry 55 (S1000).

The processor 53 then stops displaying the screen on the sensitive display 54 (S1001). More specifically, the processor 53 may also stop sending video signals of the screen to the sensitive display 54.

Instead, the processor 53 starts sending of the screen to the remote display device 51 via the communication circuitry 55 (1002). The processor 53 also starts emphasizing the tappable object or icon above which hover is made as described in S804, S805, S904, and S905 (S1003).

Eighth Aspect of Display Control

FIG. 74 is a flowchart illustrating a eighth aspect of the display control in accordance with the display control program 56f.

The display control of FIG. 74 is operated when the communication circuitry 55 becomes deactivated. While the communication circuitry 55 is active, as mentioned above with reference to FIGS. 71 and 72, video signals representing the screen of the OS 56a or one of the application programs 56b to 56e is being sent to the remote display device 54. A tappable object or a tappable icon contained in the screen becomes emphasized if the processor 53 determines that hover exists above the tappable object or tappable icon.

In this situation, if the user operates to deactivate the communication circuitry 55 by, for example, tapping on a predetermined icon on the sensitive display 54, the processor 53 deactivates the communication circuitry 55 (S1100).

The processor 53 then stops sending the video signals of the screen (S1101). The processor 53 also stops emphasizing the tappable object or icon even if hover is detected above the tappable object or icon (S1102).

Instead, the processor 53 then starts displaying the screen on the sensitive display 54 (S1103). More specifically, the processor 53 starts sending video signals of the screen to the sensitive display 54.

Examples of Screen

The detail of how the screen is displayed in accordance with the above-mentioned fifth to eighth aspects of display control is explained below.

FIGS. 75 and 76 illustrate how the screen is displayed if the executed application program is the WWW (World Wide Web) browser 56b.

As illustrated in FIG. 75, while the communication circuitry 55 is not active, the screen of the WWW browser 56b is displayed on the sensitive display 54. HTML links 60 and graphical buttons 61 contained in the screen are tappable by the user's finger 62 for operation of the WWW browser 56b. Each of the HTML links 60 and the graphical buttons 61 is displayed in its predefined default appearance.

While the communication circuitry 55 is active, the processor 53 continuously determines whether or not hover is made above any of the HTML links 60 and the graphical buttons 61. As illustrated in FIG. 76, if hover is made above one of the HTML links 60 entitled "Today's topic", the HTML link 60 entitled "Today's topic" is emphasized. Accordingly, the video signals of the screen of the WWW browser 56b, with the HTML link entitled "Today's topic" being emphasized, are sent from the computing device 50 to the remote display device 51 as long as hover exists above the HTML link entitled "Today's topic". The HTML link 60 entitled "Today's topic" is thus displayed in the emphasized appearance as long as hover exists above the HTML link 60 entitled "Today's topic". The emphasizing may be, for example, enlarging the HTML link 60 entitled "Today's topic" as depicted in FIG. 76. The emphasizing stops if hover does not exist from above the HTML link 60 entitled "Today's topic" because, for example, the user has moved his/her finger 62 away from above the HTML link 60 entitled "Today's topic", and then the HTML link 60 entitled "Today's topic" is displayed in its predefined default appearance again.

FIGS. 77 and 78 illustrate how the screen is displayed if the executed application program is a video game 56c.

As illustrated in FIG. 77, while the communication circuitry 55 is not active, the screen of the video game 56c is displayed on the sensitive display 54. Graphical buttons 64 contained in the screen are tappable by the user's finger 62 for operation of the video game 56c.

While the communication circuitry 55 is active, the processor 53 continuously determines whether or not hover is made above any of the graphical buttons 64. As illustrated in FIG. 78, if hover is made above one of the graphical buttons 64, namely, a circular graphical button 64, the circular graphical button 64 is emphasized. Accordingly, the video signals of the screen of the video game 56c, with the circular graphical button 64 being emphasized, are sent from the computing device 50 to the remote display device 51 as long as hover exists above the circular graphical button 64. The circular graphical button 64 is thus displayed in the emphasized appearance as long as hover exists above the circular graphical button 64. The emphasizing may be, for example, changing the size and the color of the circular graphical button 64 as illustrated in FIG. 78. The emphasizing stops if hover does not exist above the circular graphical button 64 because, for example, the user has moved his/her finger 62 away from above the circular graphical button 64, and then the circular graphical button 64 is displayed in its predefined default appearance gain.

FIGS. 79 and 80 illustrate how the screen is displayed if the executed application program is the text editor 56d.

While the communication circuitry 55 is not active, the screen of the text editor 56*d* is displayed on the sensitive display 54. Graphical keyboard 65 contained in the screen is tappable for operation of the text editor 56*d*, namely, for text inputting. The graphical keyboard 65 is displayed with every key displayed in its predefined default appearance.

While the communication circuitry 55 is active, the processor 53 continuously determines whether or not hover is made above any key of the graphical keyboard 65. As illustrated in FIG. 80, if hover is made above a key, namely, a "V" key in the graphical keyboard 65, the "V" key is emphasized. Accordingly, the video signals of the screen of the text editor 56*d*, with the "V" key being emphasized, are sent from the computing device 50 to the remote display device 51 as long as hover exists above the "V" key. The graphical keyboard 65 is thus displayed with the "V" key displayed in the emphasized appearance as long as hover exists above the "V" key. The emphasizing may be, for example, enlarging the "V" key as illustrated in FIG. 80. The emphasizing stops if hover does not exist because, for example, the user has moved his/her finger 62 away from above the "V" key, and then the "V" key is displayed in its predefined default appearance again.

FIGS. 81 and 82 illustrate how the screen is displayed if the executed application program is the media player 56*e*.

As illustrated in FIG. 81, while the communication circuitry 55 is not active, the screen of the media player 56*e* is displayed on the sensitive display 54. Thumbnails 66 of pictures or movies that appear in the screen are tappable for operation of the media player 56*e*, namely, for displaying an enlarged picture corresponding to the tapped thumbnail at an area 67 or for playing a movie corresponding to the tapped thumbnail at the area 67. Each thumbnail 66 is displayed in its predefined default appearance.

While the communication circuitry 55 is active, the processor 53 continuously determines whether or not hover is made above any of the thumbnails 66. As illustrated in FIG. 82, if hover is made above the upper thumbnail 66, the upper thumbnail 66 is emphasized. Accordingly, the video signals of the screen of the media player 56*e*, with the upper thumbnail 66 emphasized, are sent from the computing device 50 to the remote display device 51 as long as hover exists above the upper thumbnail 66. The upper thumbnail 66 is thus displayed in the emphasized appearance as long as hover exists above the upper thumbnail 66. The emphasizing may be, for example, changing the size and color of the upper thumbnail 66 as illustrated in FIG. 82. The emphasizing stops if hover does not exist above the upper thumbnail 66 because, for example, the user has moved his/her finger 62 away from above the upper thumbnail 66, and then the upper thumbnail 66 is displayed in its predefined default appearance again.

FIGS. 83 and 84 illustrate how the screen is displayed when the OS 56*a* is executed.

As illustrated in FIG. 83, while the communication circuitry 55 is not active, the screen of the OS 56*a* is displayed on the sensitive display 54. Icons 68 representing the application programs 56*b* to 56*e* that appear in the screen are tappable for operation of the OS 56*a*, namely, for launching one of the application programs 56*b* to 56*e* corresponding to the tapped icon. Each icon 68 is displayed in its predefined default appearance.

While the communication circuitry 55 is active, the processor 53 continuously determines whether or not hover is made above any of the icons 68. As illustrated in FIG. 84, if hover is made above the "e" icon representing the WWW browser 56*b*, the "e" icon is emphasized. Accordingly, the video signals of the screen of the OS 56*a*, with the "e" icon emphasized, are sent from the computing device 50 to the remote display device 51 as long as hover exists above the "e" icon. The "e" icon is thus displayed in the emphasized appearance as long as hover exists above the "e" icon. The emphasizing may be, for example, changing the size and shape of the "e" icon as illustrated in FIG. 84. The emphasizing stops if hover does not exist because, for example, the user has moved his/her finger 62 away from above the "e" icon, and then the "e" icon is displayed in its predefined default appearance again.

Advantage

According to the fifth to eighth aspects of display control of the second embodiment, when the user enjoys the computer programs with his/her eyes on the screen displayed on the remote display device 51 with the communication circuitry 55 being active, a tappable object which is about to be tapped is emphasized. Therefore, the user can easily recognize where in the sensitive display 54 he/she should tap on or how far he/she should move the finger in order to tap the tappable objects 60, 61, 64, 65, 66, or 68 within the screen while he/she is keeping watching the screen displayed on the remote display device 51.

On the other hand, when the user enjoys the computer programs with his/her eyes on the screen displayed on the sensitive display 54, tappable objects are not emphasized because he/she can recognize where to tap without the emphasizing because he/she can see the finger hovering in proximity over the sensitive display 54 while he/she is watching the screen displayed on the sensitive display 54.

In this way, usability can be highly improved because a tappable object is emphasized suitably or ideally depending on whether or not a computing device is communicatable with a remote display device. Therefore, usability in operation through the sensitive display 54 can be improved.

Ninth Aspect of Display Control

FIG. 85 is a flowchart illustrating a ninth aspect of the display control in accordance with the display control program 56*f*.

The processor 53 launches, namely, executes one of the application programs 56*b* to 56*e* in response to the user's selection (S1300). The selection is made by way of, for example, the user's tap on an icon representing any of the application programs 56*b* to 56*e* on the sensitive display 54, and the processor 53 detects the tap on the icon.

While the one of the application programs 56*b* to 56*e* is executed, the processor 53 determines whether or not the communication circuitry 55 is active or not (S1301).

As described above, the communication circuitry 55 becomes activated or deactivated by way of, for example, the user's operation such as a tap or hover of his/her finger on or above a predetermined icon displayed on the sensitive display 54 and a predetermined gesture on or above the sensitive display 54.

If the communication circuitry 55 is active (S1301: Yes), the processor 53 determines whether or not a screen of the executed application program contains one or more tappable objects such as a HTML link, a text-input field, a software button, and a software keyboard (S1303). If at least one tappable object is contained in the screen (S1303: Yes), the processor 53 generates video signals representing the screen of the executed application program and also generates video signals representing an indicator over the screen. The indicator indicates the hover location by being displayed at the location of hover detected by the processor 53 over the screen. The processor 53 then sends the generated video signals of the screen and the indicator to the communication circuitry 52 through the communication circuitry 55 (S1305). In this manner, the screen of the executed application program and the indicator indicative of the location of, for example, the user's finger's hover over the screen are displayed on the remote display device 51.

On the other hand, if no tappable object is contained in the screen (S1303: No), the processor 53 generates video signals representing the screen of the executed application program, but does not generate video signals representing the indicator even if hover is detected. The processor 53 then sends the generated video signals of the screen to the communication circuitry 52 through the communication circuitry 55 (S1304).

Back in S1301, if the communication circuitry 55 is not active (S1301: No), the processor 53 generates video signals representing a screen of the executed application program and sends the video signals to the sensitive display 54 (S1302). Accordingly, the screen of the executed application program is displayed on the sensitive display 54. The screen of the executed application program may contain one or more tappable objects such as a HTML link, a text-input field, a software button, a software keyboard, and the like. The processor 53 does not determine whether or not the screen contains one or more tappable objects, or generate video signals representing the indicator even if hover is detected by the sensitive display 54.

While the screen of the executed application program and the indicator are displayed on the sensitive display 54 according to S1305 or the screen is displayed on the remote display device 51 according to S1302, the processor 53 operates in response to the user's tap on the tappable objects contained in the screen in accordance with the executed application program (S1306).

Tenth Aspect of Display Control

FIG. 86 is a flowchart illustrating a tenth aspect of the display control in accordance with the display control program 56f.

The display control of FIG. 86 is operated when the communication circuitry 55 becomes activated. While the communication circuitry 55 is not active, as mentioned above with reference to FIG. 85, the screen of one of the application programs 56b to 56e is displayed on the sensitive display 54 (S1302).

In this situation, if the user operates to activate the communication circuitry 55 by, for example, tapping on a predetermined icon on the sensitive display 54, the processor 53 activates the communication circuitry 55 (S1400).

The processor 53 then stops displaying the screen on the sensitive display 54 (S1401). More specifically, the processor 53 may stop sending the video signals of the screen to the sensitive display 54. The processor 53 may also turn off the sensitive display 54.

Instead, the processor 53 starts determining whether or not the screen contains at least one tappable objects (S1402). The processor 53 starts generating video signals based on the determination at S1402 and sending the generated video signals to the communication circuitry 52 through the communication circuitry 55 (S1403). Namely, the processor 53 generates video signals representing the screen and the indicator indicative of the location of hover detected by the processor 53 as long as the processor 53 determines that at least one tappable object is contained in the screen, whereas the processor 53 generates video signals representing the screen but does not generate video signals representing the indicator as long as the processor 53 determines that no tappable object is contained.

Eleventh Aspect of Display Control

FIG. 87 is a flowchart illustrating an eleventh aspect of the display control in accordance with the display control program 56f.

The display control of FIG. 87 is operated when the communication circuitry 55 becomes deactivated. While the communication circuitry 55 is active, as mentioned above with reference to FIG. 85, video signals representing the screen only or representing the screen and the indicator are being sent to the remote display device 51 based on the determination whether or not the screen contains at least one tappable object.

In this situation, if the user operates to deactivate the communication circuitry 55 by, for example, tapping on a predetermined icon on the sensitive display 54, the processor 53 deactivates the communication circuitry 55 (S1500).

The processor 53 then stops determining whether or not the screen contains at least one tappable object (S1501) and also stops sending the video signals to the remote display device 54 (S1502).

Instead, the processor 53 then starts displaying the screen, without the indicator, on the sensitive display 54 (S1503). More specifically, the processor 53 starts sending video signals of the screen only to the sensitive display 54.

Examples of Screen

The detail of how the screen is displayed in accordance with the above-mentioned ninth to eleventh aspects of display control is explained below.

FIGS. 88 through 90 illustrate how the screen is displayed if the executed application program is the WWW (World Wide Web) browser 56b.

As illustrated in FIG. 88, while the communication circuitry 55 is not active, the screen of the WWW browser 56b is displayed on the sensitive display 54. An indicator indicative of hover is not generated and displayed over the screen even if such hover is detected by the sensitive display 54. Tappable objects of HTML links 60 and graphical buttons 61 may appear in the screen for operation of the WWW browser 56b.

As illustrated in FIG. 89, while the communication circuitry 55 is active, as long as the tappable objects 60 and 61 appear in the screen of the WWW browser 56b, the video signals of the screen and the indicator 63 indicative of hover location are sent from the computing device 50 to the remote display device 51. Accordingly, the indicator 63 indicative of the location of hover detected by the processor 53 during the display of the screen is displayed over the screen at the remote display device 51. On the other hand, even while the communication circuitry 55 is active, as long as the screen contains no tappable object, the video signals of the screen only are sent from the computing device 50 to the remote display device 51. As illustrated in FIG. 90, the screen may contain no tappable object when, for example, the browser 56b displays a movie streamed from a video streaming website in a full-screen manner.

FIGS. 91 through 93 illustrate how the screen is displayed if the executed application program is a video game 56c.

As illustrated in FIG. 91, while the communication circuitry 55 is not active, the screen of the video game 56c is displayed on the sensitive display 54. An indicator indicative of hover is not generated and displayed over the screen even if such hover is detected by the sensitive display 54. The screen may contain graphical buttons 64 to be tapped by the user's finger 62 for operation of the video game 56c.

As illustrated in FIG. 92, while the communication circuitry 55 is active, as long as the screen contains the graphical buttons 64, the video signals of the screen of the video game 56c and the indicator 63 are sent from the computing device 50 to the remote display device 54. Accordingly, the indicator 63 indicative of the location of hover detected by the processor 53 during the display of the screen is displayed over the screen. On the other hand, even while the communication circuitry 55 is active, as long as the screen contains none of the graphical buttons 64, the video signals of the screen only are sent from the computing device 50 to the remote display device 54. As illustrated in FIG. 93, the screen contains none of the graphical buttons 64 when, for example, the video game 56c can be operated by the user's gesture on or above the screen instead of tapping on the graphical buttons 64.

FIGS. 94 through 96 illustrate how the screen is displayed if the executed application program is the media player 56e.

As illustrated in FIG. 94, while the communication circuitry 55 is not active, the screen of the media player 56e is displayed on the sensitive display 54. An indicator indicative of hover is not generated and displayed over the screen even if such hover is detected by the sensitive display 54. Thumbnails 66 of pictures or movies may appear in the screen for operation of the media player 56e, namely, for displaying an enlarged picture corresponding to the tapped thumbnail at an area 67 or for playing a movie corresponding to the tapped thumbnail at the area 67.

As illustrated in FIG. 95, while the communication circuitry 55 is active, as long as the screen contains the thumbnails 66, the video signals of the screen of the media player 56e and the indicator 63 are sent from the computing device 50 to the remote display device 54. Accordingly, the indicator 63 indicative of the location of hover detected by the processor 53 during the display of the screen is displayed over the screen. On the other hand, even while the communication circuitry 55 is active, as long as the screen contains none of the thumbnails 66, the video signals of the screen only are sent from the computing device 50 to the remote display device 54. As illustrated in FIG. 96, the screen contains none of the thumbnails 66 when, for example, the enlarged picture or movie is played and displayed at the area 67 in a full-screen manner.

Examples of Indicator

The indicator 63 can be shaped and/or colored in any manner within the scope of its intention to indicate hover location. For example, the indicator 63 can be shaped to be a form of an arrow as depicted in FIG. 33A, or can be shaped to be a form of a circle and colored translucently or transparently as depicted in FIG. 70.

Advantage

According to the above-mentioned ninth to eleventh aspects of the second embodiment, even when the user enjoys the computer programs with his/her eyes on the screen displayed on the remote display device 51 with the communication circuitry 55 being active, the indicator 63 does not appear on the remote display 54 as long as the user does not need to recognize where to tap because no tappable object appears on the remote display 54. In other words, an indicator indicative of detected hover is displayed suitably or ideally depending on the user's need. Therefore, usability in operation through the sensitive display 54 can be improved.

Twelfth Aspect of Display Control

FIG. 97 is a flowchart illustrating a twelfth aspect of the display control performed in accordance with the display control program 56f.

The processor 53 launches, namely, executes one of the application programs 56b to 56e in response to the user's selection (S1600). The selection is made by way of, for example, the user's tap on an icon representing the application programs 56b to 56e on the sensitive display 54, and the processor 53 detects the tap on the icon.

While the one of the application programs 56b to 56e is executed, the processor 53 determines whether or not the communication circuitry 55 is active or not (S1601).

As described above, the communication circuitry 55 becomes activated or deactivated by way of, for example, the user's operation such as a tap or hover of his/her finger on or above a predetermined icon displayed on the sensitive display 54 and a predetermined gesture on or above the sensitive display 54.

If the communication circuitry 55 is not active (S1601: No), the processor 53 continuously determines whether or not hover is made above a tappable object in the displayed screen (S1602). The determination can be made by, for example, comparing the location of a tappable object with the location of hover detected by the processor 53. If the processor 53 determines that hover is made above a tappable object (S1602: Yes), the processor 53 emphasizes the tappable object (S1603). The emphasizing can be made by, for example, changing the predefined default appearance of the tappable object. The changing includes, without limitation, enlarging or zooming up the predefined default size of the tappable object and highlighting the predefined default color of the tappable object. The processor 53 then displays the screen of the executed application program, with the emphasized tappable object, on the sensitive display 54 (S1604).

If the processor 53 determines that hover is not made above a tappable object (S1602: NO), the processor 53 does not perform the emphasizing and displays the screen on the sensitive display 54 (S1604).

In this manner, the screen of the executed application program is displayed on the sensitive display 54, with the tappable object emphasized while hover of the user's finger exists above the tappable object. The steps S1602 to S1604 may be continuously performed while an application program is executed as long as the communication circuitry is not active.

Back in S1601, if the communication circuitry 55 is active (S1601: Yes), the processor 53 generates video signals representing the screen and also generates video signals representing an indicator over the screen. The indicator indicates the hover location by being displayed at the location of hover detected by the processor 53 over the screen. The processor 53 then sends the generated video signals of the screen and the indicator to the communication circuitry 52 through the communication circuitry 55 (S1605). Accordingly, the screen and the indicator are displayed on the remote display device 51.

While the screen only is displayed on the sensitive display 54 according to S1604 or the screen and the indicator are displayed on the remote display device 51 according to S1605, the processor 53 operates in response to the user's tap on the tappable objects contained in the screen in accordance with the executed application program (S1606).

Thirteenth Aspect of Display Control

FIG. 98 is a flowchart illustrating a thirteenth aspect of the display control performed in accordance with the display control program 56*f*.

The processor 53 launches, namely, executes the OS 56*a* in response to activating or powering on the computing device 50 (S1700). The activation is made, for example, by way of the user's turning on the computing device 50.

While the OS 56*a* is executed, the processor 53 determines whether or not the communication circuitry 55 is active or not (S1701).

While the OS 56*a* is executed, the processor 53 determines whether or not the communication circuitry 55 is active or not (S1701).

As described above, the communication circuitry 55 becomes activated or deactivated by way of, for example, the user's operation such as a tap or hover of his/her finger on or above a predetermined icon displayed on the sensitive display 54 and a predetermined gesture on or above the sensitive display 54.

If the communication circuitry 55 is not active (S1701: No), the processor 53 continuously determines whether or not hover is made above a tappable object in the displayed screen (S1702). The determination can be made by, for example, comparing the location of a tappable object with the location of hover detected by the processor 53. If the processor 53 determines that hover is made above a tappable object (S1702: Yes), the processor 53 emphasizes the tappable object (S1703). The emphasizing can be made by, for example, changing the predefined default appearance of the tappable object. The changing includes, without limitation, enlarging or zooming up the predefined default size of the tappable object and highlighting the predefined default color of the tappable object. The processor 53 then displays the screen of the OS 56*a*, with the emphasized tappable object, on the sensitive display 54 (S1704).

If the processor 53 determines that hover is not made above a tappable object (S1702: NO), the processor 53 does not perform the emphasizing and displays the screen on the sensitive display 54 (S1704).

In this manner, the screen of the OS 56*a* is displayed on the sensitive display 54, with the tappable object emphasized while hover of the user's finger exists above the tappable object. The steps S1702 to S1704 may be continuously performed while an application program is executed as long as the communication circuitry is not active.

Back in S1701, if the communication circuitry 55 is active (S1701: Yes), the processor 53 generates video signals representing the screen and also generates video signals representing an indicator over the screen. The indicator indicates the hover location by being displayed at the location of hover detected by the processor 53 over the screen. The processor 53 then sends the generated video signals of the screen and the indicator to the communication circuitry 52 through the communication circuitry 55 (S1705). Accordingly, the screen and the indicator are displayed on the remote display device 51.

While the screen only is displayed on the sensitive display 54 according to S1604 or the screen and the indicator are displayed on the remote display device 51 according to S1605, the processor 53 operates in response to the user's tap on the tappable objects contained in the screen in accordance with the OS 56*a* (S1706).

Fourteenth Aspect of Display Control

FIG. 99 is a flowchart illustrating a fourteenth aspect of the display control in accordance with the display control program 56*f*.

The display control of FIG. 99 is operated when the communication circuitry 55 becomes activated. While the communication circuitry 55 is not active, as mentioned above with reference to FIGS. 97 and 98, the screen of the OS 56*a* or one of the application programs 56*b* to 56*e* is displayed on the sensitive display 54 (S1604, S1704).

In this situation, if the user operates to activate the communication circuitry 55 by, for example, tapping on a predetermined icon on the sensitive display 54, the processor 53 activates the communication circuitry 55 (S1800).

The processor 53 then stops determining whether or not hover is made above a tappable object (S1801), stops the emphasizing of tappable objects (S1802), and also stops displaying the screen on the sensitive display 54 (S1803). More specifically, the processor 53 may also stop sending video signals of the screen to the sensitive display 54.

Instead, the processor 53 starts generating video signal representing the indicator indicative of the location of hover detected by the sensitive display 54, and starts sending the video signals representing the screen and the indicator to the remote display device 51 via the communication circuitry 55 (1804).

Fifteenth Aspect of Display Control

FIG. 100 is a flowchart illustrating a fifteenth aspect of the display control in accordance with the display control program 56*f*.

The display control of FIG. 100 is operated when the communication circuitry 55 becomes deactivated. While the communication circuitry 55 is active, as mentioned above with reference to FIGS. 97 and 98, video signals representing the screen of the OS 56*a* or one of the application programs 56*b* to 56*e* as well as the indicator are being sent to the remote display device 51.

In this situation, if the user operates to deactivate the communication circuitry 55 by, for example, tapping on a predetermined icon on the sensitive display 54, the processor 53 deactivates the communication circuitry 55 (S1900).

The processor 53 then stops sending the video signals of the screen and the indicator (S1901). The processor 53 may also stop generating the video signals representing the indicator.

Instead, the processor 53 then starts determining whether or not hover is made above a tappable object contained in the screen (S1902), and starts emphasizing the tappable object responsive to determination that hover is made above the tappable object (S1903). Accordingly, the tappable object contained in the screen becomes emphasized if the processor 53 determines that hover exists above the tappable object. The processor 53 then displays the screen on the sensitive display 54 (S1904). More specifically, the processor 53 starts sending video signals of the screen to the sensitive display 54.

Examples of Screen

The detail of how the screen is displayed in accordance with the above-mentioned twelfth to fifteenth aspects of display control is explained below.

FIGS. 101 and 102 illustrate how the screen is displayed if the executed application program is the WWW (World Wide Web) browser 56b.

As illustrated in FIG. 101, while the communication circuitry 55 is not active, the screen of the WWW browser 56b is displayed on the sensitive display 54. HTML links 60 and graphical buttons 61 contained in the screen are tappable by the user's finger 62 for operation of the WWW browser 56b. Each of the HTML links 60 and the graphical buttons 61 is displayed in its predefined default appearance. As illustrated in FIG. 101, if hover of an object such as the user's finger 62 is made above the HTML link 60a labeled "Today's topic", the HTML link 60a is emphasized.

As illustrated in FIG. 102, while the communication circuitry 55 is active, the video signals of the screen of the WWW browser 56b and the indicator 63 are sent from the computing device 50 to the remote display device 51. Accordingly, the indicator 63 indicative of the location of hover detected by the processor 53 during the display of the screen is displayed over the screen at the remote display device 51.

FIGS. 103 and 104 illustrate how the screen is displayed if the executed application program is a video game 56c.

As illustrated in FIG. 103, while the communication circuitry 55 is not active, the screen of the video game 56c is displayed on the sensitive display 54. An indicator indicative of hover is not generated and displayed over the screen even if such hover is detected by the sensitive display 54. Graphical buttons 64 contained in the screen are tappable by the user's finger 62 for operation of the video game 56c. As illustrated in FIG. 103, if hover of an object such as the user's finger 62 is made above the circular graphical button 64a, the graphical button 64a is emphasized.

As illustrated in FIG. 104, while the communication circuitry 55 is active, the video signals of the screen of the video game 56c and the indicator 63 are sent from the computing device 50 to the remote display device 54. Accordingly, the indicator 63 indicative of the location of hover detected by the processor 53 during the display of the screen is displayed over the screen.

FIGS. 105 and 106 illustrate how the screen is displayed if the executed application program is the text editor 56d.

As illustrated in FIG. 105, while the communication circuitry 55 is not active, the screen of the text editor 56d is displayed on the sensitive display 54. An indicator indicative of hover is not generated and displayed over the screen even if such hover is detected by the sensitive display 54. Graphical keyboard 65 contained in the screen is tappable for operation of the text editor 56d, namely, for text inputting. As illustrated in FIG. 105, if hover of an object such as the user's finger 62 is made above a "V" key of the graphical keyboard 65, the "V" key is emphasized.

As illustrated in FIG. 106, while the communication circuitry 55 is active, the video signals of the screen of the text editor 56d and the indicator 63 are sent from the computing device 50 to the remote display device 51. Accordingly, the indicator 63 indicative of the location of hover detected by the processor 53 during the display of the screen is displayed over the screen.

FIGS. 107 and 108 illustrate how the screen is displayed if the executed application program is the media player 56e.

As illustrated in FIG. 107, while the communication circuitry 55 is not active, the screen of the media player 56e is displayed on the sensitive display 54. An indicator indicative of hover is not generated and displayed over the screen even if such hover is detected by the sensitive display 54. Thumbnails 66 of pictures or movies that appear in the screen are tappable for operation of the media player 56e, namely, for displaying an enlarged picture corresponding to the tapped thumbnail at an area 67 or for playing a movie corresponding to the tapped thumbnail at the area 67. As illustrated in FIG. 107, if hover of an object such as the user's finger 62 is made above the upper thumbnail 66a, the thumbnail 66a is emphasized.

As illustrated in FIG. 108, while the communication circuitry 55 is active, the video signals of the screen of the media player 56e and the indicator 63 are sent from the computing device 50 to the remote display device 54. Accordingly, the indicator 63 indicative of the location of hover detected by the processor 53 during the display of the screen is displayed over the screen.

FIGS. 109 and 110 illustrate how the screen is displayed when the OS 56a is executed.

As illustrated in FIG. 109, while the communication circuitry 55 is not active, the screen of the OS 56a is displayed on the sensitive display 54. An indicator indicative of hover is not generated and displayed over the screen even if such hover is detected by the sensitive display 54. Icons 68 representing the application programs 56b to 56e that appear in the screen are tappable for operation of the OS 56a, namely, for launching one of the application programs 56b to 56e corresponding to the tapped icon. As illustrated in FIG. 109, if hover of an object such as the user's finger 62 is made above the icon 68 representing the browser 56b, the icon 68 is emphasized.

As illustrated in FIG. 110, while the communication circuitry 55 is active, the video signals of the screen of the OS 56a and the indicator 63 are sent from the computing device 50 to the remote display device 54. Accordingly, the indicator 63 indicative of the location of hover detected by the processor 53 during the display of the screen is displayed over the screen.

Examples of Indicator

The indicator 63 can be shaped and/or colored in any manner within the scope of its intention to indicate hover location. For example, the indicator 63 can be shaped to be a form of an arrow as depicted in FIG. 69, or can be shaped to be a form of a circle and colored translucently or transparently as depicted in FIG. 70.

Advantage

According to the above-mentioned twelfth to fifteenth aspects of the second embodiment, when the user enjoys the computer programs with his/her eyes on the screen displayed on the remote display device 51 with the communication circuitry 55 being active, the indicator 63 indicates, on the remote display device 51, the location of his/her finger hovering over the sensitive display 54. Therefore, the user can easily recognize where in the sensitive display 54 he/she should tap on in order to tap the tappable objects 60, 61, 64, 65, 66, or 68 within the screen while he/she is keeping watching the screen displayed on the remote display device 51.

On the other hand, when the user enjoys the computer programs with his/her eyes on the screen displayed on the sensitive display 54, the indicator 63 is not displayed over the screen because he/she can recognize where to tap without the indicator 63 because he/she can see the finger hovering in proximity over the sensitive display 54 while he/she is watching the screen displayed on the sensitive display 54.

In this way, usability can be highly improved because an indicator indicative of detected hover are displayed suitably or ideally depending on whether or not a computing device is communicatable with a remote display device. Therefore, usability in operation through the sensitive display 54 can be improved.

Sixteenth Aspect of Display Control

In a sixteenth aspect of the present embodiment, the processor 53 controls display of tappable graphical keys or software keys for text input depending on whether the communication circuitry 55 is active or not.

FIG. 111 is a flowchart illustrating the sixteenth aspect of the display control in accordance with the display control program 56*f*.

While the screen of the OS 56*a* or one of the application programs 56*b* to 56*e* is displayed according to the first to fifteenth aspects of the display control depicted in FIGS. 52 to 110, the processor 53 continuously determines the location at which a tap is made within a screen based on signals representing taps sent from the sensitive display 54. The processor 53 then continuously determines whether or not a tap is made at a text input field in the screen. The text input filed is associated with one or more tappable software keys for text input.

If a tap on a text input field contained in the screen is detected (S1200), the processor 53 determines whether or not the communication circuitry 55 is active or not (S1201).

If the communication circuitry 55 is not active (S1201: No), namely, when the screen is displayed on the sensitive display 54 according to the first to fifteenth aspects of the display control, the processor 53 generates video signals representing one or more tappable software keys for text input with a first size and sends the video signals to the sensitive display 54 (S1202). The video signals representing the tappable software keys may be sent in parallel with or along with video signals representing the screen.

The first size is smaller than the size of the screen. Accordingly, the one or more software keys are displayed overlappingly along with the screen on the sensitive display 54.

If the communication circuitry 55 is active (S1201: Yes), namely, when the screen is displayed on the remote display device 51 according to the first to fifteenth aspects of the display control, the processor 53 generates video signals representing one or more tappable software keys for text input with a second size and sends the video signals to the sensitive display 54 (S1203).

The second size is larger than the first size, and can preferably be a full-screen size. Accordingly, the one or more software keys are displayed alone on the sensitive display 54.

While the one or more tappable software keys are displayed on the sensitive display 54 in accordance with S1202 or S1203, the processor 53 receives text inputs in response to the user's tap on the tappable software keys (S1204).

When the user has completed the text inputs through tapping on the tappable software keys on the sensitive display 54, the processor 53 stops sending the video signals of the tappable software keys to the sensitive display 54 (S1205, S1206). Preferably, in S1206, the processor 53 may turn off the sensitive display 54 because there is no longer anything to be displayed on the sensitive display 54 until a tap on the text input field is detected again.

Examples of Software Keys

FIGS. 112 to 115 depict how the tappable software keys are displayed when the screen of the WWW browser 56*b* is displayed. The screen of the WWW browser 56*b* contains a text input filed 70 at which a URL (Uniform Resource Locator) can be input by the user.

Figure 112:
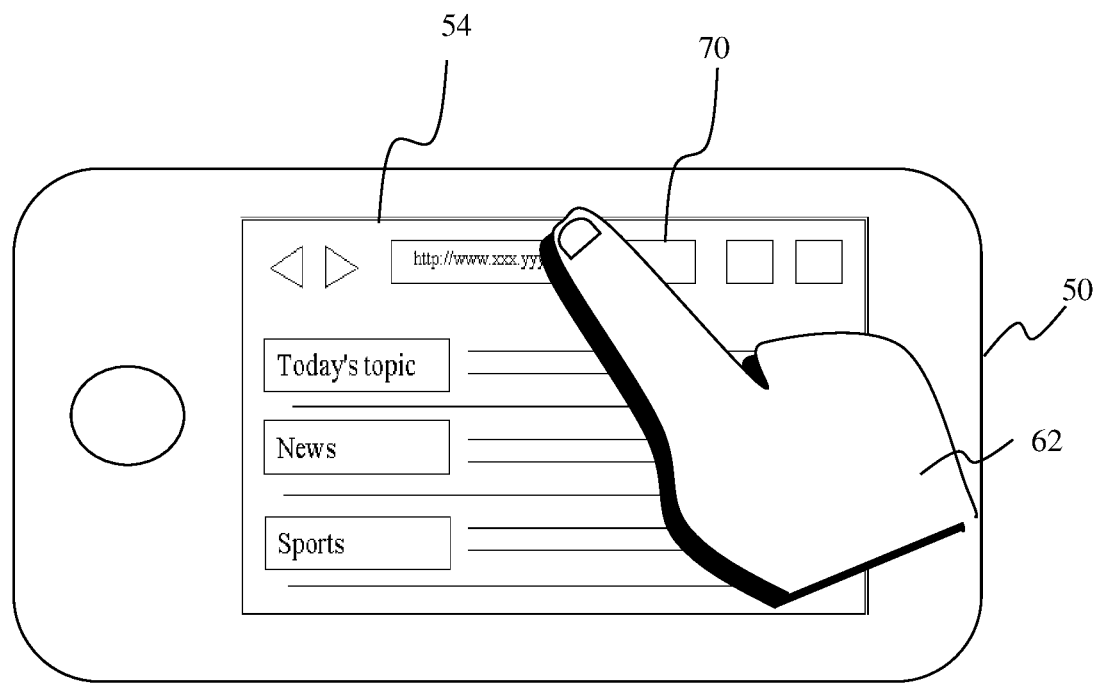

While the communication circuitry 55 is not active, the screen is displayed on the sensitive display 54 in accordance with the first to fifteenth aspects of the display control, as depicted in FIG. 112.

Figure 113:
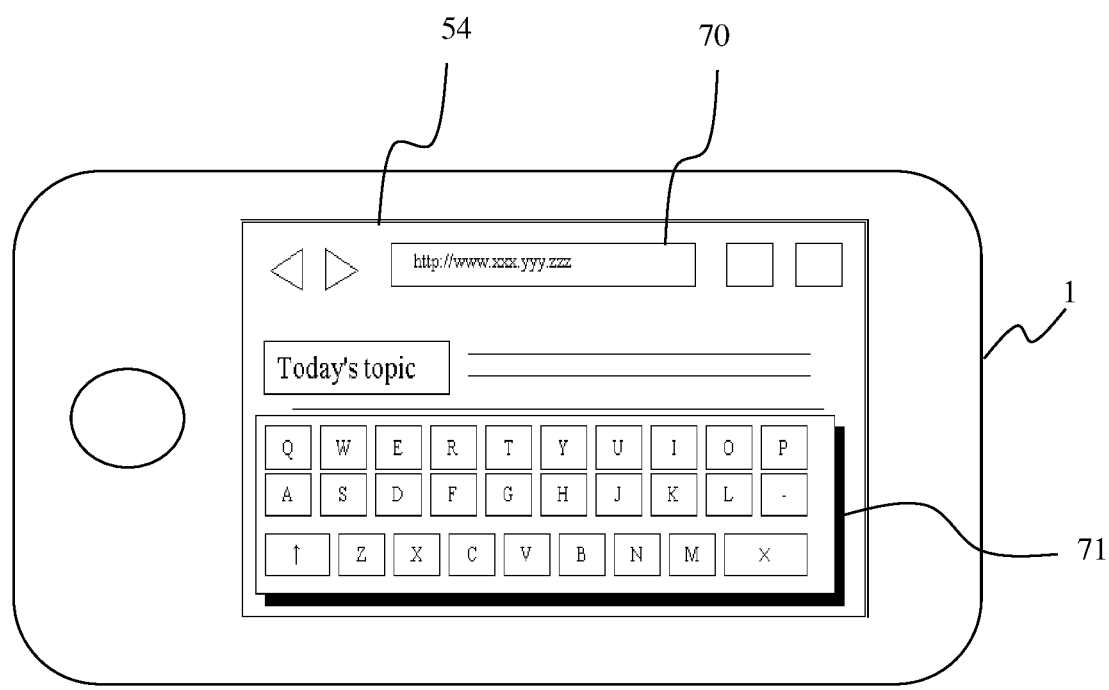

If a tap at the text input field 70 in the screen through the sensitive display 54 by the user's finger 62 is detected, the processor 53 determines whether the communication circuitry 55 is being active or not. If the communication circuitry 55 is determined to be not active, the processor 53 generates and sends video signals of a graphical keyboard 71 with the first size to the sensitive display 54. The graphical keyboard 71 includes plural tappable alphabetical keys for text input. Accordingly, the graphical keyboard 71 is displayed along with the screen of the WWW browser 56*b* as depicted in FIG. 113. In this situation, the user can perform text inputs through the graphical keyboard 71 while watching the screen on the sensitive display 54 although the graphical keyboard 71 is relatively small.

Figure 114:
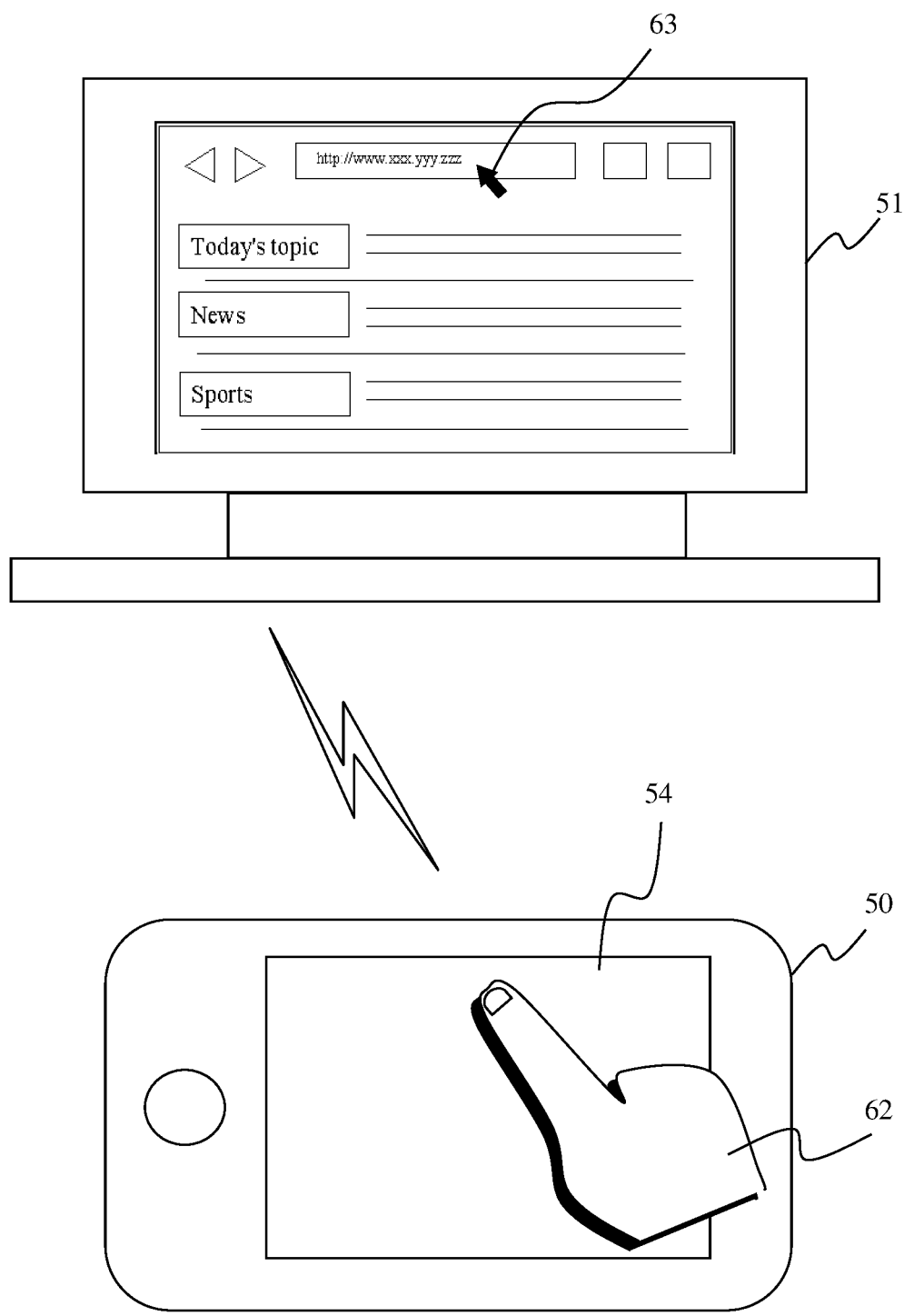

While the communication circuitry 55 is active, the screen of the WWW browser 56*b* is displayed on the remote display device 51 in accordance with the first to fifteenth aspects of the display control, as depicted in FIG. 114.

Figure 115:
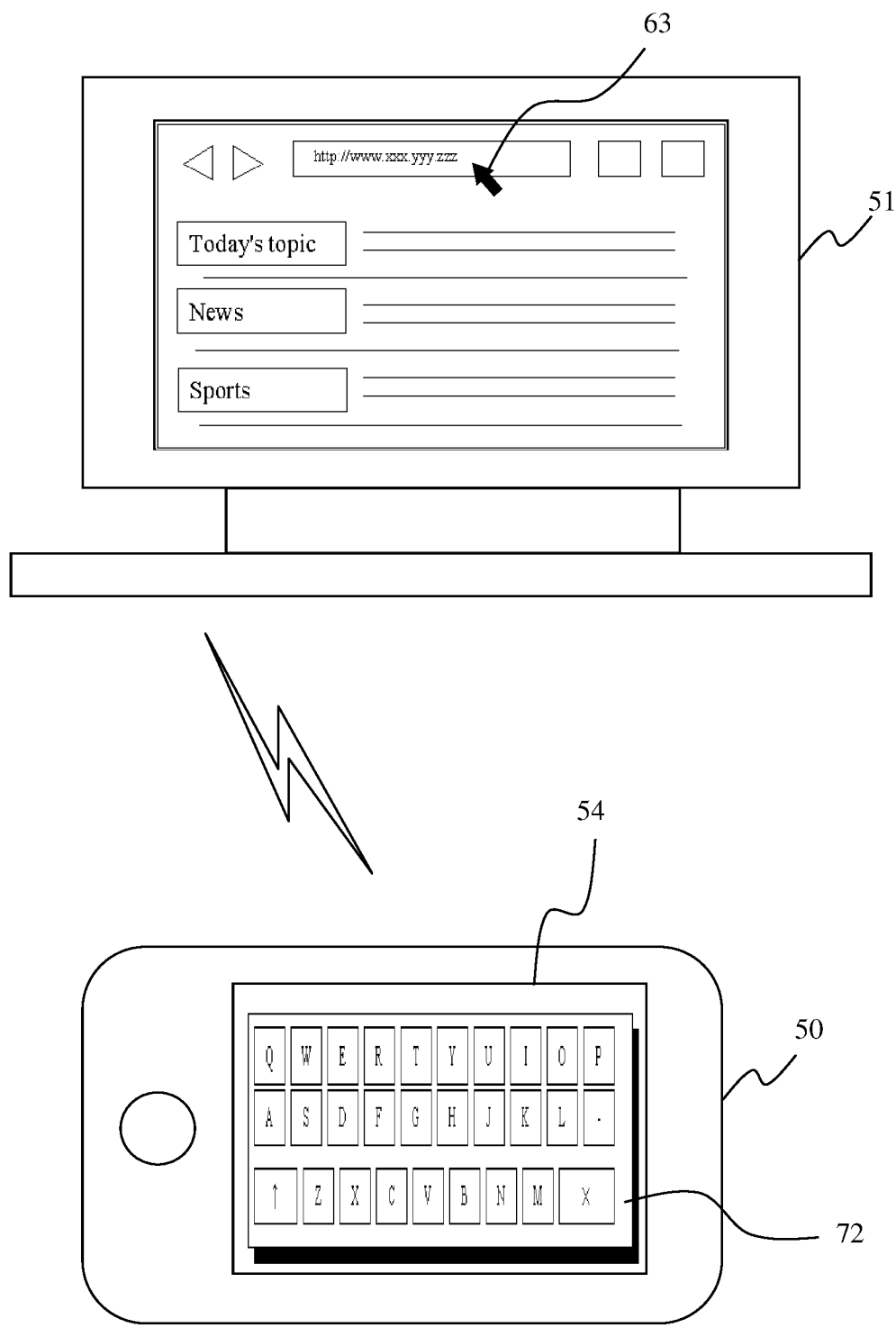

If a tap at the text input field 70 in the screen through the sensitive display 54 by the user's finger 62 is detected, the processor 53 determines whether the communication circuitry 55 is being active or not. If the communication circuitry 55 is determined to be active, the processor 53 generates and sends video signals of a graphical keyboard 71 with the second size to the sensitive display 54. Accordingly, the graphical keyboard 71 is displayed alone almost or substantially entirely on the sensitive display 54, apart from the screen of the WWW browser 56*b* displayed on the remote display device 51, as depicted in FIG. 115. In this situation, the user can perform text inputs easily because the displayed graphical keyboard 71 is relatively large.

Advantage and Note

Thanks to the above-mentioned display control, usability can be highly improved because one or more software keys are displayed suitably or ideally depending on whether or not a computing device is communicatable with a remote display device.

As illustrated in FIG. 111, the sixteenth aspect of the display control begins when a tap on a text input field contained in the screen is detected (S1200). Instead, the sixteenth aspect of the display control may begin when hover is detected in proximity above the text input filed over the screen for more than a predetermined period.

Supplemental Note and Conclusion

In the above-mentioned embodiments, the video signals generated by the computing device 1 and 50 may be analog video signals or digital video signals. Also, the video signals may be non-encoded or encoded pursuant to some protocol such as MPEG (Motion Picture Experts Group).

Further modifications and alternative embodiments will be apparent to those skilled in the art in view of this disclosure. Accordingly, the above description is to be construed as illustrative only and is for the purpose of teaching those skilled in the art a manner of carrying out the invention. It is to be understood that the forms of the invention herein shown and described are to be taken as exemplary embodiments. Various modifications may be made without departing from the scope of the invention. For example, equivalent elements or materials may be substitute for those illustrated and described herein, and certain features of the invention may be utilized independently of the use of other features, all as would be apparent to one skilled in the art after having the benefit of this description of the invention. In addition, the terms "a" and "an" are generally used in the present disclosure to mean one or more.

Thanks to the above-mentioned user interface with improved display control according to the embodiments, usability can be highly improved.

What is claimed is:

1. A handheld computing device, comprising:
   a sensitive display configured to detect (a) hover of a user's finger or stylus in proximity above the sensitive display when the user is hovering the finger or stylus in proximity above the sensitive display and (b) a touch of the user's finger or stylus onto the sensitive display in response to the user touching the finger or stylus onto the sensitive display subsequently to the hovering of the finger or stylus;
   a graphical user interface (GUI) configured to be displayed on the sensitive display, the GUI containing selectable GUI objects each of which is linked to a specific content so that a touch of the finger or stylus onto one of the GUI objects invokes display of a specific content linked to the one of the GUI objects, wherein each GUI object is a text object or image object;
   communication circuitry through which to establish a short-range communication with an external display device so that the GUI is transmitted to and displayed remotely on the external display device via the communication, thereby allowing the user to operate the GUI through the touch of the user's finger or stylus on the sensitive display while watching the GUI displayed remotely on the external display device;
   a first graphical assistant object configured to be displayed over the GUI in response to hover of the user's finger or stylus being detected above the GUI, wherein the first graphical assistant object indicates a location of the detected hover by being displayed at the location of the detected hover over the GUI; and
   a second graphical assistant object configured to be popped up and displayed over the GUI in response to hover of the user's finger or stylus being detected above a first GUI object linked to a first specific content continuously for more than a predetermined time period prior to touch of the user's finger or stylus being detected onto the first GUI object, the second graphical assistant object being displayed until the hover is undetected, wherein the second graphical assistant object is linked to the first specific content to which the first GUI object is originally linked so that a touch of the finger or stylus onto the second graphical assistant object invokes display of the first specific content instead of the touch of the finger or stylus onto the first GUI object.

2. The handheld computing device according to claim 1, wherein the second graphical assistant object includes a thumbnail or screenshot of the first specific content originally linked to the first GUI object.

3. The handheld computing device according to claim 1, wherein the second graphical assistant object is configured to be displayed larger than the first GUI object.

4. The handheld computing device according to claim 1, wherein the second graphical assistant object is configured to be popped up and displayed in proximity to but predetermined pixels away from the first GUI object.

5. The handheld computing device according to claim 1, wherein:
   after the second graphical assistant object is displayed, in response to the detection of the hover of the user's finger or stylus above the first GUI object being stopped and having transitioned to detection of hover of the user's finger or stylus above a second GUI object linked to a second specific content continuously for more than the predetermined time period, the second graphical assistant object is linked to the second specific content to which the second GUI object is originally linked.

6. The handheld computing device according to claim 1, wherein:
   the handheld computing device has a world wide web (WWW) browser installed thereon;
   the GUI includes a first WWW page;
   the first GUI object is a hypertext link to a second WWW page other than the first WWW page; and
   the display of the first specific content includes connection to and display of the second WWW page.

7. The handheld computing device according to claim 1, further comprising:
   an onscreen software keyboard configured to be displayed on the sensitive display in response to a touch of the user's finger or stylus being detected onto a text input field in the GUI, wherein the onscreen software keyboard has a first size that is small enough for the onscreen software keyboard to be displayed along with the GUI when the GUI is displayed locally on the sensitive display whereas the onscreen software keyboard has a second size larger than the first size when the GUI is displayed remotely on the external display device via the short-range communication through the communication circuitry.

8. A handheld touch screen device, comprising:
   a sensitive display (a) above which to detect hover of a user's finger or stylus in response to the user hovering the finger or stylus in proximity above the sensitive display and (b) on which to detect a touch of the user's finger or stylus in response to the user touching the finger or stylus onto the sensitive display subsequently to the hovering of the finger or stylus;
   a processor; and
   a memory storing computer program instructions that, when executed by the processor, cause the handheld touch screen device to perform operations comprising:
   displaying a graphical user interface (GUI) on the sensitive display, the GUI containing one or more selectable GUI objects each of which is linked to a specific content so that a touch of the user's finger or stylus on a GUI object initiates display of the specific content to which the GUI object is linked, wherein the GUI object is one of a text object and image object;
   in response to detecting a touch of the user's finger or stylus on a first GUI object linked to a first specific content, initiating display of the first specific content;
   providing a popup display of a graphical assistant object over the GUI in response to detecting hover of the user's finger or stylus above the first GUI object continuously for more than a predetermined time period, wherein the graphical assistant object is linked to the first specific content just as the first GUI object is originally linked to;

after the provision of the popup display of the graphical assistant object, terminating the popup display of the graphical assistant object in response to the hover of the user's finger or stylus being undetected; and after the provision of the popup display of the graphical assistant object before the termination of the popup display of the graphical assistant object, initiating display of the first specific content in response to detecting a touch of the user's finger or stylus on one of the first GUI object and the graphical assistant object, thereby allowing the user to initiate the display of the first specific content through the touch on the graphical assistant object instead of through the touch on the first GUI object.

9. The handheld touch screen device according to claim 8, wherein the graphical assistant object includes a thumbnail or screenshot of the first specific content to which the first GUI object is originally linked.

10. The handheld touch screen device according to claim 8, wherein the graphical assistant object is displayed larger than the first GUI object.

11. The handheld touch screen device according to claim 8, wherein providing the popup display of the graphical assistant object comprises generating the graphical assistant object by copying and enlarging the first GUI object.

12. The handheld touch screen device according to claim 8, wherein the graphical assistant object is displayed in proximity to but predetermined pixels away from the first GUI object.

13. The handheld touch screen device according to claim 8, wherein:

in response to the detection of the hover of the user's finger or stylus above the first GUI object being stopped and having transitioned to detection of hover of the user's finger or stylus above a second GUI object linked to a second specific content continuously for more than the predetermined time period, the second graphical assistant object is linked to the second specific content to which the second GUI object is originally linked.

14. The handheld touch screen device according to claim 8, wherein:

the handheld touch screen device has a world wide web (WWW) browser installed thereon;
the GUI includes a first WWW page;
the first GUI object is a hypertext link to a second WWW page other than the first WWW page; and
the display of the first specific content includes connection to and display of the second WWW page.

15. The handheld touch screen device according to claim 8, further comprising communication circuitry through which to establish a short-range communication with an external display device so that the GUI is transmitted to and displayed remotely on the external display device via the communication, thereby allowing the user to operate the GUI through the touch of the user's finger or stylus on the sensitive display while watching the GUI displayed remotely on the external display device, wherein:

the operations further comprise providing a display of an onscreen software keyboard on the sensitive display in response to detecting a touch of the user's finger or stylus onto a text input field in the GUI; and
the onscreen software keyboard has a first size that is small enough for the onscreen software keyboard to be displayed along with the GUI when the GUI is displayed locally on the sensitive display whereas the onscreen software keyboard has a second size larger than the first size when the GUI is displayed remotely on the external display device via the short-range communication through the communication circuitry.

16. A handheld computing device, comprising:

a sensitive display configured to detect a touch of a user's finger or stylus in response to the user touching the finger or stylus onto the sensitive display;

a graphical user interface (GUI) configured to be displayed on the sensitive display, the GUI containing one or more selectable GUI objects each of which is linked to a specific content so that a touch of the finger or stylus onto one of the GUI objects invokes display of a specific content linked to the one of the GUI objects, wherein each GUI object is a text object or image object;

communication circuitry through which to establish a short-range communication with an external display device so that the GUI is transmitted to and displayed remotely on the external display device via the communication, thereby allowing the user to operate the GUI through the touch of the user's finger or stylus on the sensitive display while watching the GUI displayed remotely on the external display device a processor; and a memory storing computer program instructions that, when executed by the processor, cause the handheld computing screen device to perform operations comprising:

providing a display of an onscreen software keyboard on the sensitive display in response to detecting a touch of the user's finger or stylus onto a text input field in the GUI, wherein the onscreen software keyboard has a first size that is small enough for the onscreen software keyboard to be displayed along with the GUI when the GUI is displayed locally on the sensitive display as the short-range communication is not active, whereas the onscreen software keyboard has a second size larger than the first size when the GUI is displayed remotely on the external display device via the short-range communication through the communication circuitry.

17. The handheld computing device according to claim 16, wherein the second size is large enough for the onscreen software keyboard to be displayed in a full-screen manner.

18. The handheld computing device according to claim 16, wherein the second size is large enough for the onscreen software keyboard to be displayed alone on the sensitive display.

19. The handheld computing device according to claim 16, wherein the sensitive display is further configured to detect hover of the user's finger or stylus in proximity above the sensitive display when the user is hovering the finger or stylus in proximity above the sensitive display, and the operations further comprise:

providing a display of a graphical assistant object over the GUI in response to hover of the user's finger or stylus being detected above the GUI, the graphical assistant object indicates a location of the detected hover by being displayed at the location of the detected hover over the GUI.

20. The handheld computing device according to claim 16, wherein the sensitive display is further configured to detect hover of the user's finger or stylus in proximity above the sensitive display when the user is hovering the finger or stylus in proximity above the sensitive display, and the operations further comprise:

providing a popup display of a graphical assistant object over the GUI in response to hover of the user's finger or stylus being detected above a first GUI object linked to a first specific content continuously for more than a predetermined time period, the graphical assistant object being displayed until the hover is undetected, wherein the graphical assistant object is linked to the first specific content to which the first GUI object is originally linked; and while the graphical assistant object is displayed, initiating display of the first specific object in response to a touch of the user's finger or stylus being detected onto one of the first GUI object and the graphical assistant object, thereby allowing the user to initiate the display of the first specific content through the touch on the graphical assistant object instead of through the touch on the first GUI object.

\* \* \* \* \*